United States Patent
Shinkai et al.

(10) Patent No.: US 9,513,487 B2
(45) Date of Patent: Dec. 6, 2016

(54) ILLUMINATION DEVICE INCLUDING A LIGHT MODULATION LAYER, AND A DISPLAY UNIT INCLUDING THE ILLUMINATION DEVICE

(75) Inventors: Shogo Shinkai, Miyagi (JP); Harumi Sato, Kanagawa (JP); Akira Ebisui, Tokyo (JP); Kentaro Okuyama, Kanagawa (JP); Yuji Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 158 days.

(21) Appl. No.: 14/112,806

(22) PCT Filed: May 9, 2012

(86) PCT No.: PCT/JP2012/061913
§ 371 (c)(1),
(2), (4) Date: Oct. 18, 2013

(87) PCT Pub. No.: WO2012/153779
PCT Pub. Date: Nov. 15, 2012

(65) Prior Publication Data
US 2014/0036176 A1 Feb. 6, 2014

(30) Foreign Application Priority Data

May 10, 2011 (JP) .................................. 2011-105559
Aug. 8, 2011 (JP) .................................. 2011-173349

(51) Int. Cl.
*G02B 27/22* (2006.01)
*F21V 8/00* (2006.01)
(Continued)

(52) U.S. Cl.
CPC ......... *G02B 27/2214* (2013.01); *G02B 6/0043* (2013.01); *G02B 6/0055* (2013.01);
(Continued)

(58) Field of Classification Search
CPC .............. G02F 1/1334; G02F 1/133615; G02F 1/133553; G02F 1/133536; G09G 2310/024; G09G 2320/0233; G09G 2330/021; G09G 3/3648
See application file for complete search history.

(56) References Cited

U.S. PATENT DOCUMENTS

| 2007/0091638 A1 | 4/2007 | Ijzerman et al. |
| 2010/0085510 A1* | 4/2010 | Okuyama ......... G02F 1/133615 349/65 |

(Continued)

FOREIGN PATENT DOCUMENTS

| EP | 2322981 | 5/2011 |
| EP | 2426401 | 3/2012 |

(Continued)

*Primary Examiner* — Huyen Ngo
(74) *Attorney, Agent, or Firm* — K&L Gates LLP

(57) ABSTRACT

A display unit is provided including: a display panel having a plurality of pixels two-dimensionally arranged; a first polarization plate and a second polarization plate that face each other with the display panel in between; and an illumination device configured to illuminate the display panel through the first polarization plate. The illumination device includes a light modulation layer provided in a clearance between first and second transparent substrates, the light modulation layer being configured to exhibit scattering property or transparency of the light from the light source depending on a magnitude of an electric field. The light modulation layer includes a first portion having optical anisotropy, and relatively high responsiveness to the electric field, and a second portion having optical anisotropy, and relatively low responsiveness to the electric field. The light modulation layer generates polarized light when the light modulation layer exhibits the scattering property, the polar- (Continued)

ized light having a polarization component mainly in a first direction that is parallel to a transmission axis of the first polarization plate.

19 Claims, 79 Drawing Sheets

(51) Int. Cl.
  *G02F 1/1334* (2006.01)
  *G02F 1/1335* (2006.01)

(52) U.S. Cl.
  CPC .......... *G02B 6/0056* (2013.01); *G02F 1/1334* (2013.01); *G02F 1/13362* (2013.01); *G02F 1/133615* (2013.01); *G02F 2203/62* (2013.01)

(56) References Cited

U.S. PATENT DOCUMENTS

| | | | |
|---|---|---|---|
| 2010/0165450 A1* | 7/2010 | Okuyama | B29C 35/0894 359/315 |
| 2010/0171903 A1* | 7/2010 | Okuyama | G02B 6/0041 349/65 |
| 2011/0155296 A1* | 6/2011 | Nakamura | G02B 5/201 156/67 |
| 2012/0069063 A1* | 3/2012 | Sato | H04N 13/0452 345/690 |

FOREIGN PATENT DOCUMENTS

| | | |
|---|---|---|
| JP | 03-119889 | 5/1991 |
| JP | 05-297372 | 11/1993 |
| JP | 11-285030 | 10/1999 |
| JP | 2010-092682 | 4/2010 |
| WO | 2005/045488 | 5/2005 |
| WO | 2010/035562 | 4/2010 |
| WO | 2011/125392 | 10/2011 |

\* cited by examiner (A)

(B)

(A)

(B)

(C)

(A)

(B)

(C)

(A)

(B)

(C)

ANGLE FORMED BY PROJECTION AND LINEAR ILLUMINATION LIGHT BEAM (A)

(B)

(C)

(D)

(A)

(B)

(A)   (B)

(C)   (D)

(A)

(B)

RUBBING DIRECTION

ILLUMINATION DEVICE INCLUDING A LIGHT MODULATION LAYER, AND A DISPLAY UNIT INCLUDING THE ILLUMINATION DEVICE

CROSS REFERENCES TO RELATED APPLICATIONS

The present application is a national stage of International Application No. PCT/JP2012/061913 filed on May 9, 2012 and claims priority to Japanese Patent Applications JP2011-105559 filed on May 10, 2011, and JP2011-173349 filed on Aug. 8, 2011 the disclosure of which is incorporated herein by reference.

BACKGROUND

The present technology relates to a display unit capable of performing two-dimensional display (planar display) and three-dimensional display (stereoscopic display), and to an illumination device suitably applicable to a backlight of such a display unit.

Display units capable of performing three-dimensional display include display units in which it is necessary for a viewer to wear special glasses and display units in which it is unnecessary for a viewer to wear special glasses. The latter display unit uses a lenticular lens or a parallax barrier in order to allow a stereoscopic picture to be visually observed with naked eyes. Picture information is divided into information for a right eye and information for a left eye by the lenticular lens or the parallax barrier, and thus different pictures are observed by the right and left eyes. As a result, three-dimensional display becomes possible.

In the case where the above-described parallax barrier is used, however, resolution in two-dimensional display is degraded. Therefore, a technology of performing three-dimensional display without impairing the resolution in two-dimensional display is disclosed in PTL 1. In PTL 1, a parallax barrier is configured of a liquid crystal element, and the liquid crystal element becomes a parallax barrier in three-dimensional display by making a non-transmissive region. Then, in two-dimensional display, making the entire surface be transmissive prevents the liquid crystal element from becoming a parallax barrier, and thus the entire picture on a display screen equally enters right and left eyes of a viewer.

CITATION LIST

Patent Literature

PTL 1: Japanese Unexamined Patent Application Publication No. H03-119889
PTL 2: Japanese Unexamined Patent Application Publication No. H11-285030

SUMMARY

In the method described in PTL 1, however, light is absorbed by the parallax barrier in three-dimensional display, and thus display luminance is disadvantageously low.

In PTL 2, a technology of suppressing decrease in luminance by using a cylindrical lens and a polymer dispersed liquid crystal (PDLC) in place of a parallax barrier is disclosed. In the method described in PTL 2, however, when a viewer views a display screen in an oblique direction, display quality is disadvantageously degraded because of aberration of the cylindrical lens.

Therefore, it is desirable to provide a display unit capable of improving both display luminance and display quality in three-dimensional display, and an illumination device suitably applicable to such a display unit.

A display unit according to an embodiment of the technology includes: a display panel having a plurality of pixels two-dimensionally arranged; a first polarization plate and a second polarization plate that face each other with the display panel in between; and an illumination device configured to illuminate the display panel through the first polarization plate. The illumination device includes a first transparent substrate and a second transparent substrate that are arranged to face each other with a distance, a light source configured to apply light to an end surface of the first transparent substrate or an end surface of the second transparent substrate, and a light modulation layer provided in a clearance between the first transparent substrate and the second transparent substrate. Here, the light modulation layer is configured to exhibit scattering property or transparency to the light from the light source depending on a magnitude of an electric field. The light modulation layer includes a first region that has optical anisotropy, and relatively high responsiveness to the electric field, and a second region that has optical anisotropy, and relatively low responsiveness to the electric field. The light modulation layer generates polarized light that has a polarization component mainly in a direction parallel to a transmission axis of the first polarization plate when the light modulation layer exhibits the scattering property.

In the display unit according to the embodiment of the technology, the light modulation layer exhibiting scattering property or transparency to the light from the light source depending on a magnitude of the electric field is provided in the illumination device. Therefore, light propagating through a light guide plate is allowed to be extracted from a region exhibiting scattering property (a scattering region). Moreover, in the technology, the light modulation layer generates polarized light that has a polarization component mainly in a direction parallel to the transmission axis of the first polarization plate when the light modulation layer exhibits scattering property. Therefore, as compared with a case where non-polarized light having the same luminance is emitted from the illumination device, it is possible to allow the light of the illumination device to enter the display panel more efficiently. Accordingly, even when three-dimensional display is performed with use of pixels the number of which is smaller than that in two-dimensional display, it is possible to perform three-dimensional display with high display luminance. Incidentally, in the technology, it is unnecessary to provide a parallax barrier for three-dimensional display. However, even if a parallax barrier is provided on a light emission side of the illumination device, the rate at which the light emitted from the light modulation layer is absorbed by the parallax barrier is allowed to be extremely low by using a part of the light modulation layer as a scattering region and allowing the scattering region to correspond to a light transmissive region of the parallax barrier. Moreover, in the embodiment of the technology, it is unnecessary to provide a cylindrical lens for three-dimensional display. Therefore, there is no possibility that aberration caused by a cylindrical lens occurs.

An illumination device according to an embodiment of the technology includes: a first transparent substrate and a second transparent substrate that are arranged to face each other with a distance; and a light source configured to apply light to an end surface of the first transparent substrate or an end surface of the second transparent substrate. The illumination device further includes a light modulation layer that is provided in a clearance between the first transparent substrate and the second transparent substrate, and is configured to exhibit scattering property or transparency to the light from the light source depending on a magnitude of an electric field. The light modulation layer includes a first region that has optical anisotropy, and has relatively high responsiveness to the electric field, and a second region that has optical anisotropy, and has relatively low responsiveness to the electric field. Here, when the light modulation layer exhibits the scattering property, the light modulation layer generates polarized light having a polarization component mainly in a first direction.

In the illumination device according to the embodiment of the technology, the light modulation layer that exhibits scattering property or transparency to light from the light source depending on the magnitude of the electric field is provided. Therefore, light propagating through a light guide plate is allowed to be extracted from a region exhibiting scattering property (a scattering region). In addition, in the technology, when the light modulation layer exhibits scattering property, the light modulation layer generates polarized light that has a polarization component mainly in the first direction. Therefore, when a polarization axis of light emitted from the illumination device has a main component in a direction parallel to a transmission axis of a polarization plate provided on the illumination device, the light from the illumination device is allowed to pass through the polarization plate more efficiently as compared with a case where non-polarized light with the same luminance is emitted from the illumination device. As a result, when the illumination device according to the technology is used as a backlight of a display panel using a polarization plate, the light from the illumination device is allowed to enter the display panel more efficiently. Accordingly, even in the case where three-dimensional display is performed with use of the pixels the number of which is smaller than that in two-dimensional display, it is possible to perform three-dimensional display with high display luminance. Incidentally, in the embodiment of the technology, it is unnecessary to provide a parallax barrier for three-dimensional display. However, even if a parallax barrier is provided on a light emission side of the illumination device, the rate at which the light emitted from the light modulation layer is absorbed by the parallax barrier is allowed to be extremely low by using a part of the light modulation layer as a scattering region and allowing the scattering region to correspond to a light transmissive region of the parallax barrier. Moreover, in the embodiment of the technology, it is unnecessary to provide a cylindrical lens for three-dimensional display. Therefore, there is no possibility that aberration caused by the cylindrical lens occurs.

In the illumination device and the display unit according to the respective embodiments of the technology, polarized light is emitted from the illumination device, and a part of the light modulation layer is allowed to be used as a scattering region. Consequently, it is possible to improve both display luminance and display quality in three-dimensional display.

Additional features and advantages are described herein, and will be apparent from the following Detailed Description and the figures.

DETAILED DESCRIPTION

Hereinafter, embodiments of the invention will be described in detail with reference to the accompanying drawings. Note that description will be given in the following order.

1. First Embodiment
   An example in which a light modulation device (horizontal aligned PDLC) is used in a backlight
2. Second Embodiment
   An example in which a light modulation device (vertical aligned PDLC) is used in a backlight
3. Modifications
4. Examples

1. First Embodiment (Configuration of Transmitting and Receiving System of Television Broadcasting Signal)

Figure 1:
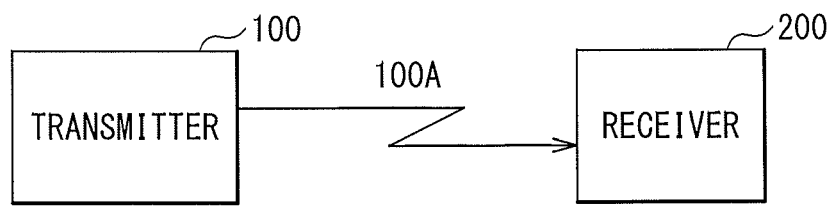
FIG. 1 is a diagram illustrating an example of a transmitting and receiving system of a television broadcasting signal according to a first embodiment of the technology.

FIG. 1 is a block diagram illustrating a configuration example of a transmitting and receiving system of a television broadcasting signal 100A, including a receiver 200, according to a first embodiment of the technology. The transmitting and receiving system may include, for example, a transmitter 100 configured to transmit a television broadcasting signal through wired communication (such as cable TV) or wireless communication (such as terrestrial digital waves and satellite waves), and the receiver 200 configured to receive the television broadcasting signal from the transmitter 100 through the above-described wired or wireless communication. Note that the receiver 200 corresponds to a specific example of "display unit" of the technology.

The television broadcasting signal 100A contains picture data for two-dimensional display (planar display) or picture data for three-dimensional display (stereoscopic display). In this case, the picture data for two-dimensional display indicates two-dimensional picture data not containing perspective information. Moreover, the picture data for three-dimensional display indicates two-dimensional picture data containing perspective information, and the picture data for three-dimensional display includes a plurality of pieces of two-dimensional picture data with different perspectives. For example, the transmitter 100 may be a television broadcasting signal transmitter placed in a broadcast station, or a server on the Internet.

(Functional Block of Receiver 200)

Figure 2:
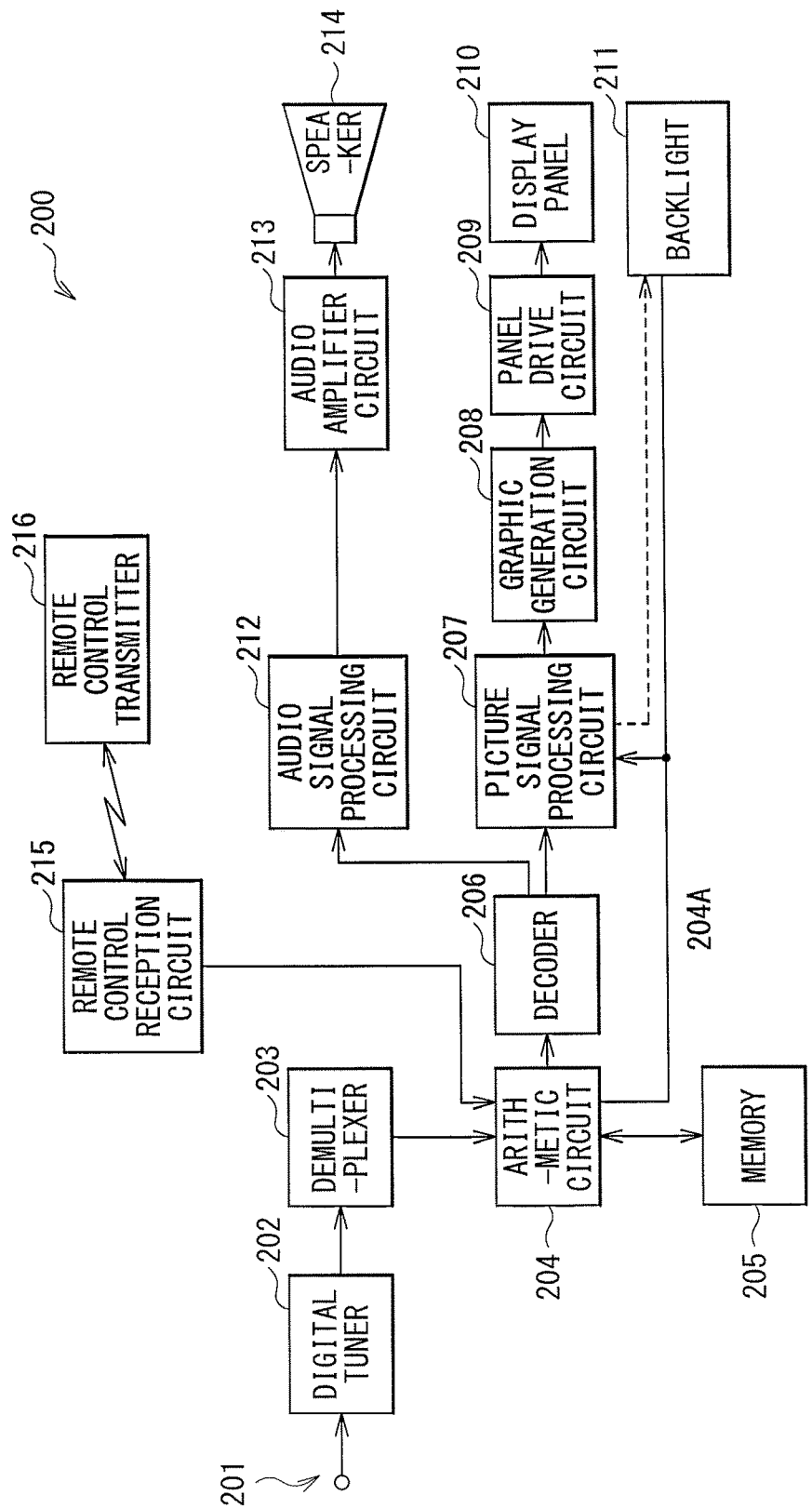
FIG. 2 is a diagram illustrating an example of a functional block of a receiver in FIG. 1.

FIG. 2 is a block diagram illustrating a configuration example of the receiver 200. For example, the receiver 200 may be a television connectable to the above-described wire or wireless communication. The receiver may include, for example, an antenna terminal 201, a digital tuner 202, a demultiplexer 203, an arithmetic circuit 204, and a memory 205. In addition, the receiver 200 may include, for example, a decoder 206, a picture signal processing circuit 207, a graphic generation circuit 208, a panel drive circuit 209, a display panel 210, a backlight 211, an audio signal processing circuit 212, an audio amplifier circuit 213, and a speaker 214. Furthermore, the receiver 200 may include, for example, a remote control reception circuit 215, and a remote control transmitter 216. Note that the display panel 210 corresponds to a specific example of "display panel" of the technology, and the backlight 211 corresponds to a specific example of "illumination device" of the technology.

The antenna terminal 201 is a terminal receiving a television broadcasting signal received by a receiving antenna (not illustrated). For example, the digital tuner 202 may process the television broadcasting signal input to the antenna terminal 201, and output a predetermined transport stream corresponding to a channel selected by a user. For example, the demultiplexer 203 may extract a partial transport stream (TS) corresponding to the channel selected by the user, from the transport stream obtained in the digital tuner 202.

The arithmetic circuit 204 controls operation of each section in the receiver 200. For example, the arithmetic circuit 204 may store the partial TS obtained in the demultiplexer 203 in the memory 205, or transmit the partial TS read from the memory 205 to the decoder 206. In addition, for example, the arithmetic circuit 204 may transmit a control signal 204A specifying two-dimensional display or three-dimensional display to the picture signal processing circuit 207 and the backlight 211. The arithmetic circuit 204 sets the above-described control signal 204A, based on, for example, setting information stored in the memory 205, predetermined information included in the partial TS, or setting information input from the remote control reception circuit 215.

For example, the memory 205 may hold setting information of the receiver 200 and performs data management. For example, the memory 205 may be capable of holding the partial TS obtained in the demultiplexer 203 and setting information such as a display method.

For example, the decoder 206 may perform decode processing on picture packetized elementary stream (PES) packets included in the partial TS that is obtained in the demultiplexer 203, to obtain picture data. Moreover, for example, the decoder 206 may perform decode processing on audio PES packets included in the partial TS that is obtained in the demultiplexer 203, to obtain audio data. In this case, the picture data indicates picture data for two-dimensional display or picture data for three-dimensional display.

For example, the picture signal processing circuit 207 and the graphic generation circuit 208 may perform multi-image processing, superimposing processing of graphics data, and the like, as necessary, on the picture data obtained in the decoder 206.

In the case where a signal specifying three-dimensional display is input as the control signal 204A from the arithmetic circuit 204 and the picture data input from the decoder 206 is picture data for three-dimensional display, for example, the picture signal processing circuit 207 may create one piece of two-dimensional picture data with use of a plurality of pieces of two-dimensional picture data with different perspectives that are contained in the picture data for three-dimensional display input from the decoder 206, and select the created two-dimensional picture data as picture data to be output to the graphic generation circuit 208. For example, in the case where the picture data for three-dimensional display contains two pieces of two-dimensional picture data with different perspectives, the picture signal processing circuit 207 may perform processing, for each row, to alternately arrange the two pieces of two-dimensional picture data in a horizontal direction, and thus create one piece of picture data in which the two pieces of two-dimensional picture data are alternately arranged in the horizontal direction. Likewise, for example, in the case where the picture data for three-dimensional display contains four pieces of two-dimensional picture data with different perspectives, the picture signal processing circuit 207 may perform processing, for each row, to arrange the four pieces of two-dimensional picture data one by one periodically in the horizontal direction, and thus create one piece of picture data in which the four pieces of two-dimensional picture data are arranged one by one periodically in the horizontal direction.

In the case where a signal specifying two-dimensional display is input as the control signal 204A from the arithmetic circuit 204 and the picture data input from the decoder 206 is picture data for three-dimensional display, for example, the picture signal processing circuit 207 may select one piece of picture data of a plurality of pieces of two-dimensional picture data with different perspectives contained in the picture data for three-dimensional display that is input from the decoder 206, as picture data to be output to the graphic generation circuit 208. In the case where a signal specifying two-dimensional display as the control signal 204A is input from the arithmetic circuit 204 and the picture data input from the decoder 206 is picture data for two-dimensional display, the picture signal processing circuit 207 selects the picture data for two-dimensional display input from the decoder 206, as picture data to be output to the graphic generation circuit 208.

For example, the graphic generation circuit 208 may generate an user interface (UI) screen used in screen display. For example, the panel drive circuit 209 may drive the display panel 210, based on the picture data output from the graphic generation circuit 208.

The configurations of the display panel 210 and the backlight 211 will be described later. For example, the audio signal processing circuit 212 may perform processing such as D/A conversion on audio data obtained in the decoder 206. For example, the audio amplifier circuit 213 may amplify an audio signal output from the audio signal processing circuit 212 to supply the amplified audio signal to the speaker 214.

For example, the remote control reception circuit 215 may receive a remote control signal transmitted from the remote control transmitter 216, and supply the received remote control signal to the arithmetic circuit 204. For example, the arithmetic circuit 204 may control each section in the receiver 200 according to the remote control signal.

(Cross-Sectional Structure of Receiver 200)

Figure 3:
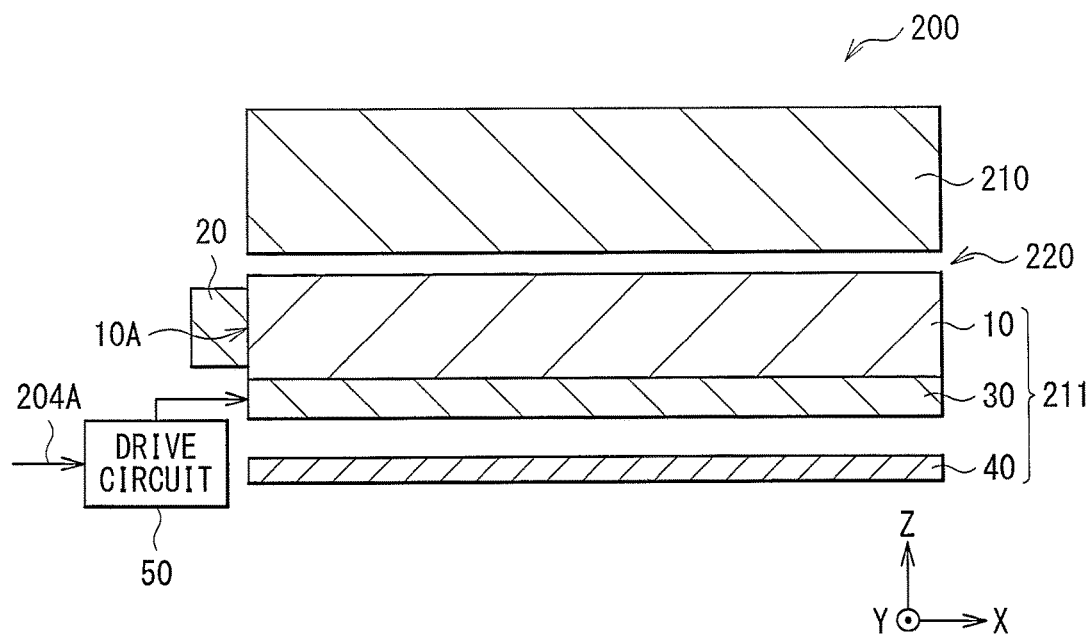
FIG. 3 is a sectional diagram illustrating an example of a structure of a display unit in the receiver in FIG. 1.

FIG. 3 illustrates an example of a cross-sectional structure of the display section in the receiver 200. Note that FIG. 3 schematically illustrates the cross-sectional structure, and actual dimensions and actual shapes are not limited to the illustrated dimensions and the illustrated shapes. The receiver 200 includes a display panel 210 and a backlight 211 disposed behind the display panel 210.

The display panel 210 includes a plurality of pixels arranged two-dimensionally, and displays a picture when the respective pixels or specific pixels are driven. For example, the display panel 210 may be a transmissive liquid crystal display (LCD) panel in which the respective pixels or specific pixels are driven in response to a picture signal, and may have a structure in which a liquid crystal layer is sandwiched between a pair of transparent substrates. The display panel 210 may include, for example, a polarization plate, a transparent substrate, pixel electrodes, an alignment film, a liquid crystal layer, an alignment film, a common electrode, a color filter, a transparent substrate, and a polarization plate in order from the backlight 211 side.

Note that the polarization plate on the backlight 211 side corresponds to a specific example of "first polarization plate" of the technology, and the polarization plate on a picture display surface side corresponds to a specific example of "second polarization plate" of the technology. In addition, the polarization plate on the backlight 211 side corresponds to a polarization plate 210B (see FIG. 20) described later, and the polarization plate on the picture display surface side corresponds to the polarization plate 210C (see FIG. 20) described later. Moreover, a section (more specifically, a stacked section configured of the transparent substrate, the pixel electrodes, the alignment film, the liquid crystal layer, the alignment film, the common electrode, the color filter, and the transparent substrate) sandwiched by the pair of polarization plates in the display panel 210 corresponds to a liquid crystal panel 210A (see FIG. 20) described later.

The transparent substrate is formed of a substrate transparent to visible light, such as plate glass. Note that, although not illustrated, the transparent substrate on the backlight 211 side is provided with an active drive circuit including thin film transistors (TFTs) electrically connected to the pixel electrodes, wirings, and the like. For example, the pixel electrode and the common electrode may be formed of indium tin oxide (ITO). The pixel electrodes are two-dimensionally arranged on the transparent substrate, and each of the pixel electrodes functions as an electrode for each pixel. On the other hand, the common electrode is formed over a surface on the color filter, and functions as a common electrode facing the respective pixel electrodes. The alignment film may be formed of, for example, a polymer material such as polyimide, and performs alignment on a liquid crystal.

For example, the liquid crystal layer may be formed of a liquid crystal of vertical alignment (VA) mode, twisted nematic (TN) mode, or super twisted nematic (STN) mode, and has a function of changing a direction of a polarization axis of emitted light from the backlight 211 for each pixel, in response to a voltage applied from a drive circuit (not illustrated). Note that changing arrangement of the liquid crystal in multiple steps allows adjustment of the direction of a transmission axis for each pixel in multiple steps. The color filter is configured by arranging color filters that separate light having passed through the liquid crystal layer into three primary colors of red (R), green (G), and blue (b), or color filters that separate the light into four colors of R, G, B, and white (W), so as to correspond to the arrangement of the pixel electrodes.

The polarization plate is a kind of an optical shutter, and allows only light (polarized light) that oscillates in a certain direction to pass therethrough. Note that the polarization plate may be an absorption type polarization element absorbing light (polarized light) that oscillates in a direction other than the transmission axis, and may be preferably a reflective polarization element reflecting the light toward the backlight 211 side in terms of luminance improvement. The two polarization plates are arranged so that respective polarization axes are different from each other by 90 degrees. Accordingly, the emitted light from the backlight 211 passes through the polarization plates through the liquid crystal layer, or is shielded by the polarization plates.

For example, the backlight 211 may illuminate the display panel 210 from the backside thereof, and may include a light guide plate 10, a light source 20 disposed on a side surface of the light guide plate, a light modulation device 30 and a reflector 40 that are arranged behind the light guide plate 10, and a drive circuit 50 driving the light modulation device 30. Note that the light guide plate 10 corresponds to a specific example of "first transparent substrate" or "second transparent substrate" of the technology. The light source 20 corresponds to a specific example of "light source" of the technology.

The light guide plate 10 guides light from the light source 20, which is disposed on the side surface of the light guide plate, to a top surface of the light guide plate 10. The light guide plate 10 may have a shape corresponding to the display panel 210 disposed on the top surface of the light guide plate 10, for example, a rectangular parallelepiped shape enclosed by a top surface, a bottom surface, and side surfaces. Note that, in the following description, the side surface receiving the light from the light source 20 of the side surfaces of the light guide plate 10 is referred to as a light incident surface 10A. Incidentally, the light incident surface 10A corresponds to a specific example of "end surface" of the technology. For example, the light guide plate 10 may have a predetermined patterned shape on the top surface or the bottom surface or both, and have a function of scattering and uniformizing the light entering from the light incident surface 10A. Note that, when the luminance is uniformized through modulation of a voltage to be applied to the backlight 211, a flat light guide plate not subjected to patterning may be used as the light guide plate 10. For example, the light guide plate 10 may mainly contain a transparent thermoplastic resin such as a polycarbonate resin (PC) and an acrylic resin (polymethyl methacrylate (PMMA)).

The light source 20 is a linear light source, and for example, may be configured of a hot cathode fluorescent lamp (HCFL), a cold cathode fluorescent lamp (CCFL), or a plurality of light emitting diodes (LEDs) arranged in line. When the light source 20 is configured of a plurality of LEDs, all of the LEDs may be preferably white LEDs in terms of efficiency, decrease in thickness, and uniformity. Incidentally, for example, the light source 20 may include red LEDs, green LEDs, and blue LEDs. The light source 20 may be provided on only one side surface of the light guide plate 10 (see FIG. 3), or may be provided on two side surfaces, three side surfaces, or all side surfaces of the light guide plate 10.

The reflector 40 allows light leaking from the back of the light guide plate 10 through the light modulation device 30 to return to the light guide plate 10 side, and for example, may have a function of reflection, diffusion, and scattering. This makes it possible to efficiently utilize the emitted light from the light source 20, and contributes to improvement of front luminance. For example, the reflector 40 may be formed of foamed polyethylene terephthalate (PET), an evaporated silver film, a multilayer reflective film, white PET, or the like. Note that, for example, the reflective film 40 may be omitted as necessary, as will be described later.

Figure 4:
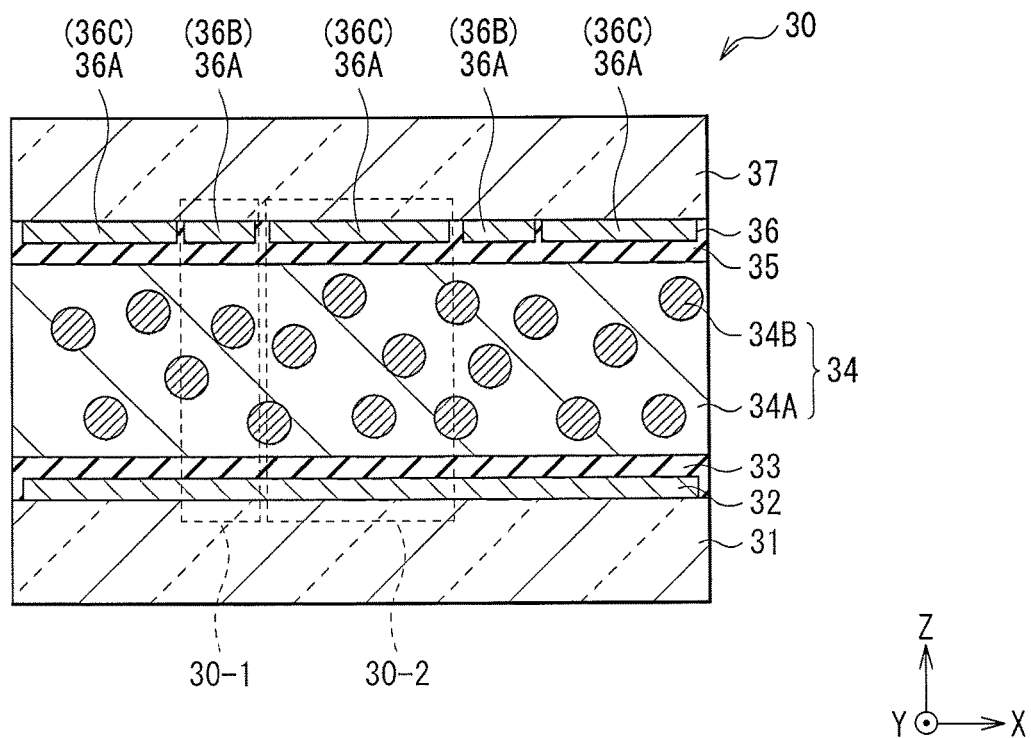
FIG. 4 is a sectional diagram illustrating an example of a structure of a light modulation device in FIG. 3.

In the present embodiment, the light modulation device 30 may be closely adhered to the back (the bottom surface) of the light guide plate 10 without an air layer, and may be bonded to the back of the light guide plate 10 with an adhesive layer (not illustrated) in between, for example. For example, as illustrated in FIG. 4, the light modulation device 30 may be configured by arranging a transparent substrate 31, a lower electrode 32, an alignment film 33, a light modulation layer 34, an alignment film 35, an upper electrode 36, and a transparent substrate 37 in order from the reflector 40 side. Note that the lower electrode 32 corresponds to a specific example of "first electrode" of the technology, and the upper electrode 36 corresponds to a specific example of "second electrode" of the technology.

Figure 5:
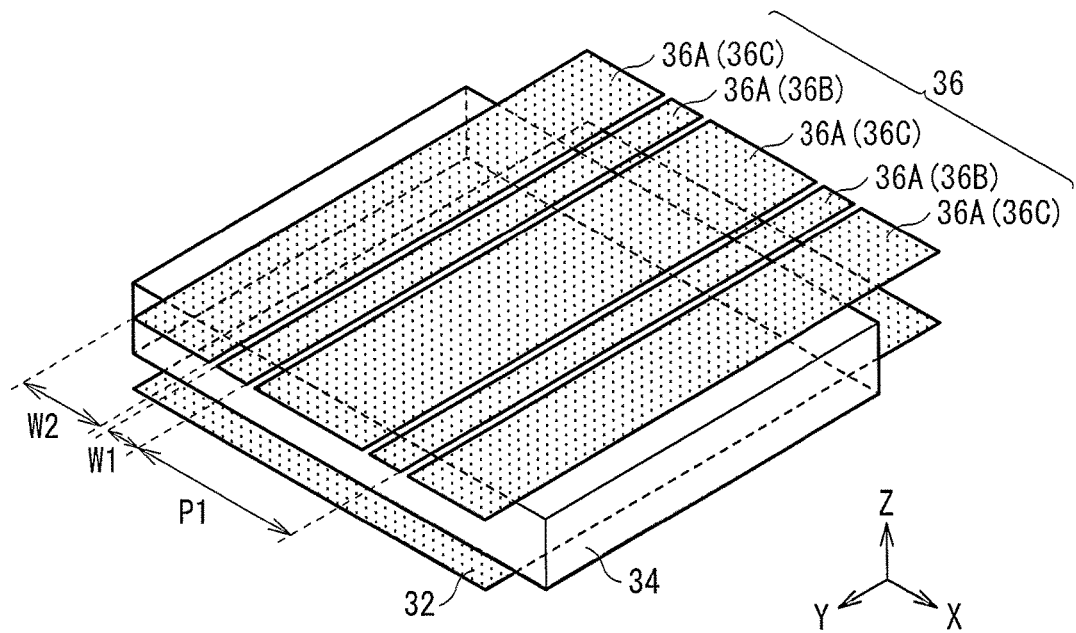
FIG. 5 is a perspective view illustrating an example of an electrode structure in FIG. 4.

The transparent substrates 31 and 37 support the light modulation layer 34, and are each typically formed of a substrate transparent to visible light such as a glass plate and a plastic film. The lower electrode 32 is provided on a surface of the transparent substrate 31 opposed to the transparent substrate 37, and may be formed of, for example, a solid film (a single planar electrode) that is formed over the entire plane as illustrated by a partial illustration of the light modulation device 30 in FIG. 5. Moreover, the upper electrode 36 is provided on a surface of the transparent substrate 37 opposed to the transparent substrate 31, and may be configured of, for example, a plurality of (two or more) partial electrodes 36A as illustrated in FIG. 5. Incidentally, the partial electrode 36A corresponds to a specific example of "first partial electrode" of the technology.

Each of the plurality of partial electrodes 36A has a strip shape extending in one direction in the plane (in a direction parallel to the light incident surface 10A). A specific number of partial electrodes 36A (hereinafter, referred to as "partial electrodes 36B") among the plurality of partial electrodes 36A are used to generate a linear illumination light beam when three-dimensional display is performed in the receiver 200. Note that the partial electrode 36B corresponds to a specific example of "second partial electrode" of the technology. The plurality of partial electrodes 36B are arranged at a pitch P1 (a pitch equal to or close to a pixel pitch P2 (see FIG. 25)) corresponding to the pixel pitch P2 for performing three-dimensional display in the receiver 200. A plurality of partial electrodes 36A other than the partial electrodes 36B of the plurality of partial electrodes 36A (hereinafter, referred to as "partial electrodes 36C") are used, together with the partial electrodes 36B, to generate a planar illumination light beam for performing two-dimensional display in the receiver 200. In other words, when the two-dimensional display is performed in the receiver 200, all of the partial electrodes 36A are used to generate the planar illumination light beam. Note that the partial electrode 36C corresponds to a specific example of "third partial electrode" of the technology. The plurality of partial electrodes 36B and the plurality of partial electrodes 36C are alternately arranged in an arrangement direction (in a direction orthogonal to the light incident surface 10A). A width W1 of the partial electrode 36B is smaller than a width W2 of the partial electrode 36C, and is smaller than a width of the pixel in the display panel 210. The width W1 of the partial electrode 36B may be preferably equal to or smaller than (the width of the pixel in the display panel 210—the thickness of the light modulation layer 34*2).

Figure 6:
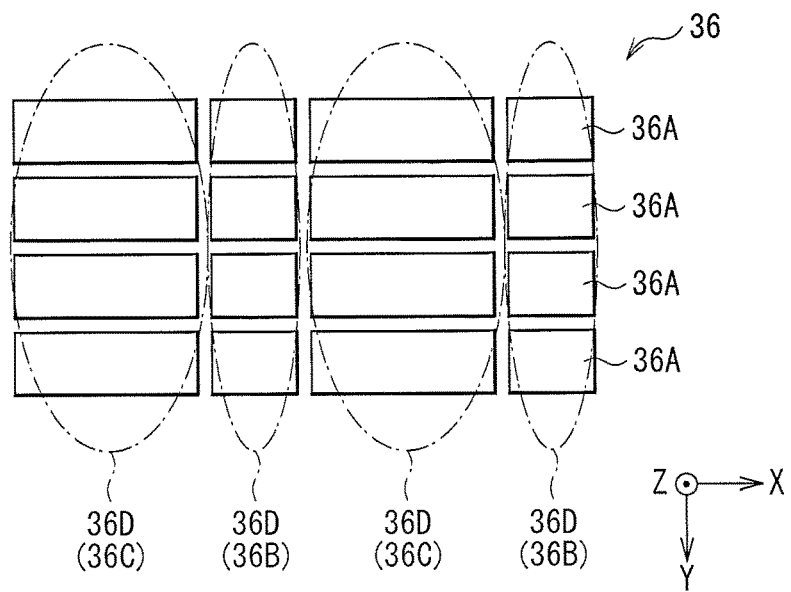
FIG. 6 is a top view illustrating a first modification of the electrode structure in FIG. 4.

For example, as illustrated in FIG. 6, each of the partial electrodes 36A may have a block shape, and the plurality of partial electrodes 36A may be arranged two-dimensionally. In this case, when a certain number of the partial electrodes 36A are regarded as one linear electrode 36D, each of the linear electrodes 36D may be used as the partial electrode 36B or 36C described above. For example, a specific number of linear electrodes 36D of the plurality of linear electrodes 36D may be used as the partial electrodes 36B. A plurality of linear electrodes 36D other than the linear electrodes 36D used as the partial electrodes 36B are used as the partial electrodes 36C. At this time, the linear electrode 36D corresponds to a specific example of "first partial electrode" of the technology, the partial electrode 36B corresponds to a specific example of "second partial electrode" of the technology, and the partial electrode 36C corresponds to a specific example of "third partial electrode" of the technology.

Incidentally, in the case where each of the partial electrodes 36A has a block shape, and the plurality of partial electrodes 36A are arranged two-dimensionally, when three-dimensional display is performed in the display unit, each of the partial electrodes 36A may be used to generate a point illumination light beam. Moreover, in the case where each of the partial electrodes 36A has a block shape and the plurality of partial electrodes 36A are arranged two-dimensionally, when two-dimensional display in which different two-dimensional pictures are allowed to be perceived from two perspectives is performed in the receiver 200, each of the partial electrodes 36A may be used to generate a point illumination light beam.

Figure 7:
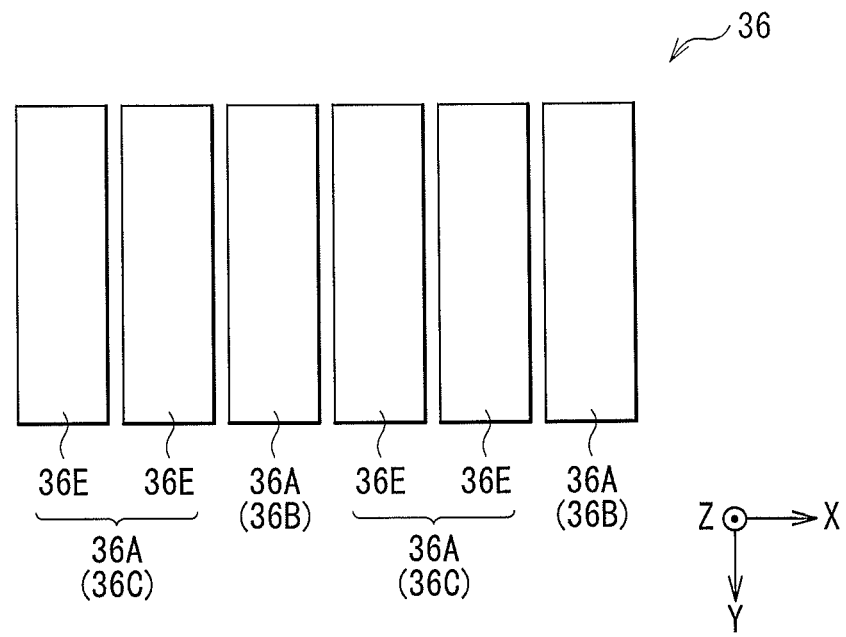
FIG. 7 is a top view illustrating a second modification of the electrode structure in FIG. 4.
Figure 8:
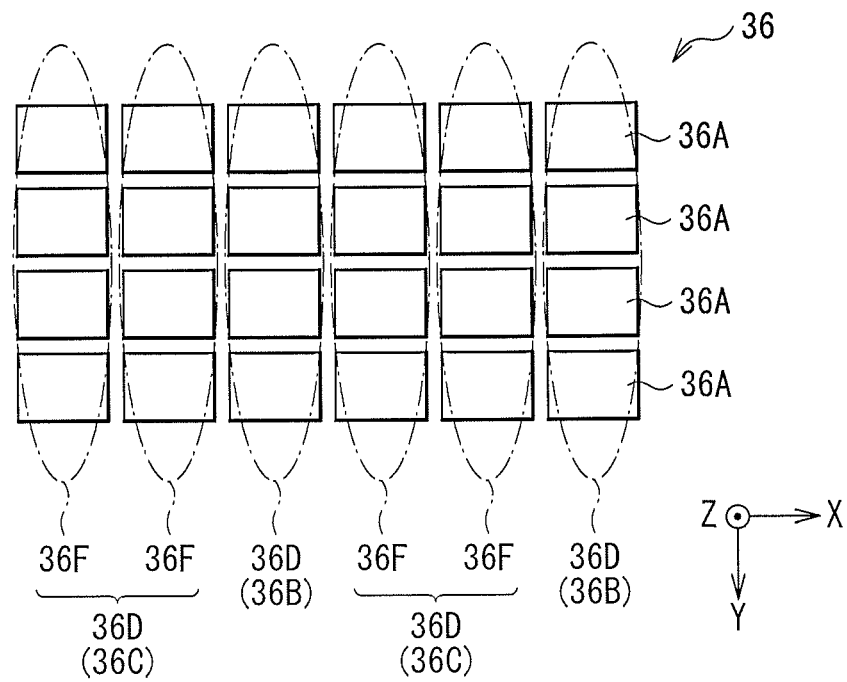
FIG. 8 is a top view illustrating a third modification of the electrode structure in FIG. 4.

In addition, for example, as illustrated in FIG. 7, each of the partial electrodes 36C may be configured of a plurality of strip-shaped partial electrodes 36E each extending in one direction in the plane (in the direction parallel to the light incident surface 10A). At this time, a width of the partial electrode 36E may be equal to the width of the partial electrode 36B. Note that the partial electrode 36E corresponds to a specific example of "third partial electrode" of the technology. Moreover, for example, as illustrated in FIG. 8, the linear electrode 36D used as the partial electrode 36C may be configured of the plurality of partial electrodes 36A arranged two-dimensionally. In this case, when a part of the plurality of partial electrodes 36A included in the linear electrode 36D is regarded as one linear electrode 36F, each linear electrode 36F may extend in one direction in the plane (in the direction parallel to the light incident surface 10A). At this time, the linear electrode 36F corresponds to a specific example of "third partial electrode" of the technology.

Figure 9:
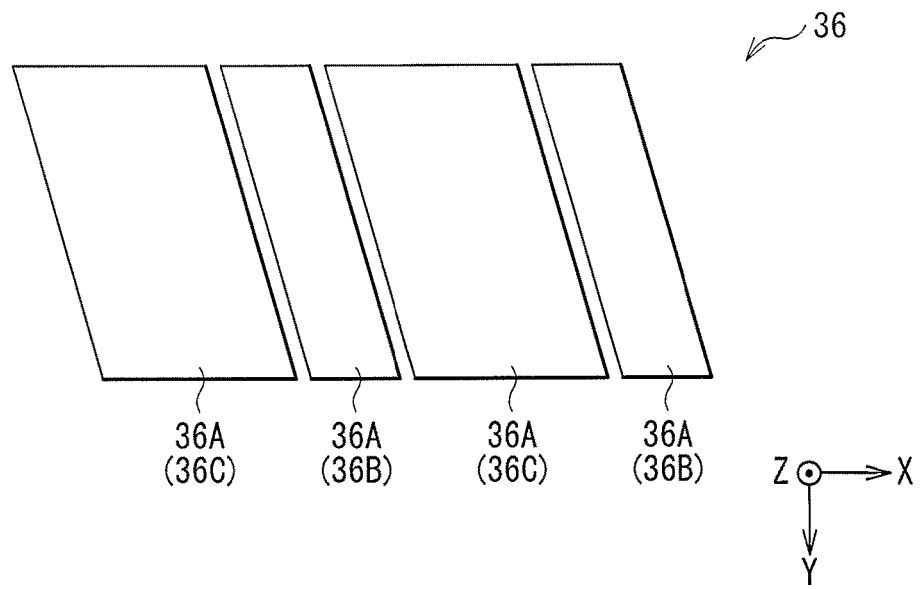
FIG. 9 is a top view illustrating a fourth modification of the electrode structure in FIG. 4.
Figure 10:
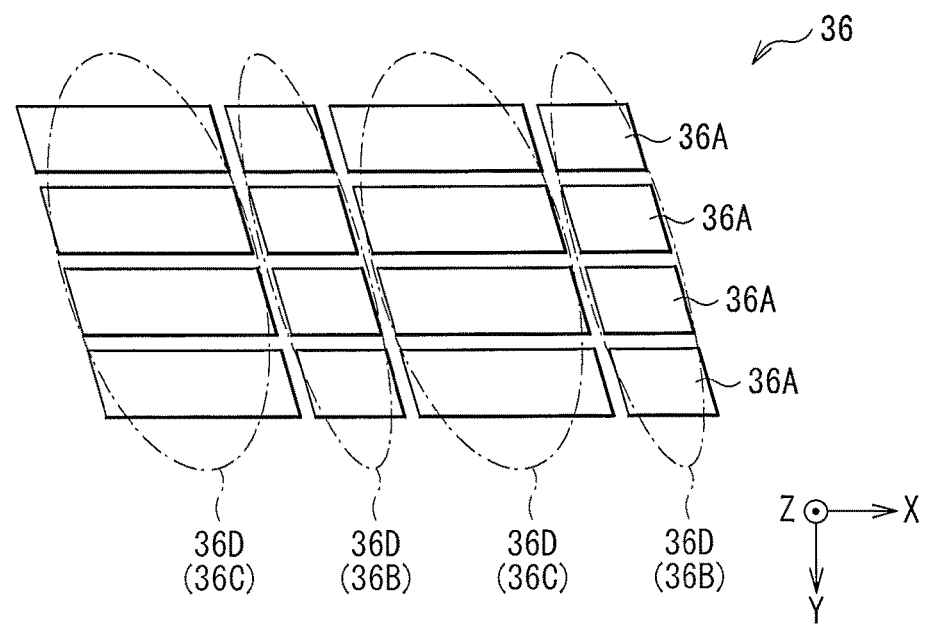
FIG. 10 is a top view illustrating a fifth modification of the electrode structure in FIG. 4.

Moreover, for example, as illustrated in FIG. 9, each of the plurality of partial electrodes 36A may extend in a direction obliquely intersecting the light incident surface 10A at an angle other than the right angle. At this time, the partial electrode 36A corresponds to a specific example of "first partial electrode" of the technology, the partial electrode 36B corresponds to a specific example of "second partial electrode" of the technology, and the partial electrode 36C corresponds to a specific example of "third partial electrode" of the technology. Moreover, in the case where each of the partial electrodes 36A has a block shape and the plurality of partial electrodes 36A are arranged two-dimensionally, each of the linear electrodes 36D may extend in the direction obliquely intersecting the light incident surface 10A at an angle other than the right angle, for example, as illustrated in FIG. 10. In this case, when the plurality of partial electrodes 36A are regarded as one linear electrode 36D, each linear electrode 36D may be used as the partial electrode 36B or 36C described above. For example, a specific number of linear electrodes 36D of the plurality of linear electrodes 36D may be used as the partial electrodes 36B, and a plurality of linear electrode 36D except for the partial electrodes 36D used as the partial electrodes 36B may be used as the partial electrodes 36C. At this time, the linear electrode 36D corresponds to a specific example of "first partial electrode" of the technology, the partial electrode 36B corresponds to a specific example of "second partial electrode" of the technology, and the partial electrode 36C corresponds to a specific example of "third partial electrode" of the technology.

Figure 11:
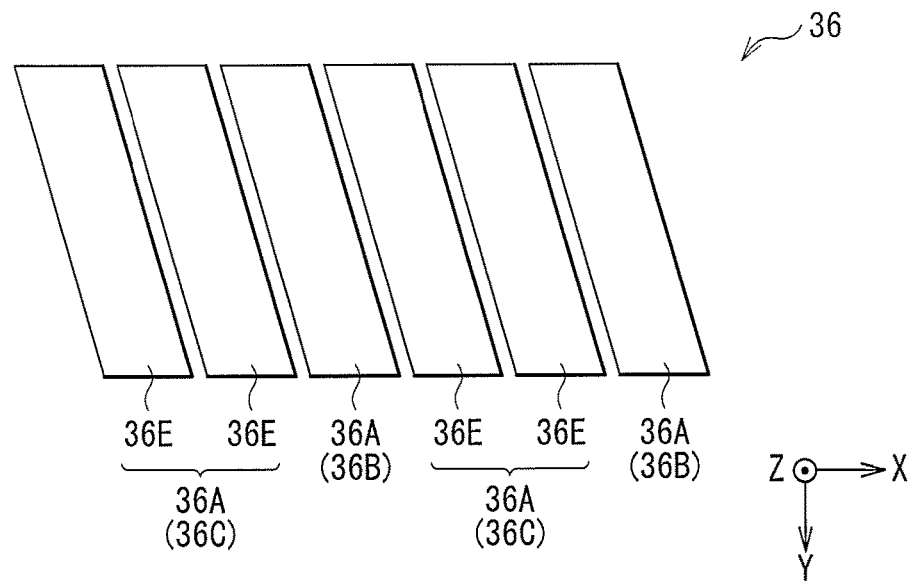
FIG. 11 is a top view illustrating a sixth modification of the electrode structure in FIG. 4.
Figure 12:
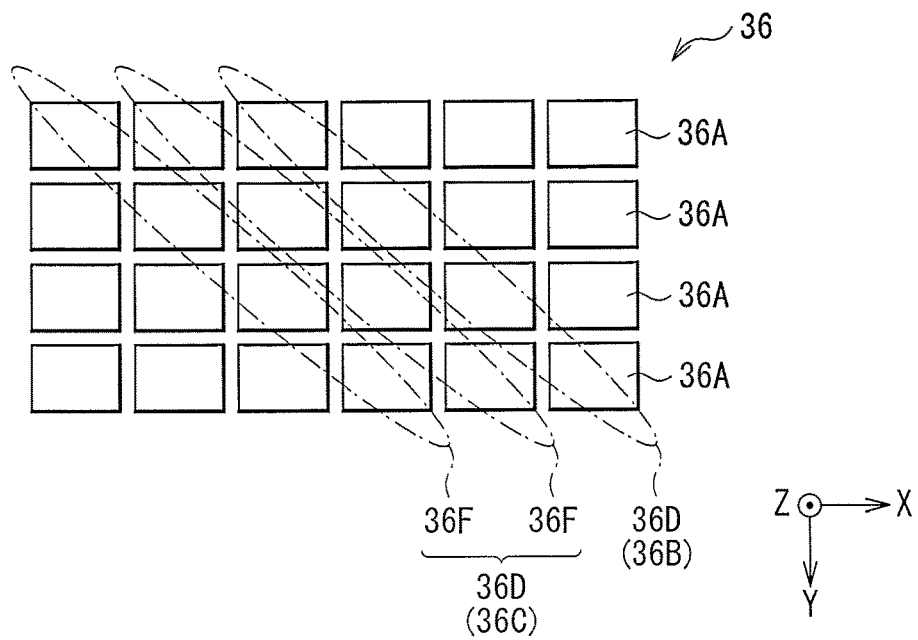
FIG. 12 is a top view illustrating a seventh modification of the electrode structure in FIG. 4.

Moreover, for example, as illustrated in FIG. 11, each of the partial electrodes 36C may be configured of a plurality of strip-shaped partial electrodes 36E each extending in the direction obliquely intersecting the light incident surface 10A at an angle other than the right angle. At this time, the width of the partial electrode 36E may be equal to the width of the partial electrode 36B. Note that the partial electrode 36E corresponds to a specific example of "third partial electrode" of the technology. In addition, for example, as illustrated in FIG. 12, in the case where the linear electrode 36D used as the partial electrode 36C is configured of the plurality of partial electrodes 36A arranged two-dimensionally, when a part of the plurality of partial electrodes 36A included in the linear electrode 36D are regarded as one linear electrode 36F, each linear electrode 36F may extend in the direction obliquely intersecting the light incident surface 10A at an angle other than the right angle. At this time, the partial electrode 36F corresponds to a specific example of "third partial electrode" of the technology.

At least the upper electrode 36 (the electrode on the top surface side of the backlight 211) of the lower electrode 32 and the upper electrode 36 is configured of a transparent conductive film. For example, the transparent conductive film may preferably have characteristics represented by the following expression (see (A) of FIG. 13). For example, the transparent conductive film may be formed of a film containing ITO (hereinafter, referred to as "ITO film"). Note that the lower electrode 32 and the upper electrode 36 may be formed of indium zinc oxide (IZO), a metal nanowire, a carbon nanotube, graphene, or the like.

$$|A1-A2| \le 2.00$$

A1: maximum light absorptivity (%) in a range of 450 nm to 650 nm both inclusive
A2: minimum light absorptivity (%) in a range of 450 nm to 650 nm both inclusive Visible light is used as illumination light, and thus a difference in light absorption of the transparent conductive film may be preferably small within a range of 380 nm to 780 nm both inclusive. The difference between the maximum value and the minimum value of the light absorptivity within the range of 380 nm to 780 nm both inclusive may be preferably 10.00 or less, and more preferably 7.00 or less. In particular, when the transparent conductive film is applied to a backlight or the like, the difference between the maximum value and the minimum value of the light absorptivity within a range of a wavelength region of the used light source may be preferably 2.00 or less, and more preferably 1.00 or less. When a typical LED light source or the like is used as the light source, the difference between the maximum value and the minimum value of the light absorptivity within a light wavelength range of 450 nm to 650 nm both inclusive may be preferably 2.00 or less, and more preferably 1.00 or less. Note that the absorptivity was measured with use of V-550 manufactured by JASCO Corporation, the reflectance and the transmittance were measured under the condition of 5 degree incident from a substrate normal direction, and a value obtained by subtracting the value of the reflectance and the transmittance from 100% was regarded as the absorptivity.

Figure 13:
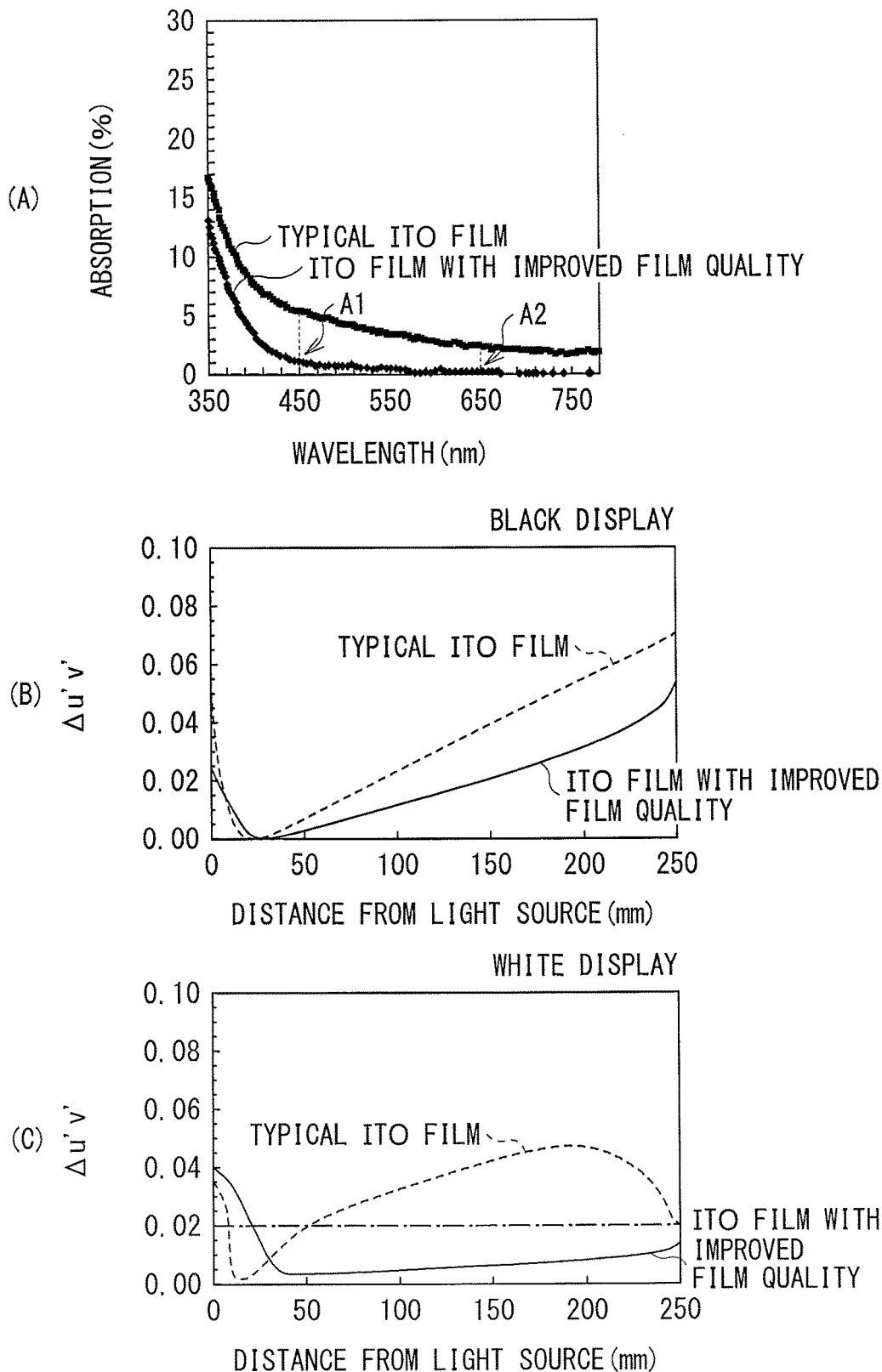
FIGS. 13A through 13C is a diagram illustrating an example of optical characteristics of an ITO film and positional dependency of chromaticity change of a backlight.
Figure 14:
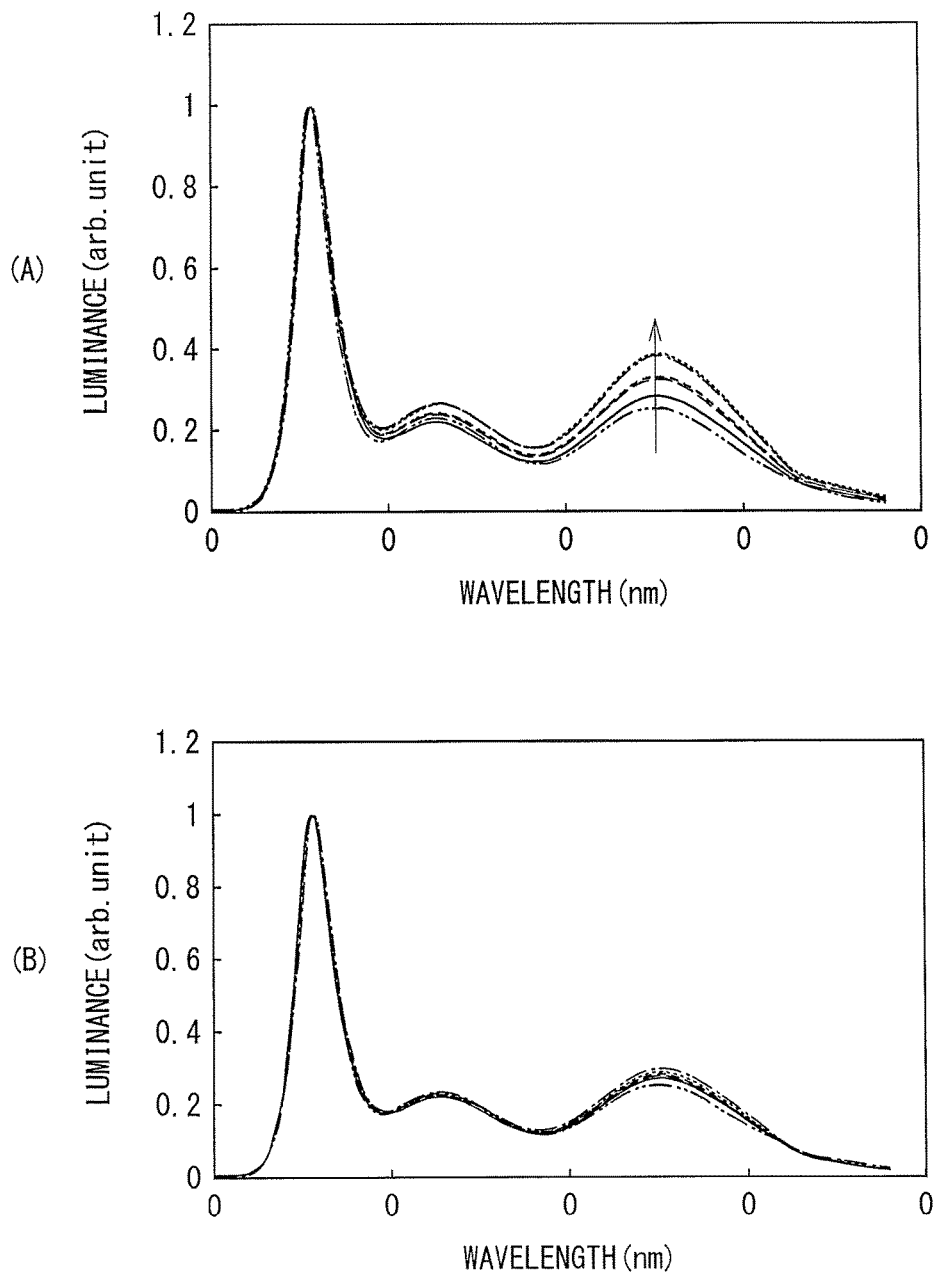
FIGS. 14A and 14B is a diagram illustrating an example of positional dependency of guided-light spectrum.

As described above, in the case where the transparent conductive film has the characteristics represented by the above-described expression, when the light emitted from the light source 20 repeatedly passes through the transparent conductive film in the light modulation device 30 during the propagation of the light in the light guide plate 10, wavelength dependency of absorption in the transparent conductive film is suppressed. When the transparent conductive film is formed of a typical ITO film, for example, as illustrated by dashed lines in (B) and (C) of FIG. 13 and by an arrow in (A) of FIG. 14, the component on the long wavelength side is increased as the distance from the light source 20 is increased. On the other hand, when the transparent conductive film is formed of the ITO film that is improved in film quality and has the characteristics represented by the above-described expression, for example, as illustrated by solid lines in (B) and (C) of FIG. 13 and in (B) of FIG. 14, the ratio in which the component on the long wavelength side is changed depending on the distance from the light source 20 is decreased. Note that $\Delta u'v'$ in the vertical axis in (B) and (C) of FIG. 13 is an index increased as the component of the long wavelength side is increased.

Moreover, for example, when one or both of the pair of the lower electrode 32 and the upper electrode 36 included in the light modulation device 30 is formed of an ITO film, a dye or a pigment that absorbs light on the long wavelength side more than light on the short wavelength side may be preferably contained in any part of the optical path guiding light (for example, one or both of the light guide plate 10 and the light modulation device 30). As the dye or the pigment described above, known materials may be used. In particular, when a process of ultraviolet irradiation is included in formation processes of the light modulation layer 34, for example, after the formation of the light modulation device 30, the light modulation device 30 and the light guide plate 10 containing the dye or the pigment may be preferably bonded to each other or the section containing the dye or the pigment may be preferably protected by an ultraviolet absorbing layer from ultraviolet ray so that the dye or the pigment is prevent from being damaged by ultraviolet ray. As described above, adding the dye or pigment described above to any part of the optical path guiding light suppresses wavelength dependency of absorption of the light modulation device 30 containing the ITO film when the light emitted from the light source 20 repeatedly passes through the light modulation device 30 during propagation of the light in the light guide plate 10.

Figure 15:
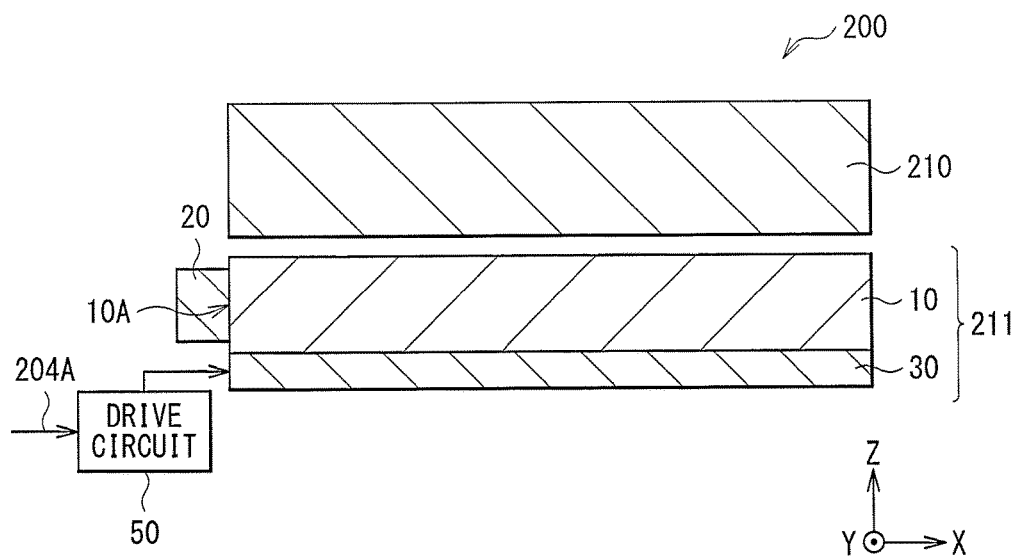
FIG. 15 is a sectional diagram illustrating another example of the structure of the display unit in FIG. 3.

Incidentally, the lower electrode 32 (the electrode on the bottom surface side of the backlight 211) may not be formed of a transparent material, and may be formed of, for example, a metal. Note that, when the lower electrode 32 is formed of a metal, the lower electrode 32 also has a function of reflecting light that enters the light modulation device 30 from the back of the light guide plate 10, as with the reflector 40. Accordingly, in this case, for example, as illustrated in FIG. 15, the reflector 40 may be omitted.

When the lower electrode 32 and the upper electrode 36 are viewed from the normal direction of the light modulation device 30, sections of the light modulation device 30 corresponding to parts where the lower electrode 32 and the upper electrode 36 face each other configure light modulation cells 30-1 and 30-2 (see FIG. 4). The light modulation cell 30-1 is a section of the light modulation device 30 corresponding to a part where the lower electrode 32 and the partial electrode 36B face each other, and the light modulation cell 30-2 is a section of the light modulation device 30 corresponding to a part where the lower electrode 32 and the partial electrode 36C face each other. The light modulation cell 30-1 and the light modulation cell 30-2 are adjacent to each other.

Each of the light modulation cells 30-1 and 30-2 is separately and independently driven by application of a predetermined voltage to the lower electrode 32 and the upper electrode 36 (the partial electrode 36A), and exhibits transparency (optical transparency) or scattering property with respect to the light from the light source 20, depending on a magnitude of the voltage applied between the lower electrode 32 and the upper electrode 36 (the partial electrode 36A). Note that the transparency and the scattering property will be described in detail in the description of the light modulation layer 34.

For example, the alignment films 33 and 35 may align a liquid crystal and a monomer used for the light modulation layer 34. The kinds of the alignment film may include, for example, a vertical alignment film and a horizontal alignment film, and in the present embodiment, the horizontal alignment film is used for the alignment films 33 and 35. Examples of the horizontal alignment film may include, for example, an alignment film formed through rubbing treatment on polyimide, polyamidimide, polyvinyl alcohol, and the like, and an alignment film provided with a groove shape by transcription, etching, or the like. In addition, examples of the horizontal alignment film may include, for example, an alignment film formed through oblique deposition of an inorganic material such as silicon oxide, a diamond-like carbon alignment film formed through ion beam irradiation, and an alignment film provided with electrode pattern slits. When a plastic film is used as the transparent substrates 31 and 37, polyamidimide capable of being formed at a temperature of 100° C. or less may be preferably used as the alignment films 33 and 35 because a firing temperature after the alignment films 33 and 35 are applied to the surfaces of the transparent substrates 31 and 37, respectively, may be preferably as low as possible in manufacturing process.

Moreover, it is sufficient for both the vertical alignment film and the horizontal alignment film to have a function of aligning the liquid crystal and the monomer, and reliability in repeated application of a voltage desired for a typical liquid crystal display is unnecessary. This is because the reliability by voltage application after device fabrication is determined by an interface between polymerized monomer and the liquid crystal. Moreover, for example, the liquid crystal and the monomer used for the light modulation layer 34 may be allowed to be aligned also by application of an electric field or a magnetic field between the lower electrode 32 and the upper electrode 36 even when an alignment film is not used. In other words, ultraviolet irradiation during application of an electric field or a magnetic field between the lower electrode 32 and the upper electrode 36 enables fixing of alignment state of the liquid crystal and the monomer in voltage-applied state. When a voltage is used for formation of the alignment film, electrodes may be separately formed for alignment and for driving, or dual-frequency liquid crystal in which the symbol of dielectric anisotropy is inverted by frequency may be used as a liquid crystal material. Moreover, when a magnetic field is used for formation of the alignment film, a material having large magnetic susceptibility anisotropy may be preferably used as the alignment film, and for example, a material having a large number of benzene rings may be preferably used.

The light modulation layer 34 exhibits, depending on the magnitude of the electric field, scattering property or transparency to the light from the light source 20. The light modulation layer 34 exhibits transparency to the light from the light source 20 when the electric field is relatively small, and exhibits scattering property to the light from the light source 20 when the electric field is relatively large. For example, as illustrated in FIG. 4, the light modulation layer 34 may be a composite layer containing a bulk 34A and a plurality of microparticles 34B dispersed in the bulk 34A. The bulk 34A and the microparticle 34B have optical anisotropy. Incidentally, the bulk 34A corresponds to a specific example of "second region" of the technology, and the microparticle 34B corresponds to a specific example of "first region" of the technology.

Figure 16:
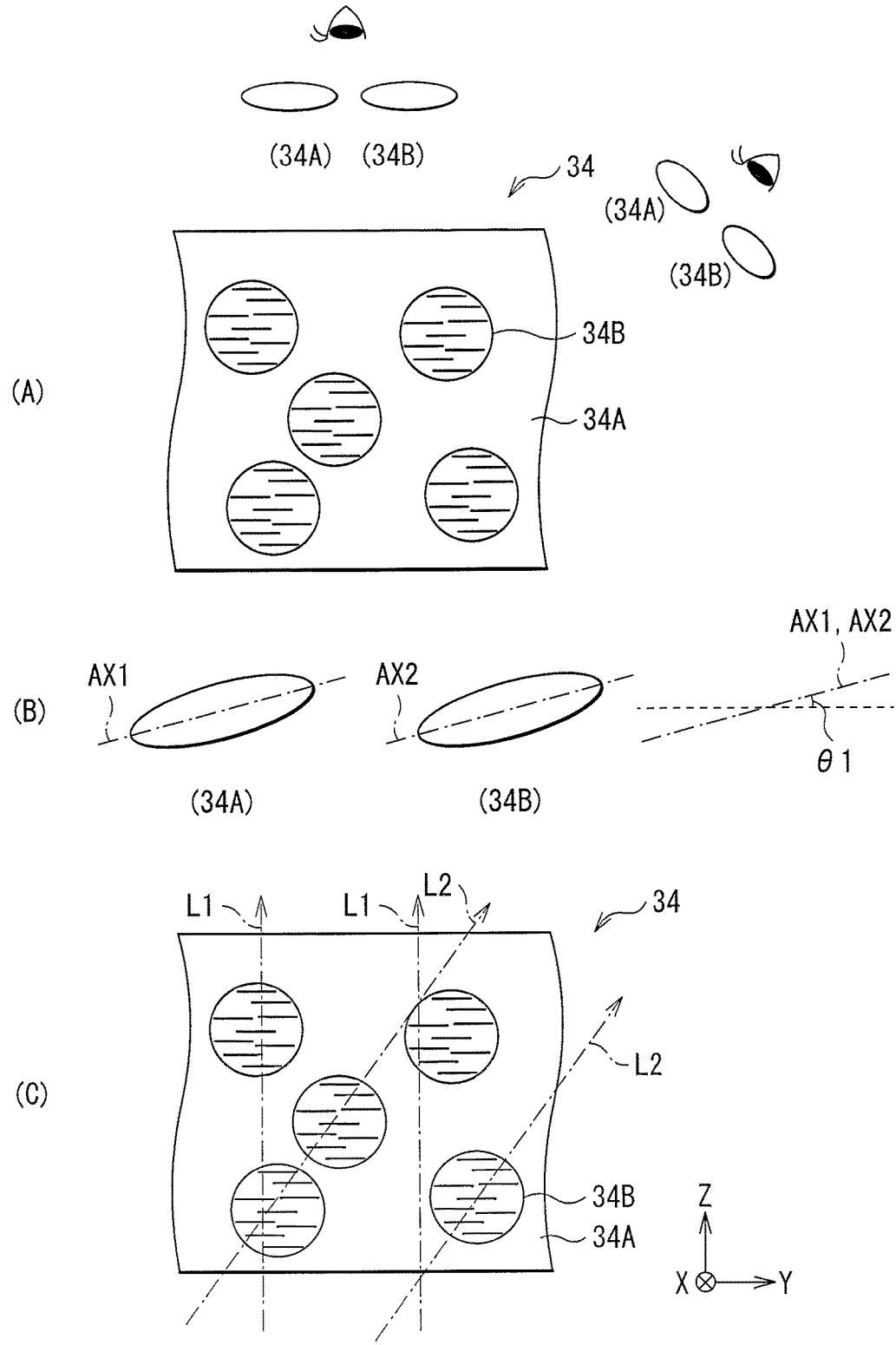
FIGS. 16A through 16C is a schematic diagram for explaining an example of a function of a light modulation layer in FIG. 4.

(A) of FIG. 16 schematically illustrates an example of the alignment state in the microparticle 34B when the voltage is not applied between the lower electrode 32 and the upper electrode 36 (hereinafter, simply referred to as "during no-voltage application"). Note that illustration of the alignment state in the bulk 34A is omitted in (A) of FIG. 16. As used herein, the wording "during no-voltage application" is a concept that encompasses a time period when a voltage that is smaller than the voltage allowing the light modulation layer to exhibit scattering property and allows the light modulation layer 34 to exhibit transparency is applied.

(B) of FIG. 16 illustrates an example of an index ellipsoid representing refractive index anisotropy of each of the bulk 34A and the microparticle 34B during no-voltage application. The index ellipsoid represents a refractive index of linear polarized light entering from various directions by a tensor ellipsoid, and geometrically represents a refractive index through observation of a cross-sectional surface of the ellipsoid from an entering direction of the light. (C) of FIG. 16 schematically illustrates an example of a state where light L1 traveling toward the front direction and light L2 traveling toward oblique direction pass through the light modulation layer 34 during no-voltage application.

Figure 17:
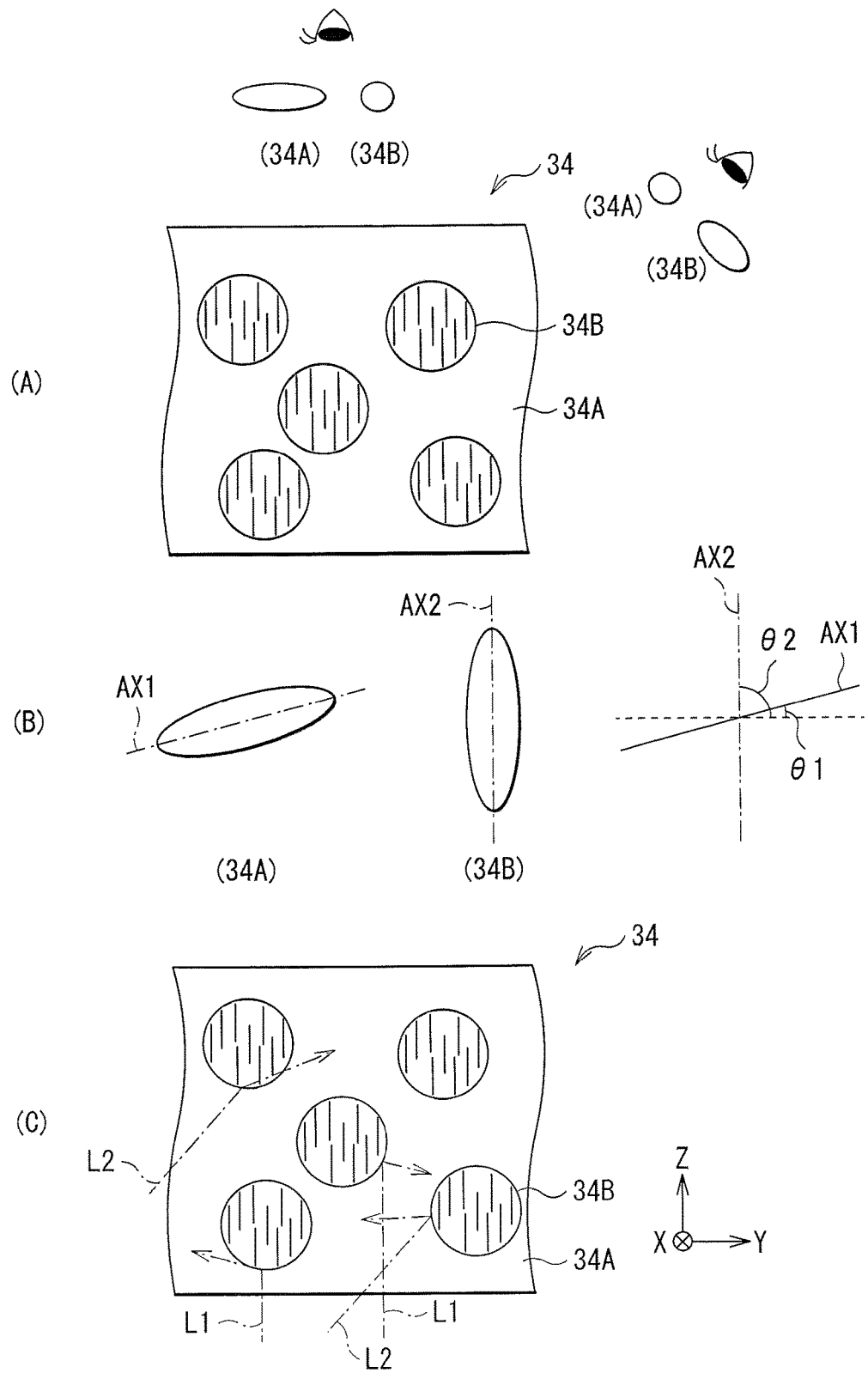
FIGS. 17A through 17C is a schematic diagram for explaining another example of the function of the light modulation layer in FIG. 4.

(A) of FIG. 17 schematically illustrates an example of the alignment state in the microparticle 34B when the voltage is applied between the lower electrode 32 and the upper electrode 36 (hereinafter, simply referred to as "during voltage application"). Note that illustration of the alignment state in the bulk 34A is omitted in (A) of FIG. 17. As used herein, the warding "during voltage application" refers to a time period when the voltage allowing the light modulation layer to exhibit scattering property is applied.

(B) of FIG. 17 illustrates an example of the index ellipsoid representing refractive index anisotropy of each of the bulk 34A and the microparticle 34B during voltage application. (C) of FIG. 17 schematically illustrates an example of a state where the light L1 traveling toward the front direction and the light L2 traveling toward the oblique direction are scattered in the light modulation layer 34, during voltage application.

For example, as illustrated in (A) and (B) of FIG. 16, the bulk 34A and the microparticle 34B have configuration in which a direction of an optical axis AX1 of the bulk 34A and a direction of an optical axis AX2 of the microparticle 34B are coincident with (parallel to) each other during no-voltage application. Incidentally, the optical axes AX1 and AX2 each indicate a line parallel to a traveling direction of a light beam having a fixed refractive index irrespective of polarization direction. In addition, it is unnecessary for the direction of the optical axis AX1 and the direction of the optical axis AX2 to constantly coincide with each other, and the direction of the optical axis AX1 may be deviated in some degree from the direction of the optical axis AX2 due to, for example, manufacturing error.

Moreover, for example, the microparticle 34B may have a configuration in which the optical axis AX2 is parallel to the light incident surface 10A of the light guide plate 10 during no-voltage application. Further, for example, the microparticle 34B may have a configuration in which the optical axis AX2 intersects the surfaces of the transparent substrates 31 and 37 at a slight angle θ1 during no-voltage application (see (B) of FIG. 16). Note that the angle θ1 will be described in detail in description of a material forming the microparticle 34B.

On the other hand, for example, the bulk 34A may have a configuration in which the optical axis AX1 of the bulk 34A is fixed irrespective of voltage application between the lower electrode 32 and the upper electrode 36. Specifically, for example, as illustrated in (A) and (B) of FIG. 16 and (A) and (B) of FIG. 17, the bulk 34A may have a configuration in which the optical axis AX1 of the bulk 34A is parallel to the light incident surface 10A of the light guide plate 10 as well as intersects the surfaces of the transparent substrates 31 and 37 at the predetermined angle θ1. In other words, the optical axis AX1 of the bulk 34A is parallel to the optical axis AX2 of the microparticle 34B during no-voltage application.

Note that it is unnecessary for the optical axis AX2 to be constantly parallel to the light incident surface 10A as well as to constantly intersect the surfaces of the transparent substrates 31 and 37 at the angle θ1, and the optical axis AX2 may intersect the surfaces of the transparent substrates 31 and 37 at an angle slightly different from the angle θ1 due to, for example, manufacturing error. In addition, it is unnecessary for the optical axes AX1 and AX2 to be constantly parallel to the light incident surface 10A, and the optical axes AX1 and AX2 may intersect the light incident surface 10A at a small angle due to, for example, manufacturing error.

Figure 18:
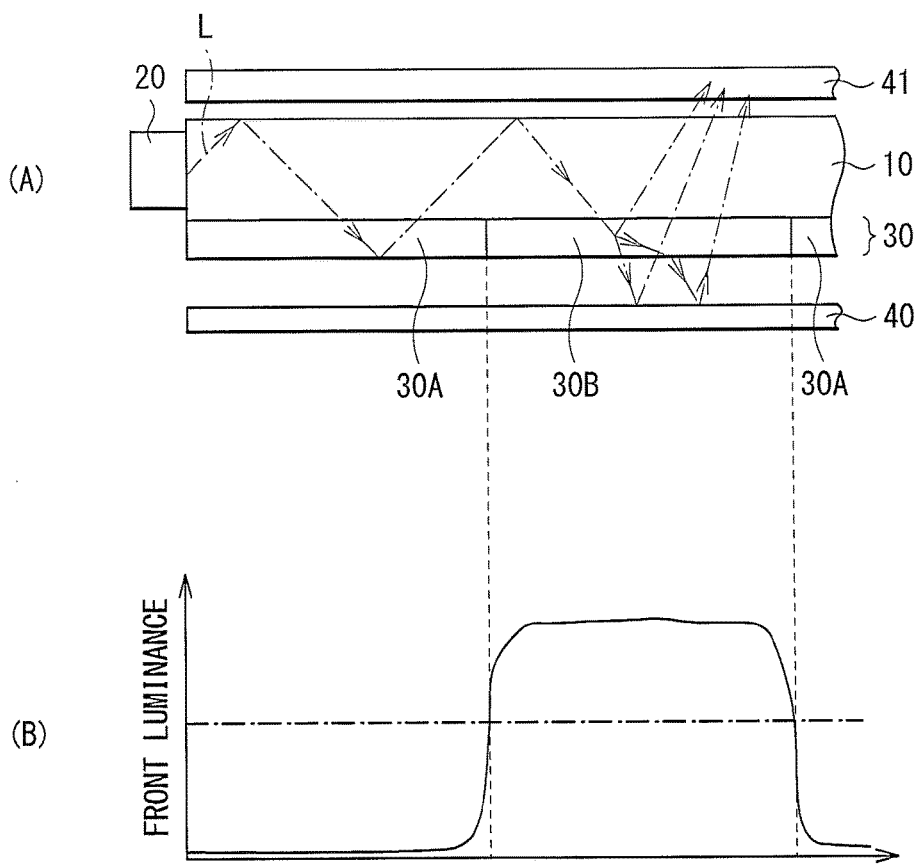
FIGS. 18A and 18B is a schematic diagram for explaining an example of a function of an illumination device in FIG. 3

At this time, it may be preferable that an ordinary refractive index of the bulk 34A be equal to that of the microparticle 34B, and an extraordinary refractive index of the bulk 34A be equal to that of the microparticle 34B. In this case, for example, as illustrated in (A) of FIG. 16, during no-voltage application, refractive index difference is substantially eliminated in various directions including the front direction and the oblique direction, and high transparency (light transparency) is obtainable. Therefore, for example, as illustrated in (C) of FIG. 16, the light L1 traveling toward the front direction and the light L2 traveling toward the oblique direction are not scattered in the light modulation layer 34, and pass through the light modulation layer 34. As a result, for example as illustrated in (A) and (B) of FIG. 18, light L from the light source 20 (light from the oblique direction) is totally reflected by an interface (the bottom surface of the transparent substrate 31 and the top surface of the light guide plate 10) of a transparent region (a transmissive region 30A) of the light modulation layer 34, and luminance of the transmissive region 30A (luminance of black display) is decreased as compared with the case where light is uniformly emitted from the entire surface (alternate long and short dash line in (B) of FIG. 18). Note that profile of front luminance in (B) of FIG. 18 is obtained by providing a diffuser sheet 41 on the light guide plate 10 and performing measurement through the diffuser sheet 41.

Note that the top surface of the light guide plate 10 that is one of interfaces of the transmissive region 30A is in contact with a clearance existing between the display panel 210 and the light guide plate 10, and the clearance may be preferably filled with a material having a refractive index lower than that of the top surface of the light guide plate 10. Although the layer formed of such a low-refractive-index material (a low-refractive-index material layer 220 (see FIG. 3)) is typically air, the layer may be an adhesive agent or a bonding agent formed of a low-refractive-index material.

For example, as illustrated in (A) and (B) of FIG. 17, during voltage application, the bulk 34A and the microparticle 34B may have a configuration in which the direction of the optical axis AX1 is different from (intersects or is substantially orthogonal to) the direction of the optical axis AX2. Moreover, for example, during voltage application, the microparticle 34B may have a configuration in which the optical axis AX2 of the microparticle 34B is parallel to the light incident surface 10A of the light guide plate 10 as well as intersects the surfaces of the transparent substrates 31 and 37 at an angle θ2 (for example, 90 degrees) larger than the angle θ1. Note that the angle θ2 will be described in detail in description of a material forming the microparticle 34B.

Therefore, during voltage application, in the light modulation layer 34, the refractive index is increased in various directions including the front direction and the oblique direction, and higher scattering property is obtainable. Accordingly, for example, as illustrated in (C) of FIG. 17, the light L1 traveling toward the front direction and the light L2 traveling toward the oblique direction is scattered in the light modulation layer 34. As a result, for example, as illustrated in (A) of FIG. 18, the light L from the light source 20 (the light from the oblique direction) passes through the interface of the scattering region 30B (the interface between the air and one of the transparent substrate 31 and the light guide plate 10), and the light that has passed to the reflector 40 side is reflected by the reflector 40 and then passes through the light modulation device 30. Consequently, the luminance of the scattering region 30B is extremely high as compared with the case where light is uniformly emitted from the entire surface (alternate long and short dash line in (B) of FIG. 18), and luminance of partial white display (luminance enhancement) is increased by a decreased amount of the luminance of the transmissive region 30A.

Incidentally, the ordinary refractive index of the bulk 34A may be slightly different from that of the microparticle 34B due to, for example, manufacturing error, and for example, the difference therebetween may be preferably 0.1 or less, and more preferably 0.05 or less. In addition, the extraordinary refractive index of the bulk 34A may also be slightly different from that of the microparticle 34B due to, for example, manufacturing error, and for example, the difference therebetween may be preferably 0.1 or less, and more preferably 0.05 or less.

In addition, the difference in refractive index ($\Delta n_P$=the extraordinary refractive index $ne_P$–the ordinary refractive index $no_P$) of the bulk 34A and the difference in refractive index ($\Delta n_L$=the extraordinary refractive index $ne_L$–the ordinary refractive index $no_L$) of the microparticle 34B may be preferably as large as possible, preferably 0.05 or more, and more preferably 0.1 or more, and still more preferably 0.15 or more. This is because when the difference in refractive index of each of the bulk 34A and the microparticle 34B is large, the scattering power of the light modulation layer 34 is increased to easily disrupt light guiding condition, and the light from the light guide plate 10 is easily extracted.

Figure 19:
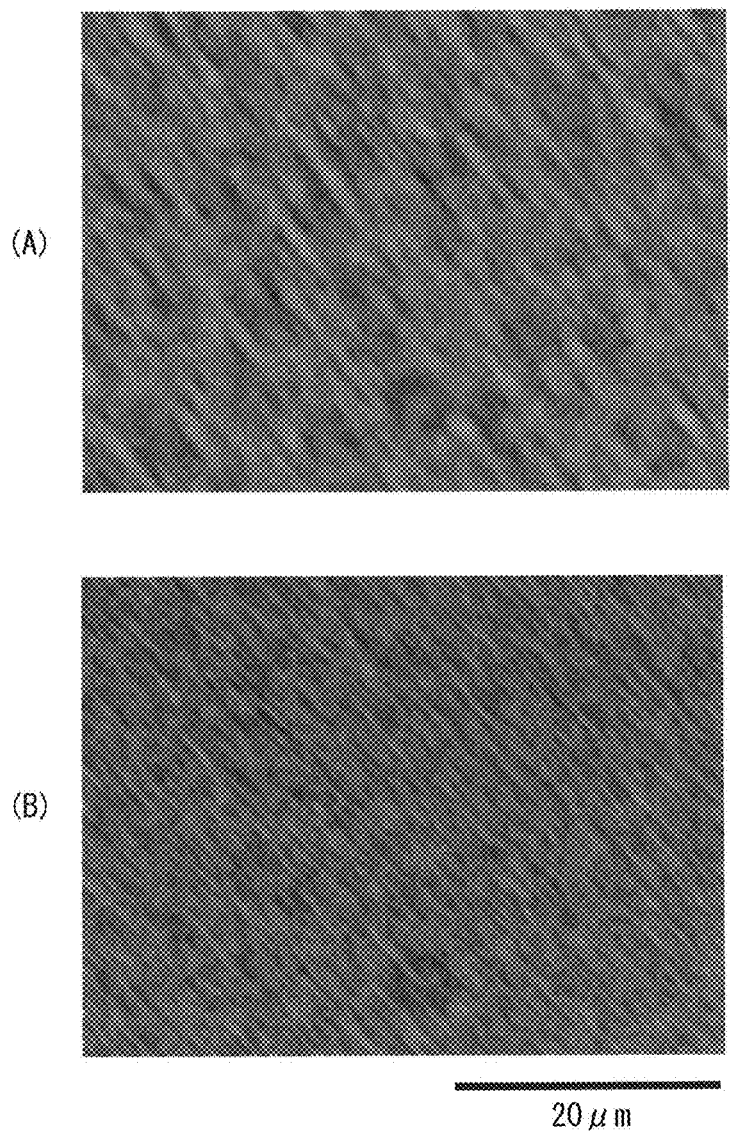
FIGS. 19A and 19B is a diagram illustrating an example of a streaky structure of a bulk in FIG. 4.

Moreover, a response speed to the electric field of the bulk 34A is different from that of the microparticle 34B. The bulk 34A may have, for example, a streaky structure (see (A) and (B) of FIG. 19), a porous structure, or a rod-like structure, that has a response speed lower than that of the microparticle 34B. Incidentally, (A) and (B) of FIG. 19 are polarizing microscope photographs when the electric field is applied to the light modulation device 30, and streaky bright sections in (A) and (B) of FIG. 19 correspond to the above-described streaky structure. (A) of FIG. 19 shows a state of the streaky structure of the bulk 34A when a weight ratio of the liquid crystal to the monomer is set to 95:5, and (B) of FIG. 19 shows a state of the streaky structure of the bulk 34A when the weight ratio of the liquid crystal to the monomer is set to 90:10. For example, the bulk 34A may be formed of a polymer material obtained through polymerization of a low-molecular monomer. For example, the bulk 34A may be formed by polymerizing a material (for example, monomer) that is aligned along the alignment direction of the microparticle 34B or the alignment direction of the alignment films 33 and 35 and has alignment property and polymerizability, by heat or light or both.

For example, the streaky structure, the porous structure, or the rod-like structure of the bulk 34A may have a long axis in a direction that is parallel to the light incident surface 10A of the light guide plate 10 and intersects the surfaces of the transparent substrates 31 and 37 at the slight angle θ1. When the bulk 34A has the streaky structure, an average size of the streaky tissue in a short axis direction may be preferably 0.1 µm or more and 10 µm or less, and more preferably 0.2 µm or more and 2.0 µm or less, in terms of improving scattering property of guided light. When the average size of the streaky tissue in the short axis direction is 0.1 µm or more and 10 µm or less, the scattering power in the light modulation device 30 is substantially equivalent in a visible region of 380 to 780 nm both inclusive. Therefore, only increase or decrease of light of a specific wavelength component does not occur in the plane, and thus balance in the visible region is achieved in the plane. When the average size of the streaky tissue in the short axis direction is smaller than 0.1 µm or larger than 10 µm, the scattering power of the light modulation device 30 is low irrespective of the wavelength, and thus it is difficult for the light modulation device 30 to function as a light modulation device.

Moreover, in terms of reducing wavelength dependency of scattering, the average size of the streaky tissue in the short axis direction may be preferably 0.5 µm or more and 5 µm or less, and more preferably within a range of 1 to 3 µm both inclusive. In such a case, when the light emitted from the light source 20 repeatedly passes through the bulk 34A in the light modulation device 30 during propagation of the light in the light guide plate 10, the wavelength dependency of the scattering in the bulk 34A is suppressed. The size of the streaky tissue is observable under a polarizing microscope, a confocal microscope, an electron microscope, and the like.

On the other hand, for example, the microparticle 34B may contain a liquid crystal material mainly, and have a response speed sufficiently higher than that of the bulk 34A. The liquid crystal material (a liquid crystal molecule) contained in the microparticle 34B may be, for example, a rod-like molecule. As the liquid crystal molecule contained in the microparticle 34B, a liquid crystal molecule having positive dielectric constant anisotropy (so-called positive liquid crystal) may be preferably used.

In this example, during no-voltage application, in the microparticle 34B, the long axis direction of the liquid crystal molecule is parallel to the optical axis AX1. At this time, the long axis of the liquid crystal molecule in the microparticle 34B is parallel to the light incident surface 10A of the light guide plate 10 and intersects the surfaces of the transparent substrates 31 and 37 at the slight angle θ1. In other words, the liquid crystal molecule in the microparticle 34B is aligned in a state of being inclined at the angle θ1 in a plane parallel to the light incident surface 10A of the light guide plate 10 during no-voltage application. The angle θ1 is a so-called pretilt angle, and for example may be preferably 0.1 degree or more and 30 degrees or less. The angle θ1 may be more preferably 0.5 degree or more and 10 degrees or less, and still more preferably 0.7 degree or more and 2 degrees or less. There is a tendency for scattering to decrease in efficiency due to reasons described below when the angle θ1 is large. In addition, the azimuth in which the liquid crystal stands up during voltage application is varied when the angle θ1 is excessively small. For example, the liquid crystal may even stand up in an azimuth changed by 180 degrees (reversed tilt). Accordingly, the refractive index difference of the microparticle 34B and that of the bulk 34A are not efficiently used, and thus there is a tendency of decrease in scattering efficiency and in luminance.

Moreover, during voltage application, in the microparticle 34B, the long axis direction of the liquid crystal molecule intersects or is orthogonal to (or is substantially orthogonal to) the optical axis AX1. At this time, the long axis of the liquid crystal molecule in the microparticle 34B is parallel to the light incidence surface 10A of the light guide plate 10 and intersects the surfaces of the transparent substrates 31 and 37 at the angle θ2 (for example, 90 degrees) larger than the angle θ1. In other words, the liquid crystal molecule in the microparticle 34B is aligned in a state of being inclined by the angle θ2 in the plane parallel to the light incidence surface 10A of the light guide plate 10 or in a state of erecting at the angle θ2 (=90°), during voltage application.

As the above-described monomer having the alignment property and the polymerizability, although a material that has optical anisotropy and is capable of being combined with a liquid crystal is sufficient, in the present embodiment, a low-molecular monomer to be cured by ultraviolet ray may be preferable. Since it may be preferable that the direction of optical anisotropy of the liquid crystal coincide with the direction of the optical anisotropy of the material (polymer material) formed through polymerization of the low-molecular monomer in the state of no-voltage application, the liquid crystal and the low-molecular monomer may be preferably aligned in the same direction before ultraviolet curing. In the case where a liquid crystal is used as the microparticle 34B, when the liquid crystal is a rod-like molecule, it may be preferable that the shape of the monomer material to be used also have a rod-like shape. As described above, it may be preferable to use a material having both polymerizability and liquid crystallinity as a monomer material, and the material may preferably contain, as a polymerizable functional group, one or more functional groups selected from the group of an acrylate group, a methacrylate group, an acryloyloxy group, a methacryloyloxy group, a vinyl ether group, and an epoxy group. These functional groups may be polymerized by irradiation of an ultraviolet ray, an infrared ray, or an electron beam, or heating. To suppress deterioration in alignment degree at the time of ultraviolet irradiation, a polyfunctionalized liquid crystal material may be added. When the bulk 34A has the above-described streaky structure, bifunctional liquid-crystalline monomer may be preferably used as a raw material of the bulk 34A. Moreover, monofunctional monomer may be added in order to adjust temperature exhibiting liquid crystallinity or tri- or more-functional monomer may be added in order to improve crosslink density, to the raw material of the bulk 34A.

Figure 20:
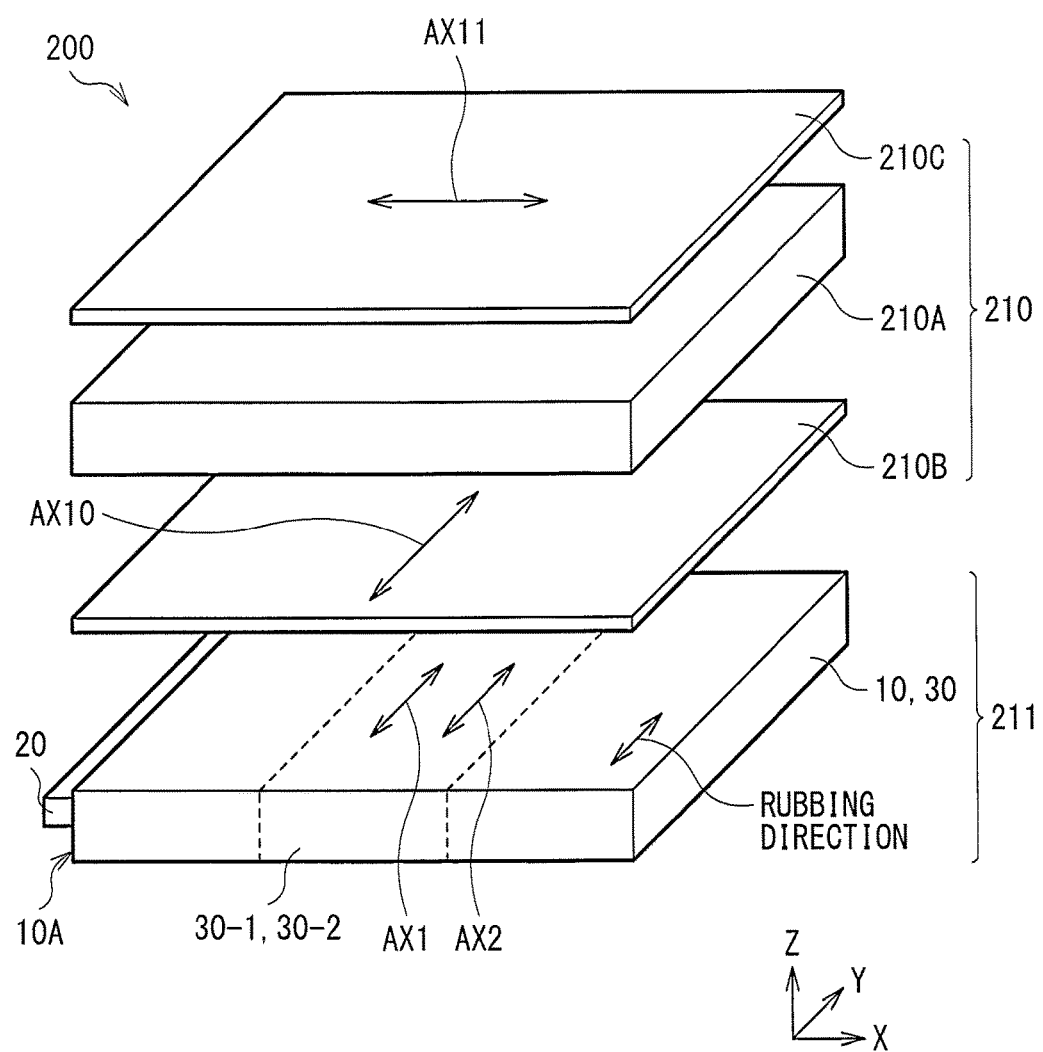
FIG. 20 is a diagram illustrating an example of relationship between a polarization plate and an optical axis of the light modulation layer.

Incidentally, as described above, during no-voltage application, the optical axis AX1 of the bulk 34A and the optical axis AX2 of the microparticle 34B both have a component of the respective optical axes mainly in the same direction. During no-voltage application, as illustrated in FIG. 20, both the optical axes AX1 and AX2 face in the same direction, for example, in a rubbing direction of the alignment films 33 and 35. In addition, during no-voltage application, the optical axes AX1 and AX2 are parallel to or substantially parallel to the light incidence surface 10A as illustrated in FIG. 20. Further, during no-voltage application, the optical axes AX1 and AX2 are parallel to or substantially parallel to the transparent substrate 31 as illustrated in FIG. 4 and FIG. 20. In other words, during no-voltage application, the optical axes AX1 and AX2 roughly face in the Y-axis direction in FIG. 20.

Further, during no-voltage application, the optical axes AX1 and AX2 have a component of the respective optical axes mainly in a direction parallel to the transmission axis AX10 of the polarization plate 210B on the backlight 211 side. During no-voltage application, the optical axes AX1 and AX2 face in the direction parallel to the transmission axis AX10, for example, as illustrated in FIG. 20. The transmission axis AX10 faces in the rubbing direction of the alignment films 33 and 35, for example, as illustrated in FIG. 20. Note that a transmission axis AX11 of the polarization plate 210C on the picture display surface side is orthogonal to the transmission axis AX10 of the polarization plate 210B on the backlight 211 side.

Figure 21:
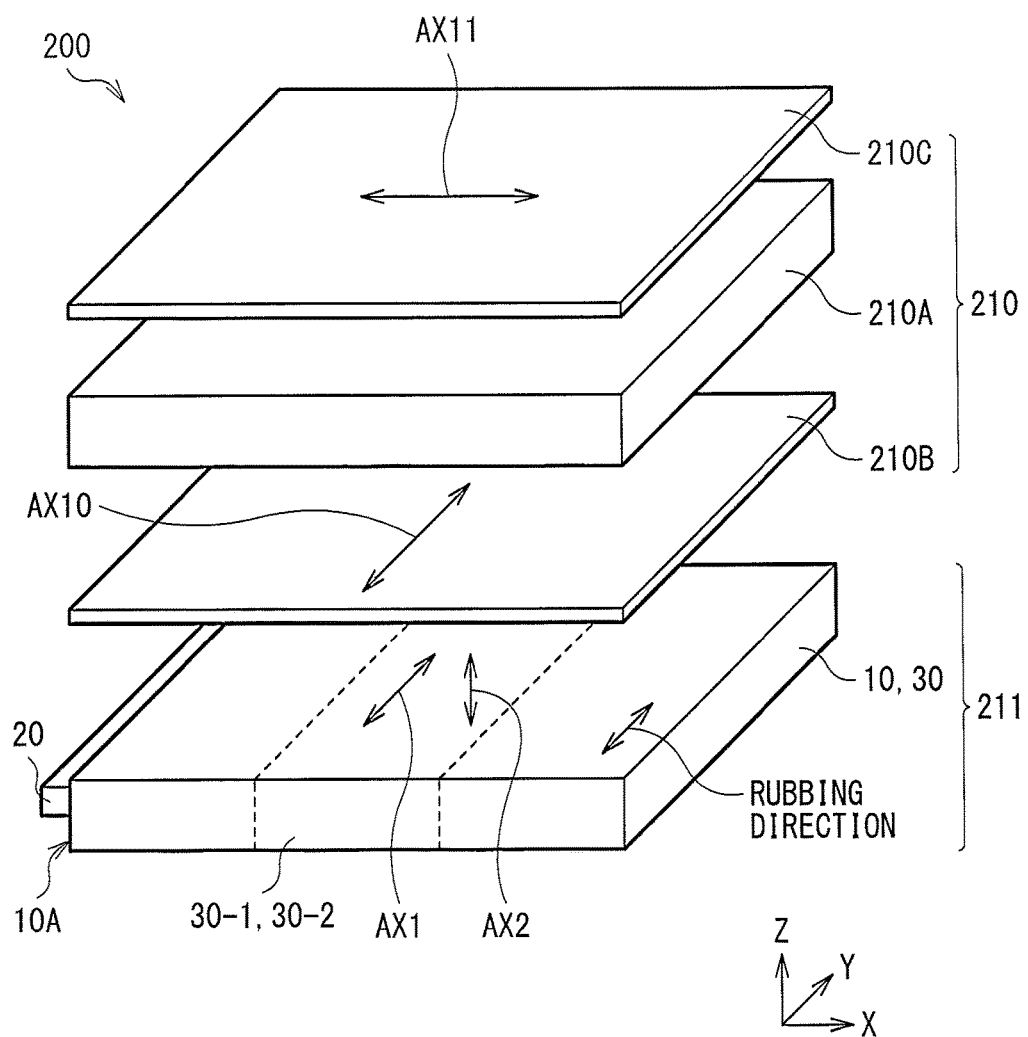
FIG. 21 is a diagram illustrating another example of the relationship between the polarization plate and the optical axis of the light modulation layer.

Moreover, as described above, during voltage application, the optical axis AX1 faces in the direction same as or substantially same as the direction during no-voltage application. During voltage application, the optical axis AX1 contains the component of the optical axis mainly in the direction parallel to the transmission axis AX10 of the polarization plate 210B, and for example, as illustrated in FIG. 21, the optical axis AX1 faces in the direction parallel to the transmission axis AX10. During voltage application, for example, the optical axis AX1 is parallel to or substantially parallel to the light incidence surface 10A, and further is parallel to or substantially parallel to the transparent substrate 31.

On the other hand, during voltage application, the optical axis AX2 is displaced in a predetermined direction due to influence of an electric field generated by the voltage that is applied between the lower electrode 32 and the upper electrode 36. For example, during voltage application, the optical axis AX2 intersects or is orthogonal to (or substantially orthogonal to) the transparent substrate 31 as illustrated in FIG. 4 and FIG. 21. In other words, the optical axis AX2 is displaced (namely, stands up) in a direction where an angle formed by the optical axis AX2 and a normal of the transparent substrate 31 is decreased, by the voltage application between the lower electrode 32 and the upper electrode 36. At this time, the optical axis AX2 is orthogonal to or substantially orthogonal to the optical axis AX1, and is orthogonal to or substantially orthogonal to the transparent substrate 31.

The state of the bulk 34A and the microparticle 34B during voltage application or during no-voltage application may have a macroscopic distribution in the plane of the light modulation layer 30. More specifically, the length, the thickness, and the density of the streaky tissue, the pretilt angle θ1, the weight ratio of the bulk 34A to the microparticle 34B, the intersection angle between the optical axis AX1 of the bulk 34A and the optical axis AX2 of the microparticle 34B during voltage application, anisotropic degree of anisotropic diffusion, the angle of the alignment in the plane, the angle of the alignment in the thickness direction, the helix angle of the alignment, and the like may have macroscopic in-plane distribution in the light modulation layer 34. As a method of providing the distribution as described above, it may be contemplated to provide a distribution to the rubbing intensity, an irradiation amount of ultraviolet ray, the thickness of the alignment film, the thickness of the substrate, a polarization direction of alignment in the case of optical alignment, electric field application during ultraviolet irradiation, magnetic field application during ultraviolet irradiation, and the like. For example, when a liquid crystal monomer is polymerized into a polymer through ultraviolet irradiation, the amount of the streaky tissue may be allowed to have a distribution by providing a distribution to ultraviolet intensity. Accordingly, when an amount of the streaky tissue on a side closer to the light source 20 is decreased to suppress scattering during voltage application and the amount of the streaky tissue on a side distant from the light source 20 is increased to enhance scattering during voltage application, the intensity of light to be emitted is allowed to be uniformized in plane.

For example, the drive circuit 50 may control the magnitude of the voltage applied to a pair of electrodes (the lower electrode 32 and the upper electrode 36) in each of the light modulation cells 30-1 and 30-2 so that the optical axis AX2 of the microparticle 34B is parallel to or substantially parallel to the optical axis AX1 of the bulk 34A in the light modulation cell 30-2 and the optical axis AX2 of the microparticle 34B intersects or is orthogonal to the optical axis AX1 of the bulk 34A in the light modulation cell 30-1. Moreover, for example, the drive circuit 50 may control the magnitude of the voltage applied to the pair of electrodes (the lower electrode 32 and the upper electrode 36) in each of the light modulation cells 30-1 and 30-2 so that the optical axis AX2 of the microparticle 34B intersects or is orthogonal to the optical axis AX1 of the bulk 34A in each of the light modulation cells 30-1 and 30-2. In other words, the drive circuit 50 allows the directions of the optical axes AX1 and AX2 of the bulk 34A and the microparticle 34B to coincide (or substantially coincide) with each other or to be different from each other (or be orthogonal to each other) through electric field control.

The drive circuit 50 allows the backlight 211 to output a plurality of linear illumination light beams when receiving a signal specifying three-dimensional display as the control signal 204A (when three-dimensional display is performed). More specifically, the drive circuit 50 applies a voltage allowing the light modulation layer 34 to exhibit scattering property, to the specific number of partial electrodes 36B of the plurality of partial electrodes 36A, and applies a voltage allowing the light modulation layer 34 to exhibit transparency, to the plurality of partial electrodes 36C other than the partial electrodes 36B of the plurality of partial electrodes 36A, thereby allowing the backlight 211 to emit a plurality of linear illumination light beams, when receiving a signal specifying three-dimensional display as the control signal 204A (when three-dimensional display is performed). In other words, the drive circuit 50 controls the magnitude of the voltage applied to the pair of electrodes (the lower electrode 32 and the partial electrode 36A) in each of the light modulation cells 30-1 and 30-2 so that the optical axis AX2 of the microparticle 34B intersects the optical axis AX1 of the bulk 34A in each of the light modulation cells 30-1 and the optical axis AX2 of the microparticle 34B is parallel to the optical axis AX1 of the bulk 34A in each of the light modulation cells 30-2.

The drive circuit 50 may drive each of the partial electrodes 36B, for example, in the state where the position of the partial electrodes 36A is fixed, when receiving a signal specifying three-dimensional display as the control signal 204A (when three-dimensional display is performed). At this time, for example, the drive circuit 50 may further apply a voltage allowing the light modulation layer 34 to exhibit transparency (for example, the same voltage (such as a ground voltage)) to each of the partial electrodes 36C and the lower electrode 32.

Note that, in the case where the partial electrodes 36A are grouped for each pitch corresponding to the pixel pitch for performing three-dimensional display on the display panel 210, when receiving a signal specifying three-dimensional display as the control signal 204A (when three-dimensional display is performed), the drive circuit 50 may sequentially assign (namely, may drive) the plurality of partial electrodes 36A included in each group to the partial electrode 36B within one frame period. At this time, for example, the drive circuit 50 may further apply the voltage allowing the light modulation layer 34 to exhibit transparency (for example, the same voltage (such as a ground voltage)), to each of the partial electrodes 36C.

In addition, the drive circuit 50 allows the backlight 211 to emit a planar illumination light beam when receiving a signal specifying two-dimensional display as the control signal 204A (when two-dimensional display is performed). For example, the drive circuit 50 may apply a voltage allowing the light modulation layer 34 to exhibit scattering property, to each of the light modulation cells 30-1 and 30-2. In other words, the drive circuit 50 controls the magnitude of the voltage applied to the pair of electrodes (the lower electrode 32 and the partial electrode 36A) in each of the light modulation cells 30-1 and 30-2 so that the optical axis AX2 of the microparticle 34B intersects or is orthogonal to (or substantially orthogonal to) the optical axis AX1 of the bulk 34A in all of the light modulation cells 30-1 and 30-2 included in the backlight 211.

Moreover, for example, in the case where the partial electrodes 36A are grouped for each pitch corresponding to the pixel pitch for performing three-dimensional display on the display panel 210, when receiving a signal specifying two-dimensional display as the control signal 204A (when two-dimensional display is performed), the drive circuit 50 may sequentially drive the plurality of partial electrodes 36A included in each group within one frame period. The drive circuit 50 may sequentially drive the groups one by one, or multiple at a time.

Note that, when receiving a signal specifying two-dimensional display as the control signal 204A as well as receiving a signal relating to picture data, the drive circuit 50 may allow the backlight 211 to emit a planar illumination light beam (for example, a planar illumination light beam partially dark in plane) having luminance distribution corresponding to the picture data. Incidentally, in this case, the upper electrode 36 may be preferably arranged in a layout corresponding to the pixels of the display panel 210. When the upper electrode 36 is arranged in the layout corresponding to the pixels of the display panel 210, the drive circuit 50 applies, according to the picture data, a voltage allowing the light modulation layer to exhibit scattering property, to some of the light modulation cells 30-1 and 30-2, and a voltage allowing the light modulation layer 34 to exhibit transparency, to the other of the light modulation cells 30-1 and 30-2.

Hereinafter, a method of manufacturing the backlight 211 according to the present embodiment will be described with reference to (A) to (C) of FIG. 22 to (A) to (C) of FIG. 24.

Figure 22:
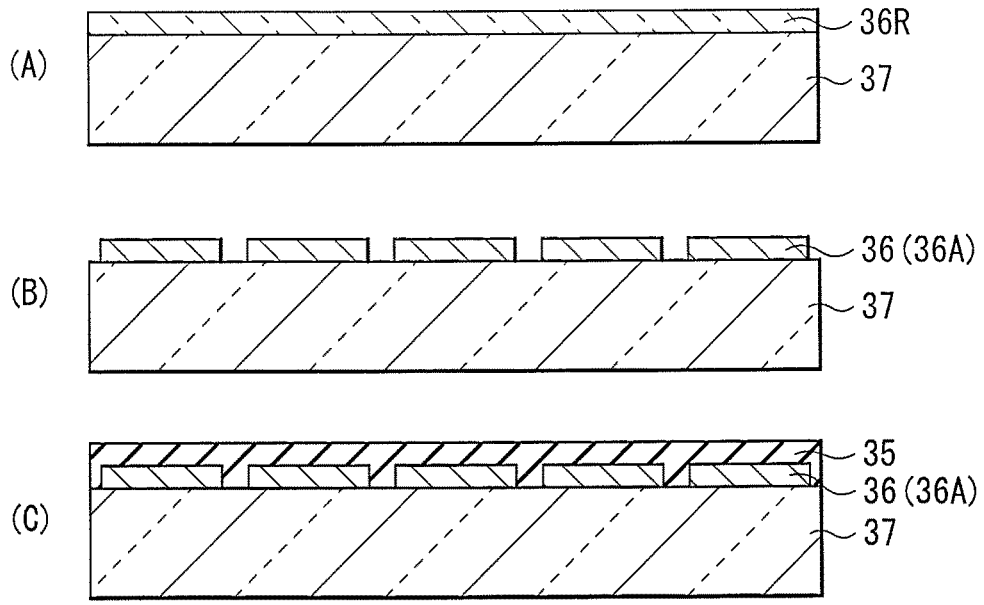
FIGS. 22A through 22C is a sectional diagram for explaining manufacturing processes of the light modulation device in FIG. 4.

At first, a transparent conductive film 36R made of, for example, ITO is formed on the transparent substrate 37 configured of a glass substrate or a plastic film substrate ((A) of FIG. 22). Then, after a resist layer is formed on the entire surface thereof, an electrode pattern is formed on the resist layer through patterning. Subsequently, the upper electrode 36 (the partial electrodes 36A) is formed through exposure and development, and the resist layer is then removed ((B) of FIG. 22).

As the method of patterning, for example, photolithography, laser processing, pattern printing, screen printing, and the like may be used. Moreover, for example, predetermined heating may be performed after screen printing is performed using the "Hyper Etch" material by Merck & Co., Inc., and then washing may be performed to perform patterning. The electrode pattern is determined by driving method and the number of segments in partial driving. For example, the electrode pattern may be processed at the pixel pitch of the display unit used or a pitch closed thereto. The process width of the electrode may be, although depending on the process method, preferably as small as possible in terms of light extraction efficiency. The process width of the electrode may be, for example, 50 µm or less, preferably 20 µm or less, and more preferably 5 µm or less. Moreover, ITO nanoparticles may be pattern-printed, and then the ITO nanoparticles may be fired to form the electrode pattern.

Subsequently, the alignment film 35 is applied to the entire surface, followed by drying and firing ((C) of FIG. 22). When a polyimide-based material is used as the alignment film 35, N-methyl-2-pyrroridone (NMP) is frequently used as a solvent, and at this time, a temperature of about 200° C. is necessary in the atmosphere. Note that, in this case, when a plastic substrate is used as the transparent substrate 37, the alignment film 35 may be dried in a vacuum at 100° C. and fired. After that, rubbing treatment is performed on the alignment film 35. As a result, the alignment film 35 functions as an alignment film for horizontal alignment, and further a pretilt is allowed to be formed in the rubbing direction of the alignment film 35.

Likewise, a transparent conductive film made of ITO or the like is formed on the transparent substrate 31 that is configured of a glass substrate or a plastic film substrate. Then, after a resist layer is formed on the entire surface, an electrode pattern is formed on the resist layer through patterning. Subsequently, the lower electrode 32 is formed through exposure and development, and the resist layer is then removed. After that, the alignment film 33 is applied on the entire surface, followed by drying and firing. Thereafter, rubbing treatment is performed on the alignment film 33. As a result, the alignment film 32 functions as an alignment film for horizontal alignment, and further a pretilt is allowed to be formed in the rubbing direction of the alignment film 33.

Figure 23:
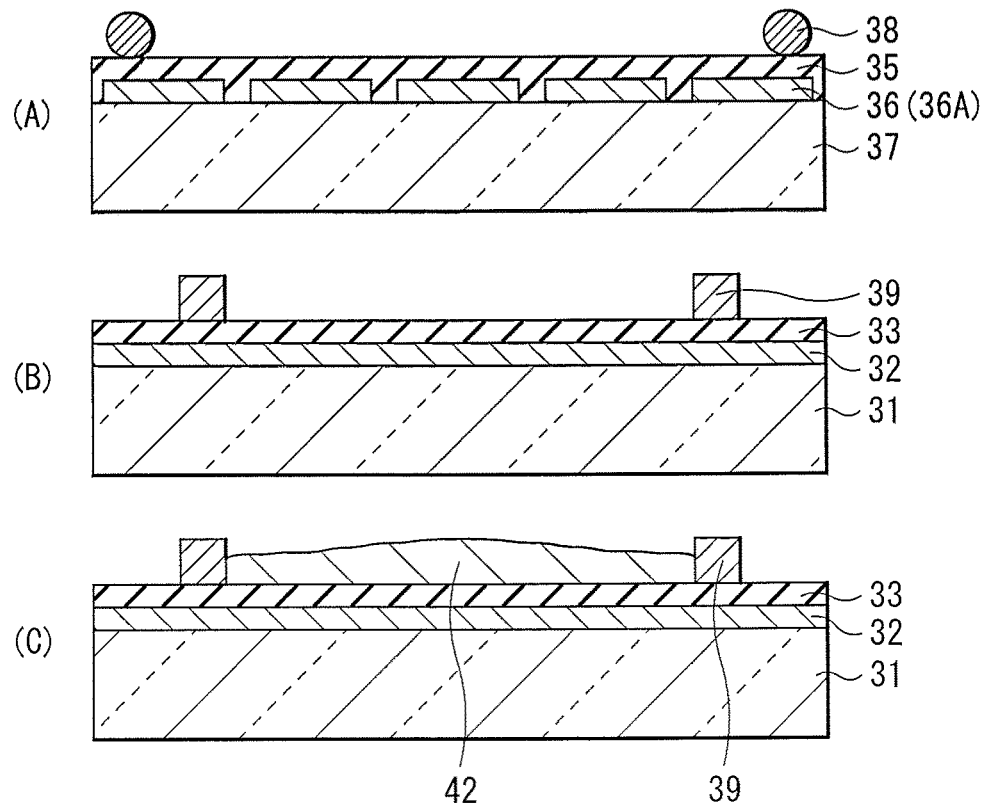
FIGS. 23A through 23C is a sectional diagram for explaining manufacturing processes following the manufacturing processes of FIG. 22.

Next, spacers 38 for forming a cell gap are spread on the alignment film 35 by a dry method or a wet method ((A) of FIG. 23). Note that, when the light modulation cells 30-1 and 30-2 are formed by vacuum bonding method, the spacers 38 may be mixed into a mixture to be dropped. In addition, instead of the spacers 38, columnar spacers may be formed by photolithography. Subsequently, a seal agent pattern 39 for bonding and for preventing leakage of liquid crystal may be applied, for example, in a frame shape on the alignment film 33 ((B) of FIG. 23). The seal agent pattern 39 is allowed to be formed by a dispenser method or a screen printing method.

Although the vacuum bonding method (one drop fill method, ODF method) will be described below, the light modulation cells 30-1 and 30-2 may be formed by a vacuum injection method, a roll bonding system, or the like.

First, a mixture 42 of liquid crystal and monomer is dropped uniformly in a plane by an amount corresponding to a volume that is determined from the cell gap, a cell area, and the like ((C) of FIG. 23). Although a precise dispenser of linear guide system may be preferably used for dropping the mixture 42, the seal agent pattern 39 may be used as a bank and a dye coater or the like may be used.

The above-described material may be used for the liquid crystal and the monomer, and the weight ratio of the liquid crystal and the monomer may be 98:2 to 50:50, may be preferably 95:5 to 75:25, and more preferably 92:8 to 85:15. The drive voltage is allowed to be decreased by increasing the rate of the liquid crystal, however, if the liquid crystal is excessively increased, whiteness tends to be lowered during voltage application, or transparency is tends to be deteriorated due to lowering of response speed after voltage off.

The mixture 42 is added with a polymerization initiator, in addition to the liquid crystal and the monomer. The monomer rate in the polymerization initiator to be added is adjusted within a range of 0.1 to 10 wt % depending on the wavelength of ultraviolet ray to be used. The mixture 42 may be added with a polymerization inhibitor, a plasticizer, a viscosity modifier, and the like, in addition thereto. When the monomer is in a solid or a gel at room temperature, a metal cap, a syringe, and a substrate may be preferably warmed.

Figure 24:
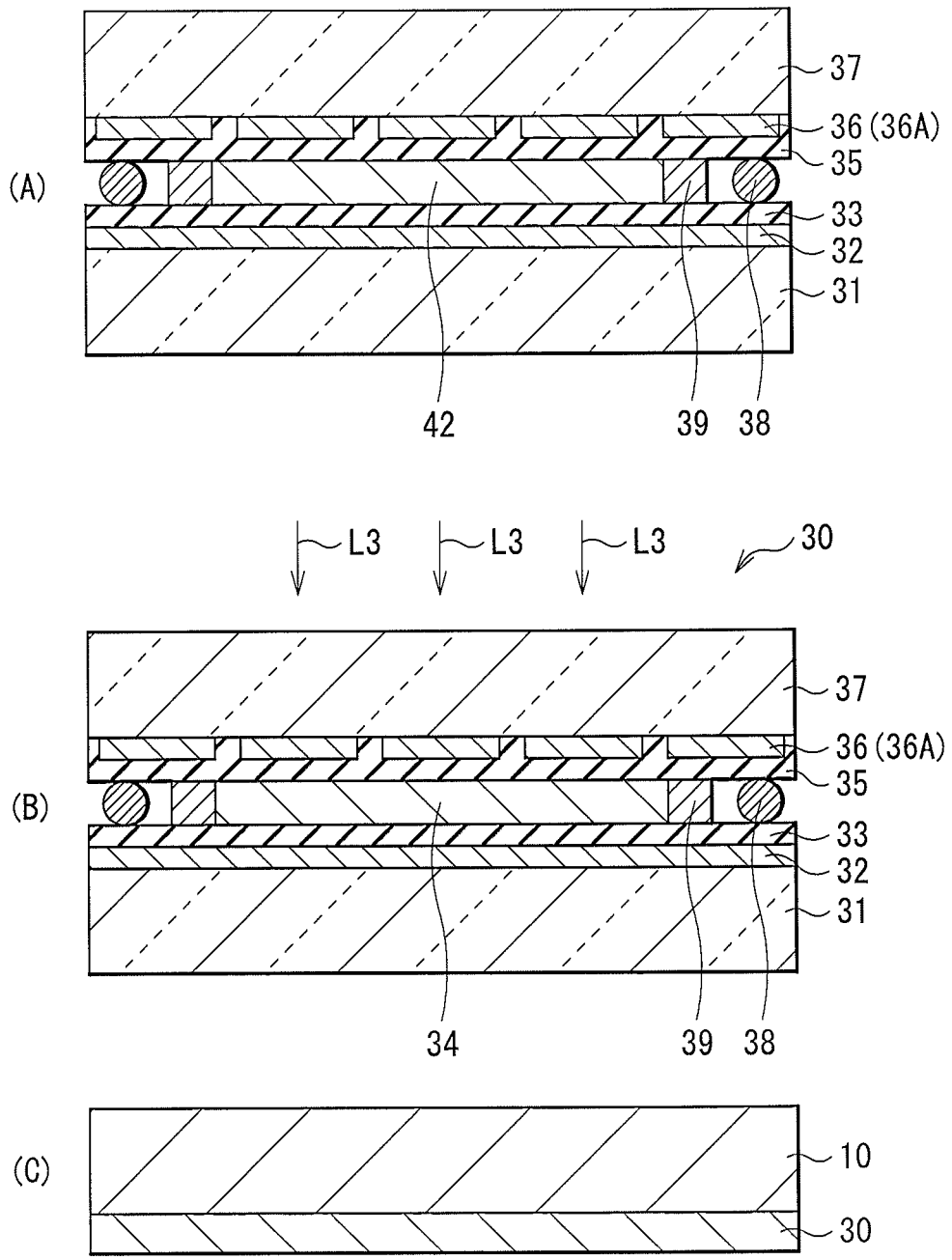
FIGS. 24A through 24C is a sectional diagram for explaining manufacturing processes following the manufacturing processes of FIG. 23.

After the transparent substrate 31 and the transparent substrate 37 are placed on a vacuum bonding machine (not illustrated), evacuation and bonding are performed ((A) of FIG. 24). After that, the bonded body is released in the air, and the cell gap is uniformized by uniform pressurization at atmosphere pressure. The size of the cell gap is arbitrarily selectable based on relationship between white luminance (whiteness) and the drive voltage, and may be 5 to 40 μm both inclusive, may be preferably 6 to 20 μm both inclusive, and more preferably 7 to 10 μm both inclusive.

After bonding, it may be preferable to perform alignment treatment as necessary (not illustrated). When light leakage occurs at the time of inserting the bonded cell between crossed-Nicols polarization plates, the cell is subjected to heat treatment for a certain time or is left at room temperature to be aligned. After that, ultraviolet ray L3 is irradiated to polymerize the monomer, and thus polymer is formed ((B) of FIG. 24). In this way, the light modulation device 30 is manufactured.

It may be preferable that the temperature of the cell be prevented from being varied during irradiation of the ultraviolet ray. It may be preferable to use an infrared cut filter, and use a UV-LED or the like as a light source. The illuminance of the ultraviolet ray affects the structure of the composite material, and thus the illuminance may be preferably adjusted appropriately based on the liquid crystal material to be used, the monomer material to be used, and the compositions thereof, may be preferably within a range of 0.1 to 500 mW/cm$^2$, and more preferably within a range of 0.5 to 30 mW/cm$^2$. There is a tendency that the drive voltage is decreased as the illuminance of the ultraviolet ray is low and preferable illuminance of the ultraviolet ray is selectable in terms of both productivity and characteristics.

Then, the light modulation device 30 is bonded to the light guide plate 10 ((C) of FIG. 24). Although the bonding may be performed through adhesion or bonding, the adhesion or the bonding may be preferably performed with use of a material that has a refractive index as close to that of the light guide plate 10 and that of the substrate material of the light modulation device 30 as possible. Finally, lead wire (not illustrated) is attached to the lower electrode 32 and the upper electrode 36. In this way, the backlight 211 of the present embodiment is manufactured.

As described above, the process in which the light modulation device 30 is fabricated and the light modulation device 30 is finally bonded to the light guide plate 10 has been described, however, the transparent substrate 37 provided with the alignment film 35 may be previously bonded to the surface of the light guide plate 10 and then the backlight 211 may be fabricated. Moreover, the backlight 211 may be fabricated by a single wafer system or a roll to roll system.

Next, functions and effects of the backlight 211 of the present embodiment will be described.

Figure 25:
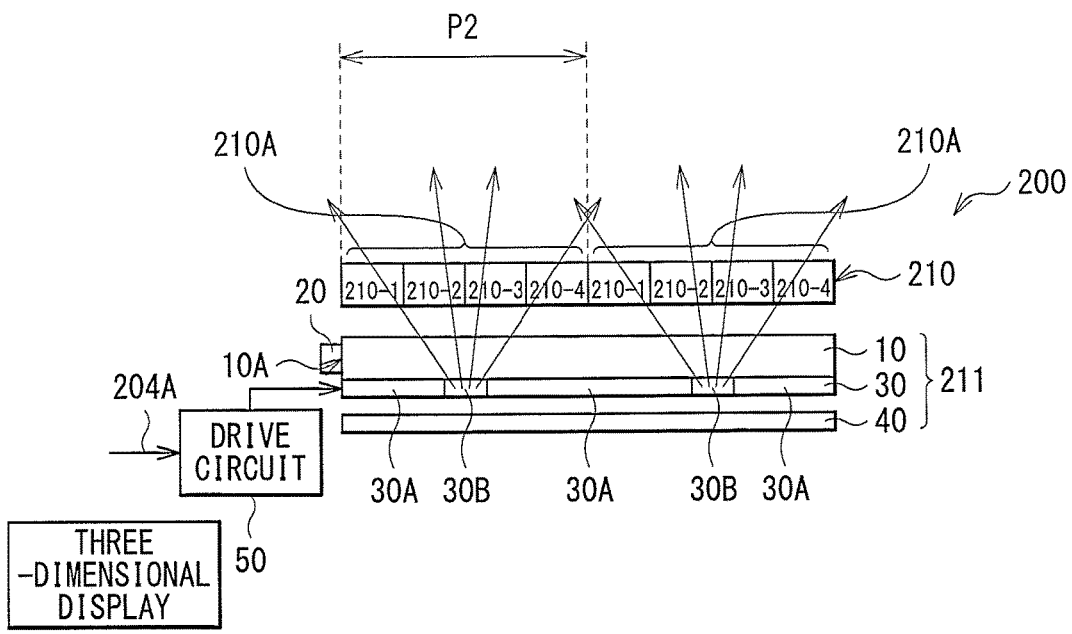
FIG. 25 is a schematic diagram for explaining three-dimensional display on the display unit in FIG. 3.

In the backlight 211 of the present embodiment, the voltage is applied to the pair of electrodes (the lower electrode 32 and the partial electrode 36A) in each of the light modulation cells 30-1 and 30-2 so that the optical axis AX2 of the microparticle 34B intersects or is orthogonal to (or substantially orthogonal to) the optical axis AX1 of the bulk 34A in each of the light modulation cells 30-1 and the optical axis AX2 of the microparticle 34B is parallel to or substantially parallel to the optical axis AX1 of the bulk 34A in each of the light modulation cells 30-2. Accordingly, in the light modulation device 30, each of the light modulation cells 30-1 becomes the scattering region 30B, and each of the light modulation cells 30-2 becomes the transmissive region 30A. As a result, the light that has been emitted from the light source 20 and has entered the light guide plate 10 passes through the transmissive region 30A of the light modulation device 30, and is scattered in the scattering region 30B of the light modulation device 30 (FIG. 25). Light that has passed through the bottom surface of the scattering region 30B of the scattered light is reflected by the reflector 40 to return to the light guide plate 10 again, and then is emitted from the top surface of the backlight 211. In addition, light traveling toward the top surface of the scattering region 30B of the scattered light passes through the light guide plate 10, and then is emitted from the top surface of the backlight 211. As described above, in three-dimensional display, light is scarcely emitted from the top surface of the transmissive region 30A and light is emitted from the top surface of the scattering region 30B. In this way, for example, as illustrated in FIG. 25, the plurality of linear illumination light beams may be emitted in the front direction.

As a result, each of the linear illumination light beams emitted in the front direction enters the back surface of the display panel 210. Therefore, for example, when two-dimensional picture data for three-dimensional display is generated by the picture signal processing circuit 207 so that each pixel row becomes three-dimensional pixel 210A in the pixel arrangement corresponding to each of the linear illumination light beams, each of the linear illumination light beams enters, at the substantially same angle, the pixel located in a position common to the respective three-dimensional pixels 210A (for example, in FIG. 25, pixel 210-1, 210-2, 210-3, or 210-4). As a result, from the pixel located in a position common to the respective three-dimensional pixels 210A, picture light modulated by the pixel is emitted at the predetermined angle. At this time, a viewer views pictures with different parallaxes by his right and left eyes. Thus, the viewer perceives display of a three-dimensional picture (a stereoscopic picture) on the display panel 210.

Figure 26:
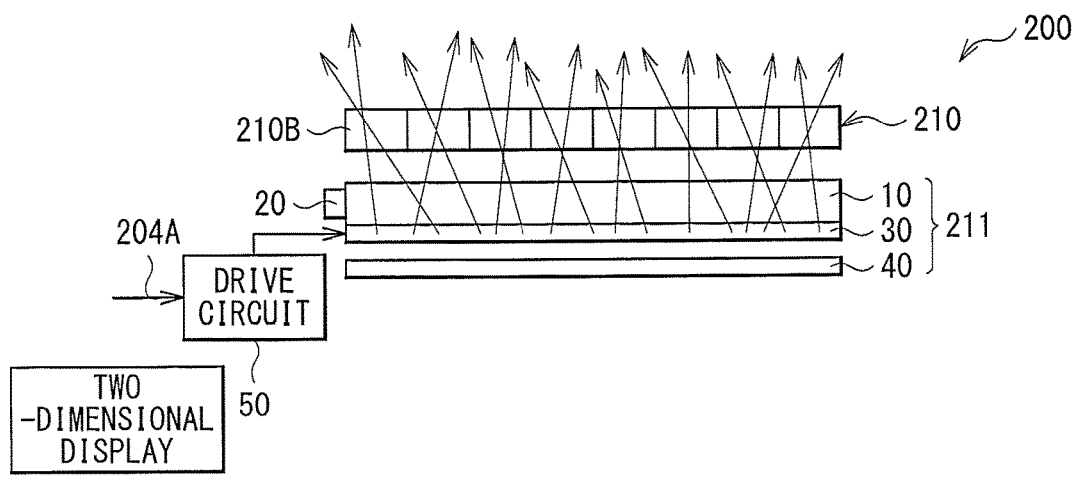
FIG. 26 is a schematic diagram for explaining two-dimensional display on the display unit in FIG. 3.

Moreover, in the backlight 211 of the present embodiment, the voltage is applied to the pair of electrodes (the lower electrode 32 and the partial electrode 36A) in each of the light modulation cells 30-1 and 30-2 so that the optical axis AX2 of the microparticle 34B intersects or is orthogonal to (or substantially orthogonal to) the optical axis AX1 of the bulk 34A in each of the light modulation cells 30-1 and 30-2, in two-dimensional display. Accordingly, the light that has been emitted from the light source 20 and has entered the light guide plate 10 is scattered in the scattering region 30B that is formed in the entire light modulation device 30 (FIG. 26). Light that has passed through the bottom surface of the scattering region 30B of the scattered light is reflected by the reflector 40 to return to the light guide plate 10 again, and then is emitted from the top surface of the backlight 211. In addition, light traveling toward the top surface of the scattering region 30B of the scattered light passes through the light guide plate 10, and then is emitted from the top surface of the backlight 211. As described above, in two-dimensional display, for example, light may be emitted from the entire top surface of the light modulation device 30, and a planar illumination light beam may be emitted in the front direction.

As a result, the planar illumination light beam emitted in the front direction enters the back surface of the display panel 210. Accordingly, for example, when two-dimensional picture data for two-dimensional display corresponding to each pixel 210B is generated by the picture signal processing circuit 207, the planar illumination light beam enters each of the pixels 210B from all angles, and picture light modulated by each of the pixels 210B is emitted from each of the pixels 210B. At this time, the viewer views the same picture by both eyes, and thus the viewer perceives display of a two-dimensional picture (a planar picture) on the display panel 210.

Moreover, in the present embodiment, when the light modulation layer 34 exhibits the scattering property, the bulk 34A having low electric-field responsiveness has a component of the optical axis AX1 mainly in a direction parallel to the transmission axis AX10 of the polarization plate 210B, and the microparticle 34B having high electric-field responsiveness has the optical axis AX2 in a direction that intersects or is orthogonal to (or substantially orthogonal to) the optical axis AX1 of the bulk 34A and intersects or is orthogonal to (or substantially orthogonal to) the transparent substrate 31. Accordingly, the polarization axis of the light emitted from the backlight 211 has a main component in the direction parallel to the transmission axis AX10 of the polarization plate 21B, and thus the light of the backlight 211 is allowed to enter the liquid crystal panel 210A more efficiently as compared with the case where non-polarized light with the same luminance is emitted from the backlight 211. Therefore, even in the case where three-dimensional display is performed with use of the smaller number of pixels than that in two-dimensional display, three-dimensional display with high display luminance is allowed to be performed. In addition, two-dimensional display with high display luminance is also allowed to be performed.

Incidentally, in the present embodiment, it is unnecessary to provide a parallax barrier in three-dimensional display. In addition, even if a parallax barrier is provided on a light emission side of the backlight 211, the rate at which the light emitted from the light modulation layer 34 is absorbed by the parallax barrier is allowed to be extremely low by using a part of the light modulation layer 34 as the scattering region 30B and allowing the scattering region 30B to correspond to a light transmissive region of the parallax barrier. In addition, in the present embodiment, it is unnecessary to provide a cylindrical lens in three-dimensional display. Therefore, there is no possibility that aberration caused by the cylindrical lens occurs.

As described above, in the present embodiment, the polarization axis of the light emitted from the backlight 211 has a main component in the direction parallel to the transmission axis AX10 of the polarization plate 210B, and a part of the light modulation layer 34 is allowed to be the scattering region 30B. Consequently, it is possible to improve both the display luminance and the display quality in three-dimensional display.

In the present embodiment, as illustrated in FIG. 5, FIG. 7, FIG. 9, FIG. 11, and FIG. 62, when the partial electrode 36A or the partial electrode 32A has a linear shape, advantages such as simplification of the drive pattern and suppression of electric resistance are obtained because the electrode structure is simple. In contrast, as illustrated in FIG. 6, FIG. 8, FIG. 10, FIG. 12, FIG. 65, and FIG. 66, when the partial electrode 36A or the partial electrode 32A has a block shape, the light output pattern of the illumination device 211 is allowed to be aligned in position on a pixel basis with respect to the pixel layout for 3D display of the display panel 210 in three-dimensional display. Consequently, the pixels in the display panel 210 are allowed to be prevented from receiving common light, and double image is allowed to be suppressed.

Moreover, in the present embodiment, as illustrated in FIG. 6, FIG. 8, FIG. 10, and FIG. 12, when the partial electrode 36A or the partial electrode 32A has a block shape, a succession of blocks regarded as one group of linear electrodes may be electrically connected to one another. In the group of the linear electrodes, the respective blocks (the partial electrodes 36A or the partial electrodes 32A) may be connected to one another through a thin electrode. In addition, in the present embodiment, as illustrated in FIG. 9, FIG. 10, FIG. 11, and FIG. 12, when the partial electrode 36A, the partial electrode 36D, the partial electrode 36E, or the partial electrode 36F extends in a direction intersecting the light incidence surface 10A, deterioration of biased resolution is allowed to be suppressed in three-dimensional display described in modification 20 described later.

In addition, in the present embodiment, as illustrated in FIG. 7, FIG. 8, FIG. 11, and FIG. 12, when the partial electrode 36C is configured of a plurality of partial electrodes, the drive circuit 50 may perform time-divisional driving as illustrated in modification 22 described later, or may perform scan driving in four pixel rows within one frame period in two-dimensional display as illustrated in modification 22 described later. Moreover, when the partial electrode 36C is configured of a plurality of partial electrodes, light absorption by each partial electrode is allowed to be suppressed by decreasing a width of each partial electrode to decrease the electrode area of each partial electrode.

Other effects of the receiver 200 according to the present embodiment will be described below.

Typically, the PDLC is formed by mixing a liquid crystal material and an isotropic low-molecular material and causing phase separation by ultraviolet irradiation, drying of a solvent, etc., and the PDLC is a composite layer in which microparticles of the liquid crystal material are dispersed in a polymer material. The liquid crystal material in the composite layer exhibits scattering property because the liquid crystal material face in random directions during no-voltage application; however the liquid crystal material aligns in an electric field direction during voltage application. Accordingly, the liquid crystal material in the composite layer exhibits high transparency in the front direction (in the normal direction of the PDLC) when the ordinary refractive index of the liquid crystal material is equal to the refractive index of the polymer material. However, in the liquid crystal material, in the oblique direction, difference between the extraordinary refractive index of the liquid crystal material and the refractive index of the polymer material is remarkable, and this results in expression of scattering property in the oblique direction even when transparency is expressed in the front direction.

Usually, a light modulation device using the PDLC frequently has a structure in which the PDLC is sandwiched between two glass plates that each have a front surface provided with a transparent conductive film. When light obliquely enters, from the air, the light modulation device having the above-described structure, the light that has entered the light modulation device in the oblique direction is refracted due to difference in refractive index between the air and the glass plate, and enters the PDLC at a smaller angle. Therefore, in such a light modulation device, large scattering does not occur. For example, when light enters the light modulation device from the air at an angle of 80 degrees, the entering angle of the light to the PDLC may be decreased to about 40 degrees by refraction at the glass interface.

However, in an edge light system using a light guide plate, since light enters through the light guide plate, the light crosses the PDLC at a large angle of about 80 degrees. Therefore, the difference between the extraordinary refractive index of the liquid crystal material and the refractive index of the polymer material is large, and further the light crosses the PDLC at larger angle, and optical path subjected to scattering is also increased accordingly. For example, when microparticles of a liquid crystal material that has an ordinary refractive index of 1.5 and an extraordinary refractive index of 1.65 are dispersed in a polymer material having a refractive index of 1.5, difference in refractive index is not generated in the front direction (the normal direction of the PDLC); however the difference in refractive index is increased in the oblique direction. Therefore, this prevents the scattering property scattering property in the oblique direction to be decreased so that viewing angle characteristics are deteriorated. Further, when an optical film such as a diffuser film is provided on the light guide plate, obliquely-leaked light is diffused also in the front direction by the diffuser film or the like. Therefore, light leakage in the front direction is increased and the modulation ratio in the front direction is lowered.

On the other hand, in the present embodiment, since the bulk 34A and the microparticle 34B are formed to mainly contain respective optical anisotropic materials, the scattering property is decreased and the transparency is improved in the oblique direction. For example, when the bulk 34A and the microparticle 34B are configured to mainly contain respective optical anisotropic materials whose ordinary refractive indices are equal to each other and whose extraordinary refractive indices are also equal to each other, and in a region where a voltage is not applied between the lower electrode 32 and the upper electrode 36, the directions of the optical axes thereof coincide or substantially coincide with each other. Therefore, difference in refractive index is decreased or eliminated in all directions including the front direction (the normal direction of the light modulation device 30) and the oblique direction, and higher transparency is obtainable. As a result, light leakage in a region where a viewing angle is large is allowed to be decreased or substantially eliminated, and viewing angle characteristics are allowed to be improved.

For example, when a liquid crystal that has an ordinary refractive index of 1.5 and an extraordinary refractive index of 1.65 and a liquid crystalline monomer that has an ordinary refractive index of 1.5 and an extraordinary refractive index of 1.65 are mixed and the liquid crystalline monomer is polymerized in a state where the liquid crystal and the liquid crystalline monomer are aligned by the alignment film or an electric field, the optical axis of the liquid crystal coincides with the optical axis of a polymer formed through polymerization of the liquid crystalline monomer. As a result, since the refractive indices are coincident with each other in all directions, in such a case, a state with higher transparency is achievable and the viewing angle characteristics are further improved.

In addition, in the present embodiment, for example, as illustrated in (A) and (B) of FIG. 18, the luminance of the transmissive region 30A (the luminance of black display) is lower than that in the case where light is uniformly emitted from the entire surface (alternate long and short dash line in (B) of FIG. 18). On the other hand, the luminance of the scattering region 30B is extremely higher than that in the case where light is uniformly emitted from the entire surface (alternate long and short dash line in (B) of FIG. 18), and the luminance of partial white display (luminance enhancement) is increased by a decreased amount of the luminance of the transmissive region 30A.

Incidentally, the luminance enhancement is a technique to enhance luminance when partial white display is performed, as compared with the case of entire white display. This is a technique generally used for CRT, PDP, and the like. In a liquid crystal display, however, a backlight uniformly emits light as a whole irrespective of an image so that partial enhancement of luminance is difficult. Incidentally, when the backlight is configured as an LED backlight in which a plurality of LEDs are two-dimensionally arranged, the LEDs are allowed to be partially turned off. In such a case, however, diffusion light from a dark region where the LEDs are turned off is absent, and thus the luminance is lowered as compared with the case where all of the LEDs are turned on. In addition, although it is possible to increase the luminance by increasing a current flowing through the LEDs partially turned on, in such a case, large current flows through the LEDs in an extremely short time, and thus issues are remained in terms of load and reliability of circuits.

On the other hand, in the present embodiment, since the bulk 34A and the microparticle 34B are formed to mainly contain respective optical anisotropic materials, the scattering property in the oblique direction is suppressed and leakage of light from the light guide plate in a dark state is suppressed. Therefore, the light is guided from a partial dark region to a partial bright region so that luminance enhancement is achievable without increasing power supplied to the backlight 211.

Moreover, in the present embodiment, in a region where a voltage is not applied between the lower electrode 32 and the upper electrode 36, the optical axis AX2 of the microparticle 34B is parallel to the light incident surface 10A of the light guide plate 10, and intersects the surfaces of the transparent substrates 31 and 37 at the slight angle θ1. Specifically, the liquid crystal molecule contained in the microparticle 34B is aligned in a state of being inclined at the angle θ1 in a plane parallel to the light incident surface 10A (in a state of being provided with a pretilt angle). Therefore, during voltage application, the liquid crystal material contained in the microparticle 34B does not stand up in random directions, and stands up in the plane parallel to the light incident surface 10A. At this time, the optical axis AX1 of the bulk 34A intersects or is orthogonal to (or substantially orthogonal to) the optical axis AX2 of the microparticle 34B in the plane parallel to the light incident surface 10A. In this case, of the light entering the light guide plate 10 from the light incident surface 10A, light oscillating perpendicular to the transparent substrate 31 is affected by a difference between the extraordinary refractive index of the microparticle 34B and the ordinary refractive index of the bulk 34A. At this time, since the difference between the extraordinary refractive index of the microparticle 34B and the ordinary refractive index of the bulk 34A is large, the scattering efficiency of the light oscillating perpendicular to the transparent substrate 31 is increased. On the other hand, the light oscillating parallel to the transparent substrate 31 is affected by the difference between the ordinary refractive index of the microparticle 34B and the extraordinary refractive index of the bulk 34A. At this time, since the difference between the ordinary refractive index of the microparticle 34B and the extraordinary refractive index of the bulk 34A is also large, the scattering efficiency of the light oscillating parallel to the transparent substrate 31 is also increased. Accordingly, light propagating through the region where a voltage is applied between the lower electrode 32 and the upper electrode 36 contains a large amount of oblique component. For example, when an acryl light guide plate is used as the light guide plate 10, the light in the region where a voltage is applied between the lower electrode 32 and the upper electrode 36 propagates the region at an angle of 41.8 degrees or more. As a result, the refractive index difference is increased in all directions including the oblique direction, and high scattering property is obtained, and thus display luminance is allowed to be improved. In addition, it is possible to further improve the display luminance due to the effect of the above-described luminance enhancement.

Incidentally, for example, when the optical axis AX1 of the bulk 34A and the optical axis AX2 of the microparticle 34B are arranged perpendicular to the light incident surface 10A of the light guide plate 10 during no-voltage application, and the liquid crystal material contained in the microparticle 34B is adapted to stand up in a plane perpendicular to the light incidence surface 10A during voltage application, as with the case described above, the light oscillating perpendicular to the transparent substrate 31 is affected by the difference between the extraordinary refractive index of the microparticle 34B and the ordinary refractive index of the bulk 34B. However, the light oscillating parallel to the transparent substrate 31 is affected by the difference between the ordinary refractive index of the microparticle 34B and the ordinary refractive index of the bulk 34A. In this case, the difference between the ordinary refractive index of the microparticle 34B and the ordinary refractive index of the bulk 34A is zero or substantially zero. Therefore, of the light entering the light guide plate 10 from the light incidence surface 10A, the light oscillating perpendicular to the transparent substrate 31 is largely affected by the refractive index difference as with the case described above, whereas the light oscillating parallel to the transparent substrate 31 is free or substantially free from influence of the refractive index difference. As a result, the scattering efficiency of the light oscillating perpendicular to the transparent substrate 31 is increased, but the scattering efficiency of the light oscillating parallel to the transparent substrate 31 is low or zero. Therefore, when the optical axes AX1 and AX2 are arranged perpendicular to the light incidence surface 10A, the scattering efficiency is lower than that in the case where the optical axes AX1 and AX2 are arranged parallel to the light incidence surface 10A. As a result, the luminance extracted from the light guide plate 10 is lower than that of the light modulation device 30 of the present embodiment.

As described above, in the present embodiment, the display luminance is allowed to be improved while light leakage in a region where the viewing angle is large is decreased or substantially eliminated. As a result, modulation ratio in the front direction is allowed to be high.

(Anisotropic Diffusion)

Figure 27:
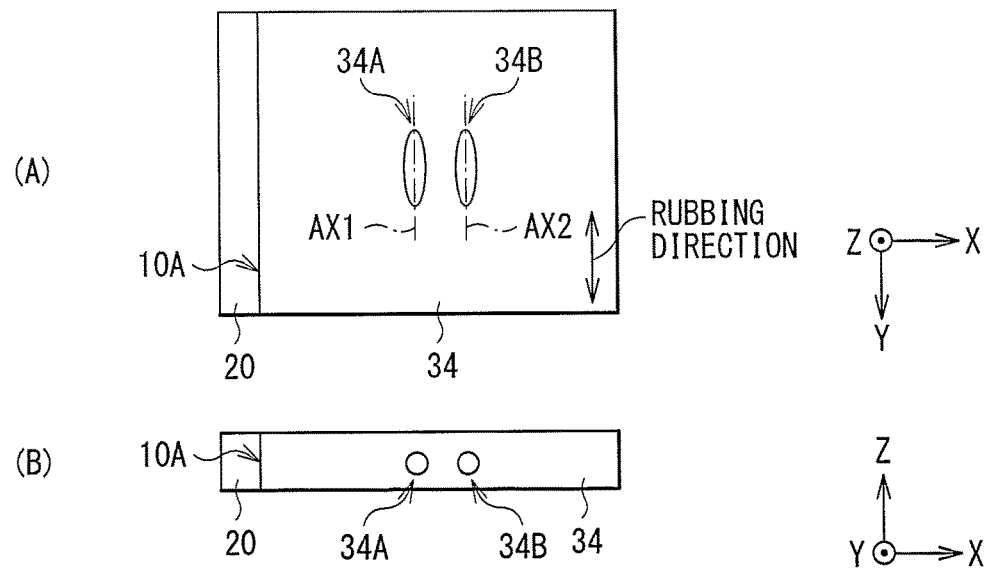
FIGS. 27A and 27B is a schematic diagram for explaining an example of a function of the light modulation layer in FIG. 4.
Figure 28:
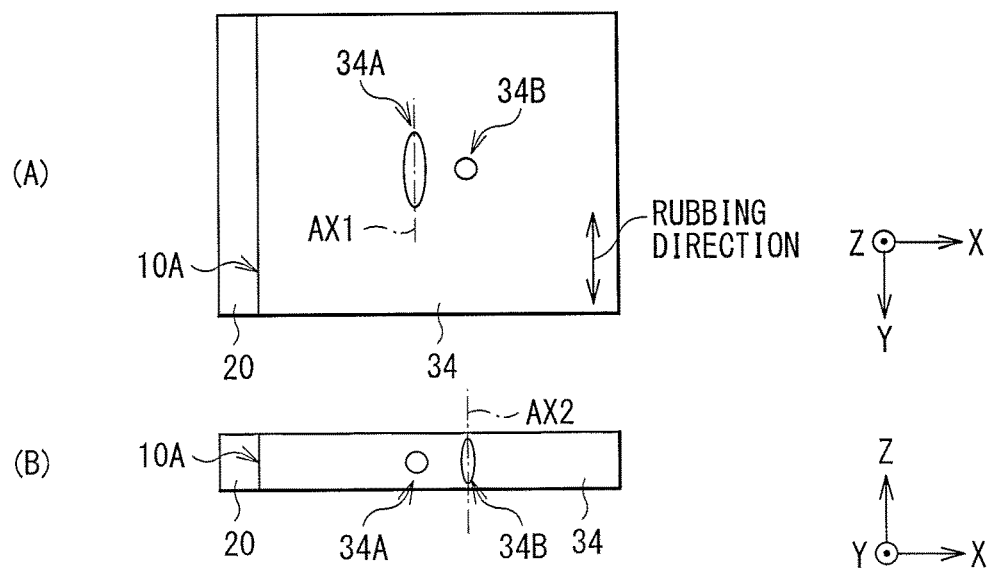
FIGS. 28A and 28B is a schematic diagram for explaining another example of the function of the light modulation layer in FIG. 4.

Next, anisotropic diffusion in the present embodiment is described. FIG. 27 and FIG. 28 each illustrate an example of index ellipsoids of the bulk 34A and the microparticle 34B in the light modulation layer 34 of the present embodiment. FIG. 27 illustrates an example of the index ellipsoids of the bulk 34A and the microparticle 34B during no-voltage application, and FIG. 28 illustrates an example of the index ellipsoids of the bulk 34A and the microparticle 34B during voltage application.

Again, as illustrated in FIG. 27, during no-voltage application, the optical axis AX1 of the bulk 34A and the optical axis AX2 of the microparticle 34B face in a direction that is parallel to the light incidence surface 10A of the light guide plate 10 and intersects the surfaces of the transparent substrates 31 and 37 at the angle θ1. In addition, again, as illustrated in FIG. 28, during voltage application, the optical axis AX1 of the bulk 34A faces in the direction same as that during the no-voltage application. Further, the optical axis AX2 of the microparticle 34B faces in a direction that is parallel or substantially parallel to the light incidence surface 10A of the light guide plate 10, and intersects the surfaces of the transparent substrates 31 and 37 at the angle θ2 (for example, 90 degrees) larger than the angle θ1.

As described above, the liquid crystal molecule in the microparticle 34B shows a change as described above depending on voltage application and no-voltage application. In the course of the change, the bulk 34A does not respond to the voltage change or responds at low speed, and the long axis direction of the streaky structure of the bulk 34A faces in the rubbing direction (the direction parallel to the light incidence surface 10A (the Y-axis direction in FIG. 27 and FIG. 28)). Therefore, during voltage application, the light that is emitted from the light source 20 and propagates through the light modulation layer 34 propagates at a cycle of the average size of the streaky tissue in the short axis direction of the streaky structure of the bulk 34A while being affected by a difference between the extraordinary refractive index of the microparticle 34B and the ordinary refractive index of the bulk 34A or a difference between the ordinary refractive index of the microparticle 34B and the extraordinary refractive index of the bulk 34A. As a result, the light propagating through the light modulation layer 34 is largely scattered in the thickness direction of the light modulation layer 34 and is less scattered in the direction parallel to the light incidence surface 10A. In other words, in the light modulation layer 34, in the plane (the YZ plane) parallel to the light incidence surface 10A, scattering property has anisotropy in the Y-axis direction and Z-axis direction. In this way, the light modulation layer 34 exhibits anisotropic scattering to the light that is emitted from the light source 20 and propagates through the light modulation layer 34.

In the light modulation layer 34, according to the index ellipsoids in the bulk 34A and the microparticle 34B, the polarization component in the Y-axis direction (the rubbing direction) has higher scattering power than that of the polarization component in the X-axis direction in the light propagating in the Z-axis direction in FIG. 28. In other words, the light modulation layer 34 exhibits anisotropic scattering property in the polarization direction, with respect to the light propagating in the thickness direction of the light modulation layer 34. The light polarized in the X-axis direction is scattered based on the difference between the ordinary refractive index of the bulk 34A and the ordinary refractive index of the microparticle 34B. However, these values are similar to each other, and thus the scattering property is low. On the other hand, the light polarized in the Y-axis direction is scattered based on the difference between the extraordinary refractive index of the bulk 34A and the ordinary refractive index of the microparticle 34B. However, these values are largely different from each other, and thus the scattering property is high.

The degree of the anisotropic scattering actually exhibited by the light modulation layer 34 will be examined below.

Figure 29:
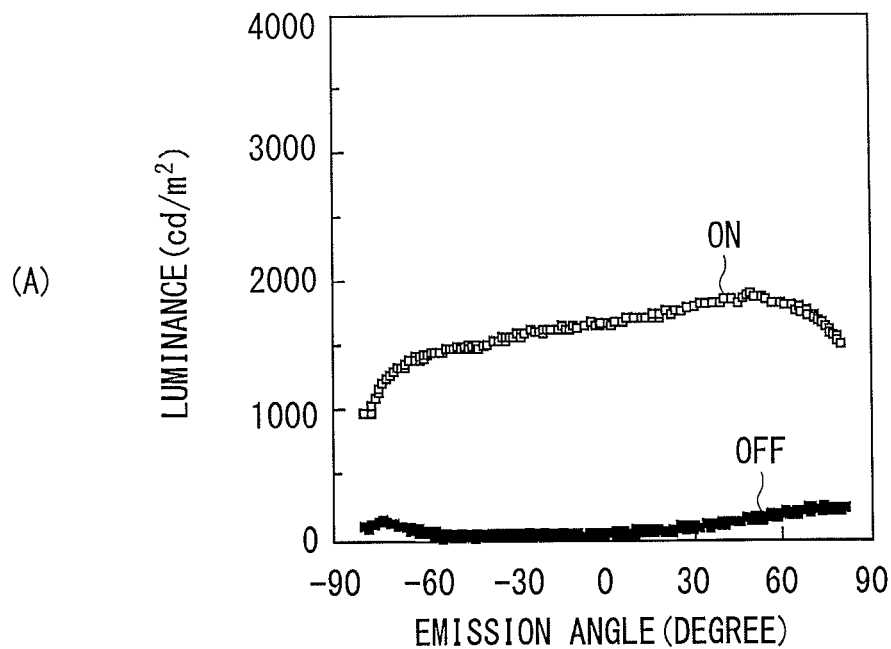
FIGS. 29A and 29B is a diagram for explaining effects of the light modulation layer in FIG. 4 and effects of a light modulation layer according to a comparative example.
Figure 29:
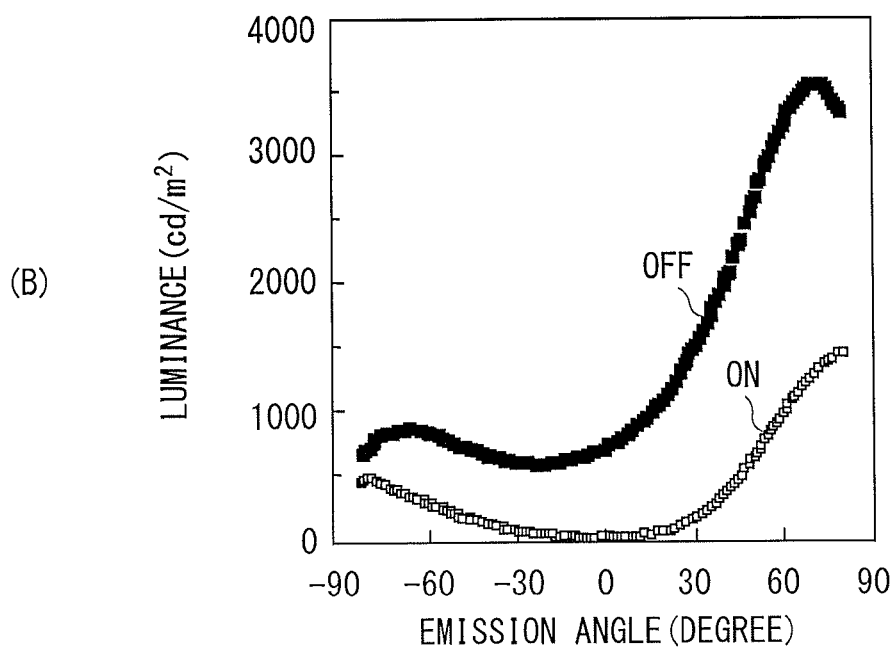

(A) and (B) of FIG. 29 illustrate measured results of the emission angle characteristics of the light from the light guide plate. (A) of FIG. 29 illustrates the results in the case of using the light modulation layer 34, and (B) of FIG. 29 illustrates the results in the case of using a light modulation layer exhibiting optical isotropy in plane. Although a white reflector is typically used on a bottom surface of the light modulation layer, a black absorption layer was disposed on the bottom surface of the light modulation layer, in place of the white reflector, in order to precisely obtain emission characteristics from the light modulation layer and from the light guide plate.

When the light modulation layer exhibiting optical isotropy in plane is used, in the light extracted from the light guide plate, an amount of components in proximity to the light guide plate are large and an amount of components in the front direction is small. In contrast, when the light modulation layer 34 exhibiting optical anisotropy in plane is used, the amount of the light in the front direction is relatively large at the time of being extracted from the light guide plate, and such profile is suitable for an illumination device. Further, in a black state, the amount of the light obliquely leaked in the case of the optically-isotropic light modulation layer is larger than that in the anisotropic light modulation layer, and thus it is advantageous also in light modulation ratio performance. Moreover, when an optical sheet is used on the light guide plate with an air interface in between, it is conceivable that the amount of the light that is lost due to reflection by the optical sheet and the air interface is large, and thus the emission characteristics from the light guide plate is suitably large in components in the front direction. Since the used monomer material and the used liquid crystal material are different between the two light modulation layers used in the examination, it is difficult to compare light extraction intensity thereof. However, in the case where materials having the same optical property are used as the light modulation layers, usage efficiency of light is allowed to be enhanced when the light modulation layer 34 exhibiting optical anisotropy in plane is used.

Figure 30:
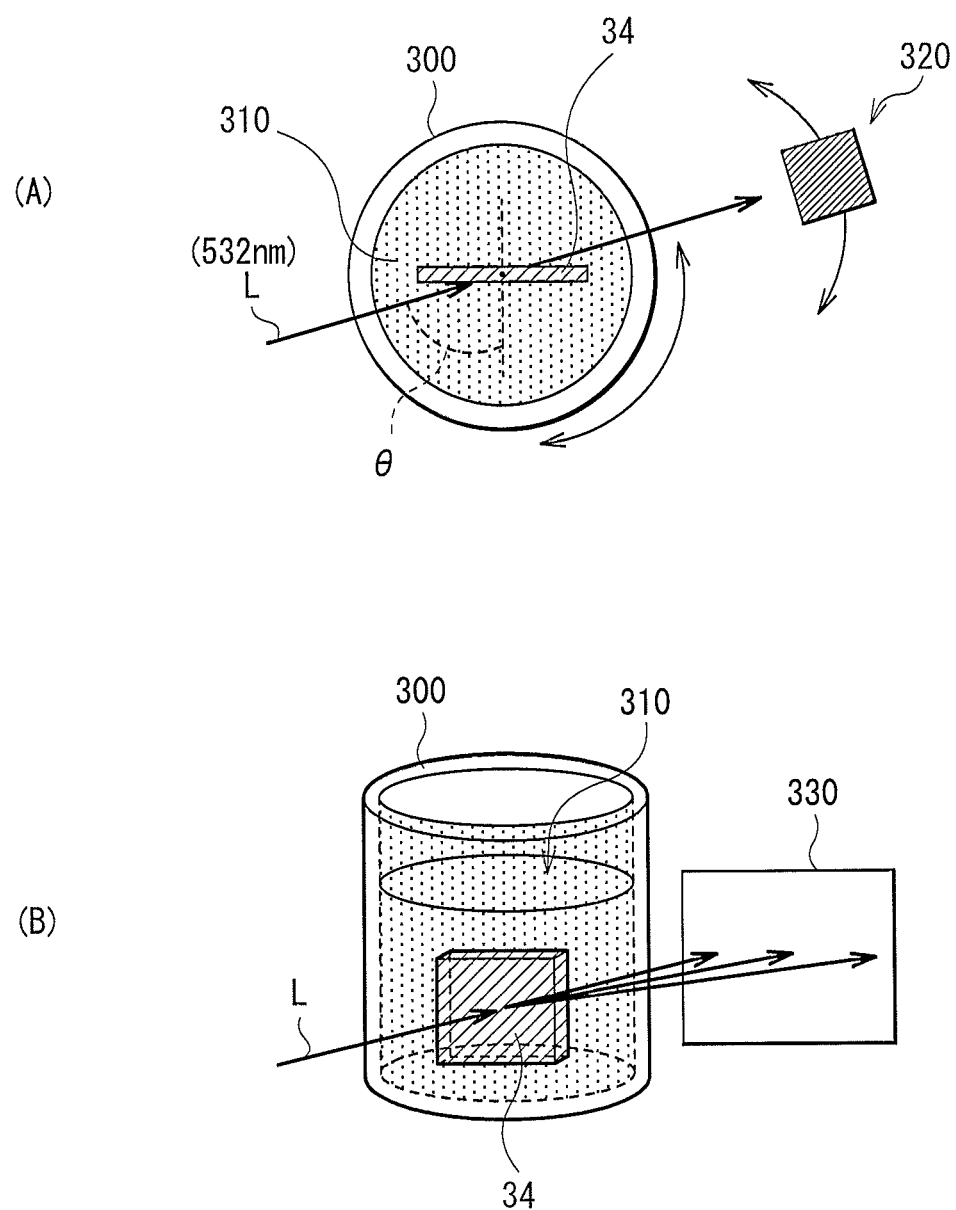
FIGS. 30A and 30B is a diagram illustrating an example of an apparatus measuring optical characteristics of the light modulation layer.

It was found from the above-described results that when the two light modulation layers are used, the emission angle characteristics thereof are different from each other. Therefore, the scattering characteristics of the light modulation layer 34 itself were measured. In the state of using the light guide plate, total reflection by the light guide plate occurred and measurement of angle characteristics of scattering was not possible, and thus the angle characteristics of scattering were measured by an apparatus illustrated in (A) and (B) of FIG. 30. Specifically, a matching oil 310 and the light modulation layer 34 were put into a cylindrical glass container 300, and the light modulation layer 34 was irradiated with a laser beam L at a large incident angle θ (for example, 80 degrees) that allows the light beam L to be guided through the light guide plate, to evaluate angle characteristics of scattering. (A) of FIG. 31 illustrates a state of a luminance distribution projected on a measured surface 330 when the laser beam L entered the light modulation layer 34 at the large incident angle θ (for example, 80 degrees).

Figure 31:
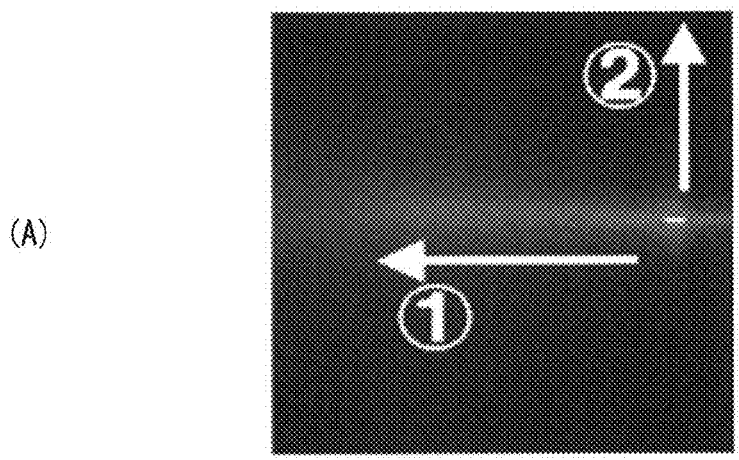
FIGS. 31A through 31C is a diagram illustrating an example of results measured by the apparatus in FIG. 30.
Figure 31:
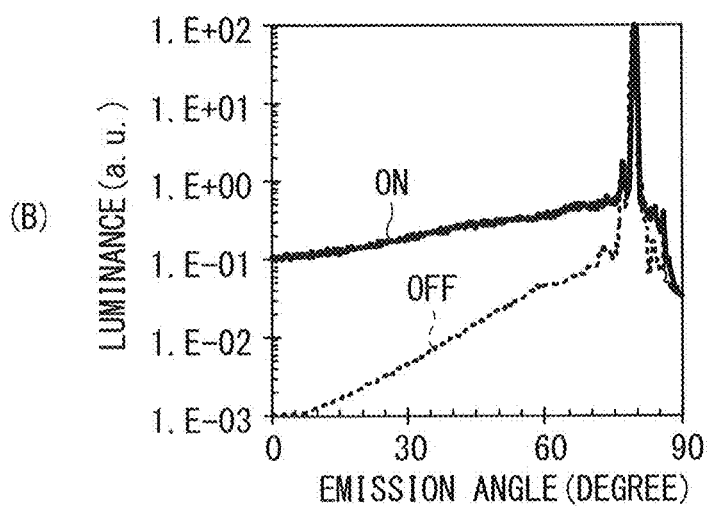
Figure 31:
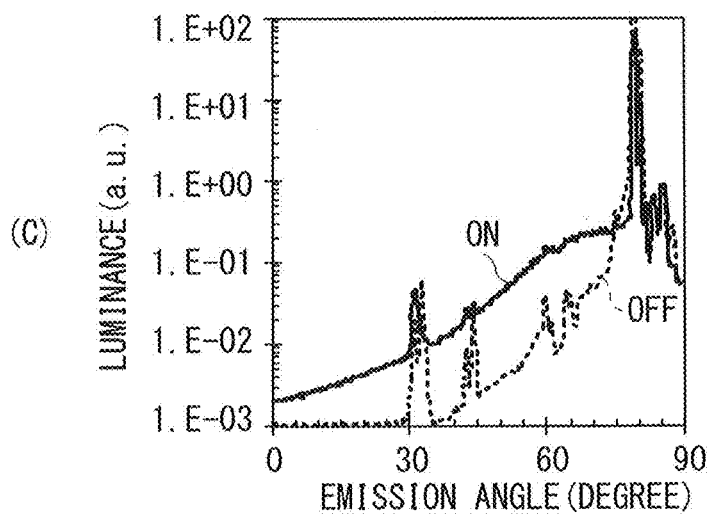

Further, (B) of FIG. 31 illustrates an optical intensity distribution obtained when a detector 320 is caused to perform scanning in a plane (corresponding to the ZX plane in FIG. 27 and FIG. 28) perpendicular to the rubbing direction, with an axis parallel to the optical axis AX1 (not illustrated) of the bulk 34A in the light modulation layer 34 as a central axis at this time. The optical intensity distribution at this time corresponds to a distribution in (1) direction in (A) of FIG. 31. In addition, (C) of FIG. 31 illustrates a luminance distribution obtained when the detector 320 is caused to perform scanning in a plane (corresponding to the ZY plane in FIG. 27 and FIG. 28) that is parallel to the rubbing direction and is parallel to the light incidence surface of the light modulation layer 34, with an axis orthogonal to the optical axis AX1 (not illustrated) of the bulk 34A in the light modulation layer 34 as a central axis. The optical intensity distribution at this time corresponds to a distribution in (2) direction in (A) of FIG. 31.

As illustrated in (A) to (C) of FIG. 31, scattering characteristics in the plane (corresponding to the ZX plane in FIG. 27 and FIG. 28) perpendicular to the rubbing direction were higher than that in the plane (in the ZY plane in FIG. 27 and FIG. 28) parallel to the rubbing direction, and the intensity was different by about 50 times in the front direction (the emission angle of 0 degree) (during voltage application). In other words, for example, as illustrated in (A) to (C) of FIG. 31, it was found that the light modulation layer 34 has the anisotropic scattering property in which the scattering in the thickness direction (the Z-axis direction) of the light modulation layer 34 is larger than the scattering in the rubbing direction (the direction parallel to the light incidence surface 10A (the Y-axis direction)). For this reason, it was found that aligning the liquid crystal molecule in the microparticle 34B in the thickness direction of the light modulation layer 34 in a state where the long axis direction of the streaky structure of the bulk 34A faces in the rubbing direction (the direction parallel to the light incidence surface 10A (the Y-axis direction in FIG. 27 and FIG. 28)) allows the light modulation layer 34 to exhibit the above-described anisotropic scattering with respect to the light emitted from the light source 20.

Figure 32:
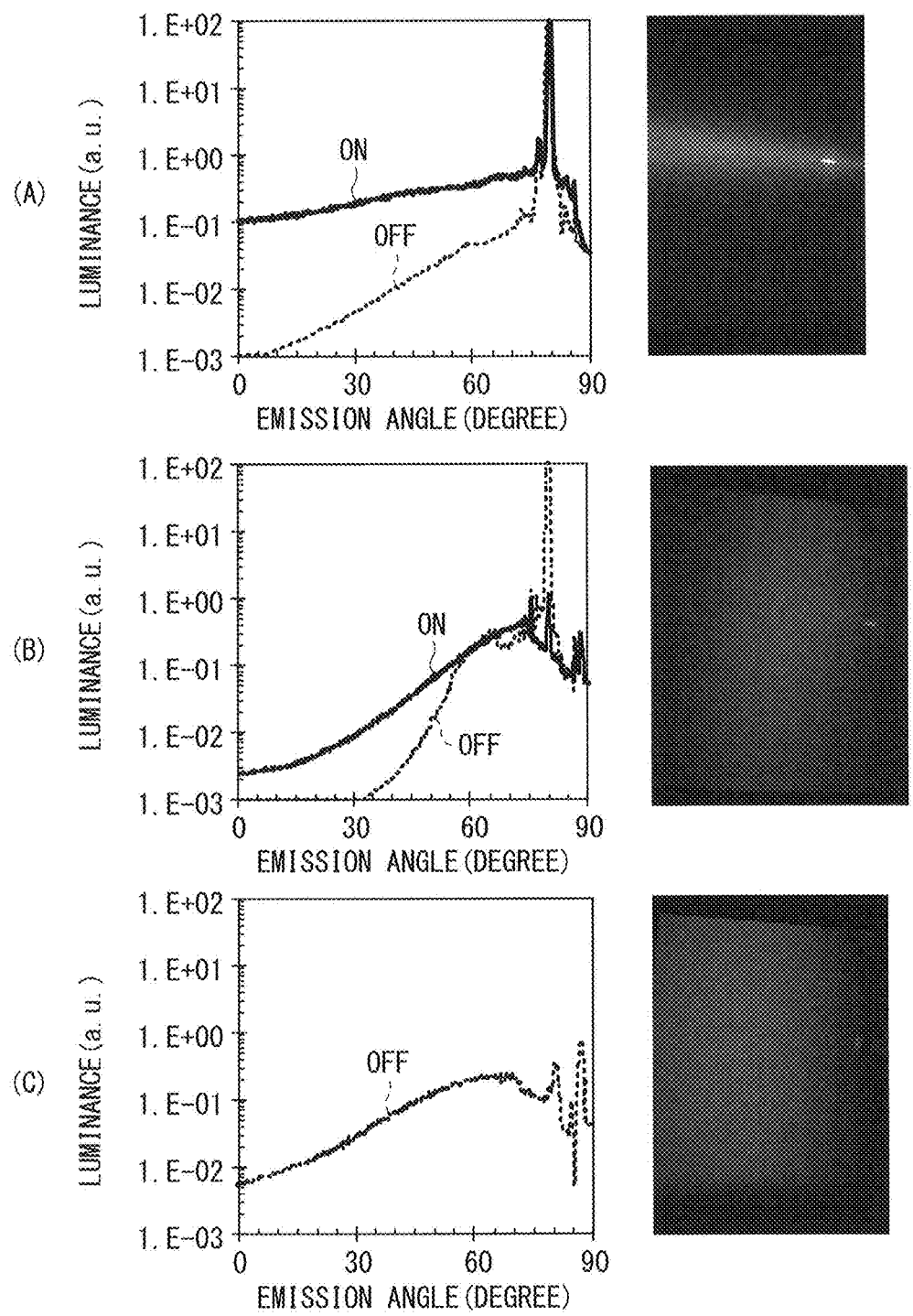
FIGS. 32A through 32C is a diagram illustrating another example of the results measured by the apparatus in FIG. 30.

(A) of FIG. 32 illustrates the scattering characteristics of the light modulation layer 34. (B) of FIG. 32 illustrates the scattering characteristics of a light modulation layer in which a direction of a liquid crystal inclined by a voltage is not fixed (pretilt of 90 degrees). (C) of FIG. 32 illustrates the scattering characteristics of a normal light modulation layer that is formed using isotropic polymer and does not exhibit optical anisotropy in plane. It was found from (A) to (C) of FIG. 32 that incident light in the light modulation layer 34 is largely scattered in the front direction as compared with the other light modulation layers, and only the light modulation layer 34 exhibits anisotropic scattering.

Figure 33:
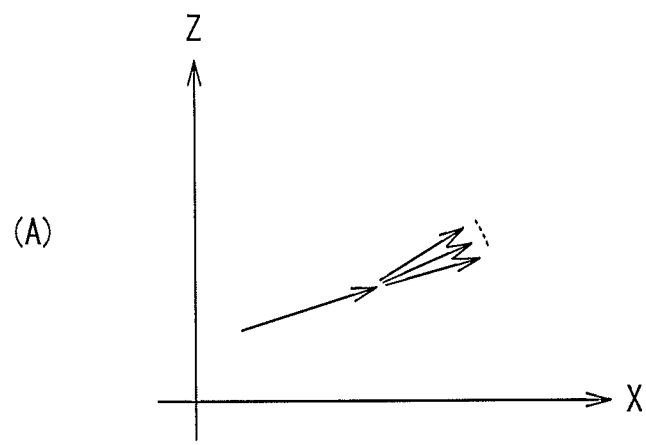
FIGS. 33A through 33C is a conceptual diagram for explaining isotropic scattering.
Figure 33:
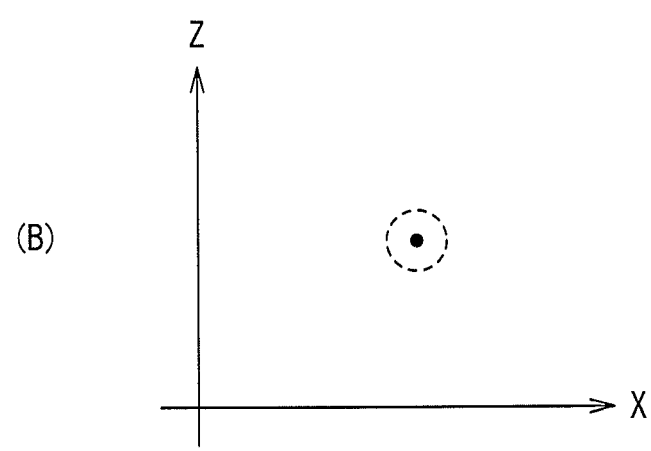
Figure 33:
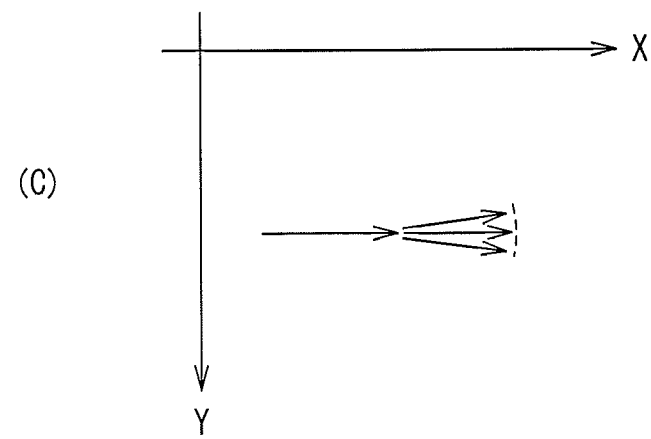
Figure 34:
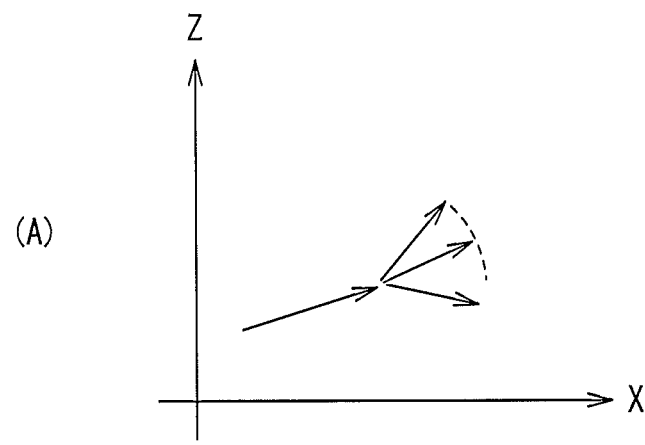
FIGS. 34A through 34C is a conceptual diagram for explaining anisotropic scattering.
Figure 34:
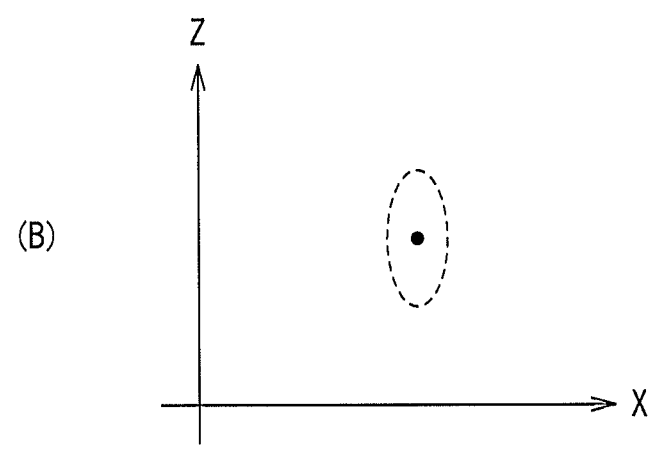
Figure 34:
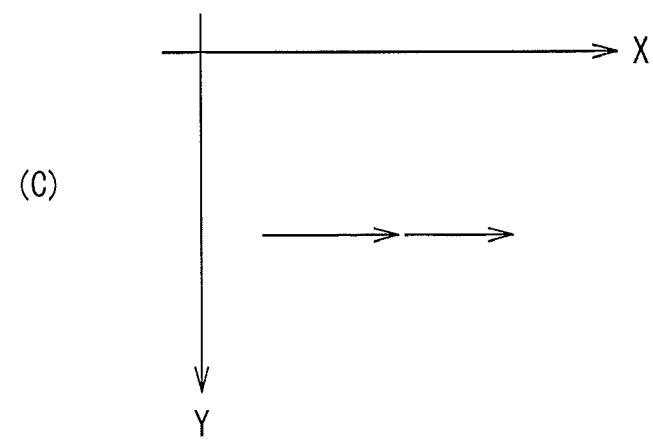

Next, a reason why the light modulation layer 34 exhibiting anisotropic scattering is superior in extraction of light from the light guide plate is described. When the light modulation layer, the light guide plate, and the light source are provided, the light guide plate having a printed white pattern or the above-described normal light modulation layer exhibits isotropic scattering characteristics as illustrated in (A) to (C) of FIG. 33, for example. Therefore, a large amount of light is scattered in the direction parallel to the plane of the light guide plate, and probability of changing angle until the light guide condition is disrupted is decreased. On the other hand, when anisotropic scattering like in the light modulation layer 34 is exhibited, for example, as illustrated in (A) to (C) of FIG. 34, the incident light is easily scattered in the direction perpendicular to the in-plane direction of the light guide plate, and thus the incident light is scattered preferentially in the direction disrupting the light guide condition. For this reason, it is conceivable that exhibiting anisotropic scattering improves light extraction efficiency from the light guide plate.

In terms of improving scattering property of the guided light, the average size of the streaky tissue of the bulk 34A in the short axis direction may be preferably 0.1 or more and 10 µm or less, and more preferably 0.2 µm or more and 2.0 µm or less.

(Modification)

Figure 35:
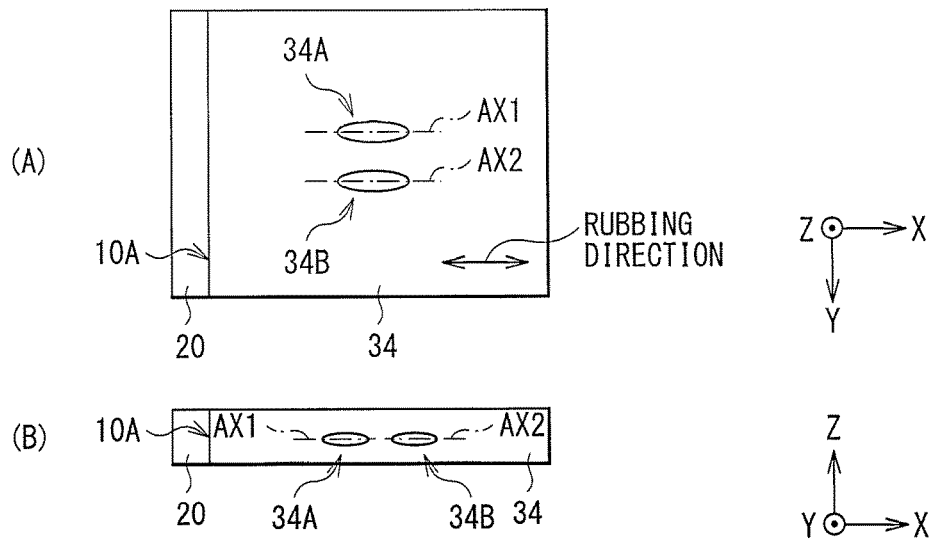
FIGS. 35A and 35B is a schematic diagram for explaining an example of a function in a modification of the light modulation layer in FIG. 4.
Figure 36:
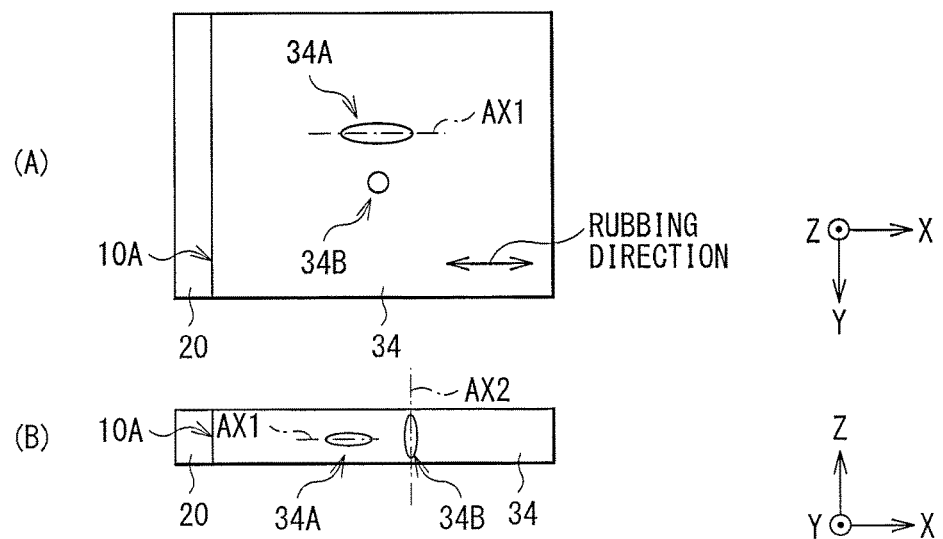
FIGS. 36A and 36B is a schematic diagram for explaining another example of the function in the modification of the light modulation layer in FIG. 4.

In the above-described embodiment, the light modulation layer 34 is configured so that the optical axes AX1 and AX2 face in the direction parallel to or substantially parallel to the light incidence surface 10A and the transparent substrate 31 during no-voltage application, and the optical axis AX2 displaces in the direction orthogonal to or substantially orthogonal to (or intersecting) the transparent substrate 31 during voltage application. However, the light modulation layer 34 may be configured so that the optical axes AX1 and AX2 face in a direction that is orthogonal to or substantially orthogonal to (or intersects) the light incidence surface 10A and is parallel to or substantially parallel to the transparent substrate 31 during no-voltage application, and the optical axis AX2 displaces in a direction orthogonal to or substantially orthogonal to (or intersecting) the transparent substrate 31 during voltage application. For example, the light modulation layer 34 may be configured so that the optical axes AX1 and AX2 face in the direction that is orthogonal to or substantially orthogonal to the light incidence surface 10A and is parallel to or substantially parallel to the transparent substrate 31 during no-voltage application as illustrated in (A) and (B) of FIG. 35, and the optical axis AX2 displaces in the direction orthogonal to or substantially orthogonal to the transparent substrate 31 during voltage application as illustrated in (A) and (B) of FIG. 36.

Figure 37:
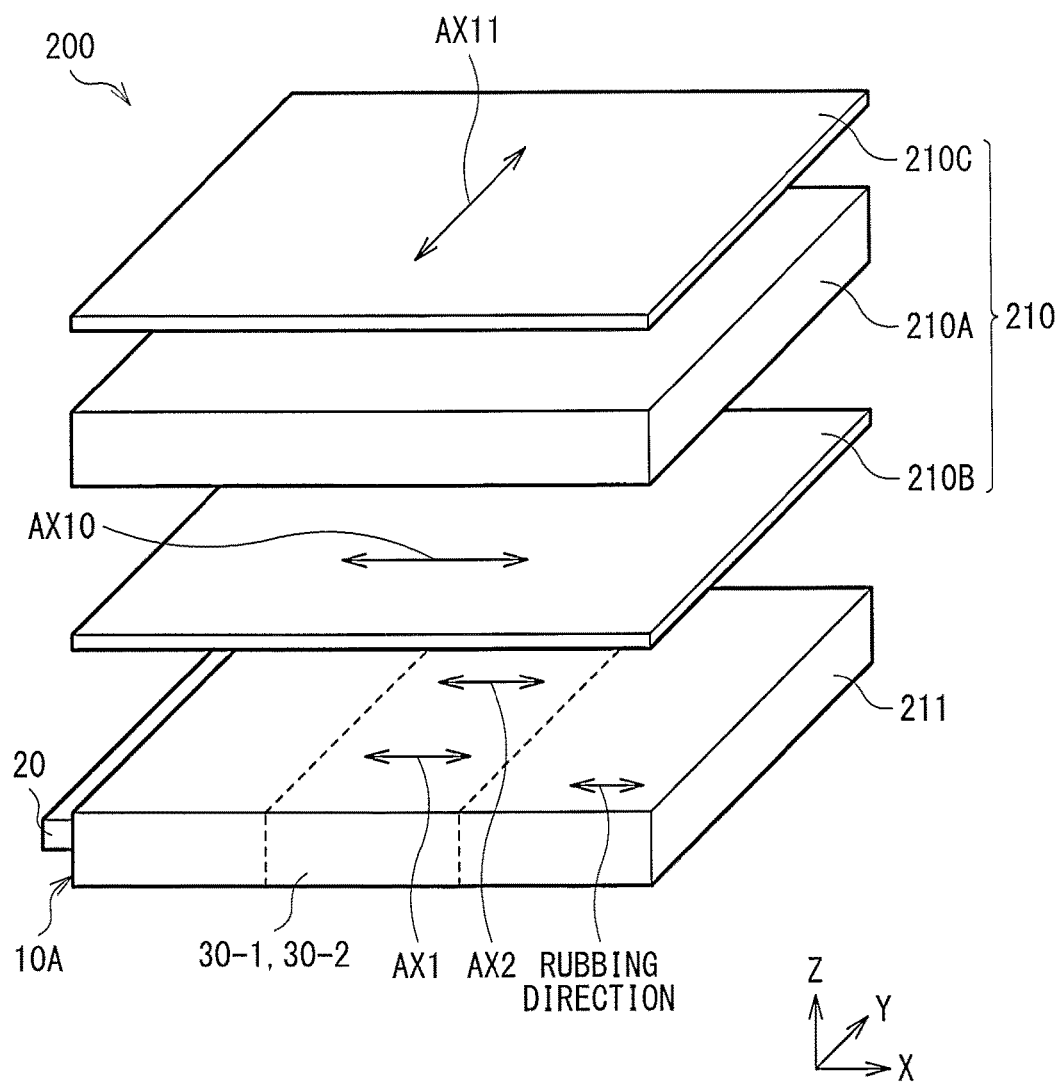
FIG. 37 is a diagram illustrating an example of relationship between the polarization plate and an optical axis of the light modulation layer in FIG. 35.

In this case, during no-voltage application, for example, both the optical axes AX1 and AX2 may face in the rubbing direction of the alignment films 33 and 35. In addition, during no-voltage application, both the optical axes AX1 and AX2 mainly have components of the respective optical axes in the same direction, and for example, may face in the same direction. During no-voltage application, as illustrated in FIG. 37, both the optical axes AX1 and AX2 face in a direction intersecting or orthogonal to (or substantially orthogonal to) the light incidence surface 10A. Further, during no-voltage application, as illustrated in FIG. 4 and FIG. 37, the optical axes AX1 and AX2 are parallel to or substantially parallel to the transparent substrate 31. In other words, during no-voltage application, the optical axes AX1 and AX2 roughly face in the X-axis direction in FIG. 37.

Furthermore, during no-voltage application, the optical axes AX1 and AX2 mainly have components of the respective optical axes in the direction parallel to the transmission axis AX10 of the polarization plate 210B on the backlight 211 side. During no-voltage application, as illustrated in FIG. 37, the optical axes AX1 and AX2 face in the direction parallel to the transmission axis AX10. For example, as illustrated in FIG. 37, the transmission axis AX10 may face in the rubbing direction of the alignment films 33 and 35.

Figure 38:
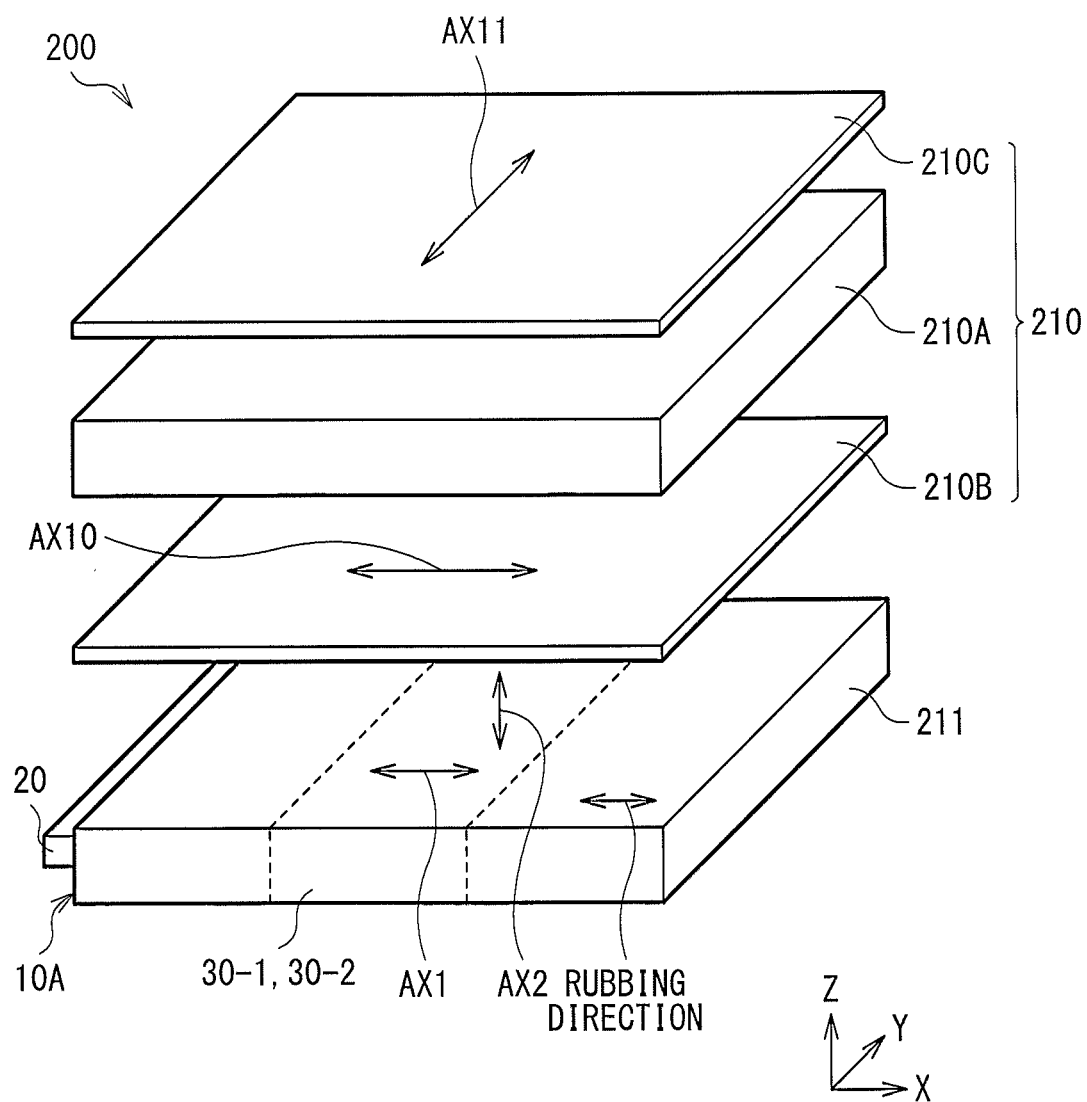
FIG. 38 is a diagram illustrating another example of relationship between the polarization plate and an optical axis of the light modulation layer in FIG. 36.

Moreover, as described above, during voltage application, the optical axis AX1 faces in the direction same or substantially same as the direction during no-voltage application. During voltage application, the optical axis AX1 mainly has a component of the optical axis in the direction parallel to the transmission axis AX10 of the polarization plate 210B, and for example, as illustrated in FIG. 38, may face in the direction parallel to the transmission axis AX10. During voltage application, for example, the optical axis AX1 may face in the direction intersecting or orthogonal to (or substantially orthogonal to) the light incidence surface 10A, and further, may be parallel to or substantially parallel to the transparent substrate 31.

On the other hand, during voltage application, the optical axis AX2 displaces in a predetermined direction due to influence of an electric field generated by a voltage applied between the lower electrode 32 and the upper electrode 36. For example, as illustrated in FIG. 4 and FIG. 38, during voltage application, the optical axis AX2 may be orthogonal to or substantially orthogonal to (or intersect) the transparent substrate 31. In other words, the optical axis AX2 displaces (namely, stands up), due to voltage application between the lower electrode 32 and the upper electrode 36, in a direction in which an angle formed by the optical axis AX2 and the normal of the transparent substrate 31 is decreased. At this time, the optical axis AX2 is orthogonal to or substantially orthogonal to (or intersects) the optical axis AX1, and is orthogonal to or substantially orthogonal to (or intersects) the transparent substrate 31.

As described above, in the present modification, as with the above-described embodiment, the polarization axis of the light emitted from the backlight 211 has a main component in the direction parallel to the transmission axis AX10 of the polarization plate 210B, and a part of the light modulation layer 34 is allowed to be the scattering region 30B. Therefore, both the display luminance and the display quality are allowed to be improved in three-dimensional display.

2. Second Embodiment

Figure 39:
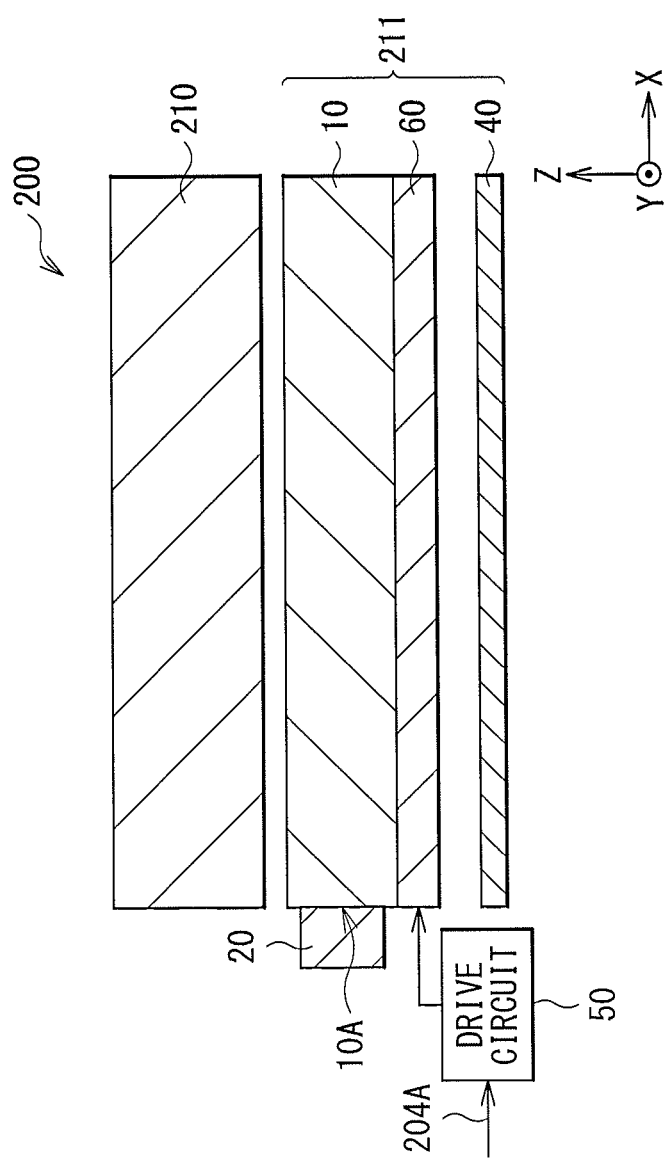
FIG. 39 is a sectional diagram illustrating an example of a structure of a display section in a receiver according to a second embodiment of the technology.

Next, a receiver 200 according to a second embodiment of the technology is described. As illustrated in FIG. 39, the configuration of the receiver 200 of the present embodiment is different from the receiver 200 of the above-described embodiment in that the receiver 200 of the present embodiment includes a light modulation device 60 instead of the light modulation device 30. Therefore, in the following, the description about common points to the configuration of the above-described embodiment will be appropriately omitted, and difference points from the configuration of the above-described embodiment will be mainly described.

Figure 40:
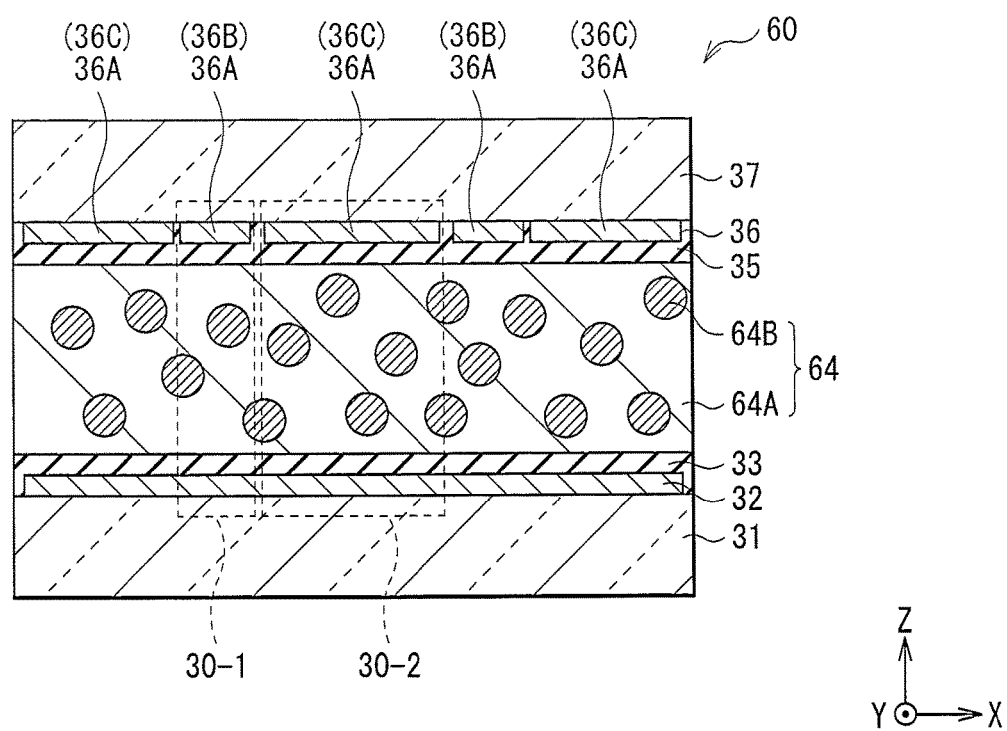
FIG. 40 is a sectional diagram illustrating an example of a structure of a light modulation device in FIG. 39.

In the light modulation device 60, a vertical alignment film is used as the alignment films 33 and 35, and a light modulation layer 64 is provided in place of the light modulation layer 34 as illustrated in FIG. 40.

When a vertical alignment film is used as the alignment films 33 and 35, a pretilt in which a bulk 64A and a microparticle 64B described later are obliquely aligned from the transparent substrate 31 is formed by the vertical alignment film. As the vertical alignment film, a silane coupling material, polyvinyl alcohol (PVA), a polyimide-based material, a surfactant, and the like may be used. For example, performing rubbing treatment after application and drying of the material may form the pretilt in the rubbing direction. In addition, when a plastic film is used as the transparent substrates 31 and 37, a silane coupling material capable of being used with an alcohol-based solvent as the alignment films 33 and 35 may be preferably used because firing temperature after the alignment films 33 and 35 are applied to the surfaces of the transparent substrates 31 and 37, respectively, is preferably as low as possible in manufacturing process. Note that the pretilt may be provided without rubbing treatment on the alignment films 33 and 35. A method of achieving that may include a method in which a cell is formed in the alignment films 33 and 35, and ultraviolet ray is applied to the cell while a magnetic field or an oblique electric field due to a slit electrode is applied to the cell.

Incidentally, when the vertical alignment film is used as the alignment films 33 and 35, as the liquid crystal molecule contained in the microparticle 64B, a liquid crystal molecule having negative dielectric constant anisotropy (so-called negative liquid crystal) may be preferably used.

Next, the light modulation layer 64 of the present embodiment is described. The light modulation layer 64 is a composite layer including the bulk 64A and the plurality of microparticles 64B dispersed in the bulk 64A. The bulk 64A and the microparticle 64B have optical anisotropy.

Figure 41:
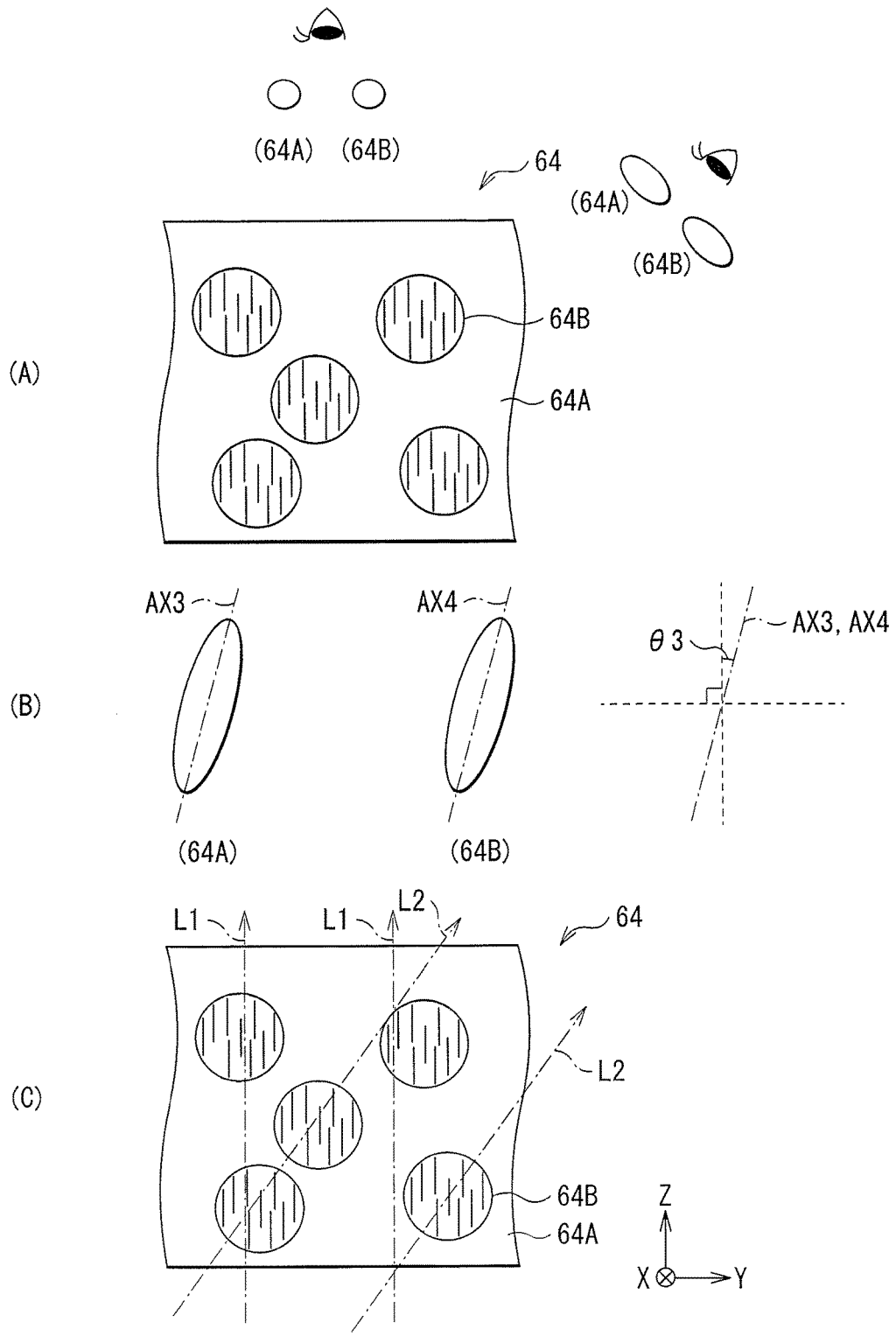
FIGS. 41A-41B and 41C are schematic diagrams for explaining an example of a function of a light modulation layer in FIG. 40.

(A) of FIG. 41 schematically illustrates an example of an alignment state in the microparticle 64B during no-voltage application. Note that an illustration of an alignment state in the bulk 64A is omitted in (A) of FIG. 41. (B) of FIG. 41 illustrates an example of an index ellipsoid representing refractive index anisotropy of each of the bulk 64A and the microparticle 64B during no-voltage application. (C) of FIG. 41 schematically illustrates an example of a state where the light L1 traveling toward the front direction and the light L2 traveling toward the oblique direction pass through the light modulation layer 64 during no-voltage application.

Figure 42:
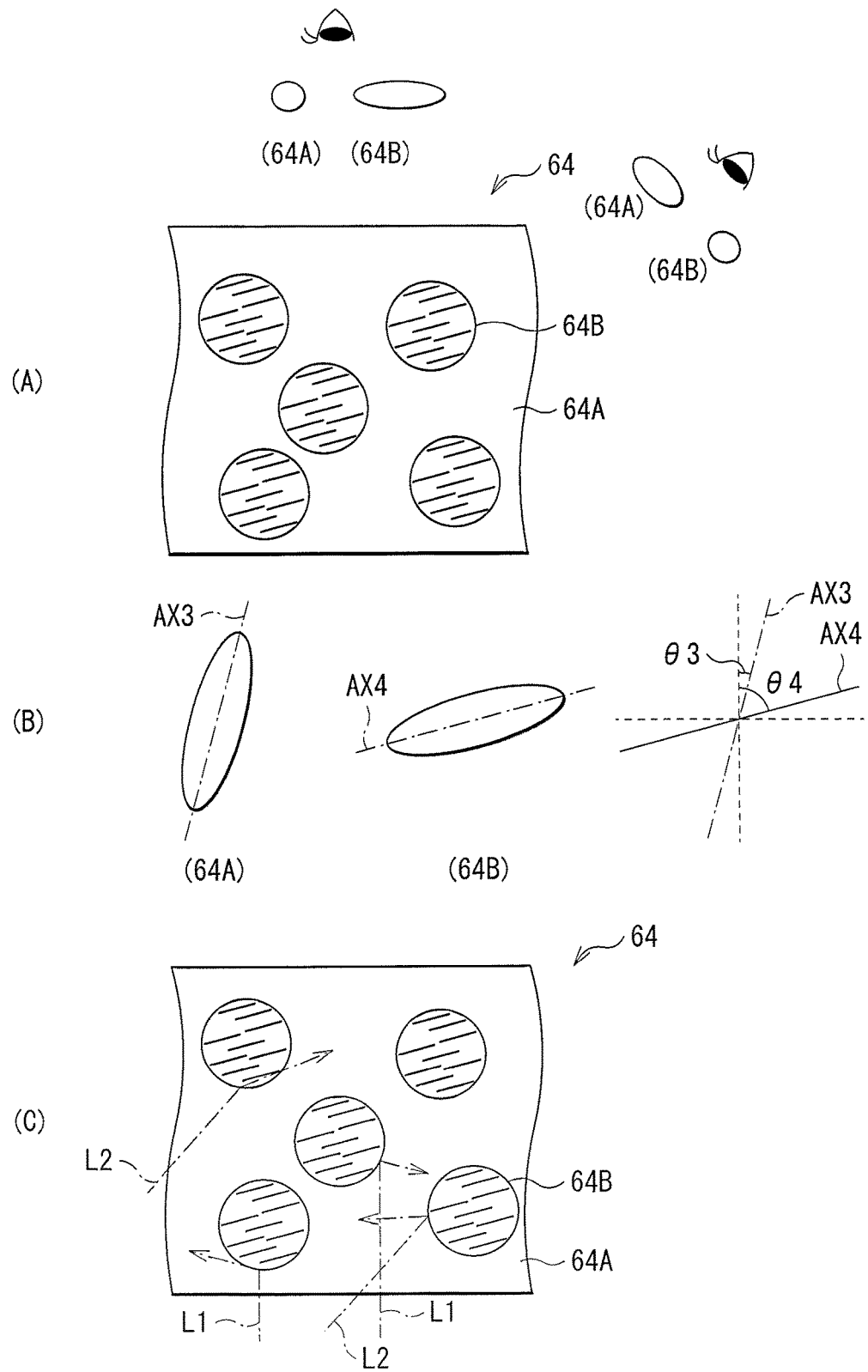
FIGS. 42A-42B and 42C are schematic diagrams for explaining another example of the function of the light modulation layer in FIG. 40.

(A) of FIG. 42 schematically illustrates an example of the alignment state in the microparticle 64B during voltage application. Note that illustration of the alignment state in the bulk 64A is omitted in (A) of FIG. 42. (B) of FIG. 42 illustrates an example of the index ellipsoid representing refractive index anisotropy of each of the bulk 64A and the microparticle 64B during voltage application. (C) of FIG. 42 schematically illustrates an example of a state where the light L1 traveling toward the front direction and the light L2 traveling toward the oblique direction are scattered in the light modulation layer 64 during voltage application.

For example, as illustrated in (A) and (B) of FIG. 41, the bulk 64A and the microparticle 64B have configuration in which a direction of an optical axis AX3 of the bulk 64A and a direction of an optical axis AX4 of the microparticle 64B coincide with (are parallel to) each other during no-voltage application. Incidentally, the optical axes AX3 and AX4 each indicate a line parallel to a traveling direction of a light beam having a fixed refractive index irrespective of polarization direction. In addition, it is unnecessary for the direction of the optical axis AX3 and the direction of the optical axis AX4 to constantly coincide with each other, and the direction of the optical axis AX3 may be deviated in some degree from the direction of the optical axis AX4 due to, for example, manufacturing error.

Moreover, for example, the microparticle 34B may have a configuration in which the optical axis AX4 is parallel to the light incident surface 10A of the light guide plate 10 during no-voltage application. Further, for example, the microparticle 64B may have a configuration in which the optical axis AX4 intersects the normal of the transparent substrates 31 and 37 at a slight angle θ3 during no-voltage application (see (B) of FIG. 41). Incidentally, the angle θ3 will be described in detail in description of a material forming the microparticle 64B.

On the other hand, for example, the bulk 64A may have a configuration in which the optical axis AX4 of the bulk 64A is fixed irrespective of voltage application between the lower electrode 32 and the upper electrode 36. Specifically, for example, as illustrated in (A) and (B) of FIG. 41 and (A) and (B) of FIG. 42, the bulk 64A may have a configuration in which the optical axis AX3 of the bulk 64A is parallel to the light incidence surface 10A of the light guide plate 10 as well as intersects the normal of the transparent substrates 31 and 37 at the slight angle θ3. In other words, during no-voltage application, the optical axis AX3 of the bulk 64A is parallel to the optical axis AX4 of the microparticle 64B.

Note that it is unnecessary for the optical axis AX4 to be constantly parallel to the light incidence surface 10A of the light guide plate 10 as well as to constantly intersect the normal of the transparent substrates 31 and 37 at the angle θ3, and the optical axis AX4 may intersect the normal of the transparent substrates 31 and 37 at an angle slightly different from the angle θ3 due to, for example, manufacturing error. In addition, it is unnecessary for the optical axes AX3 and AX4 to be constantly parallel to the light incidence surface 10A of the light guide plate 10, and the optical axes AX3 and AX4 may intersect the light incidence surface 10A of the light guide plate 10 at a small angle due to, for example, manufacturing error.

At this time, it may be preferable that an ordinary refractive index of the bulk 64A be equal to that of the microparticle 64B, and an extraordinary refractive index of the bulk 64A be equal to that of the microparticle 64B. In this case, for example, as illustrated in (A) of FIG. 41, during no-voltage application, refractive index difference is substantially eliminated in all directions including the front direction and the oblique direction, and high transparency is obtainable. Therefore, for example, as illustrated in (C) of FIG. 41, the light L1 traveling toward the front direction and the light L2 traveling toward the oblique direction are not scattered in the light modulation layer 64 and may pass through the light modulation layer 64. As a result, for example, as illustrated in (A) and (B) of FIG. 18, as with the above-described embodiment, the light L from the light source 20 (light from the oblique direction) is totally reflected by an interface (an interface between air and the transparent substrate 31 or the light guide plate 10) of the transmissive region 30A, and luminance of the transmissive region 30A (luminance of black display) is decreased as compared with the case where the light is uniformly emitted from the entire surface (alternate long and short dash line in (B) of FIG. 18).

Moreover, for example, during voltage application, as illustrated in (A) of FIG. 42, the bulk 64A and the microparticle 64B may have a configuration in which the direction of the optical axis AX3 is different from (intersects) that of the optical axis AX4. In addition, for example, during voltage application, the microparticle 64B may have a configuration in which the optical axis AX4 of the microparticle 64B is parallel to the light incident surface 10A of the light guide plate 10 as well as intersects the normal of the transparent substrates 31 and 37 at an angle θ4 larger than the angle θ3, or is parallel to the surfaces of the transparent substrates 31 and 37. Note that the angle θ4 will be described in detail in description of a material forming the microparticle 64B.

Therefore, the light propagating through the region where a voltage is applied between the lower electrode 32 and the upper electrode 36 contains a large amount of oblique component. For example, when an acryl light guide plate is used as the light guide plate 10, the light in the region where a voltage is applied between the lower electrode 32 and the upper electrode 36 may propagate through the region at an angle of 41.8 degrees or more. As a result, for the light propagating through the region where a voltage is applied between the lower electrode 32 and the upper electrode 36, a refractive index difference is increased and higher scattering property is obtainable. Accordingly, for example, as illustrated in (C) of FIG. 42, the light L1 traveling toward the front direction and the light L2 traveling toward the oblique direction may be scattered in the light modulation layer 64. As a result, as with the above-described embodiment, for example, as illustrated in (A) and (B) of FIG. 18, the light L from the light source 20 (the light from the oblique direction) passes through the interface of the scattering region 30B (the interface between the air and the transparent substrate 31 or the light guide plate 10), and the light that has passed to the reflector 40 side is reflected by the reflector 40 and then passes through the light modulation device 30. Therefore, the luminance of the scattering region 30B is extremely higher than that in the case where light is uniformly emitted from the entire surface (alternate long and short dash line in (B) of FIG. 18), and the luminance of partial white display (luminance enhancement) is increased by a decreased amount of the luminance of the transmissive region 30A.

Incidentally, the ordinary refractive index of the bulk 64A may be slightly different from that of the microparticle 64B due to, for example, manufacturing error, and the difference therebetween may be preferably 0.1 or less, and more preferably 0.05 or less. In addition, the extraordinary refractive index of the bulk 64A may also be slightly different from that of the microparticle 64B due to, for example, manufacturing error, and the difference therebetween may be preferably 0.1 or less, and more preferably 0.05 or less.

In addition, the refractive index difference ($\Delta n_P$=an extraordinary refractive index $ne_P$–an ordinary refractive index $no_P$) of the bulk 64A and the refractive index difference ($\Delta n_L$=an extraordinary refractive index $ne_L$–an ordinary refractive index $no_L$) of the microparticle 64B may be preferably as large as possible, preferably 0.05 or more, more preferably 0.1 or more, and still more preferably 0.15 or more. This is because when the refractive index difference of each of the bulk 64A and the microparticle 64B is large, the scattering power of the light modulation layer 64 is increased to easily disrupt light-guiding condition, and the light from the light guide plate 10 is easily extracted.

Moreover, a response speed to the electric field of the bulk 64A is different from that of the microparticle 64B. The bulk 64A may have, for example, a streaky structure or a porous structure that does not respond to the electric field, or may have a rod-like structure having a response speed lower than that of the microparticle 64B. For example, the bulk 64A may be formed of a polymer material obtained through polymerization of a low-molecular monomer. For example, the bulk 64A may be formed by polymerizing material (for example, monomer) that is aligned along the alignment direction of the microparticle 64B or the alignment direction of the alignment films 33 and 35 and has an alignment property and polymerizability, by heat or light or both.

On the other hand, for example, the microparticle 64B may contain a liquid crystal material mainly, and may have a response speed sufficiently higher than that of the bulk 64A. The liquid crystal material (liquid crystal molecule) contained in the microparticle 64B may be, for example, a rod-like molecule. As the liquid crystal molecule contained in the microparticle 64B, a liquid crystal molecule having negative dielectric constant anisotropy (so-called negative liquid crystal) is used.

In this example, during no-voltage application, in the microparticle 64B, the long axis direction of the liquid crystal molecule is parallel to the optical axis AX3. At this time, the long axis of the liquid crystal molecule in the microparticle 64B is parallel to the light incident surface 10A of the light guide plate 10 and intersects the normal of the transparent substrates 31 and 37 at the slight angle θ3. In other words, the liquid crystal molecule in the microparticle 64B is aligned in a state of being inclined at the angle θ3 in a plane parallel to the light incidence surface 10A of the light guide plate 10 during no-voltage application. The angle θ3 is a so-called pretilt angle, and for example may be preferably 0.1 degree or more and 30 degrees or less. The angle θ3 may be more preferably 0.5 degree or more and 10 degrees or less, and still more preferably 0.7 degree or more and 2 degrees or less. There is a tendency for scattering to decrease in efficiency due to reasons described below when the angle θ3 is small. In addition, the azimuth in which the liquid crystal falls during voltage application is varied when the angle θ3 is excessively large (for example, about 90 degrees). For example, a liquid crystal may fall in an azimuth changed by 180 degrees (reverse tilt). Therefore, the refractive index difference of the microparticle 64B and that of the bulk 64A are not efficiently used, and thus there is a tendency of decrease in scattering efficiency and in luminance.

Moreover, during voltage application, in the microparticle 64B, the long axis direction of the liquid crystal molecule intersects (or is orthogonal to) the optical axis AX3. At this time, the long axis of the liquid crystal molecule in the microparticle 64B is parallel to the light incident surface 10A of the light guide plate 10 and intersects the normal of the transparent substrates 31 and 37 at the angle θ4 larger than the angle θ3. In other words, the liquid crystal molecule in the microparticle 64B is aligned in a state of being inclined by the angle θ4 in a plane parallel to the light incidence surface 10A of the light guide plate 10 or in a state of lying at the angle θ4)(=90°, during voltage application.

As the above-described monomer having the alignment property and the polymerizability, although a material that has optical anisotropy and is capable of being combined with a liquid crystal is sufficient, in the present embodiment, a low-molecular monomer to be cured by ultraviolet ray may be preferable. Since it may be preferable that the direction of optical anisotropy of the liquid crystal coincide with the direction of the optical anisotropy of the material (polymer material) formed through polymerization of the low-molecular monomer in the state of no-voltage application, the liquid crystal and the low-molecular monomer may be preferably aligned in the same direction before ultraviolet curing. In the case where a liquid crystal is used as the microparticle 64B, when the liquid crystal is a rod-like molecule, it may be preferable that the shape of the monomer material to be used also have a rod-like shape. As described above, it may be preferable to use a material having both of polymerizability and liquid crystallinity as a monomer material, and the monomer material preferably contains, as a polymerizable functional group, one or more functional groups selected from the group of an acrylate group, a methacrylate group, an acryloyloxy group, a methacryloyloxy group, a vinyl ether group, and an epoxy group. These functional groups may be polymerized by irradiation of an ultraviolet ray, an infrared ray, or an electron beam, or heating. To suppress deterioration in alignment degree at the time of ultraviolet irradiation, a polyfunctionalized liquid crystal material may be added. When the bulk 64A has the above-described streaky structure, bifunctional liquid-crystalline monomer may be preferably used as a raw material of the bulk 64A. Moreover, monofunctional monomer may be added in order to adjust temperature exhibiting liquid crystallinity or tri- or more-functional monomer may be added in order to improve crosslink density, to the raw material of the bulk 64A.

Figure 43:
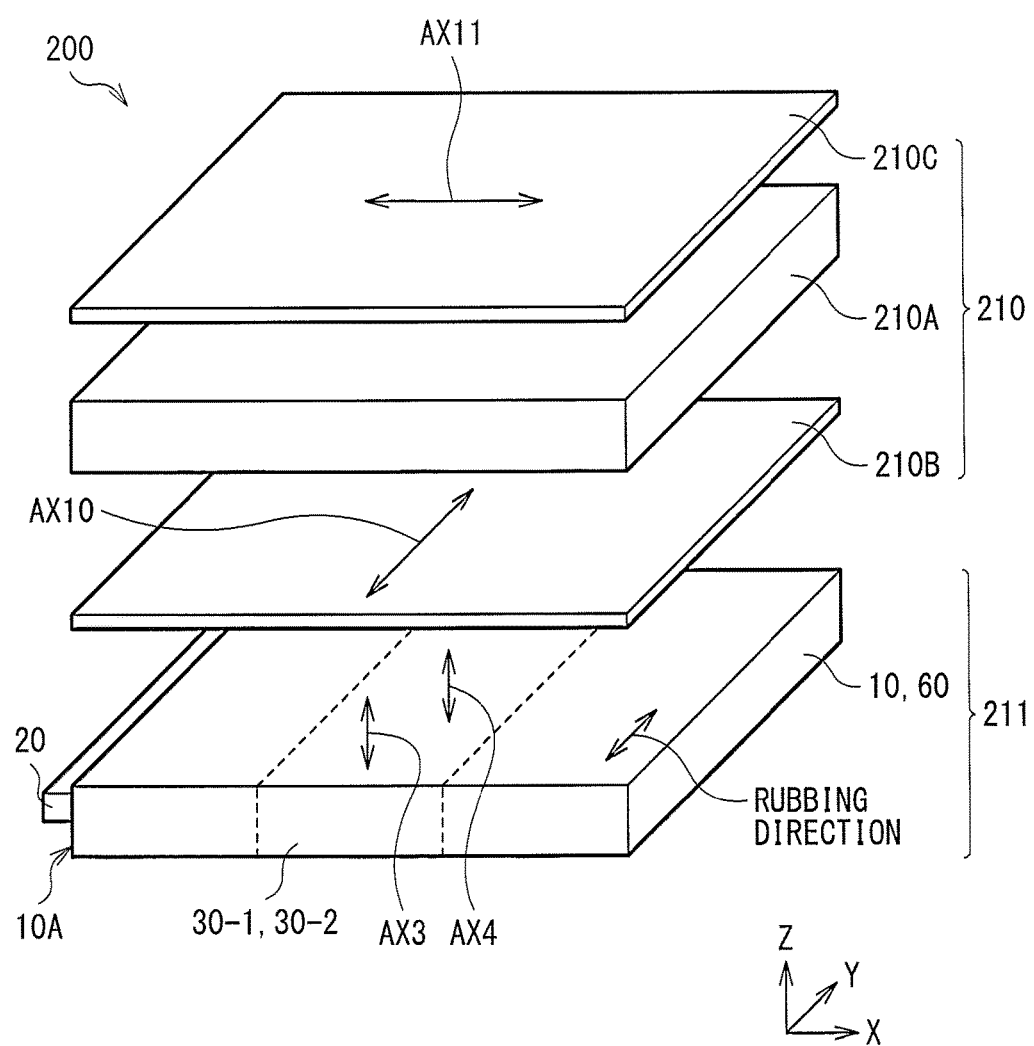
FIG. 43 is a diagram illustrating an example of relationship between a polarization plate and an optical axis of the light modulation layer in FIG. 41.

Incidentally, as described above, during no-voltage application, the optical axis AX3 of the bulk 64A and the optical axis AX4 of the microparticle 64B both have a component of the respective optical axes mainly in the same direction. During no-voltage application, for example, as illustrated in FIG. 40 and FIG. 43, both the optical axes AX3 and AX4 face in the same direction, and face in the direction orthogonal to or substantially orthogonal to the transparent substrate 31. In addition, as illustrated in FIG. 43, during no-voltage application, both the optical axes AX3 and AX4 face in a direction that is parallel to or substantially parallel to the light incidence surface 10A and is orthogonal to or substantially orthogonal to the transparent substrate 31. In other words, during no-voltage application, the optical axes AX3 and AX4 roughly face in the Z-axis direction in FIG. 43.

Figure 44:
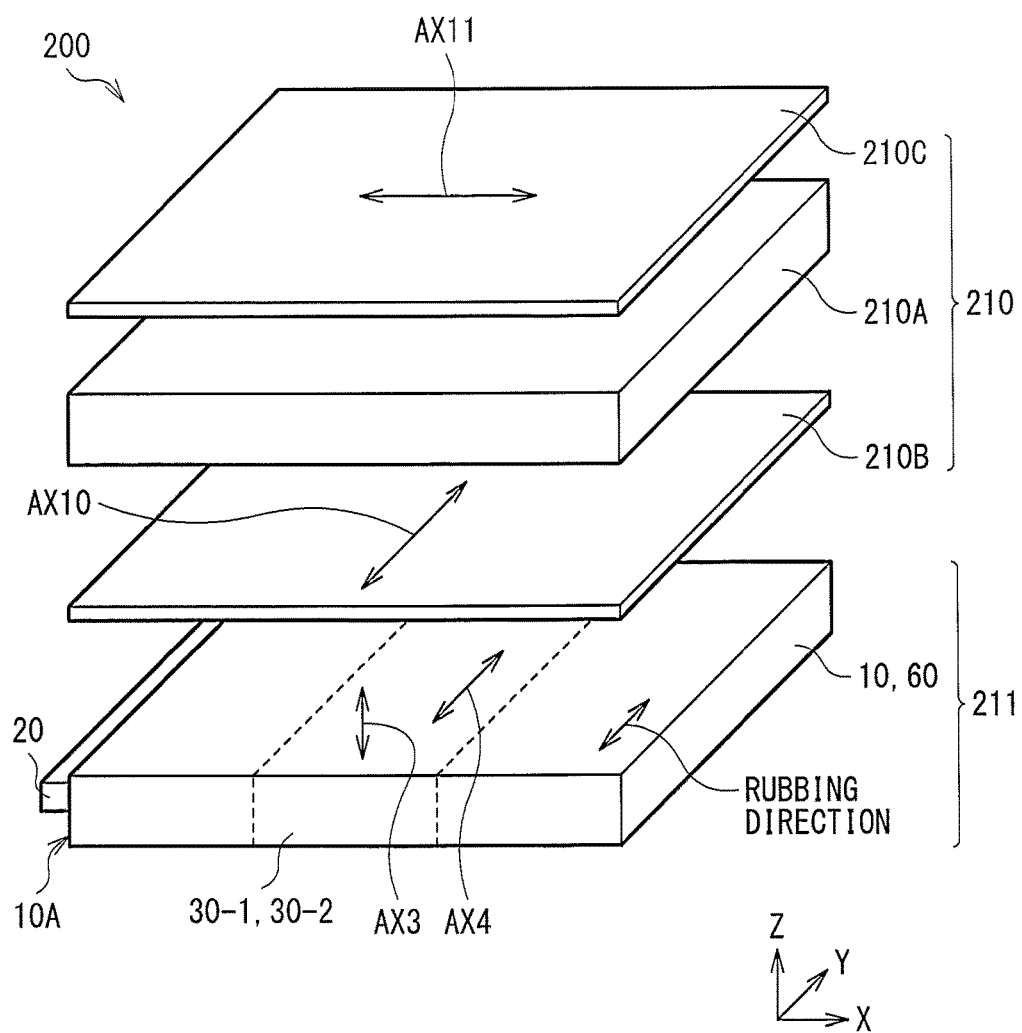
FIG. 44 is a diagram illustrating another example of relationship between the polarization plate and an optical axis of the light modulation layer in FIG. 42.

Further, as described above, during voltage application, the optical axis AX3 faces in the direction same or substantially same as that during the no-voltage application. During voltage application, the optical axis AX3 mainly contains the component of the optical axis in the direction parallel to the transmission axis AX10 of the polarization plate 210B, and for example, as illustrated in FIG. 44, the optical axis AX3 may face in the direction parallel to the transmission axis AX10. For example, during voltage application, the optical axis AX3 may face in the direction that is parallel to or substantially parallel to the light incidence surface 10A and is orthogonal to or substantially orthogonal to the transparent substrate 31.

On the other hand, during voltage application, the optical axis AX4 displaces in a predetermined direction due to influence of the electric field generated by the voltage applied between the lower electrode 32 and the upper electrode 36. For example, as illustrated in FIG. 40 and FIG. 44, during voltage application, the optical axis AX4 may face in the direction that is parallel to or substantially parallel to the light incidence surface 10A and is parallel to or substantially parallel to the transparent substrate 31. In other words, the optical axis AX4 displaces (namely, lies) in the direction in which an angle formed by the optical axis AX4 and the normal of the transparent substrate 31 is increased by voltage application between the lower electrode 32 and the upper electrode 36. At this time, the optical axis AX4 is orthogonal to or substantially orthogonal to the optical axis AX3, and is orthogonal to or substantially orthogonal to the transparent substrate 31.

For example, the drive circuit 50 may control the magnitude of the voltage applied to the pair of electrodes (the lower electrode 32 and the upper electrode 36) in each of the light modulation cells 30-1 and 30-2 so that the optical axis AX4 of the microparticle 34B is parallel or substantially parallel to the optical axis AX3 of the bulk 34A in the light modulation cell 30-2 and the optical axis AX4 of the microparticle 64B intersects or is orthogonal to the optical axis AX3 of the bulk 64A in the light modulation cell 30-1. Moreover, for example, the drive circuit 50 may control the magnitude of the voltage applied to the pair of electrodes (the lower electrode 32 and the upper electrode 36) in each of the light modulation cells 30-1 and 30-2 so that the optical axis AX4 of the microparticle 64B intersects or is orthogonal to the optical axis AX3 of the bulk 64A in each of the light modulation cells 30-1 and 30-2. In other words, the drive circuit 50 allows the directions of the optical axes AX3 and AX4 of the bulk 64A and the microparticle 64B to coincide (or substantially coincide) with each other or to be different from each other (or be orthogonal to each other) through electric field control.

The drive circuit 50 allows the backlight 211 to output a plurality of linear illumination light beams when receiving a signal specifying three-dimensional display as the control signal 204A. More specifically, the drive circuit 50 applies a voltage allowing the light modulation layer 64 to exhibit scattering property, to the light modulation cell 30-1 including the partial electrode 36B, and applies a voltage allowing the light modulation layer 64 to exhibit transparency, to the light modulation cell 30-2 including the partial electrode 36C. In other words, the drive circuit 50 controls the magnitude of the voltage applied to the pair of electrodes (the lower electrode 32 and the partial electrode 36A) in each of the light modulation cells 30-1 and 30-2 so that the optical axis AX4 of the microparticle 64B intersects the optical axis AX3 of the bulk 64A in all of the light modulation cells 30-1 included in the backlight 211 and the optical axis AX4 of the microparticle 64B is parallel to the optical axis AX3 of the bulk 64A in all of the light modulation cells 30-2 included in the backlight 211.

Moreover, the drive circuit 50 allows the backlight 211 to output a planar illumination light beam when receiving a signal specifying two-dimensional display as the control signal 204A. More specifically, the drive circuit 50 applies a voltage allowing the light modulation layer 64 to exhibit scattering property, to each of the light modulation cells 30-1 and 30-2. In other words, the drive circuit 50 controls the magnitude of the voltage applied to the pair of electrodes (the lower electrode 32 and the partial electrode 36A) in each of the light modulation cells 30-1 and 30-2 so that the optical axis AX4 of the microparticle 64B intersects or is orthogonal to (or substantially orthogonal to) the optical axis AX3 of the bulk 64A in all of the light modulation cells 30-1 and 30-2 included in the backlight 211.

Note that the drive circuit 50 may allow the backlight 211 to output a planar illumination light beam (for example, a planar illumination light beam in which the plane is partially dark) having a luminance distribution corresponding to picture data when receiving a signal specifying two-dimensional display as the control signal 204A and a signal relating to the picture data. In this case, however, the upper electrode 36 may be preferably arranged in a layout corresponding to the pixels of the display panel 210. When the upper electrode 36 is arranged in the layout corresponding to the pixels of the display panel 210, the drive circuit 50 applies, according to the picture data, a voltage allowing the light modulation layer 64 to exhibit scattering property, to some of the light modulation cells 30-1 and 30-2, and a voltage allowing the light modulation layer 64 to exhibit transparency, to the other of the light modulation cells 30-1 and 30-2.

Next, functions and effects of the backlight 211 of the present embodiment will be described.

In the backlight 211 of the present embodiment, in three-dimensional display, the voltage is applied to the pair of electrodes (the lower electrode 32 and the upper electrode 36) in each of the light modulation cells 30-1 and 30-2 so that the optical axis AX4 of the microparticle 64B intersects or is orthogonal to (or substantially orthogonal to) the optical axis AX3 of the bulk 64A in each of the light modulation cells 30-1 and the optical axis AX4 of the microparticle 64B is parallel to or substantially parallel to the optical axis AX3 of the bulk 64A in each of the light modulation cells 30-2. As a result, the light that has been emitted from the light source 20 and has entered the light guide plate 10 passes through the transmissive region 30A where the optical axis AX3 is parallel to or substantially parallel to the optical axis AX4 (FIG. 18). In addition, the light that has been emitted form the light source 20 and has entered the light guide plate 10 is scattered in the scattering region 30B where the optical axis AX3 intersects or is orthogonal to the optical axis AX4 (FIG. 18). Light that has passed through the bottom surface of the scattering region 30B of the scattered light is reflected by the reflector 40 to return to the light guide plate 10 again, and then is emitted from the top surface of the backlight 211. In addition, light traveling toward the top surface of the scattering region 30B of the scattered light passes through the light guide plate 10, and then is emitted from the top surface of the backlight 211. As described above, in three-dimensional display, light is scarcely emitted from the top surface of the transmissive region 30A and light is emitted from the top surface of the scattering region 30B. In this way, for example, as illustrated in FIG. 25, the plurality of linear illumination light beams may be emitted in the front direction.

As a result, each of the linear illumination light beams emitted in the front direction enters the back surface of the display panel 210. Therefore, for example, when two-dimensional picture data for three-dimensional display is generated by the picture signal processing circuit 207 so that each pixel row becomes three-dimensional pixel 210A in the pixel arrangement corresponding to each of the linear illumination light beams, each of the linear illumination light beams enters, at the substantially same angle, the pixel located in a position common to the respective three-dimensional pixels 210A (for example, the pixel 210-1, 210-2, 210-3, or 210-4 in FIG. 25). As a result, from the pixel located in a position common to the respective three-dimensional pixels 210A, picture light modulated by the pixel is emitted at the predetermined angle. At this time, a viewer views pictures with different parallaxes using his right and left eyes. Thus, the viewer perceives the display of a three-dimensional picture (a stereoscopic picture) on the display panel 210.

Moreover, in the backlight 211 of the present embodiment, in two-dimensional display, for example, a voltage may be applied to the pair of electrodes (the lower electrode 32 and the partial electrode 36A) in each of the light modulation cells 30-1 and 30-2 so that the optical axis AX4 of the microparticle 64B intersects or is orthogonal to the optical axis AX3 of the bulk 64A in each of the light modulation cells 30-1 and 30-2. Accordingly, the light that has been emitted from the light source 20 and has entered the light guide plate 10 is scattered in the scattering region 30B that is formed in the entire device (FIG. 26). Light that has passed through the bottom surface of the scattering region 30B of the scattered light is reflected by the reflector 40, and then is returned to the light guide plate 10 again, and then is emitted from the top surface of the backlight 211. In addition, light traveling toward the top surface of the scattering region 30B of the scattered light passes through the light guide plate 10, and is then emitted from the top surface of the backlight 211. In this way, in two-dimensional display, for example, the light may be emitted from the entire top surface of the light modulation device 60, and a planar illumination light beam may be emitted in the front direction.

As a result, the planar illumination light beam emitted in the front direction enters the back surface of the display panel 210. Accordingly, for example, when two-dimensional picture data for two-dimensional display corresponding to each pixel 210B is generated by the picture signal processing circuit 207, the planar illumination light enters each of the pixels 210B from all angles, and picture light modulated by each of the pixels 210B is emitted from the each of the pixels 210B. At this time, the viewer views the same picture with both eyes, and thus the viewer perceives display of a two-dimensional picture (a planar picture) on the display panel 210.

Incidentally, also in the present embodiment, when the light modulation layer 64 exhibits the scattering property, the bulk 64B having low electric-field responsiveness has a component of the optical axis AX3 mainly in the direction parallel to the transmission axis AX10 of the polarization plate 210B, and the microparticle 64A having high electric-field responsiveness has the optical axis AX4 in the direction intersecting or orthogonal to the optical axis AX3 of the bulk 64B. Accordingly, the polarization axis of the light emitted from the backlight 211 has a main component in the direction parallel to the transmission axis AX10 of the polarization plate 21B. Therefore, as compared with the case where no-polarized light with the same luminance is emitted from the backlight 211, the light from the backlight 211 is allowed to enter the liquid crystal panel 210A more efficiently. Consequently, even when three-dimensional display is performed with use of the smaller number of pixels than that in two-dimensional display, three-dimensional display with high display luminance is allowed to be performed. Moreover, two-dimensional display with high display luminance is also allowed to be performed.

In addition, in three-dimensional display, it is unnecessary to provide a parallax barrier. Moreover, if a parallax barrier is provided on a light emission side of the backlight 211, the light modulation layer 64 outputs only linear light beams at this time. Therefore, each of the linear illumination light beams output from the light modulation layer 64 is absorbed by the parallax barrier at extremely low rate. Further, in the present embodiment, in three-dimensional display, it is unnecessary to provide a cylindrical lens. Therefore, there is no possibility that aberration caused by the cylindrical lens occurs.

As described above, in the present embodiment, the polarization axis of the light emitted from the backlight 211 has a main component in the direction parallel to the transmission axis AX10 of the polarization plate 210B, and a part of the light modulation layer 64 is allowed to be the scattering region 30B. Consequently, it is possible to improve both the display luminance and the display quality in three-dimensional display.

Incidentally, in the present embodiment, since the bulk 64A and the microparticle 64B are formed to mainly contain the respective optical anisotropy materials, the scattering property is decreased and transparency is improved in the oblique direction. For example, when the bulk 64A and the microparticle 64B are configured to mainly contain the respective optical anisotropy materials whose ordinary refractive indices are equal to each other and whose extraordinary refractive indices are also equal to each other, and in a region where a voltage is not applied between the lower electrode 32 and the upper electrode 36, the directions of the optical axes thereof are coincident or substantially coincident with each other. Accordingly, refractive index difference is decreased or eliminated in all directions including the front direction (the normal direction of the light modulation device 60) and the oblique direction, and high transparency is obtainable. As a result, leakage of light in a region of large viewing angle is decreased or substantially eliminated, and the viewing angle characteristics are allowed to be improved.

For example, when a liquid crystal that has an ordinary refractive index of 1.5 and an extraordinary refractive index of 1.65 and a liquid crystalline monomer that has an ordinary refractive index of 1.5 and an extraordinary refractive index of 1.65 are mixed and the liquid crystalline monomer is polymerized in a state where the liquid crystal and the liquid crystalline monomer are aligned by the alignment film or an electric field, the optical axis of the liquid crystal coincides with the optical axis of a polymer formed through polymerization of the liquid crystalline monomer. As a result, since the refractive indices are coincident with each other in all directions, in such a case, a state with higher transparency is achievable and the viewing angle characteristics are further improved.

In addition, in the present embodiment, for example, as illustrated in (A) and (B) of FIG. 18, the luminance of the transmissive region 30A (the luminance of black display) is lower than that in the case where light is uniformly emitted from the entire surface (alternate long and short dash line in (B) of FIG. 18). On the other hand, the luminance of the scattering region 30B is extremely higher than that in the case where light is uniformly emitted from the entire surface (alternate long and short dash line in (B) of FIG. 18), and the luminance of partial white display (luminance enhancement) is increased by a decreased amount of the luminance of the transmissive region 30A. This is because the bulk 64A and the microparticle 64B are formed to mainly contain the respective optical anisotropic materials, scattering property in the oblique direction is suppressed, and the amount of the leaked light from the light guide plate in a dark state is small. Therefore, the light is guided from a partial dark region to a partial bright region so that luminance enhancement is achievable without increasing power supplied to the backlight.

In addition, in the present embodiment, in a region where a voltage is not applied between the lower electrode 32 and the upper electrode 36, the optical axis AX4 of the microparticle 64B is parallel to the light incidence surface 10A of the light guide plate 10, and intersects the normal of the transparent substrates 31 and 37 at the slight angle θ3. Specifically, the liquid crystal molecule contained in the microparticle 64B is aligned in a state of being inclined at the angle θ3 (in a state of being applied with a pretilt angle) in the plane parallel to the light incidence surface 10A. Therefore, during voltage application, the liquid crystal material contained in the microparticle 64B does not fall in random directions but falls in the plane parallel to the light incidence surface 10A. At this time, the optical axis AX3 of the bulk 64A intersects or is orthogonal to the optical axis AX4 of the microparticle 64B in the plane parallel to the light incidence surface 10A. In this case, of the light entering the light guide plate 10 from the light incidence surface 10A, light oscillating perpendicular to the transparent substrate 31 is affected by a difference between the ordinary refractive index of the microparticle 64B and the extraordinary refractive index of the bulk 64A. At this time, since the difference between the ordinary refractive index of the microparticle 64B and the extraordinary refractive index of the bulk 64A is large, the scattering efficiency of the light oscillating perpendicular to the transparent substrate 31 is increased. On the other hand, the light oscillating parallel to the transparent substrate 31 is affected by a difference between the extraordinary refractive index of the microparticle 64B and the ordinary refractive index of the bulk 64A. At this time, since the difference between the extraordinary refractive index of the microparticle 64B and the ordinary refractive index of the bulk 64A is also large, the scattering efficiency of the light oscillating parallel to the transparent substrate 31 is also increased. Accordingly, light propagating through the region where a voltage is applied between the lower electrode 32 and the upper electrode 36 contains a large amount of oblique component. For example, when an acryl light guide plate is used as the light guide plate 10, the light in the region where a voltage is applied between the lower electrode 32 and the upper electrode 36 propagates the region at an angle of 41.8 degrees or more. As a result, the refractive index difference is increased and high scattering property is obtained, and thus display luminance is allowed to be improved. In addition, it is possible to further improve the display luminance due to the effect of the above-described luminance enhancement.

Incidentally, for example, in the case where the optical axis AX3 of the bulk 64A and the optical axis AX4 of the microparticle 64B are arranged perpendicular to the light incidence surface 10A of the light guide plate 10 during no-voltage application, and the liquid crystal material contained in the microparticle 64B is adapted to fall in the plane perpendicular to the light incidence surface 10A during voltage application, as with the above-described case, the light oscillating perpendicular to the transparent substrate 31 is affected by the difference between the ordinary refractive index of the microparticle 64B and the extraordinary refractive index of the bulk 64A. However, the light oscillating parallel to the transparent substrate 31 is affected by the difference between the ordinary refractive index of the microparticle 64B and the ordinary refractive index of the bulk 64A. In this case, the difference between the ordinary refractive index of the microparticle 64B and the ordinary refractive index of the bulk 64A is zero or substantially zero. Therefore, of the light entering the light guide plate 10 from the light incidence surface 10A, the light oscillating perpendicular to the transparent substrate 31 is largely affected by the refractive index difference as with the case described above, whereas the light oscillating parallel to the transparent substrate 31 is free or substantially free from influence of the refractive index difference. As a result, the scattering efficiency of the light oscillating perpendicular to the transparent substrate 31 is increased, but the scattering efficiency of the light oscillating parallel to the transparent substrate 31 is low or zero. Therefore, when the optical axes AX3 and AX4 are arranged perpendicular to the light incidence surface 10A, the scattering efficiency is lower than that in the case where the optical axes AX3 and AX4 are arranged parallel to the light incidence surface 10A. Consequently, the luminance extracted from the light guide plate 10 is lower than that of the light modulation device 60 of the present embodiment.

Moreover, when a pretilt is not formed or when a pretilt angle is substantially 90 degrees, the direction in which a liquid crystal falls is random. Therefore, the refractive index difference becomes an average of the refractive index difference in a case where the optical axis AX3 of the bulk 64A and the optical axis AX4 of the microparticle 64B are parallel to the light incident surface 10A of the light guide plate 10 and the refractive index difference in a case where the optical axis AX3 of the bulk 64A and the optical axis AX4 of the microparticle 64B are orthogonal to the light incident surface 10A of the light guide plate 10. Therefore, also in this case, the luminance to be extracted is low as compared with the case where the optical axis AX3 of the bulk 63A and the optical axis AX4 of the microparticle 64B are arranged parallel to the light incidence surface 10A of the light guide plate 10.

As described above, in the present embodiment, the display luminance is allowed to be improved while light leakage in a region where the viewing angle is large is decreased or substantially eliminated. As a result, modulation ratio in the front direction is allowed to be high.

(Modification)

Figure 45:
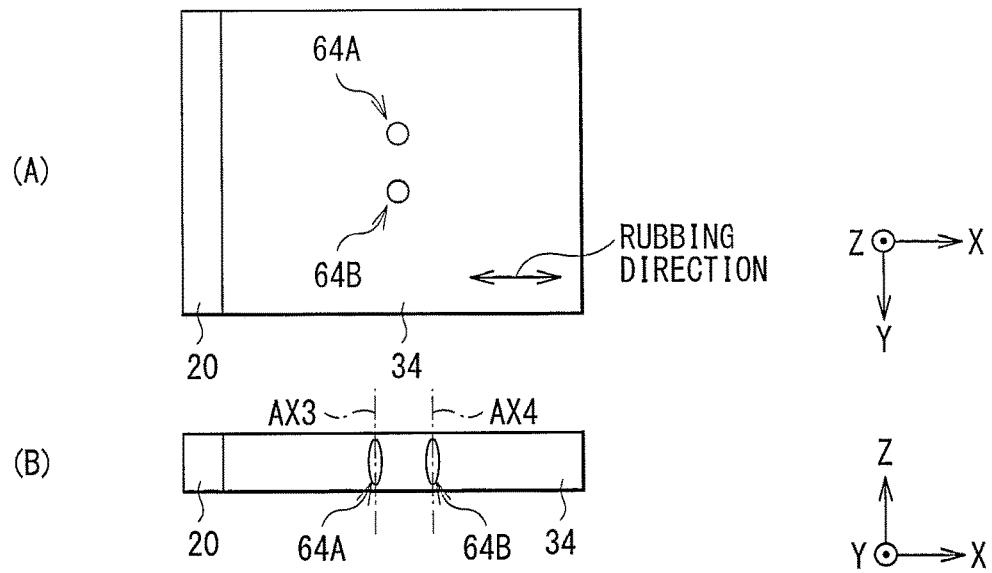
FIGS. 45A and 45B is a schematic diagram for explaining an example of a function in a modification of the light modulation layer in FIG. 41.
Figure 46:
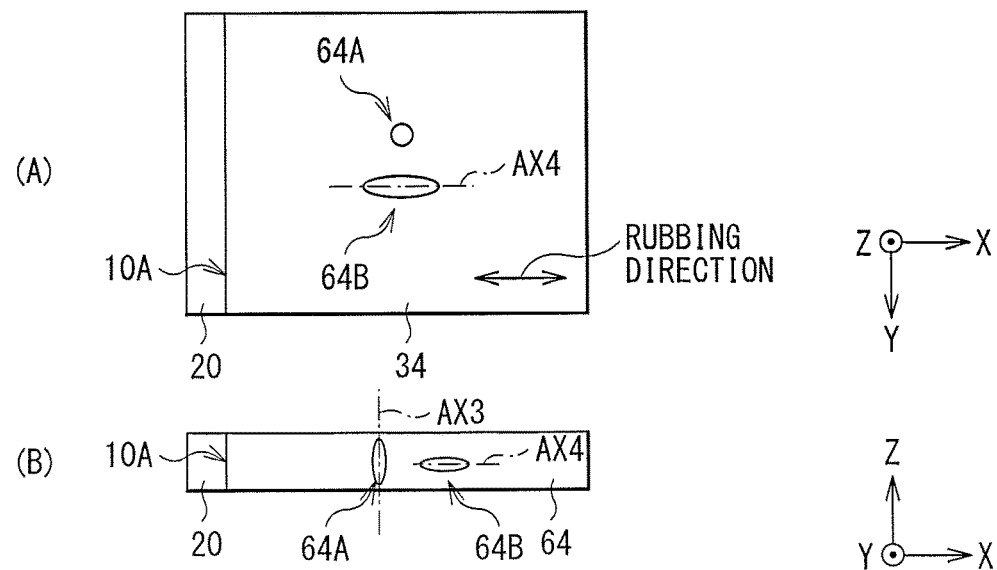
FIGS. 46A and 46B is a schematic diagram for explaining another example of a function of a modification of the light modulation layer in FIG. 42.

In the above-described second embodiment, the light modulation layer 64 is configured so that the optical axes AX3 and AX4 face in the direction intersecting or orthogonal to (or substantially orthogonal to) the transparent substrate 31 during no-voltage application, and the optical axis AX4 displaces in the direction parallel to or substantially parallel to the light incidence surface 10A and the transparent substrate 31 during voltage application. However, the light modulation layer 64 may be configured so that the optical axes AX3 and AX4 face in a direction intersecting or orthogonal to (or substantially orthogonal to) the transparent substrate 31 during no-voltage application and the optical axis AX4 displaces in a direction that is parallel or substantially parallel to the transparent substrate 31 and intersects or is orthogonal to (or substantially orthogonal to) the light incidence surface 10A during voltage application. The light modulation layer 64 may be configured so that the optical axes AX3 and AX4 face in the direction intersecting or orthogonal to (or substantially orthogonal to) the transparent substrate 31 (not illustrated) during no-voltage application, for example, as illustrated in (A) and (B) of FIG. 45, and the optical axis AX4 displaces in the direction that is parallel to or substantially parallel to the transparent substrate 31 and intersects or is orthogonal to (or substantially orthogonal to) the light incidence surface 10A during voltage application, for example, as illustrated in (A) and (B) of FIG. 46.

Figure 47:
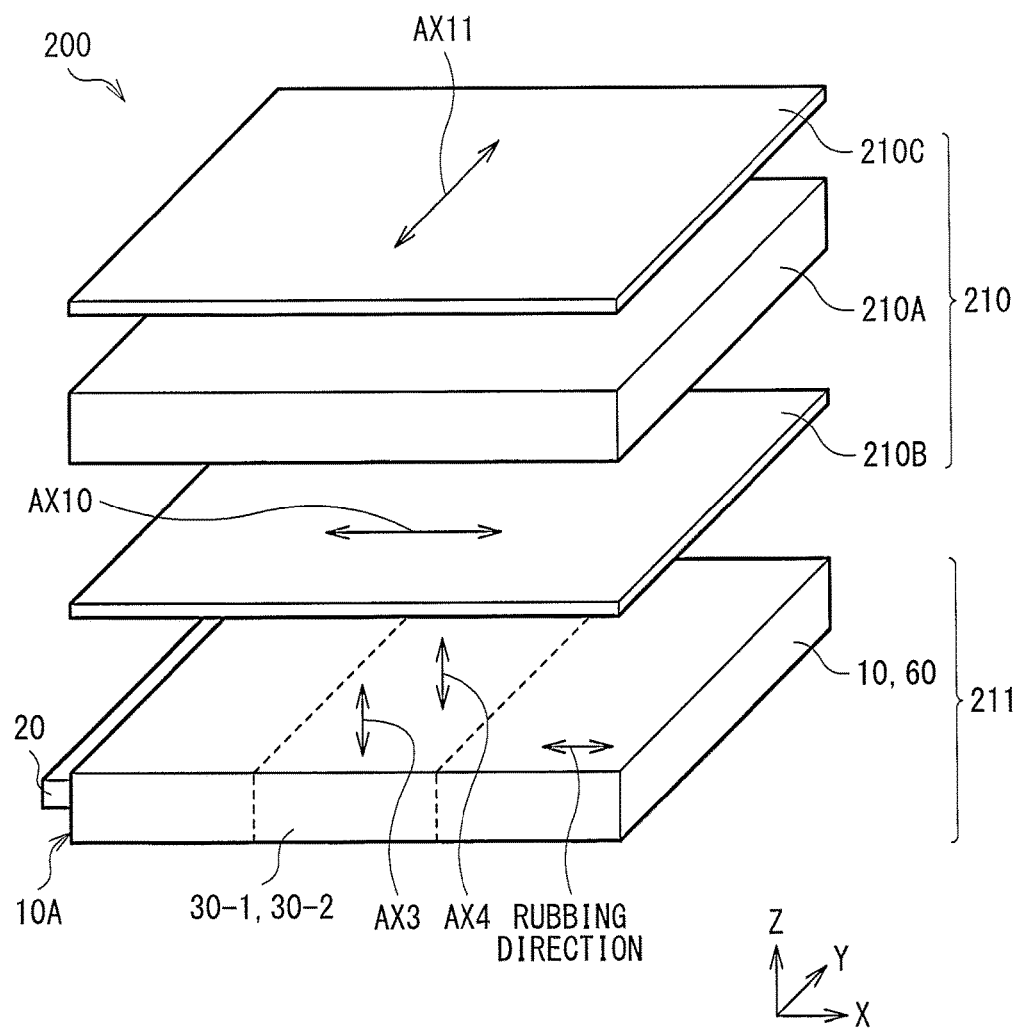
FIG. 47 is a diagram illustrating an example of relationship between the polarization plate and an optical axis of the light modulation layer in FIG. 45.

In this case, during no-voltage application, both the optical axes AX3 and AX4 mainly contain the component of the respective optical axes in the same direction, and for example, may face in the same direction. During no-voltage application, for example, as illustrated in FIG. 40 and FIG. 47, both the optical axes AX3 and AX4 may face in the direction orthogonal to or substantially orthogonal to the transparent substrate 31. In other words, during no-voltage application, the optical axes AX3 and AX4 roughly face in the Z-axis direction in FIG. 40.

Figure 48:
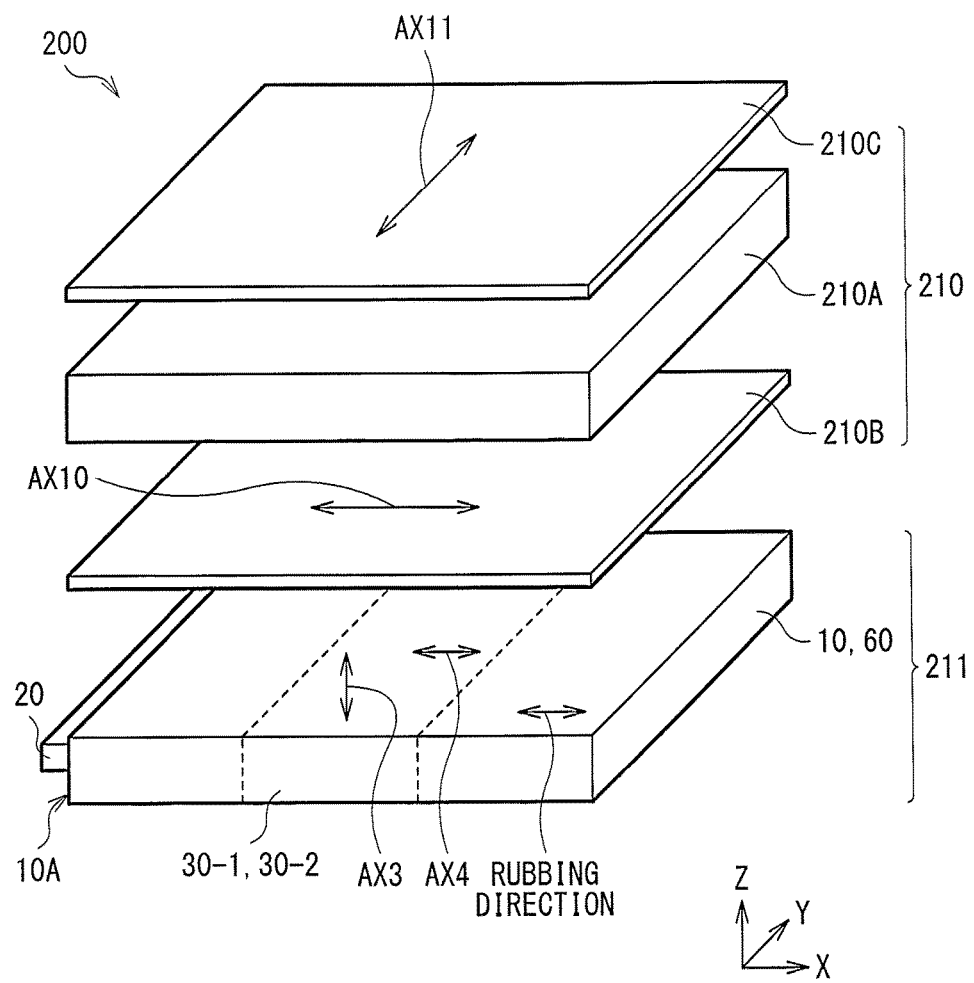
FIG. 48 is a diagram illustrating another example of relationship between the polarization plate and an optical axis of the light modulation layer in FIG. 46.

Moreover, as described above, during voltage application, the optical axis AX3 faces in the direction same or substantially same as the direction during no-voltage application. During voltage application, the optical axis AX3 mainly has the component of the optical axis in the direction parallel to the transmission axis AX10 of the polarization plate 210B, and may face in the direction parallel to the transmission axis AX10, for example, as illustrated in FIG. 48. For example, as illustrated in FIG. 40 and FIG. 48, during voltage application, the optical axis AX3 may face in the direction orthogonal to or substantially orthogonal to the transparent substrate 31.

On the other hand, during voltage application, the optical axis AX4 displaces in the predetermined direction due to influence of the electric field generated by the voltage applied between the lower electrode 32 and the upper electrode 36. For example, as illustrated in FIG. 48, during voltage application, the optical axis AX4 may displace in the direction orthogonal to or substantially orthogonal to the light incidence surface 10A. In other words, the optical axis AX4 displaces (namely, lies) in the direction in which an angle formed by the optical axis AX4 and the normal of the transparent substrate 31 is increased by the voltage application between the lower electrode 32 and the upper electrode 36. At this time, the optical axis AX4 is orthogonal to or substantially orthogonal to the optical axis AX3.

As described above, in the present modification, as with the above-described second embodiment, the polarization axis of the light emitted from the backlight 211 has a main component in the direction parallel to the transmission axis AX10 of the polarization plate 210B, and a part of the light modulation layer 64 is allowed to be the scattering region 30B. Consequently, both the display luminance and the display quality are allowed to be improved in three-dimensional display.

3. Modifications (Modification 1)

Figure 49:
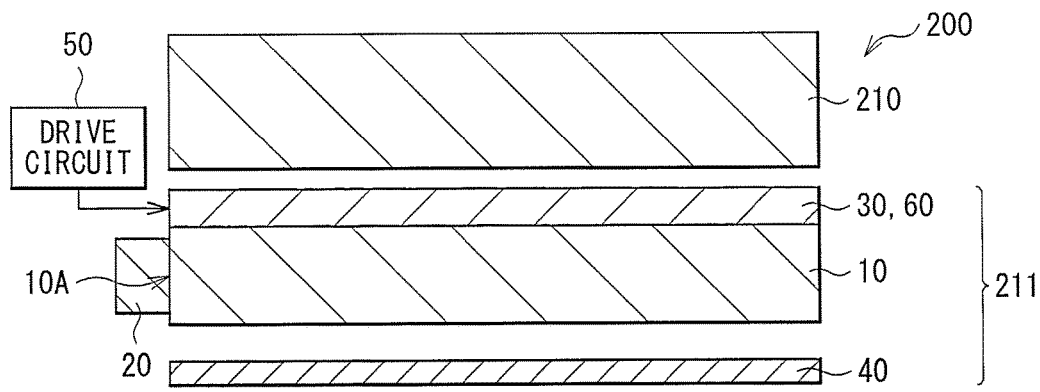
FIG. 49 is a sectional diagram illustrating a first modification of the structure of the display unit according to any of the embodiments.
Figure 50:
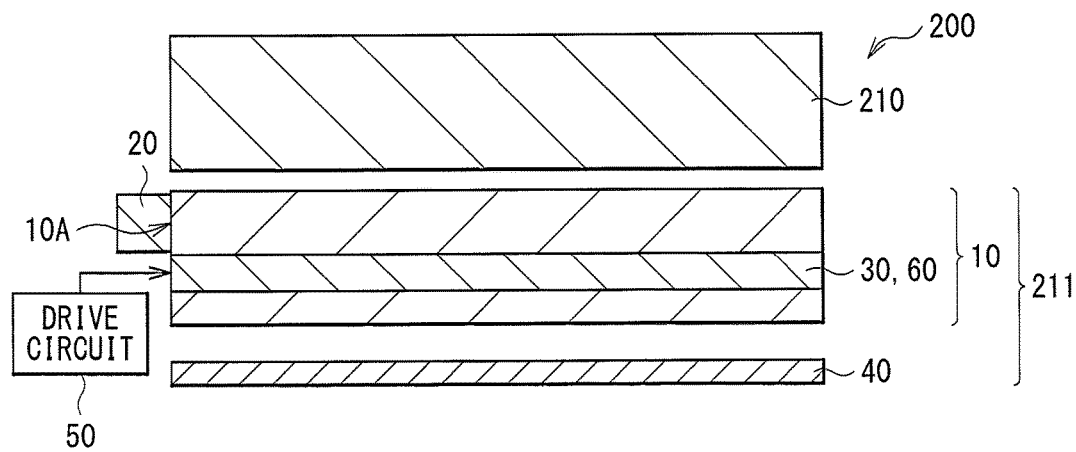
FIG. 50 is a sectional diagram illustrating a second modification of the structure of the display unit according to any of the embodiments.

In the above-described respective embodiments, the light modulation device 30 or 60 is closely bonded to the backside (the bottom surface) of the light guide plate 10 without an air layer. However, for example, as illustrated in FIG. 49, the light modulation device 30 or 60 may be closely bonded to the top surface of the light guide plate 10 without an air layer. In addition, for example, as illustrated in FIG. 50, the light modulation devices 30 or 60 may be provided inside the light guide plate 10. However, also in this case, it is necessary for the light modulation devices 30 or 60 to be closely bonded to the light guide plate 10 without an air layer.

(Modification 2)

Figure 51:
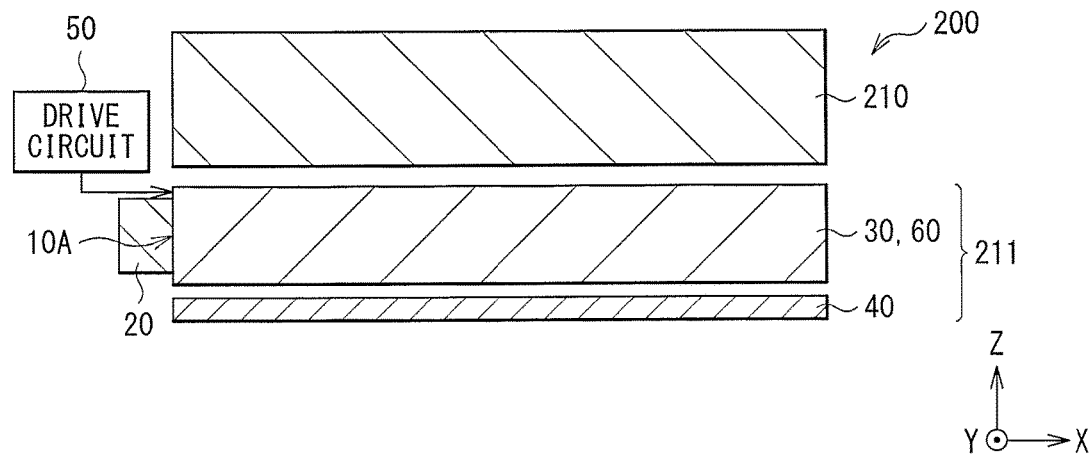
FIG. 51 is a sectional diagram illustrating a third modification of the structure of the display unit according to any of the embodiments.

In the above-described respective embodiments and the modifications thereof, the light guide plate 10 is provided. However, for example, as illustrated in FIG. 51, the light guide plate 10 may be omitted. Incidentally, in this case, the transparent substrate 31 or the transparent substrate 37 functions as the light guide plate 10. Therefore, the light source 20 is provided on a side surface of the transparent substrate 31 or the transparent substrate 37.

(Modification 3)

Figure 52:
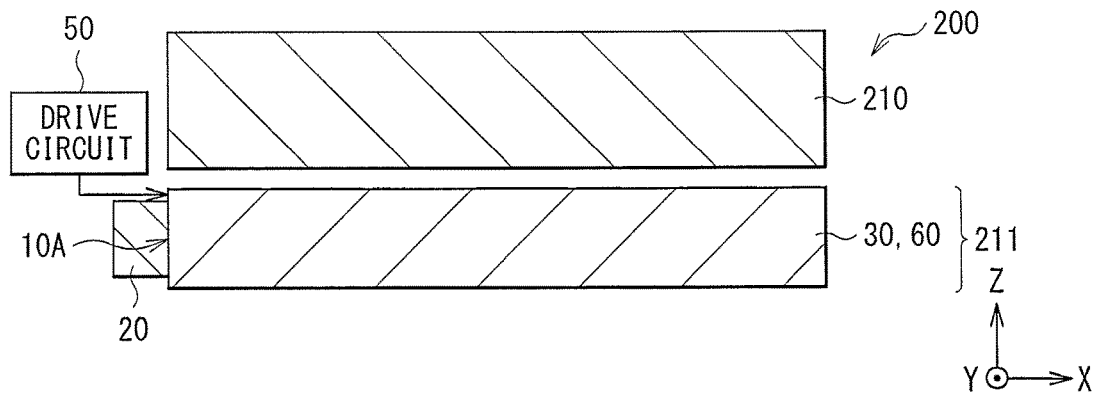
FIG. 52 is a sectional diagram illustrating a fourth modification of the structure of the display unit according to any of the embodiments.

In the above-described respective embodiments and the modifications thereof, the reflector 40 is provided. However, for example, as illustrated in FIG. 15, the reflector 40 may be omitted. In this case, for example, as illustrated in FIG. 52, the light guide plate 10 may be omitted.

(Modification 4)

Figure 53:
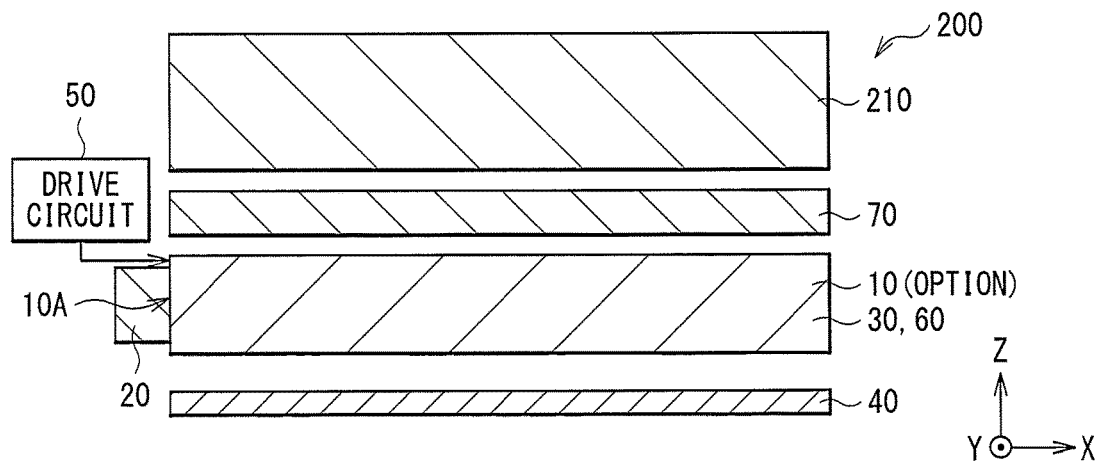
FIG. 53 is a sectional diagram illustrating a fifth modification of the structure of the display unit according to any of the embodiments.
Figure 54:
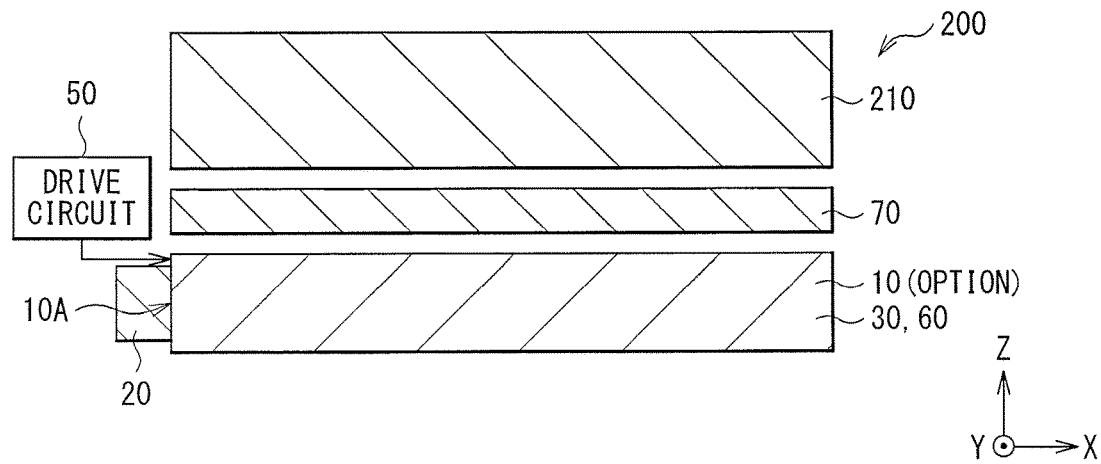
FIG. 54 is a sectional diagram illustrating a sixth modification of the structure of the display unit according to any of the embodiments.

In the above-described respective embodiments and the modifications thereof, nothing is particularly provided on the light guide plate 10. However, for example, as illustrated in FIG. 53 and FIG. 54, an optical sheet 70 (for example, a diffuser plate, a diffuser sheet, a lens film, or a polarization separation sheet) may be provided. In such a case, part of the light emitted from the light guide plate 10 in the oblique direction stands up in the front direction, and thus the front luminance is allowed to be effectively improved. Note that, in FIG. 53 and FIG. 54, when the transparent substrate 31 or the transparent substrate 37 functions as the light guide plate 10, the light guide plate 10 may be omitted. In this case, the light source 20 is provided on a side surface of the transparent substrate 31 or the transparent substrate 37.

Figure 55:
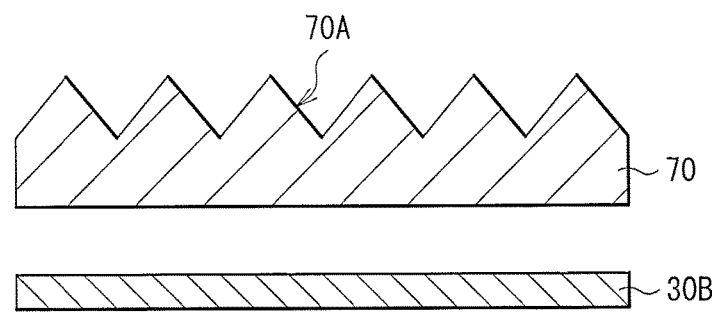
FIG. 55 is a sectional diagram illustrating an example of a structure of an optical sheet in FIG. 54 together with a scattering region.

For example, it is assumed that a lens film having a plurality of strip-shaped projections 70A arranged on a top surface thereof is used as the optical sheet 70 as illustrated in FIG. 55. In this case, for example, as illustrated in FIG. 55, when the cross-sectional surface of the projection 70A has a triangular prism shape, the projection 70A may preferably extend in a direction intersecting or orthogonal to the extending direction of the strip-shaped scattering region 30B that generates a linear illumination light beam or a linear illumination light beam including mass of point illumination light beams (hereinafter, simply referred to as "linear illumination light beam"). In such a case, the lens film allows the linear illumination light beam that has entered the lens film, to directly pass therethrough. Note that the cross-sectional shape of the projection 70A may not strictly have a triangular shape as illustrated in FIG. 52, and for example may have a triangular shape having a slightly-rounded apex or a slightly-rounded inclined surface.

Figure 56:
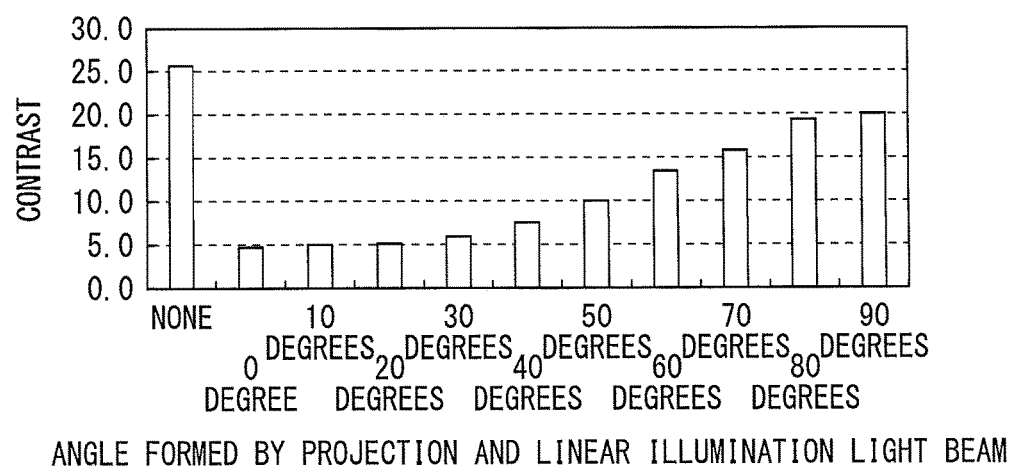
FIG. 56 is a diagram illustrating relationship between a contrast of a backlight and an angle formed by a projection and a linear illumination light beam.

FIG. 56 illustrates relationship between contrast of the backlight 211 and an angle formed by the projection 70A and the linear illumination light beam in the case where the cross-sectional surface of the projection 70A has a triangular shape with a vertex angle of 90 degrees. In FIG. 56, "none" indicates that the optical sheet 70 is not provided. In addition, in FIG. 53, "0 degree" indicates that the extending direction of the projection 70A and the extending direction of the strip-shaped illumination light beam are coincident with each other, and "90 degrees" indicates that the extending direction of the projection 70A and the extending direction of the linear illumination light beam are orthogonal to each other. It is found from FIG. 56 that the contrast is highest when the extending direction of the projection 70A and the extending direction of the linear illumination light beam are orthogonal to each other. In addition, it is also found from FIG. 56 that the change in contrast is small in a range of 80 degrees to 90 degrees. Therefore, in terms of contrast, it is found that it may be preferable that an angle formed by the extending direction of the projection 70A and the extending direction of the linear illumination light beam be within a range of 90 degrees±10 degrees.

Figure 57:
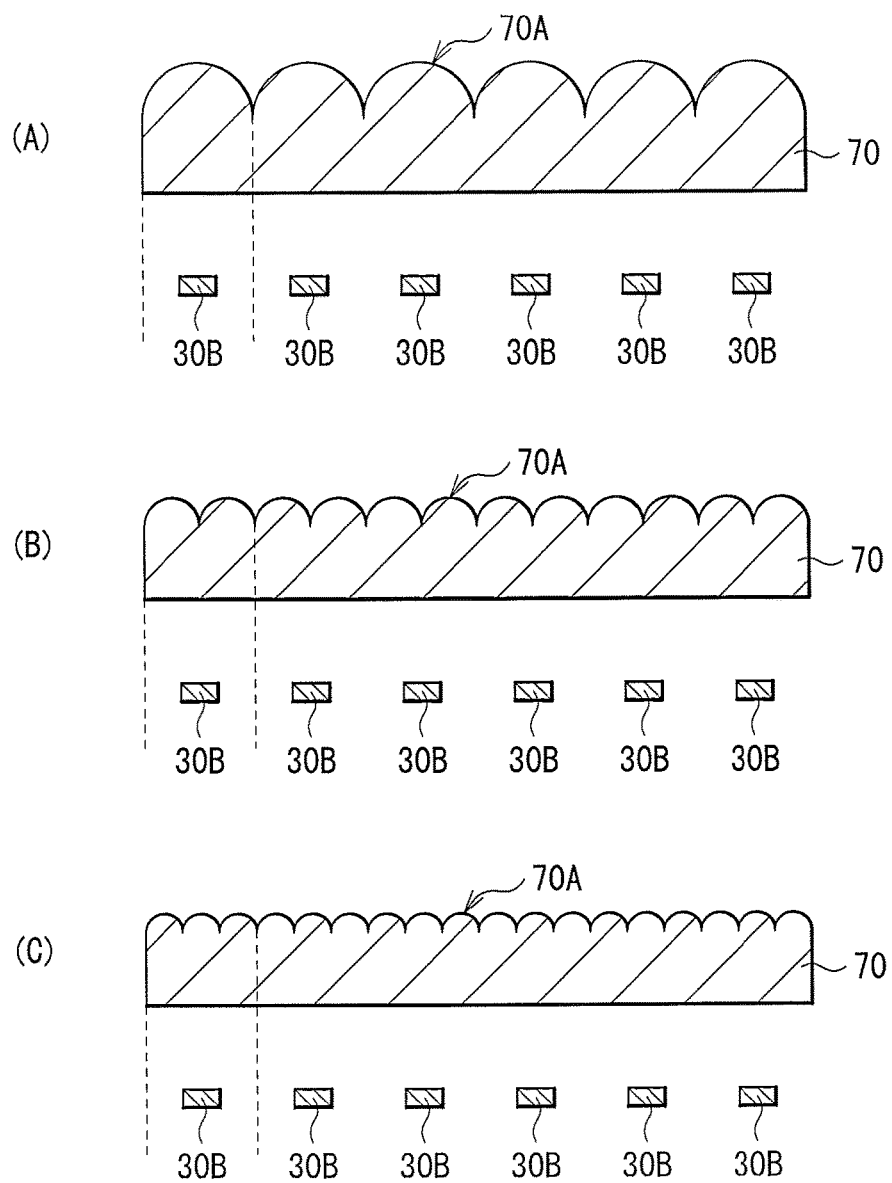
FIGS. 57A through 57C is a sectional diagram illustrating another example of the structure of the optical sheet in FIG. 54 together with the scattering region.

In addition, for example, as illustrated in (A) to (C) of FIG. 57, when the projection 70A has a strip-shaped cylindrical shape, the projection 70A may preferably extend in a direction parallel to the extending direction of the strip-shaped scattering region 30B that generates a linear illumination light beam. Then, as illustrated in (A) to (C) of FIG. 57, a pitch of the linear illumination light beams may be preferably integral multiple (onefold, twofold, threefold, . . . ) of a pitch of the lens film, and further, the position of the linear illumination light beam may be preferably located at a position corresponding to an apex of the projection 70A (for example, directly below the apex of the projection 70A). In such a case, it is possible to improve directivity of the linear illumination light beam that has entered the lens film.

Incidentally, retardation of the above-described lens film may be preferably small. In the case where light polarized mainly in the rubbing direction is generated by the light modulation device 30, and the transmission axis AX10 of the polarization plate 210B on the backlight 211 side of the display panel 210 is aligned in that direction, retardation for changing the polarization state may be preferably eliminated (or small) between the light modulation device 30 and the display panel 210. As the material of the above-described lens film, a cycloolefin polymer (COP)-based resin, a cycloolefin copolymer (COC)-based resin, a triacetylcellulose (TAC)-based resin, a polycarbonate resin, glass, and the like may be preferable. In addition, the polarization axis of the above-described lens film may be preferably parallel or orthogonal to the rubbing direction. In such a case, the light polarized in the rubbing direction is substantially free from influence of retardation of the above-described lens film.

(Modification 5)

Figure 58:
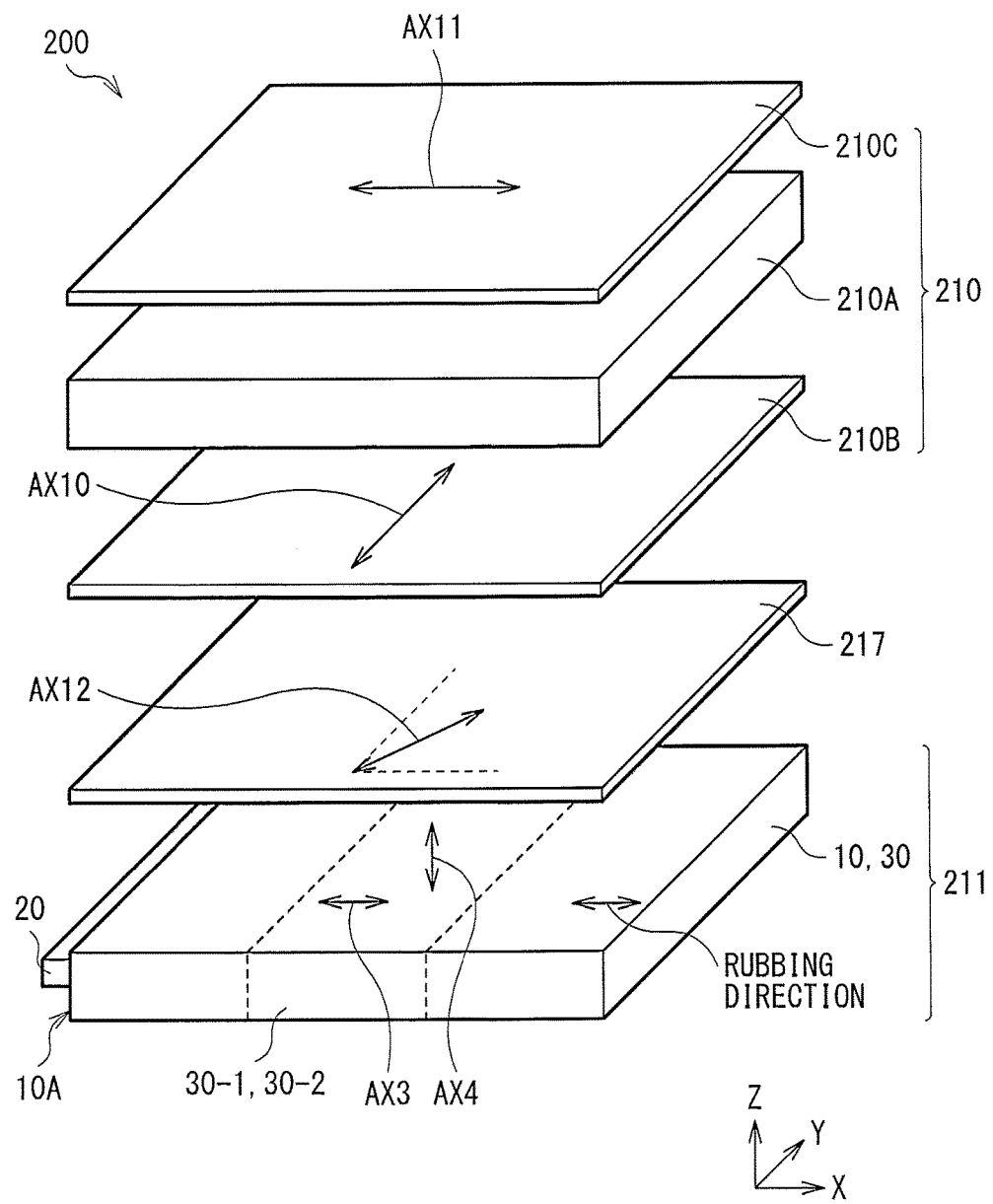
FIG. 58 is a diagram illustrating an example of relationship between the polarization plate and the optical axis of the light modulation layer.
Figure 59:
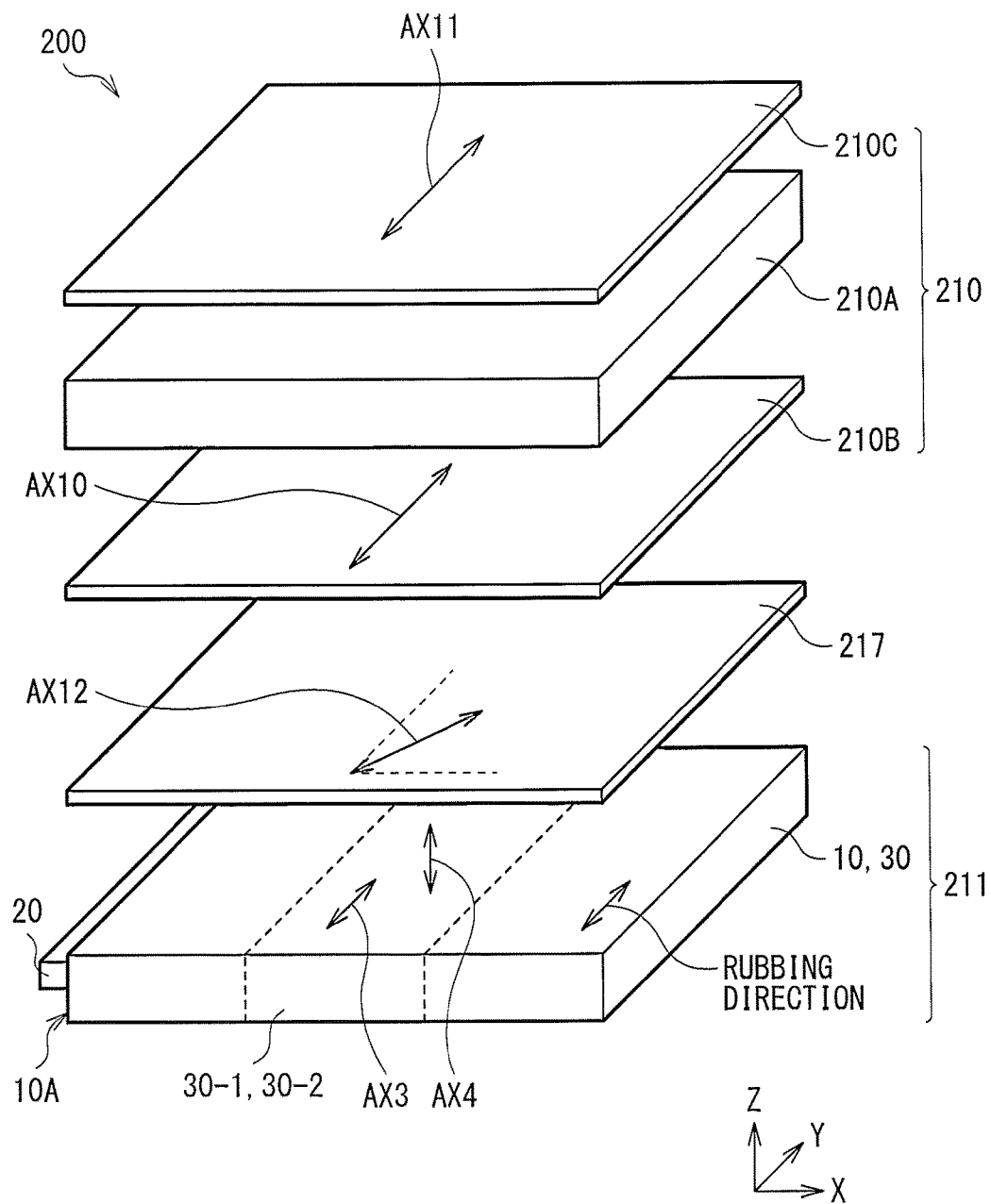
FIG. 59 is a diagram illustrating another example of the relationship between the polarization plate and the optical axis of the light modulation layer.

In addition, in the above-described first embodiment and the modification thereof, for example, as illustrated in FIG. 58 and FIG. 59, the optical axis AX1 of the backlight 211 and the transmission axis AX10 of the polarization plate 21 may face in respective directions orthogonal to or intersecting each other. In this case, however, the transmitter 100 may preferably include, between the backlight 211 and the polarization plate 210B, a ½λ plate 217 having an optical axis AX12 in a direction parallel to a bisector of an angle formed by the optical axis AX1 and the transmission axis AX10. In such a case, it is possible to rotate the polarization direction of the polarized light emitted from the backlight 211 in a direction parallel to the transmission axis AX10 by the ½λ plate 217. As a result, it is possible to enhance usage efficiency of the light.

(Modification 6)

Figure 60:
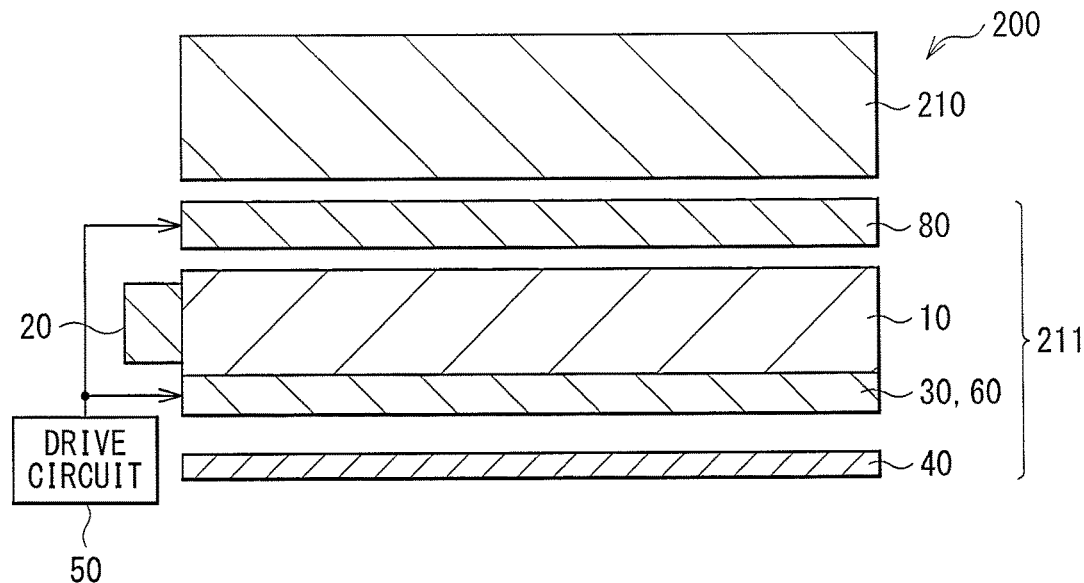
FIG. 60 is a sectional diagram illustrating a seventh modification of the structure of the display unit according to any of the embodiments.

Moreover, in the above-described respective embodiments and the modifications thereof, for example, as illustrated in FIG. 60, a parallax barrier 80 may be provided on the light emission side of the backlight 211. The parallax barrier 80 restricts the light output region of the backlight 211 to a region opposing to the plurality of partial electrodes 36B or a region corresponding thereto, and blocks noise light that may be output from regions adjacent to the scattering region 30B (for example, an end of the transmissive region 30A), in three-dimensional display. Moreover, the parallax barrier 80 expands the light output region of the backlight 211 to a region opposing to a region where the lower electrode 32 and the upper electrode 36 face each other or a region corresponding thereto, and allows the light emitted from the light modulation device 30 to pass therethrough, in performing two-dimensional display.

Figure 61:
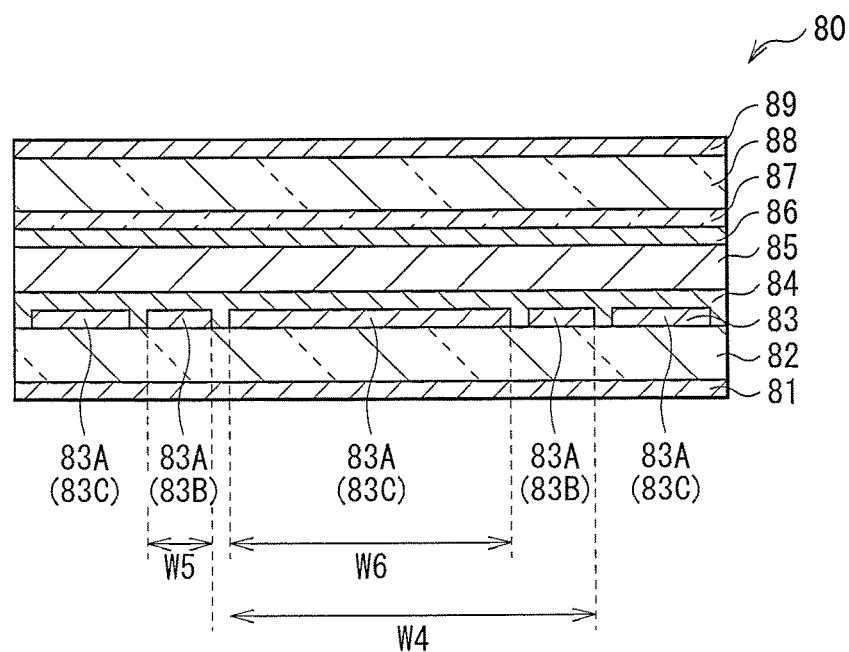
FIG. 61 is a sectional diagram illustrating an example of a structure of a parallax barrier in FIG. 60.

For example, as illustrated in FIG. 61, the parallax barrier 80 may include a polarization plate 81, a transparent substrate 82, a transparent electrode 83, an alignment film 84, a liquid crystal layer 85, an alignment film 86, a transparent electrode 87, a transparent substrate 88, and a polarization plate 89 in order from the light guide plate 10 side.

The transparent substrates 82 and 88 may be each formed of a substrate transparent to visible light, for example, plate glass. Note that, although not illustrated, for example, an active drive circuit including TFTs, wirings, and the like that are electrically connected to the transparent electrode 83 may be formed on the transparent substrate on the light guide plate 10 side. The transparent electrodes 83 and 87 may be each formed of, for example, ITO. For example, as illustrated in FIG. 61, the transparent electrode 83 may be configured of a plurality of partial electrodes 83A. The plurality of partial electrodes 83A are formed on the transparent substrate 82.

The plurality of partial electrode 83A each have a strip shape extending in one direction (in a direction parallel to the light incident surface 10A) in a plane. A width W5 of a specific number of partial electrodes 83B of the plurality of partial electrode 83A is lower than a width W6 of the plurality of partial electrodes 83C other than the plurality of partial electrodes 83B of the plurality of partial electrode 83A. The plurality of partial electrodes 83B are used for transmitting and blocking linear illumination light beams when three-dimensional display is performed on the receiver 200. The plurality of partial electrode 83B are arranged at a pitch P4 (a pitch equal to or close to the pixel pitch P2) corresponding to the pixel pitch P2 (see FIG. 25) for three-dimensional display on the receiver 200. The plurality of partial electrodes 83B and the plurality of partial electrodes 83C are alternately arranged in an arrangement direction (in a direction orthogonal to the light incidence surface 10A). Note that, when the two-dimensional display is performed on the receiver 200, all of the partial electrodes 83A are used to generate a planar illumination light beam.

The transparent electrode 87 is formed on one surface of the transparent substrate 88, and functions as a common electrode facing the partial electrodes 83A. The alignment films 84 and 86 may be each formed of, for example, a polymer material such as polyimide, and may perform alignment treatment on liquid crystal. For example, the liquid crystal layer 85 may be formed of a liquid crystal of VA mode, TN mode, or STN mode, and may have a function of changing the direction of a polarization axis of the light from the light guide plate 10 side for each section facing the partial electrode 73A, by an application voltage from the drive circuit 50. Each of the polarization plates 81 and 89 is one kind of optical shutters, and allows light oscillating in a certain direction (polarized light) to pass therethrough. Incidentally, the polarization plates 81 and 89 may be an absorption-type polarization device absorbing light (polarized light) oscillating in a direction other than transmission axis, or may be a reflective polarization device reflecting the light to the light guide plate 10 side. The polarization plates 81 and 89 are arranged so that the respective polarization axes thereof are different from each other by 90 degrees or are parallel to each other. This allows the light from the light guide plate 10 to pass through the polarization plates 81 and 89 via the liquid crystal layer 85 or to be blocked.

The drive circuit 50 allows the parallax barrier 80 to function as a slit-like light transmission section, when receiving a signal specifying three-dimensional display as the control signal 204A. Specifically, the drive circuit 50 applies a voltage allowing the parallax barrier 80 to exhibit transparency, to the specific number of partial electrodes 83B of the plurality of partial electrodes 73A, as well as applies a voltage allowing the parallax barrier 80 to exhibit light blocking effect, to the plurality of partial electrodes 83C other than the plurality of partial electrodes 83B of the plurality of partial electrodes 83A.

In addition, the drive circuit 50 allows the entire parallax barrier 80 to function as a light transmissive section when receiving a signal specifying two-dimensional display as the control signal 204A. Specifically, the drive voltage 50 applies a voltage allowing the parallax barrier 80 to exhibit transparency, to each of the partial electrodes 83A.

In the present modification, since the parallax barrier 80 is provided on the light emission side of the backlight 211, when the plurality of linear illumination light beams are output from the light modulation device 30, noise light that may be output from the regions adjacent to the scattering region 30B is allowed to be blocked. Therefore, in three-dimensional display, light entering each pixel 210-1, 210-2, 210-3, or 210-4 (see FIG. 25) at an angle different from an angle of the linear illumination light beam is allowed to be reduced. As a result, it is possible to obtain clear three-dimensional image.

(Modification 7)

Figure 62:
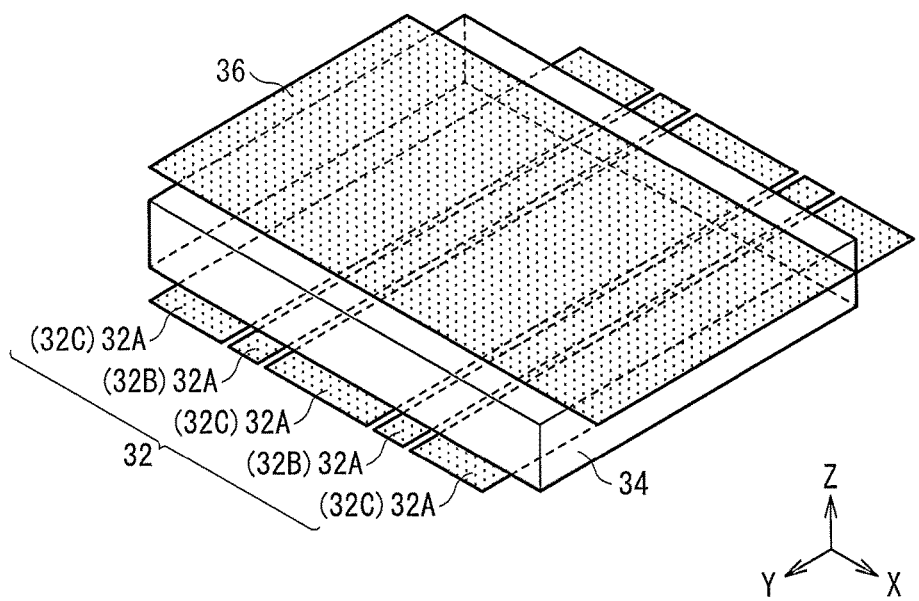
FIG. 62 is a perspective view illustrating an eighth modification of the electrode structure in FIG. 4.

In the above-described respective embodiments and the modification thereof, the lower electrode 32 is a solid film (a single planar electrode) formed on the entire surface, and the upper electrode 36 is configured of the plurality of strip-shaped partial electrodes 36A. However, for example, as illustrated in FIG. 62, the lower electrode 32 may be configured of a plurality of (two or more) strip-shaped partial electrodes 32A, and the upper electrode 36 may be a solid film (a single planar electrode) formed on the entire surface. In this case, each of the partial electrodes 32A has a configuration similar to that of each of the partial electrodes 36A (see FIG. 5 to FIG. 12). For example, as illustrated in FIG. 62, some of the partial electrodes 32A are partial electrodes 32B corresponding to the above-described partial electrodes 36B, and the other partial electrodes 32A are partial electrodes 32C corresponding to the above-described partial electrodes 36C.

(Modification 8)

Figure 63:
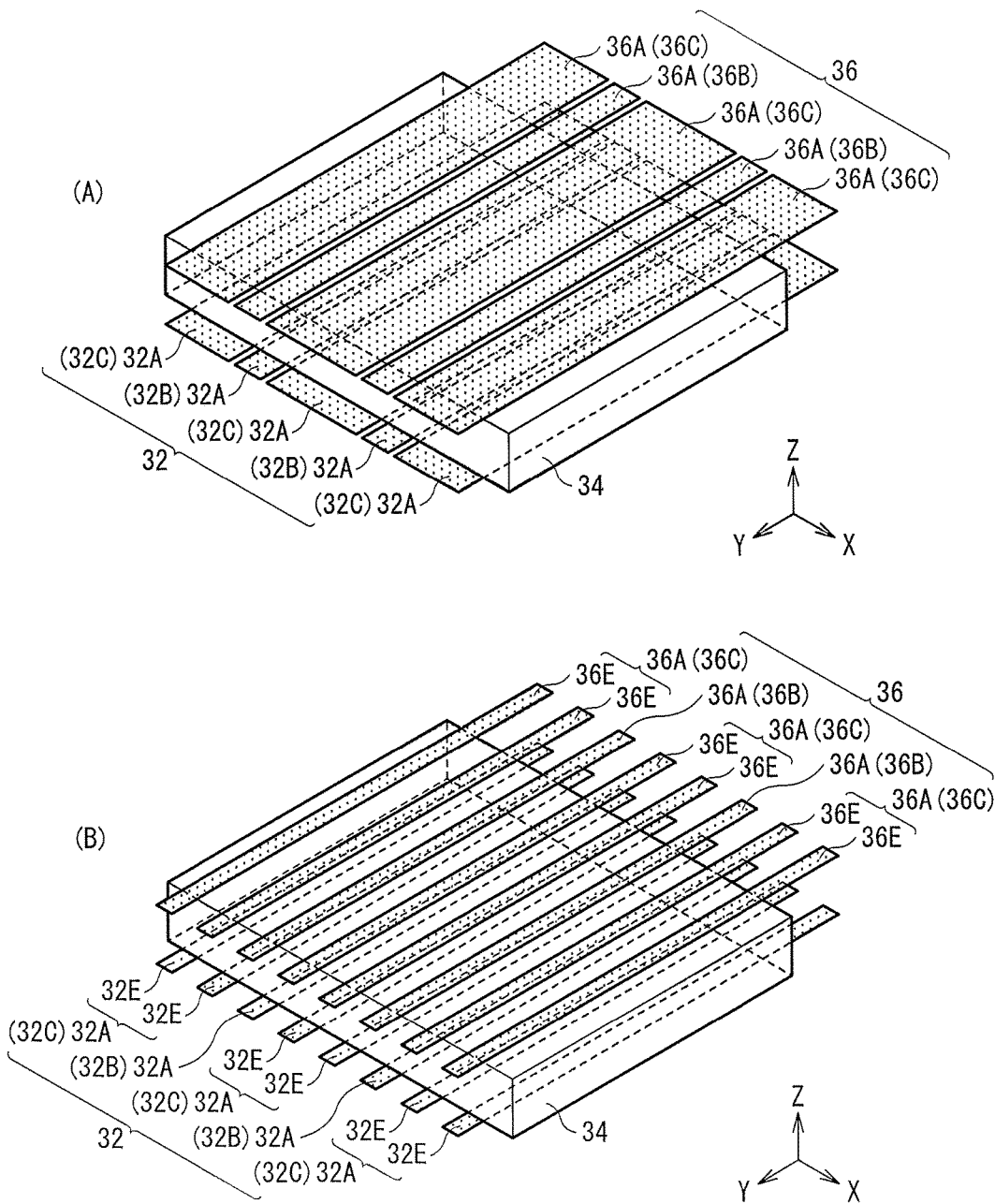
FIGS. 63A and 63B is a perspective view illustrating a ninth modification of the electrode structure in FIG. 4.
Figure 64:
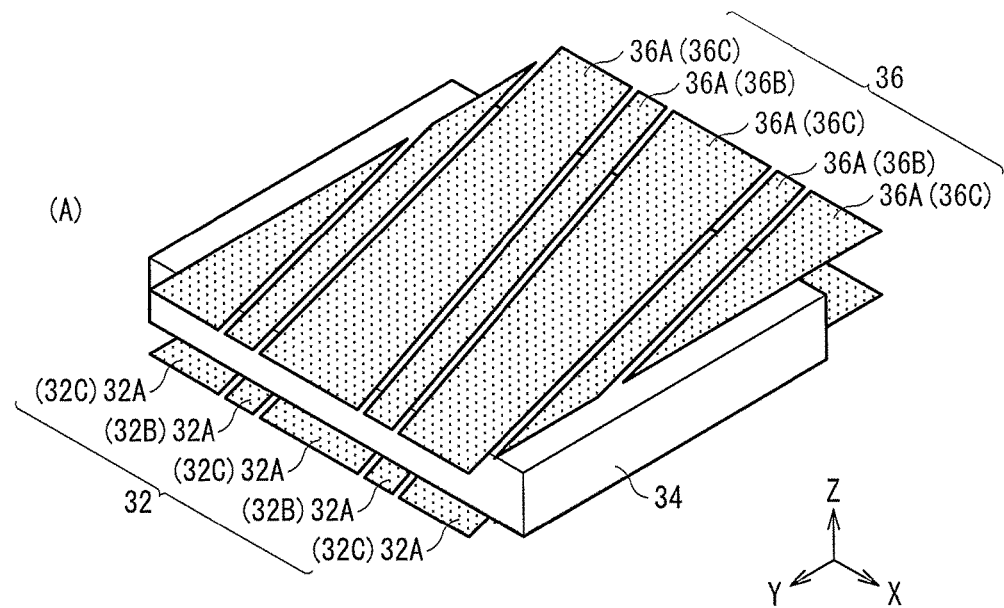
FIGS. 64A and 64B is a perspective view illustrating a tenth modification of the electrode structure in FIG. 4.
Figure 64:
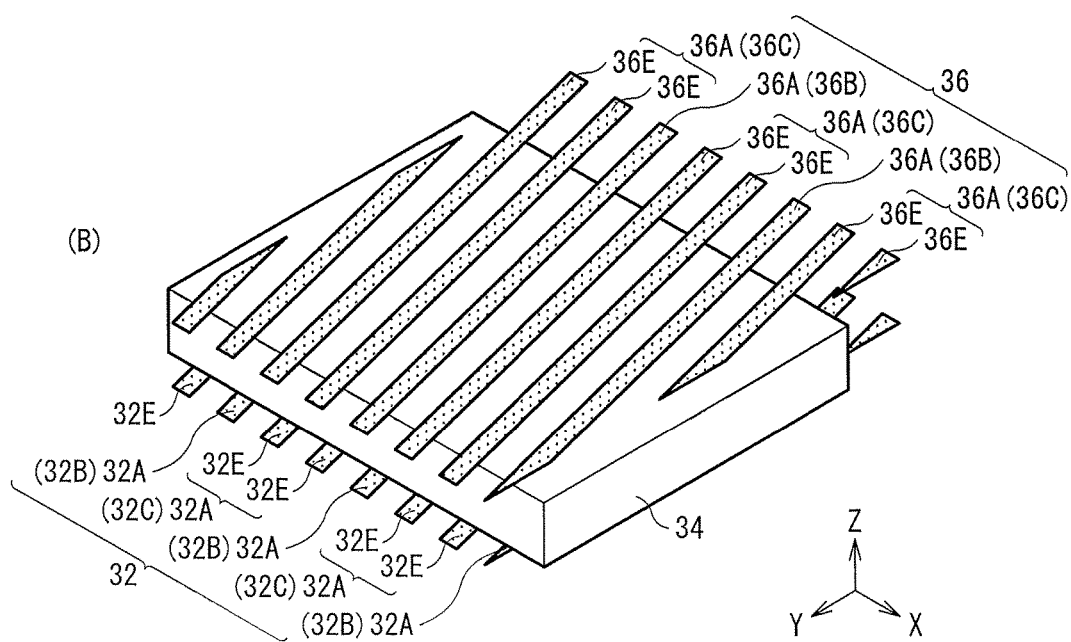

For example, as illustrated in (A) and (B) of FIG. 63, the lower electrode 32 may be configured of the plurality of partial electrodes 32A, and the upper electrode 36 may also be configured of the plurality of partial electrodes 36A. At this time, the partial electrodes 32A and the partial electrodes 36A extend in the direction parallel to the light incidence surface 10A ((A) and (B) of FIG. 63), or extend in the direction obliquely intersecting the light incidence surface 10A ((A) and (B) of FIG. 64). Further, the partial electrodes 32A and the partial electrodes 36A may preferably extend in the same direction. In (A) of FIG. 63 and (A) of FIG. 64, the partial electrode 32C is configured of a strip-shaped partial electrode 32E extending in one direction (in the direction parallel to the light incidence surface 10A) in the plane. In addition, in (B) of FIG. 63 and (B) of FIG. 64, the partial electrode 32C is configured of a plurality of (two) strip-shaped partial electrodes 32E each extending in one direction (in the direction parallel to the light incidence surface 10A) in the plane.

Note that when both the partial electrode 32A and the partial electrode 36A extend in the direction parallel to the light incidence surface 10A, the partial electrode 32A corresponds to a specific example of "fourth partial electrode" and a specific example of "fifth partial electrode" of the technology. In addition, when both the partial electrode 32A and the partial electrode 36A extend in the direction obliquely intersecting the light incidence surface 10A, the partial electrode 32A corresponds to a specific example of "fifth partial electrode" of the technology.

In the present modification, the partial electrodes 32A and the partial electrodes 36A may be preferably arranged so as to face each other, and more preferably arranged so as to precisely face each other (namely, be overlapped with each other). In such a case, unnecessary section not contributing to switching between transparency and scattering in the light modulation layer 34 is allowed to be reduced. As a result, it is possible to perform switching between transparency and the scattering in the light modulation layer 34, while suppressing light absorption by the partial electrodes 32A and the partial electrodes 36A. Further, as illustrated in (B) of FIG. 63 and (B) of FIG. 64, the width of the partial electrode 32A and the width of the partial electrode 36A may be decreased and a clearance between the partial electrodes 32A or a clearance between the partial electrodes 36A may be increased. In such a case, it is possible to further suppress light absorption by the partial electrode 32A and the partial electrode 36A.

In addition, although not illustrated, the width of the partial electrode 32A may be larger by about 5 μm than the width of the partial electrode 36A, or the width of the partial electrode 36A may be larger by about 5 μm than the width of the partial electrode 32A, for example. In such a case, even if an alignment error occurs when the partial electrodes 32A and the partial electrodes 36A are arranged so as to face each other, it is possible to precisely arrange the partial electrodes with a smaller width at a position facing to the partial electrode with a large width.

(Modification 9)

Figure 65:
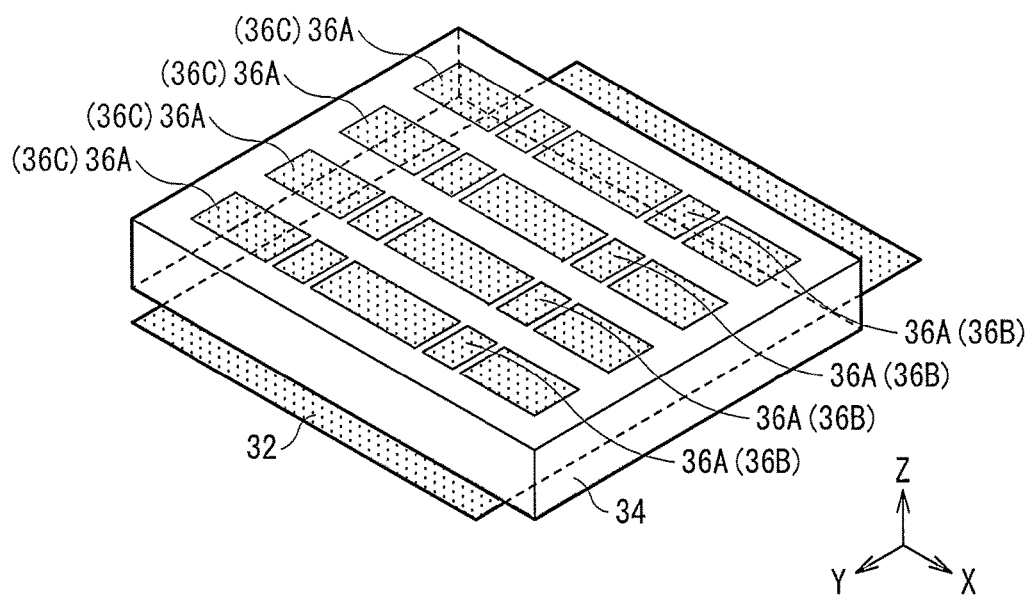
FIG. 65 is a perspective view illustrating an eleventh modification of the electrode structure in FIG. 4.

For example, the lower electrode 32 may be a solid film (a single planar electrode) formed on the entire surface, and the upper electrode 36 may be configured of a plurality of block-shaped partial electrodes 36A arranged in a matrix. In this case, for example, as illustrated in FIG. 65, each of the partial electrodes 36A included in a specific number of columns parallel to the light incidence surface 10A is the above-described partial electrode 36B, and each of the partial electrodes 36A included in other columns parallel to the light incidence surface 10A is the above-described partial electrode 36C.

Moreover, in the present embodiment, a source or a drain of the TFT may be connected to each of the partial electrodes 36A, a scan line may be connected to a gate of the TFT, and the source or the drain of the TFT that is not connected to the partial electrode 36A may be connected to a data line. In this case, the drive circuit 50 may sequentially select a plurality of scan lines, and may apply a signal voltage corresponding to a picture signal to each data line. In other words, the drive circuit 50 may perform active matrix driving on each of the partial electrodes 36A.

(Modification 10)

Figure 66:
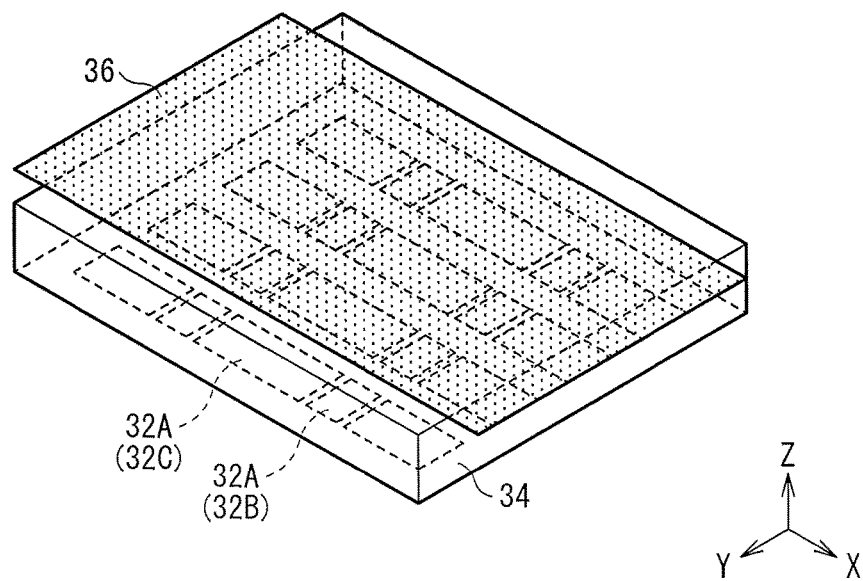
FIG. 66 is a plan view illustrating a twelfth modification of the electrode structure in FIG. 4.

Contrary to the above-described modification 9, the upper electrode 36 may be a solid film (a single planar electrode) formed on the entire surface, and the lower electrode 32 may be configured of a plurality of block-shaped partial electrodes 32A arranged in a matrix. In this case, for example, as illustrated in FIG. 66, each of the partial electrodes 32A included in a specific number of columns parallel to the light incidence surface 10A is the partial electrode 32B, and each of the partial electrodes 32A included in the other columns parallel to the light incidence surface 10A is the partial electrode 32C.

Moreover, in the present embodiment, the source or the drain of the TFT may be connected to each of the partial electrodes 32A, the scan line may be connected to the gate of the TFT, and the source or the drain of the TFT that is not connected to the partial electrode 32A may be connected to the data line. In this case, the drive circuit 50 may sequentially select a plurality of scan lines, and may apply a signal voltage corresponding to a picture signal to each data line. In other words, the drive circuit 50 may perform active matrix driving on each of the partial electrodes 32A.

(Modification 11)

Figure 67:
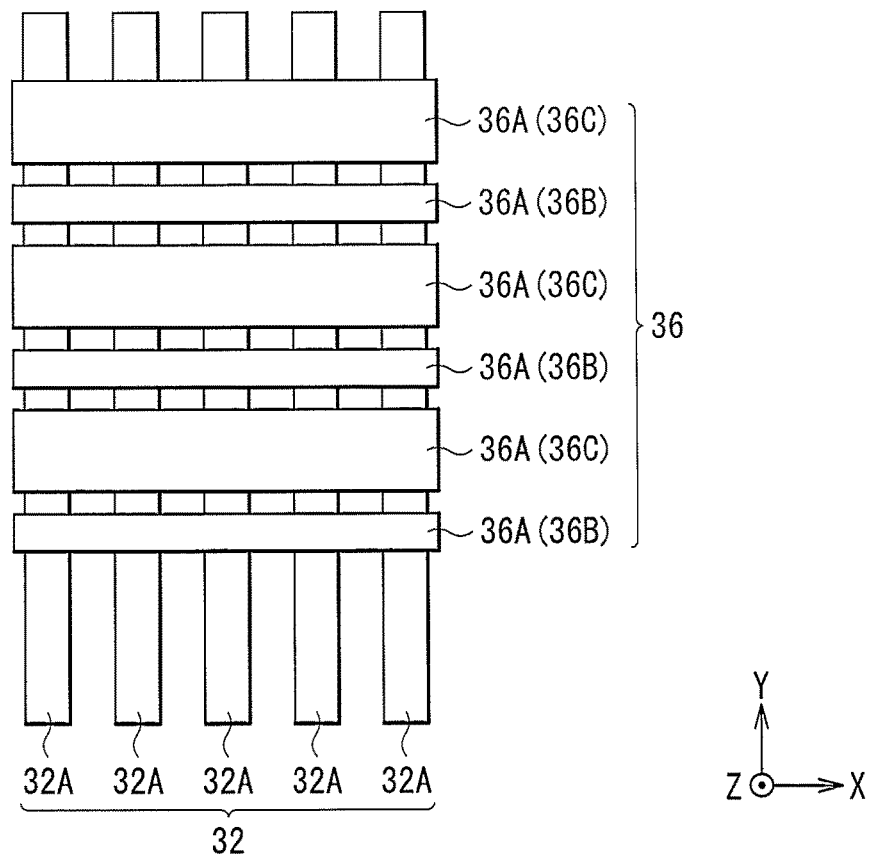
FIG. 67 is a plan view illustrating a thirteenth modification of the electrode structure in FIG. 4.

In the above-described respective embodiments and the modifications thereof, one of the lower electrode 32 and the upper electrode 36 is configured of the plurality of strip-shaped partial electrodes, or both of the lower electrode 32 and the upper electrode 36 are configured of the plurality of strip-shaped partial electrodes extending in the same direction. However, both of the lower electrode 32 and the upper electrode 36 may be configured of the plurality of strip-shaped partial electrodes, and the plurality of strip-shaped partial electrodes 32A included in the lower electrode 32 and the plurality of strip-shaped partial electrodes 36A included in the upper electrode 36 may extend in the directions intersecting with each other. For example, as illustrated in FIG. 67, the lower electrode 32 may be configured of the plurality of strip-shaped partial electrodes 32A extending in the direction parallel to the light incidence surface 10A, and the upper electrode 36 may be configured of the plurality of strip-shaped partial electrodes 36A extending in the direction orthogonal to the light incidence surface 10A.

Figure 68:
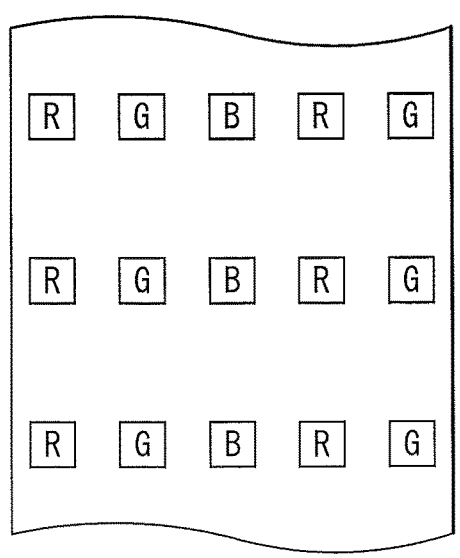
FIG. 68 is a schematic diagram illustrating an example of relationship between pixels of a display panel and backlight light.

In the present modification, in the case where the sections where each of the partial electrodes 32A and each of the partial electrodes 36A intersect with each other corresponds to the pixel layout for 3D display of the display panel 210 when viewed from the normal direction of the transparent substrate 31 (see FIG. 68), it is possible to suppress entering of common light to different pixels in the display panel 210. As a result, it is possible to reduce double image.

In the case where two-dimensional display or three-dimensional display is performed, when the plurality of partial electrodes 32A or the plurality of partial electrodes 36A extend in the direction parallel to the light incidence surface 10A, the drive circuit 50 may sequentially drive the plurality of partial electrodes extending in the direction parallel to the light incidence surface 10A among the plurality of partial electrodes 32A and the plurality of partial electrodes 36A on a predetermined unit basis (for example, one by one). In such a case, it is possible to partially enhance or partially suppress in-plane luminance. Note that, in FIG. 67, the case where the partial electrodes 32A extend in the direction parallel to the light incidence surface 10A is exemplified.

In the case where it is unnecessary to partially enhance or partially suppress the in-plane luminance, when two-dimensional display or three-dimensional display is performed, the drive circuit 50 may apply the same voltage to the respective partial electrodes 32A. When two-dimensional display or three-dimensional display is performed, the drive circuit 50 may apply a voltage having a voltage value, a frequency, or a duty ratio corresponding to a distance from the light source 20, to the plurality of partial electrodes 32A.

In this case, the drive circuit 50 may preferably perform scanning of the plurality of partial electrodes described before in synchronization with the scanning of the pixels of the display panel 210, under the condition that the scanning direction of the plurality of partial electrodes extending in the direction parallel to the light incidence surface 10A among the plurality of partial electrodes 32A and the plurality of partial electrodes 36A is the same direction as the scanning direction of the pixels of the display panel 210. In such a case, it is possible to achieve display with high luminance and improved moving-picture responsiveness (suppressed blur).

(Modification 12)

Figure 69:
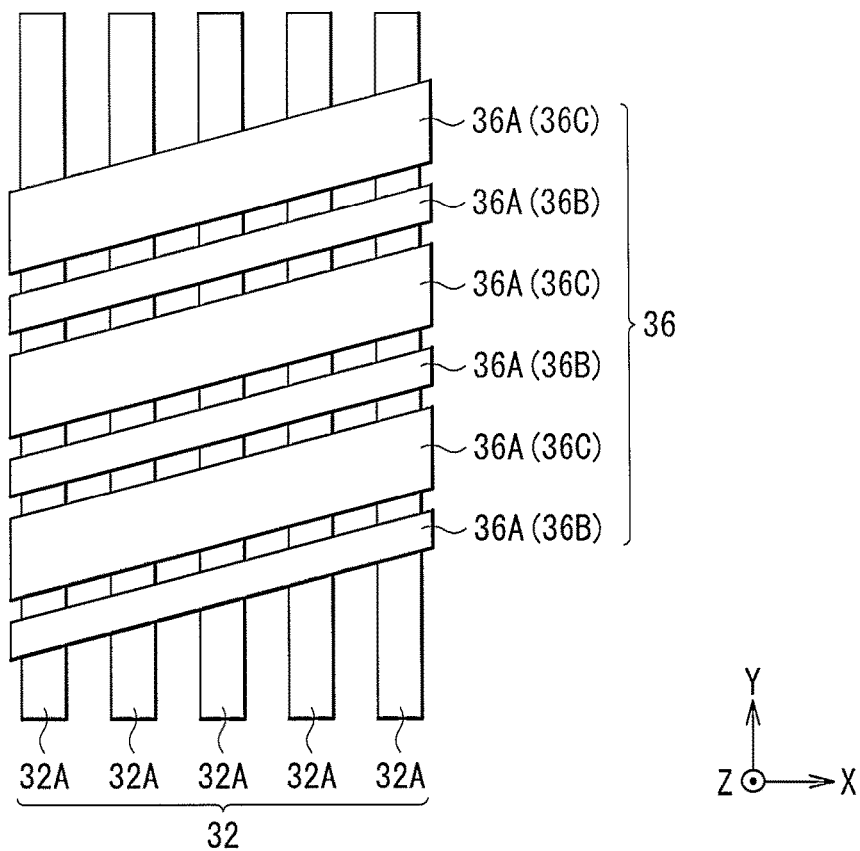
FIG. 69 is a plan view illustrating a fourteenth modification of the electrode structure in FIG. 4.

For example, as illustrated in FIG. 69, in the above-described modification 11, the lower electrode 32 may be configured of the plurality of strip-shaped partial electrodes 32A extending in the direction parallel to the light incidence surface 10A, and the upper electrode 36 may be configured of the plurality of strip-shaped partial electrodes 36A extending in the direction intersecting the light incidence surface 10A at an angle other than 90 degrees.

Figure 70:
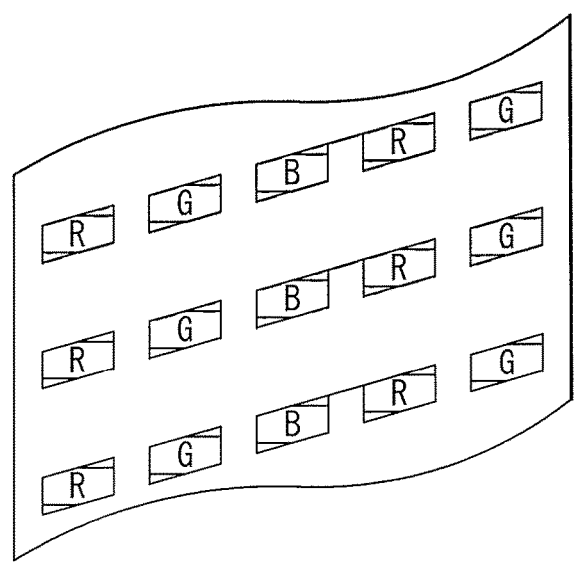
FIG. 70 is a schematic diagram illustrating an example of the relationship between the pixels of the display panel and the backlight light.

In the present modification, in the case where the sections where each of the partial electrodes 32A and each of the partial electrodes 36A intersect with each other corresponds to the pixel layout for 3D display of the display panel 210 when viewed from the normal direction of the transparent substrate 31 (see FIG. 70), it is possible to suppress entering of common light to different pixels in the display panel 210. As a result, it is possible to reduce double image.

In the case where two-dimensional display or three-dimensional display is performed, when the plurality of partial electrodes 32A or the plurality of partial electrodes 36A extend in the direction parallel to the light incidence surface 10A, the drive circuit 50 may sequentially drive the plurality of partial electrodes extending in the direction parallel to the light incidence surface 10A among the plurality of partial electrodes 32A and the plurality of partial electrodes 36A on a predetermined unit basis (for example, one by one). In such a case, it is possible to partially enhance or partially suppress in-plane luminance. Note that, in FIG. 69, the case where the partial electrodes 32A extend in the direction parallel to the light incidence surface 10A is exemplified.

In the case where it is unnecessary to partially enhance or partially suppress the in-plane luminance, when two-dimensional display or three-dimensional display is performed, the drive circuit 50 may apply the same voltage to the respective partial electrodes 32A. When two-dimensional display or three-dimensional display is performed, the drive circuit 50 may apply a voltage having a voltage value, a frequency, or a duty ratio corresponding to a distance from the light source 20, to the plurality of partial electrodes 32A.

In this case, the drive circuit 50 may preferably perform scanning of the plurality of partial electrodes described above in synchronization with the scanning of the pixels of the display panel 210, under the condition that the scanning direction of the plurality of partial electrodes extending in the direction parallel to the light incidence surface 10A among the plurality of partial electrodes 32A and the plurality of partial electrodes 36A is the same direction as the scanning direction of the pixels of the display panel 210. In such a case, it is possible to achieve display with high luminance and improved moving-picture responsiveness (suppressed blur).

(Modification 13)

Figure 71:
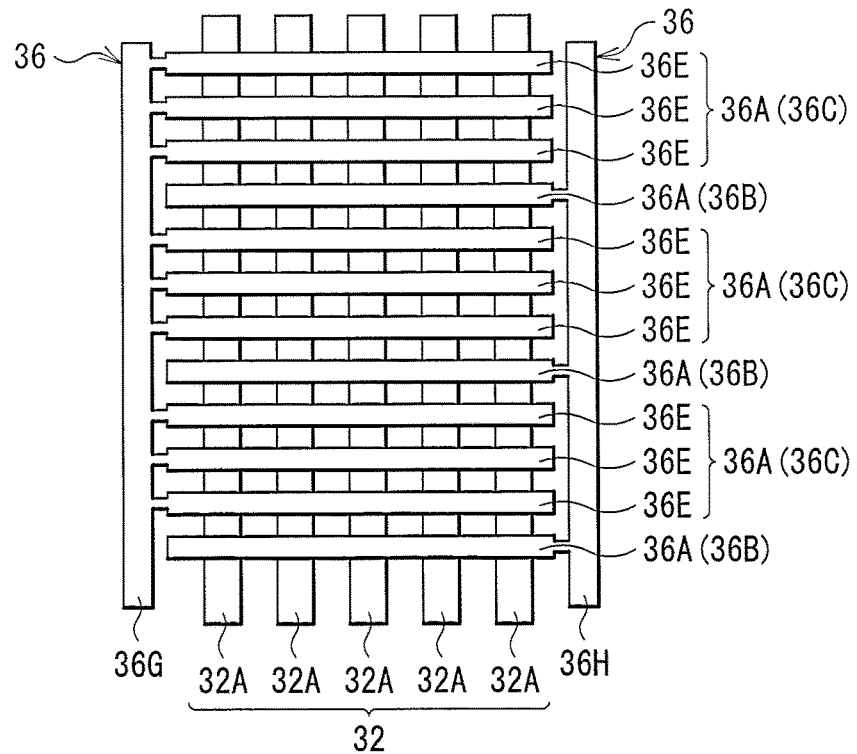
FIG. 71 is a plan view illustrating a fifteenth modification of the electrode structure in FIG. 4.
Figure 72:
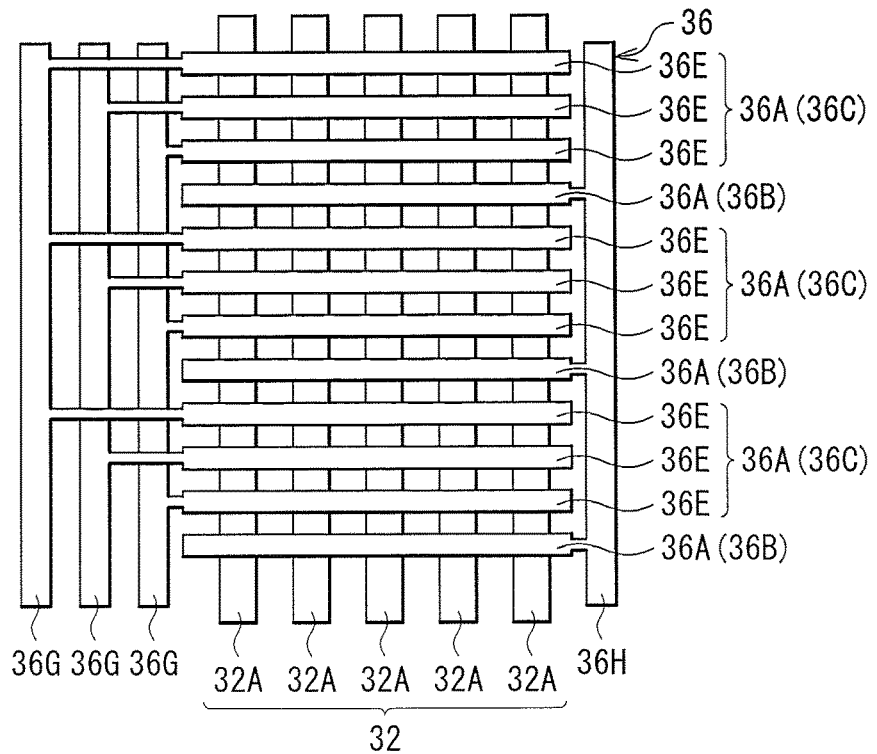
FIG. 72 is a plan view illustrating a sixteenth modification of the electrode structure in FIG. 4.
Figure 73:
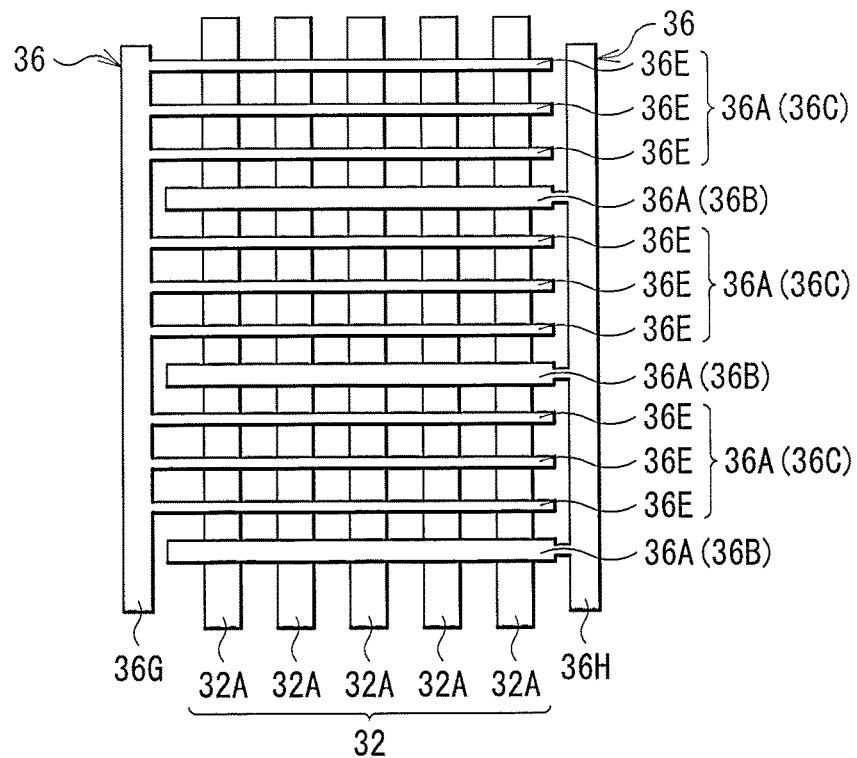
FIG. 73 is a plan view illustrating a seventeenth modification of the electrode structure in FIG. 4.
Figure 74:
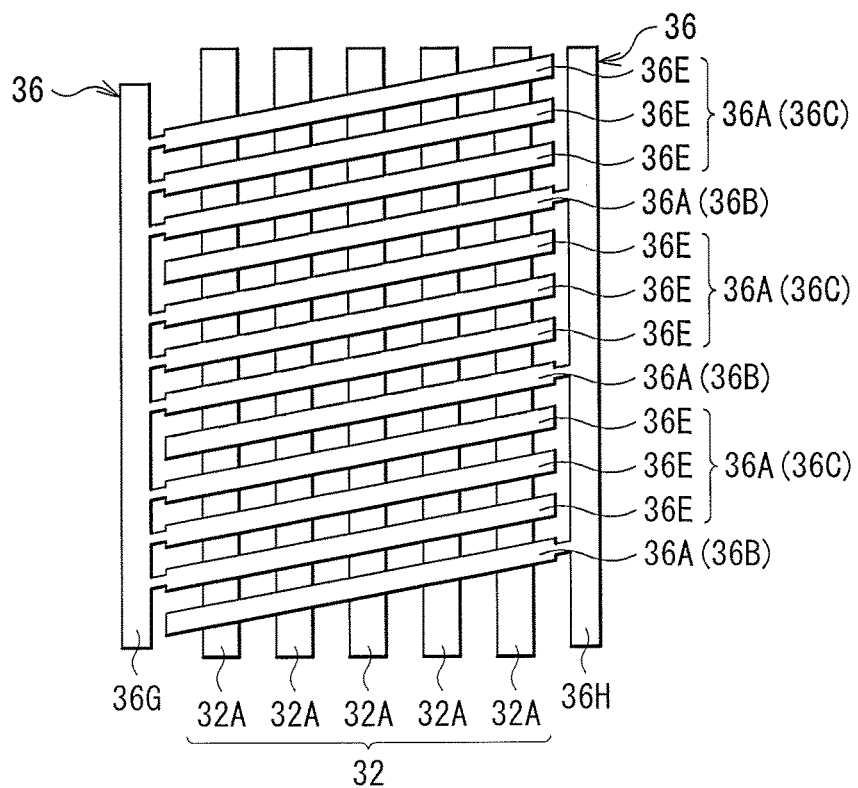
FIG. 74 is a plan view illustrating an eighteenth modification of the electrode structure in FIG. 4.

In the above-described modification 11, for example, as illustrated in FIG. 71, FIG. 72, and FIG. 73, the partial electrode 36C may be configured of the plurality of strip-shaped partial electrodes 36E extending in the direction orthogonal to the light incidence surface 10A. Likewise, in the above-described modification 12, for example, as illustrated in FIG. 74, FIG. 75, and FIG. 76, the partial electrode 36C may be configured of the plurality of strip-shaped partial electrodes 36E extending in the direction intersecting the light incidence surface 10A at an angle other than 90 degrees.

For example, as illustrated in FIG. 71, FIG. 73, FIG. 74, and FIG. 76, the respective partial electrodes 36E may be electrically connected to one another through a wiring 36G. Further, for example, as illustrated in FIG. 71, FIG. 73, FIG. 74, and FIG. 76, the respective partial electrodes 36B may be electrically connected to one another through a wiring 36H.

Figure 75:
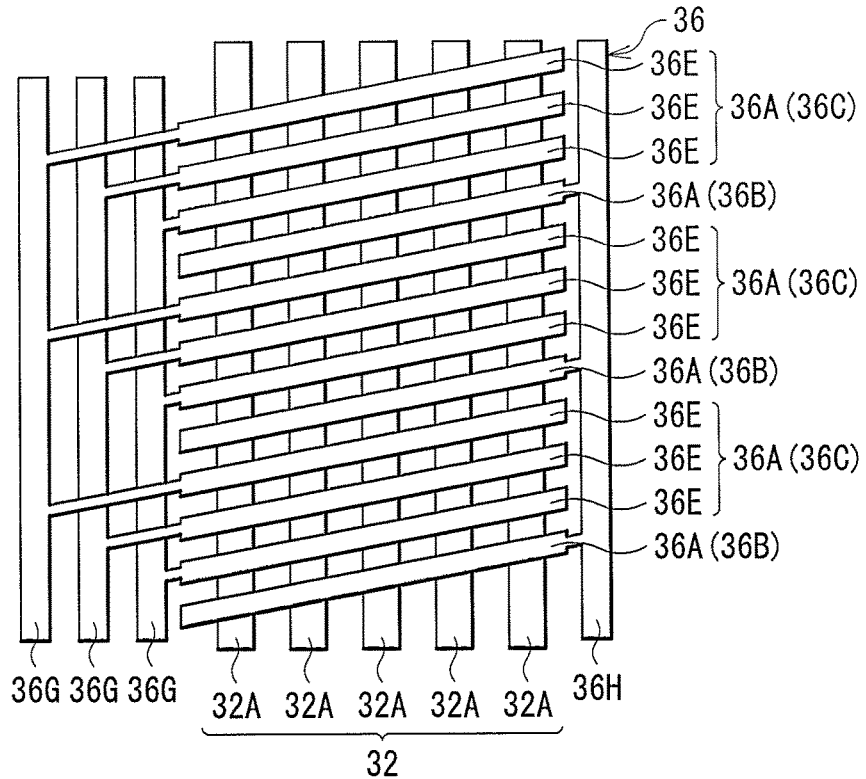
FIG. 75 is a plan view illustrating a nineteenth modification of the electrode structure in FIG. 4.
Figure 76:
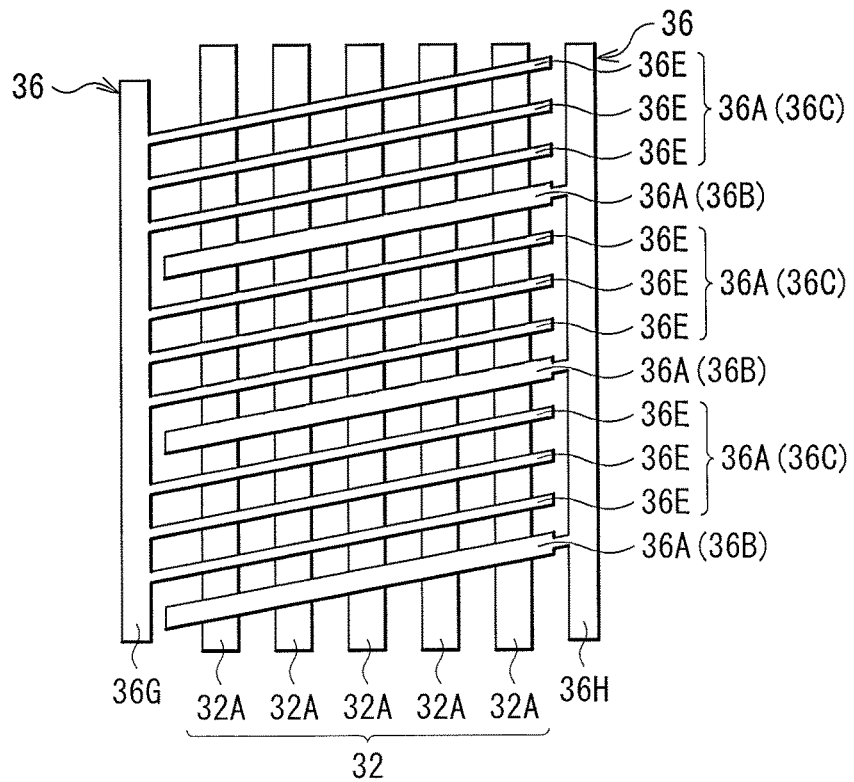
FIG. 76 is a plan view illustrating a twentieth modification of the electrode structure in FIG. 4.

Moreover, for example, as illustrated in FIG. 72 and FIG. 75, the partial electrodes 36E included in the respective partial electrodes 36C may be electrically separated from one another. At this time, for example, the partial electrodes 36E may be electrically connected, one by one, to wirings 36 that are electrically separated from one another. Further, for example, as illustrated in FIG. 72 and FIG. 75, the respective partial electrodes 36B may be electrically connected to one another through the wiring 36H.

For example, as illustrated in FIG. 71, FIG. 72, FIG. 74, and FIG. 75, the width of the partial electrode 36E may be equal to the width of the partial electrode 36B. In addition, for example, as illustrated in FIG. 73 and FIG. 76, the width of the partial electrode 36E may be smaller than the width of the partial electrode 36B.

In this case, when the width of the partial electrode 36E is smaller than the width of the partial electrode 36B, the area of the partial electrode 36E is smaller than the area of the partial electrode 36B by an amount of smaller width. Therefore, in the case where two-dimensional display is performed, when the drive circuit 50 applies a voltage of the same voltage value to the partial electrodes 36B and 36E to allow the sections of the light modulation layers 34 and 64 respectively facing the partial electrodes 36B and 36E to be the scattering regions 30B, the scattering intensity in proximity to the partial electrode 36E is weaker than the scattering intensity in proximity to the partial electrode 36B. As a result, when two-dimensional display is performed, luminance in proximity to the partial electrode 36E is lower than the luminance in proximity to the partial electrode 36B. In this way, when in-plane luminance has non-uniformity, the non-uniformity may be perceived. Therefore, the drive circuit 50 may preferably adjust the voltage value, the duty ratio, or the frequency of the voltage to be applied to the partial electrode 36B so that the in-plane luminance is uniform in two-dimensional display. For example, when two-dimensional display is performed, the drive circuit 50 may preferably apply, to the partial electrode 36B, a voltage having a voltage value smaller than the voltage value of the voltage to be applied to the partial electrode 36E. Moreover, for example, when two-dimensional display is performed, the drive circuit 50 may preferably apply, to the partial electrode 36B, a voltage having a duty ratio smaller than the duty ratio of the voltage to be applied to the partial electrode 36E. In addition, for example, when two-dimensional display is performed, the drive circuit 50 may preferably apply, to the partial electrode 36B, a voltage having a frequency smaller than the frequency of the voltage to be applied to the partial electrode 36E. In this case, to put the in-plane luminance closer to be uniform, the scattering intensity in proximity to the partial electrode 36B may be preferably X % of the scattering intensity in proximity to the partial electrode 36B when the width of the partial electrode 36E is X % of the width of the partial electrode 36B. Incidentally, for example, the scattering intensity in proximity to the partial electrode 36B may be adjustable by adjusting the voltage value, the duty ratio, or the frequency of the voltage to be applied to the partial electrode 36B.

Moreover, in the case where the partial electrodes 36A are grouped for each pitch corresponding to the pixel pitch for three-dimensional display on the display panel 210 and the number of groups (that is, the number of parallaxes in three-dimensional display) is denoted by n, the width of the partial electrode 36B may be preferably 1/n or slightly larger than 1/n of the width of the partial electrode 36B. At this time, when two-dimensional display is performed, for example, the drive circuit 50 may preferably apply a voltage of the same voltage value to the partial electrodes 36B and 36E, as well as the period where the voltage is applied to the partial electrode 36B may be preferably 1/n or slightly larger than 1/n of the period where the voltage is applied to the partial electrode 36E. In such a case, it is possible to put the in-plane luminance in two-dimensional display closer to be uniform.

Figure 77:
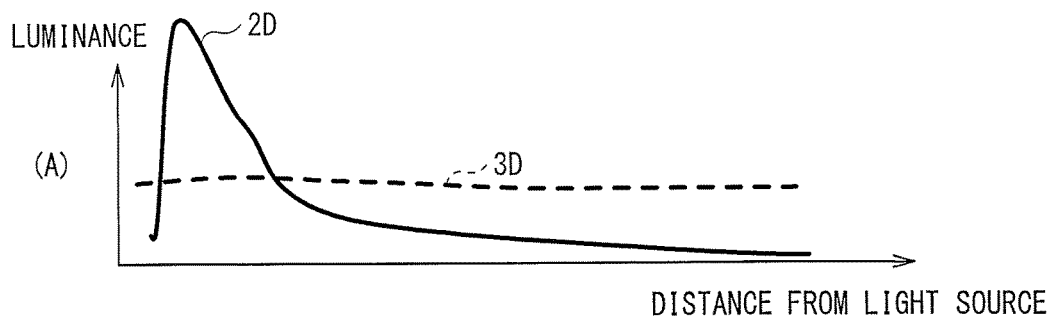
FIGS. 77A through 77D is a diagram illustrating an example of luminance distribution of each electrode structure.
Figure 77:
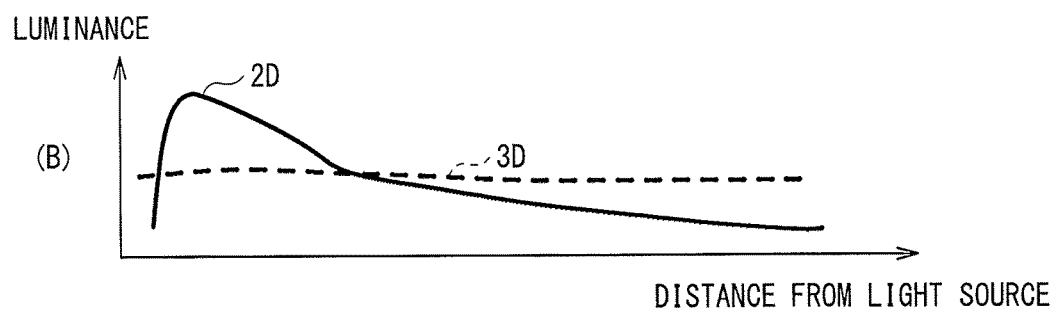
Figure 77:
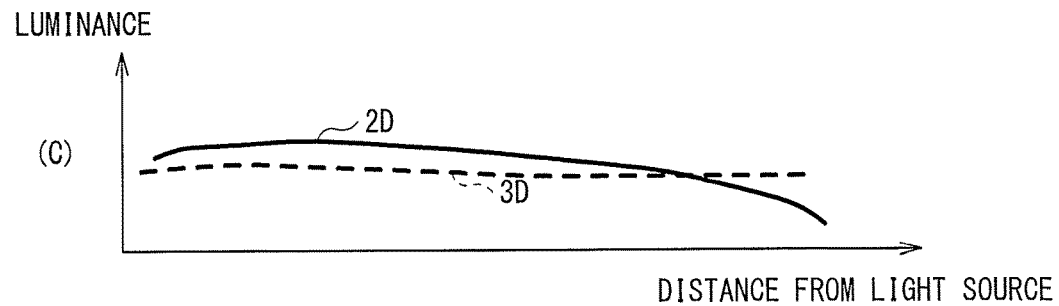
Figure 77:
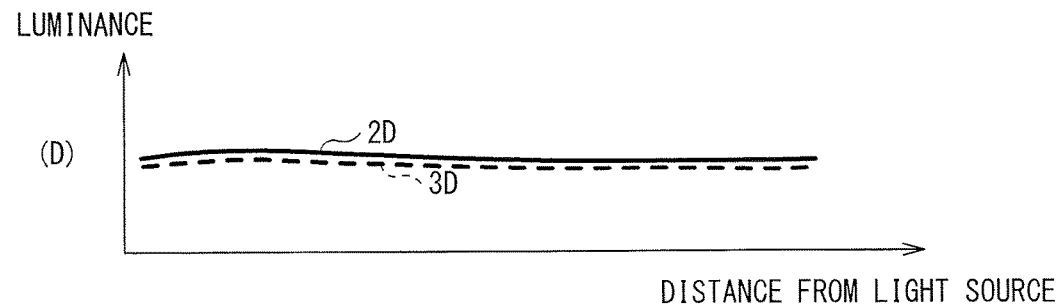

Next, relative uniformity of the in-plane luminance is described. (A) of FIG. 77 illustrates an example of a luminance distribution when the width of the partial electrode 36E and the width of the partial electrode 36B are equal to each other, as well as the drive circuit 50 applies the same voltage to the partial electrodes 36B and 36E. (B) of FIG. 77 illustrates an example of a luminance distribution when the width of the partial electrode 36E is smaller than the width of the partial electrode 36B, as well as the drive circuit 50 applies the same voltage to the partial electrodes 36B and 36E. (C) of FIG. 77 illustrates an example of a luminance distribution when the width of the partial electrode 36E is smaller than the width of the partial electrode 36B, as well as the period in which the drive circuit 50 applies the voltage to the partial electrode 36B is set shorter than the period in which the drive circuit 50 applies the voltage to the partial electrode 36E. (D) of FIG. 77 illustrates an example of a luminance distribution when the width of the partial electrode 36E is 1/n (where n is the number of parallaxes) of the width of the partial electrode 36B, as well as the period in which the drive circuit 50 applies the voltage to the partial electrode 36B is set 1/n of the period in which the drive circuit 50 applies the voltage to the partial electrode 36E.

In (A) of FIG. 77, since the scattering area in two-dimensional display is n times (where n is the number of parallaxes) the scattering area in three-dimensional display, a large amount of light is extracted on the light source 20 side. In (B) of FIG. 77, the in-plane luminance distribution in two-dimensional display is smoothed by the decreased amount of the width of the partial electrode 36E from the width of the partial electrode 36B. In (C) of FIG. 77, the in-plane luminance distribution in two-dimensional display is smoothed by the adjustment amount of the duty ratio of the applied voltage in addition to the electrode width. In (D) of FIG. 77, since the electrode width and the duty ratio of the applied voltage are optimized, in-plane luminance distribution in two-dimensional display is extremely uniform.

(Modification 14)

In the above-described respective embodiments and the modifications thereof, the lower electrode 32 and the upper electrode 36 each have a linear side section, however may each have a non-linear side section. For example, in each of the partial electrodes 36B and 36C, a side section of the partial electrode 36B adjacent to the partial electrode 36C may have an uneven shape. Likewise, in each of the partial electrodes 36B and 36C, a side section of the partial electrode 36C adjacent to the partial electrode 36B may have an uneven shape. Moreover, for example, in each of the partial electrodes 32B and 32C, a side section of the partial electrode 32B adjacent to the partial electrode 32C may have an uneven shape. Likewise, in each of the partial electrodes 32B and 32C, a side section of the partial electrode 32C adjacent to the partial electrode 32B may have an uneven shape.

Figure 78:
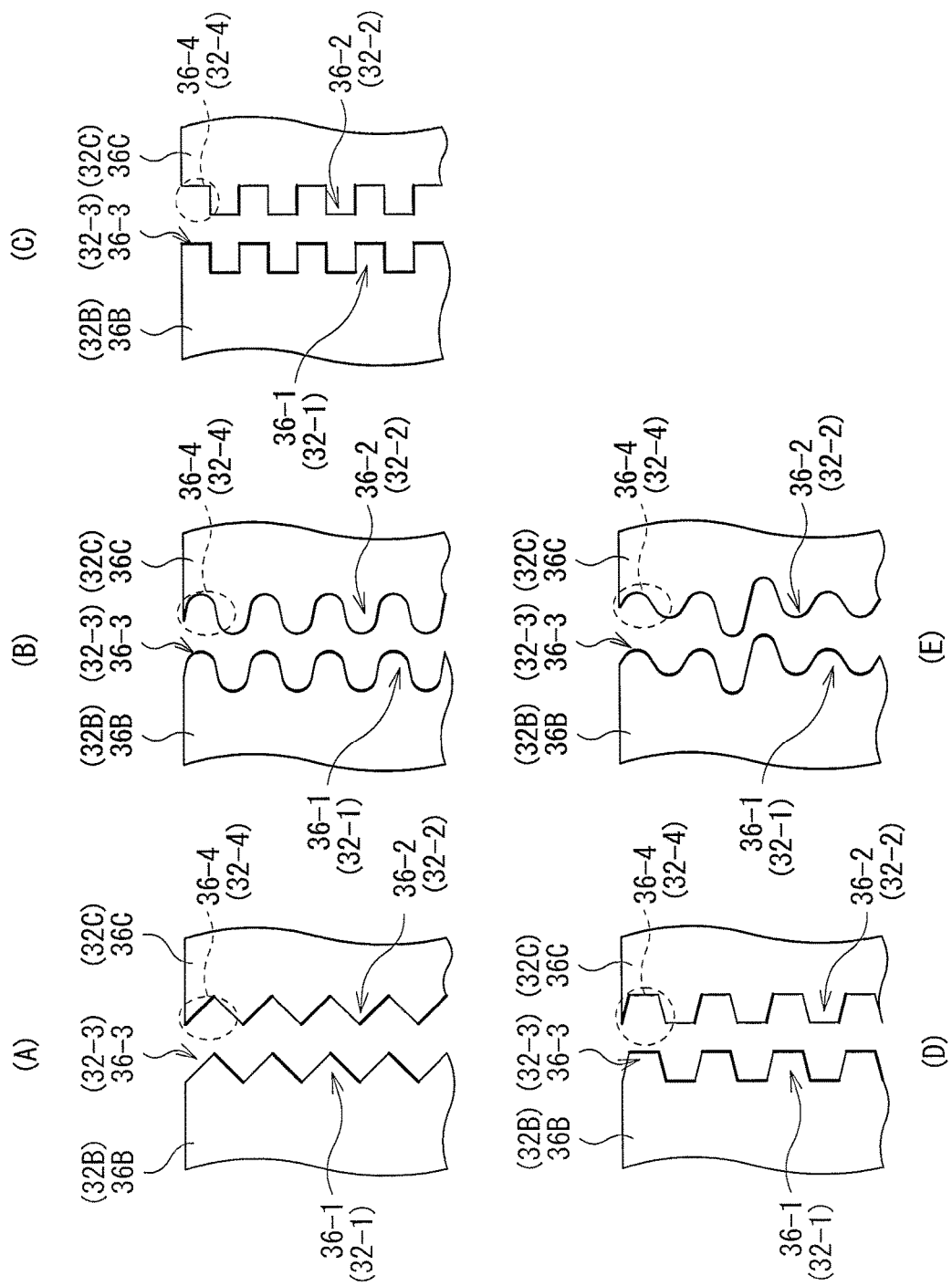
FIGS. 78A through 78E is a plan view illustrating a twenty-first modification of the electrode structure in FIG. 4.

The uneven shape formed in each of the partial electrodes 32B, 32C, 36B, and 36C may have a zigzag shape, a waveform shape, a ramp shape, a trapezoidal shape, or a random shape, for example, as illustrated in (A) to (E) of FIG. 78. Incidentally, in (A) to (E) of FIG. 78, 36B (32B) indicates 36B or 32B, and the same applies the other reference symbols.

The uneven shape of each of the partial electrodes 36B is configured of a plurality of convex sections 36-1 arranged along the side section, and the uneven shape of each of the partial electrodes 36C is configured of a plurality of convex sections 36-2 arranged along the side section. The plurality of convex sections 36-1 and the plurality of convex sections 36-2 may be alternately arranged, for example, as illustrated in (A) to (E) of FIG. 78. Likewise, the uneven shape of each of the partial electrodes 32B is configured of a plurality of convex sections 32-1 arranged along the side section, and the uneven shape of each of the partial electrodes 32C is configured of a plurality of convex sections 32-2 arranged along the side section. The plurality of convex sections 32-1 and the plurality of convex sections 32-2 may be alternately arranged, for example, as illustrated in (A) to (E) of FIG. 78.

The width of a clearance (a slit) between the side section provided with the uneven shape of each of the partial electrodes 36B and the side section provided with the uneven shape of each of the partial electrodes 36C is equal to or smaller than a predetermined width. Likewise, the width of a clearance (a slit) between the side section provided with the uneven shape of each of the partial electrodes 32B and the side section provided with the uneven shape of each of the partial electrodes 32C is equal to or smaller than a predetermined width. For example, as illustrated in (A) to (E) of FIG. 78, a front end 36-3 of each of the convex sections 36-1 may be provided outside a concave section 36-4 formed between two adjacent convex sections 36-2. Likewise, for example, as illustrated in (A) to (E) of FIG. 78, a front end 32-3 of each of the convex sections 32D may be provided outside a concave section 32-4 formed between two adjacent convex sections 32-3.

Figure 79:
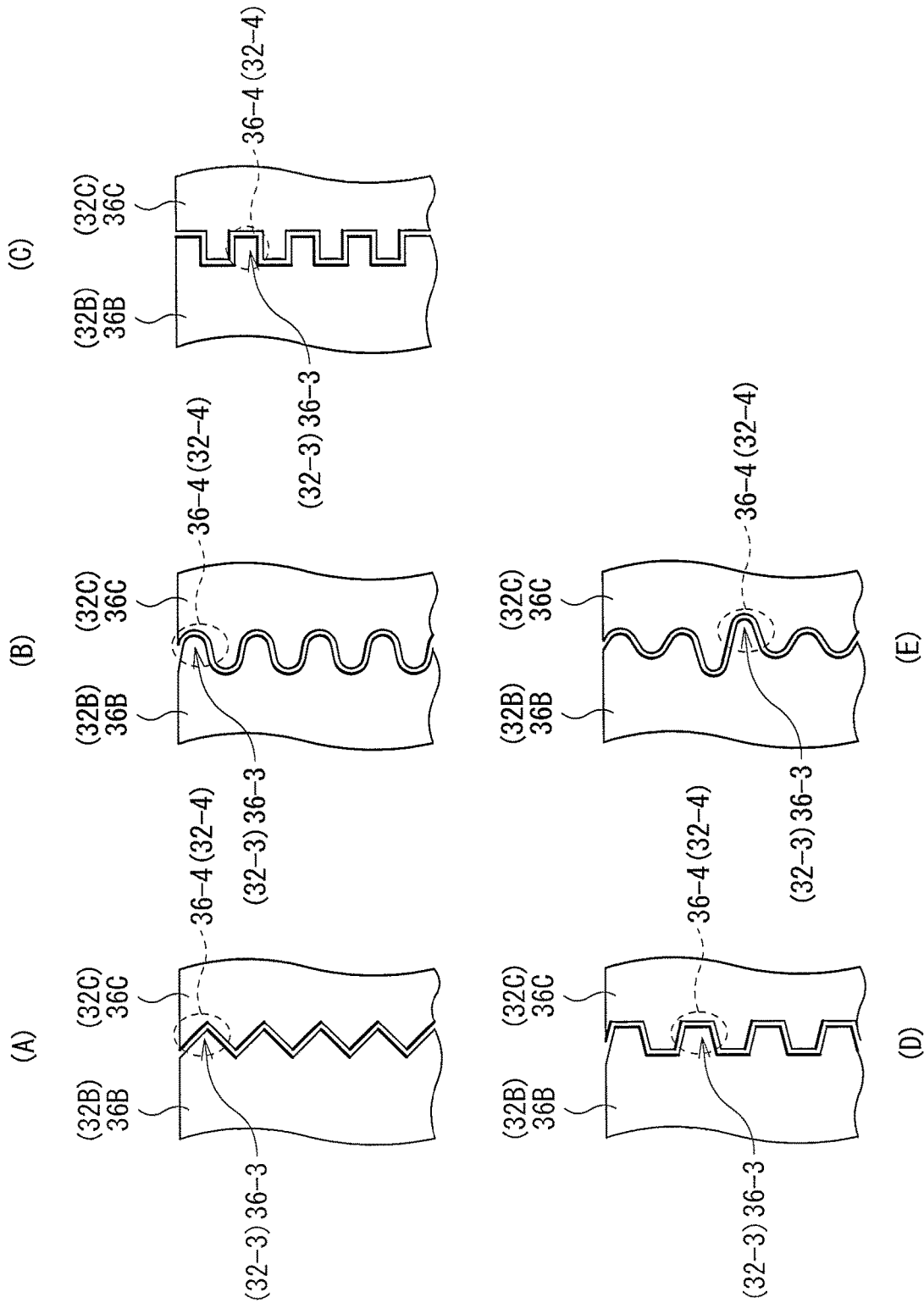
FIGS. 79A through 79E is a plan view illustrating a twenty-second modification of the electrode structure in FIG. 4.

Note that, for example, as illustrated in (A) to (E) of FIG. 79, the front end 36-3 of each of the convex sections 36-1 may be arranged in the concave section 36-4. Likewise, for example, as illustrated in (A) to (E) of FIG. 79, the front end 32-3 of each of the convex sections 32-1 may be arranged in the concave section 32-4. In the layout illustrated in (A) to (E) of FIG. 79, the width of the slit is allowed to be decreased as compared with that in the layout illustrated in (A) to (E) of FIG. 79.

Providing the uneven shape on the side section of the electrode enables blurring of the edge of luminance profile of the linear illumination light beam. However, when suppression in blurring of the edge of the luminance profile of the linear illumination light beam is desired, the width of the slit may be preferably as small as possible. On the other hand, when blurring in the edge of the luminance profile of the linear illumination light beam is desired positively, the width of the slit may not be preferably too small. When the edge of luminance profile of the linear illumination light beam is blurred, for example, it may be possible to eliminate abrupt change of display picture upon moving of a viewer (not illustrated).

Note that in each of the partial electrodes 36B and each of the partial electrodes 36C, the uneven shape does not necessarily have to be provided in both of side sections adjacent to each other, and the uneven shape may be provided in one of the side sections. Likewise, in each of the partial electrodes 32B and each of the partial electrode 32C, the uneven shape does not have to be provided in both of side sections adjacent to each other, and the uneven shape may be provided in one of the side sections.

(Modification 15)

In the above-described respective embodiments and the modifications thereof, patterning is not performed in the inside of the lower electrode 32 and the upper electrode 36. However, patterning may be performed in the inside of the lower electrode 32 or the inside of the upper electrode 36 or both. In this case, pattern density of the electrode subjected to patterning out of the lower electrode 32 and the upper electrode 36 may be varied depending on a distance from the light source 20.

Figure 80:
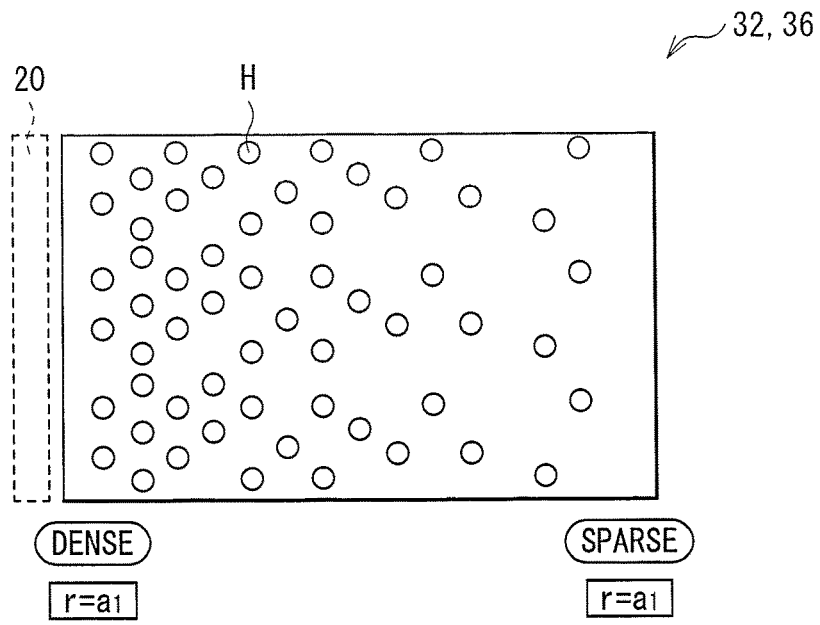
FIG. 80 is a plan view illustrating a twenty-third modification of the electrode structure in FIG. 4.
Figure 81:
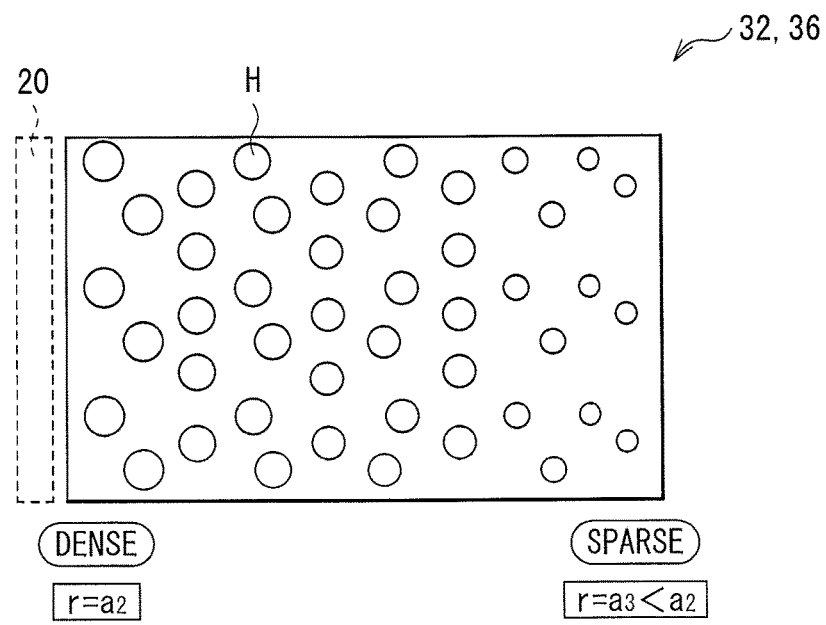
FIG. 81 is a plan view illustrating a twenty-fourth modification of the electrode structure in FIG. 4.

When the lower electrode 32 or the upper electrode 36 is configured of a planar electrode, for example, as illustrated in FIG. 80 and FIG. 81, a plurality of openings H may be provided in the lower electrode 32 or the upper electrode 36, and the density of the openings H to the entire upper electrode 36 or the entire lower electrode 32 may be varied depending on the distance from the light source 20 (the light incidence surface 10A). Incidentally, each of the lower electrode 32 and the upper electrode 36 may be a planar electrode having the plurality of openings H, and the density of the openings H may be varied depending on the distance from the light source 20 in both of the lower electrode 32 and the upper electrode 36. The shape of the opening H may be a circular shape as illustrated in FIG. 80 and FIG. 81, for example. Note that the shape of the opening H may be other shapes, for example, an elliptical shape, or a polygonal shape. In the example illustrated in FIG. 80, a diameter r of the opening H is fixed ($r=a_1$) irrespective of the distance from the light source 20, and the number of the openings H per unit area is gradually decreased with increasing distance from the light source 20. In addition, in the example illustrated in FIG. 81, the number of the openings H per unit area is fixed irrespective of the distance from the light source 20, and the diameter r of the opening H is gradually decreased with increasing distance from the light source 20. Incidentally, in FIG. 81, the case where the diameter r of the opening H located in proximity to the light source 20 is $a_2$, and the diameter r of the opening H located farthest from the light source 20 is $a_3$ ($<a_2$) is exemplified. Therefore, in any of the examples of FIG. 80 and FIG. 81, the density of the openings H (occupancy of the openings H per unit area) becomes more sparse (is gradually decreased) with increasing distance from the light source 20. In other words, the pattern density of the upper electrode 36 or the lower electrode 32 (occupancy of a region other than the openings H in the upper electrode 36 or the lower electrode 32 per unit area) becomes denser (is gradually increased) with increasing distance from the light source 20.

Figure 82:
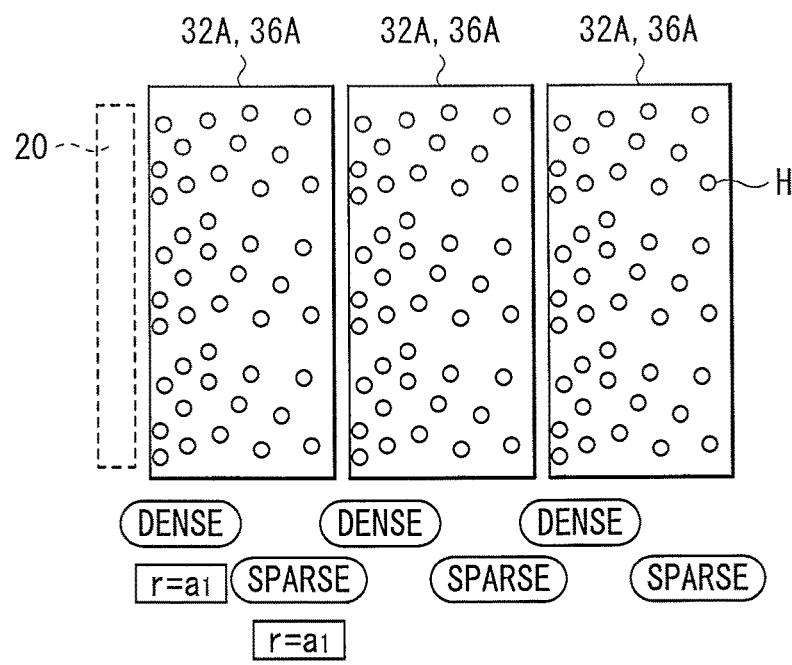
FIG. 82 is a plan view illustrating a twenty-fifth modification of the electrode structure in FIG. 4.
Figure 83:
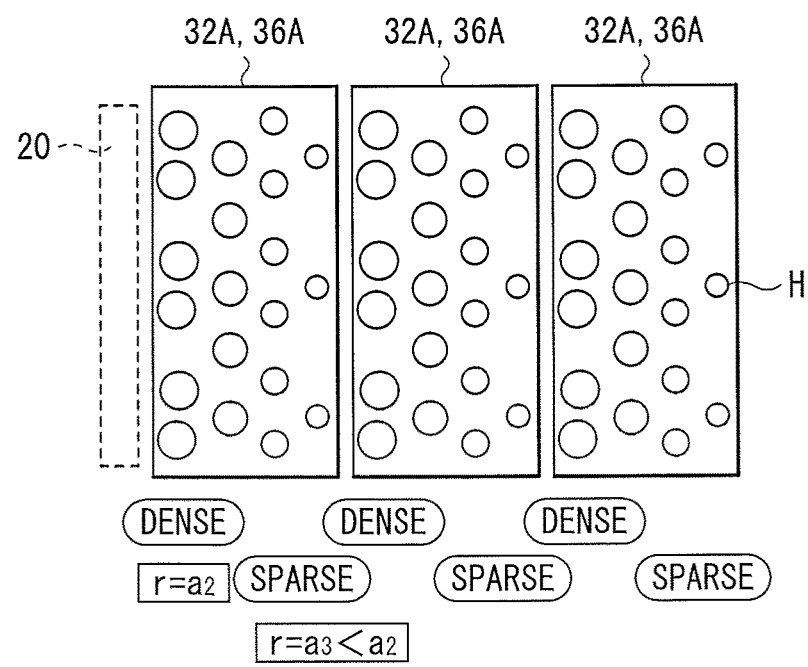
FIG. 83 is a plan view illustrating a twenty-sixth modification of the electrode structure in FIG. 4.

When the lower electrode 32 or the upper electrode 36 is configured of the plurality of partial electrodes, for example, as illustrated in FIG. 82 and FIG. 83, the plurality of openings H are provided in the partial electrode 32A or 36A, and the density of the openings H is varied depending on the distance from the light source 20 (the light incidence surface 10A) for each of the partial electrodes 32A and 36A. As for each of the partial electrodes 32A and 36A, the density of the openings H may be varied depending on the distance from the light source 20, or may be fixed irrespective of the distance from the light source 20. Incidentally, each of the partial electrodes 32A and 36A may have the plurality of openings H, and the density of the openings H in each of the partial electrodes 32A and 36A may be varied depending on the distance from the light source 20 for each of the partial electrodes 32A and 36A. The shape of the opening H may have other shapes, for example, an elliptical shape, or a polygonal shape. In the example illustrated in FIG. 82, the diameter r of the opening H is fixed ($r=a_1$) irrespective of the distance from the light source 20, and the number of the openings H per unit area is gradually decreased with increasing distance from the light source 20. In addition, in the example illustrated in FIG. 83, the number of the openings H per unit area is fixed irrespective of the distance from the light source 20, and the diameter r of the opening H is gradually decreased with increasing distance from the light source 20. Incidentally, in FIG. 83, the case where the diameter r of the opening H located in proximity to the light source 20 is $a_2$, and the diameter r of the opening H located farthest from the light source 20 is $a_3$ ($<a_2$) is exemplified. Therefore, in any of the examples of FIG. 82 and FIG. 83, the density of the openings H (the occupancy of the openings H per unit area) becomes more sparse (is gradually decreased) with increasing distance from the light source 20. In other words, the pattern density of the partial electrodes 32A and 36A (occupancy of a region other than the openings H in the partial electrodes 32A and 36A per unit area) becomes denser (is gradually increased) with increasing distance from the light source 20.

In the present modification, patterning is performed on the inside of the lower electrode 32 or the inside of the upper electrode 36 or both. Further, the pattern density of the electrode subjected to the patterning out of the lower electrode 32 and the upper electrode 36 is varied with respect to the entire electrode depending on the distance from the light source 20. Therefore, the density distribution of the transmissive region 30A and the scattering region 30B in the light emission region is allowed to be a predetermined distribution. Accordingly, the luminance in a region on the light source 20 side, of the light emission region of the backlight 211 is allowed to be suppressed lower than that in the case where the light modulation devices 30 and 60 are not provided, and the luminance in a region distant from the light source 20, of the light emission region of the backlight 211 is allowed to be enhanced as compared with the case where the light modulation devices 30 and 60 are not provided. As a result, for example, not only in the case where the entire light emission region of the backlight 211 is put in a dark state, but also in the case where the entire light emission region of the backlight 211 is put in a bright state, in-plane luminance is allowed to be uniformized. Therefore, for example, when white display is performed in the region located in proximity to the light source 20 and in the region located distant from the light source 20, white luminance of both regions are allowed to be equal to each other. Moreover, for example, when black display is performed in a region closer to the light source 20 than the region where white display is performed and in a region farther from the light source 20 than the region where white display is performed, black luminance in the regions are allowed to be equal to each other. As described above, in the present modification, it is possible to increase modulation ratio while uniformizing the in-plane luminance.

Further, in the present modification, a design example and a calculation example of patterning density distribution are illustrated. For example, one of the lower electrode 32 and the upper electrode 36 may have a patterning density distribution represented by A in FIG. 84. Note that B of FIG. 84 represents a pattern density distribution when patterning depending on the distance from the light source 20 is not performed on the lower electrode 32 and the upper electrode 36.

Figure 84:
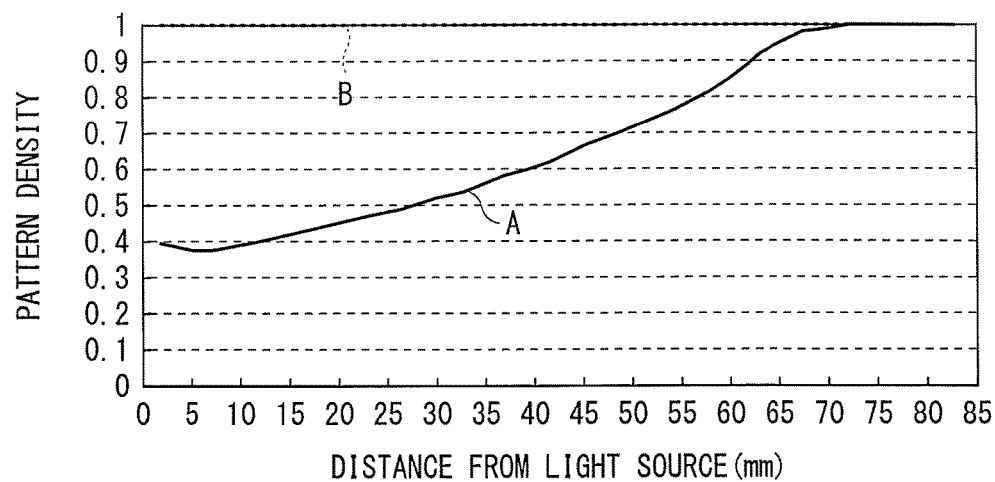
FIG. 84 is a diagram illustrating an example of pattern density distribution in the electrode structure in FIG. 80 to FIG. 83.
Figure 85:
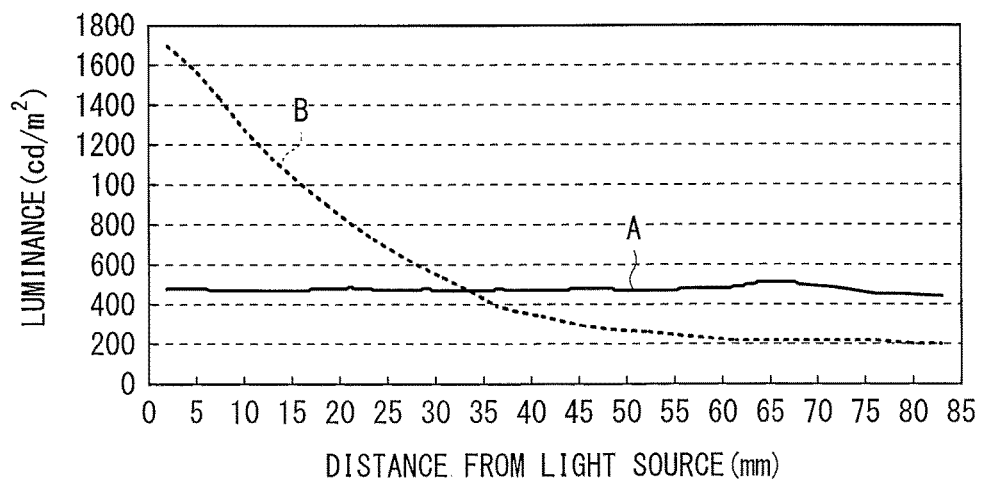
FIG. 85 is a diagram illustrating an example of luminance distribution when an electrode having the pattern density of FIG. 84 is used.

When one of the lower electrode 32 and the upper electrode 36 has the patterning density distribution represented by A in FIG. 84, it is possible to uniformize the in-plane luminance of the backlight 211 as represented by A in FIG. 85. Note that B in FIG. 85 represents the in-plane luminance distribution when patterning depending on the distance from the light source 20 is not performed on the lower electrode 32 and the upper electrode 36.

(Modification 16)

In the above-described respective embodiments and the modifications thereof, when three-dimensional display or two-dimensional display is performed, the drive circuit 50 may apply the same voltage to the partial electrodes 36A irrespective of the distance from the light source 20, or may apply a voltage corresponding to the distance from the light source 20 to the partial electrodes 36A. Likewise, in the above-described respective embodiments and the modifications thereof, when three-dimensional display or two-dimensional display is performed, the drive circuit 50 may apply the same voltage to the partial electrodes 32A irrespective of the distance from the light source 20, or may apply a voltage corresponding to the distance from the light source 20 to the partial electrodes 32A.

As described above, in the case where the voltage corresponding to the distance from the light source 20 is applied to the partial electrodes 36A or the partial electrodes 32A, when illumination light allowing the entire top surface of the backlight 211 to be at white luminance is output, the scattering in the light modulation layers 34 and 64 is allowed to be weak in a region close to the light source 20 and to be strong in a region far from the light source 20. As a result, uniform luminance distribution on the entire top surface of the backlight 211 is obtainable. Moreover, as described above, in the case where a voltage corresponding to the distance from the light source 20 is applied to the partial electrodes 36A or the partial electrodes 32A, when illumination light allowing only a part of the top surface of the backlight 211 to be at white luminance is output, it is possible to reduce the possibility that a difference in intensity of white luminance may occur between the section to be at white luminance being close to the light source 20 and the section to be at white luminance being distant from the light source 20. Further, it is possible to enhance luminance (to achieve luminance enhancement) as compared with the case where illumination light allowing the entire top surface of the backlight 211 to be at white luminance is output. Furthermore, it is possible to save energy by reducing light amount of the light source 20 using luminance enhancement.

Note that the drive circuit 50 may apply a voltage having a frequency, a voltage value, or a duty ratio corresponding to the distance from the light source 20, to the partial electrodes 36A or the partial electrodes 32A when applying a voltage corresponding to the distance from the light source 20. In addition, the drive circuit 50 may apply a voltage in which one or more of the frequency, the voltage value, and the duty ratio are modulated corresponding to the distance from the light source 20, to the partial electrodes 36A or the partial electrodes 32A when applying a voltage corresponding to the distance from the light source 20.

(Modification 17)

In the above-described respective embodiments and the modifications thereof, for example, each of the partial electrodes 36A may be configured of a plurality of microelectrodes. Likewise, each of the partial electrodes 32A may be configured of a plurality of microelectrodes.

(Modification 18)

Figure 86:
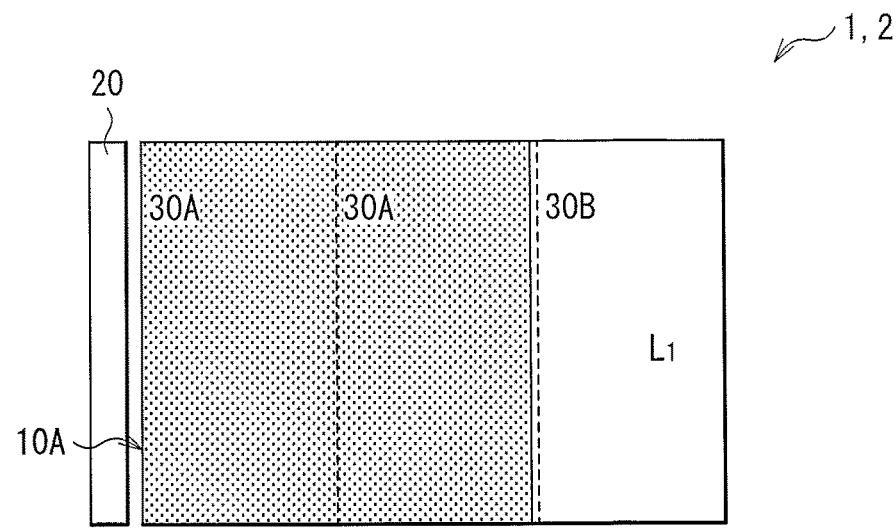
FIG. 86 is a schematic diagram for explaining an example of a function of a light modulation device having the electrode structure in any of FIG. 80 to FIG. 83.
Figure 87:
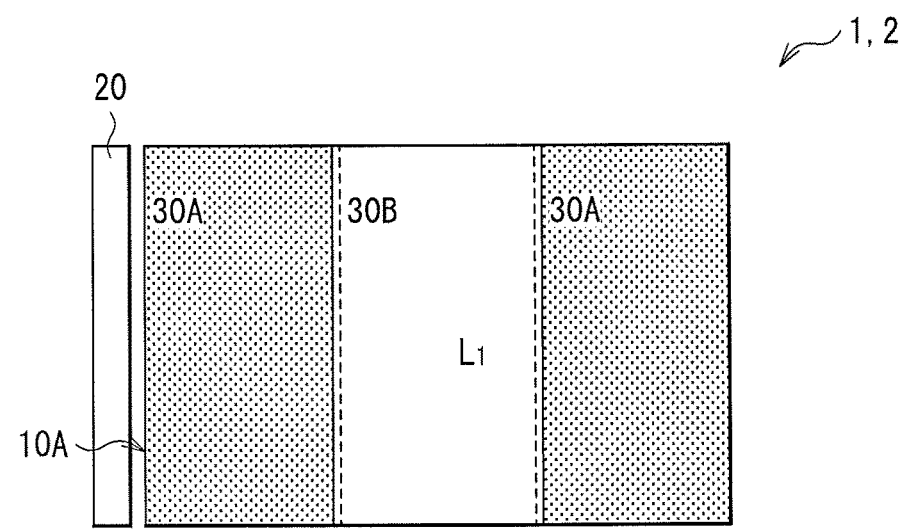
FIG. 87 is a schematic diagram for explaining another example of the function of the light modulation device having the electrode structure in any of FIG. 80 to FIG. 83.
Figure 88:
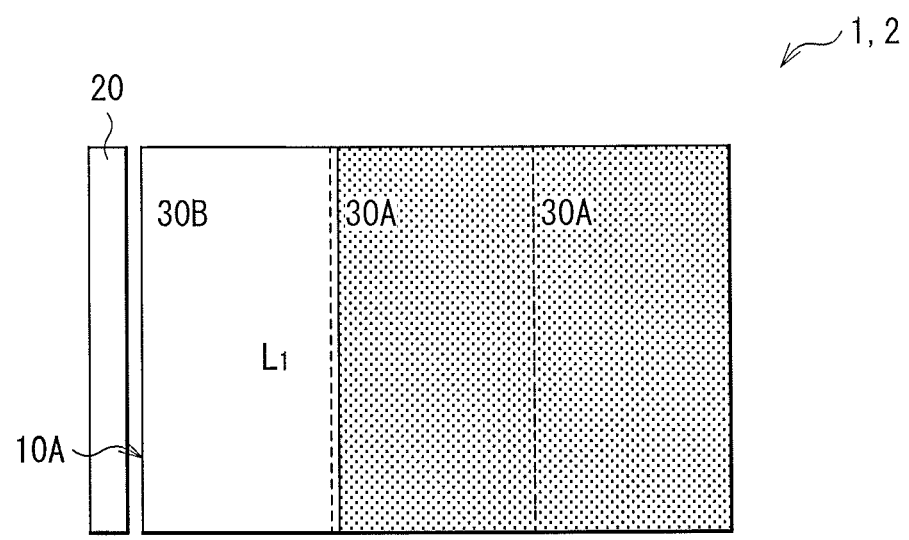
FIG. 88 is a schematic diagram for explaining still another example of the function of the light modulation device having the electrode structure in any of FIG. 80 to FIG. 83.

In the above-described respective embodiments and the modifications thereof, the drive circuit 50 may apply a voltage to the lower electrode 32 and the upper electrode 36 so as to scan the scattering region 30B in the direction orthogonal to the light incidence surface 10A. For example, as illustrated in FIG. 86, FIG. 87, and FIG. 88 in order, the drive circuit 50 may sequentially drive the plurality of partial electrodes 32A or the plurality of partial electrodes 36A on a predetermined unit basis (for example, one by one) to allow the scattering region 30B to transit toward the light source 20 side or to transit in a direction getting away from the light source 20. Note that, when the drive circuit 50 sequentially drives the plurality of partial electrodes 32A or the plurality of partial electrodes 36A multiple at a time, the frequency, the voltage value, or the duty ratio of the voltage to be applied to the bundle of partial electrodes 32A or the bundle of partial electrodes 36A may be varied depending on the distance from the light source 20.

In this case, the drive circuit 50 may preferably perform scanning of the plurality of partial electrodes 32A or the plurality of partial electrodes 36A in synchronization with scanning of the pixels in the display panel 210. In such a case, it is possible to perform display with high luminance and improved moving-picture responsiveness (suppressed blur). In addition, the scattering region 30B is scanned in the direction orthogonal to the light incidence surface 10A so that the light emitted from the top surface of the illumination unit 1 or 2 is scanned in the direction orthogonal to the light incidence surface 10A. At this time, the light emitted from the light source 20 is hardly scattered in the transparent region 30A. Therefore, light leakage from the transparent region 30A hardly occurs. Accordingly, the light emitted from the light source 20 is guided from the transparent region 30A to the scattering region 30B, and therefore, it is possible to obtain high luminance as compared with a typical method in which the light source 20 is partially turned on and the turned-on region is scanned (scan-driven).

(Modification 19)

Figure 89:
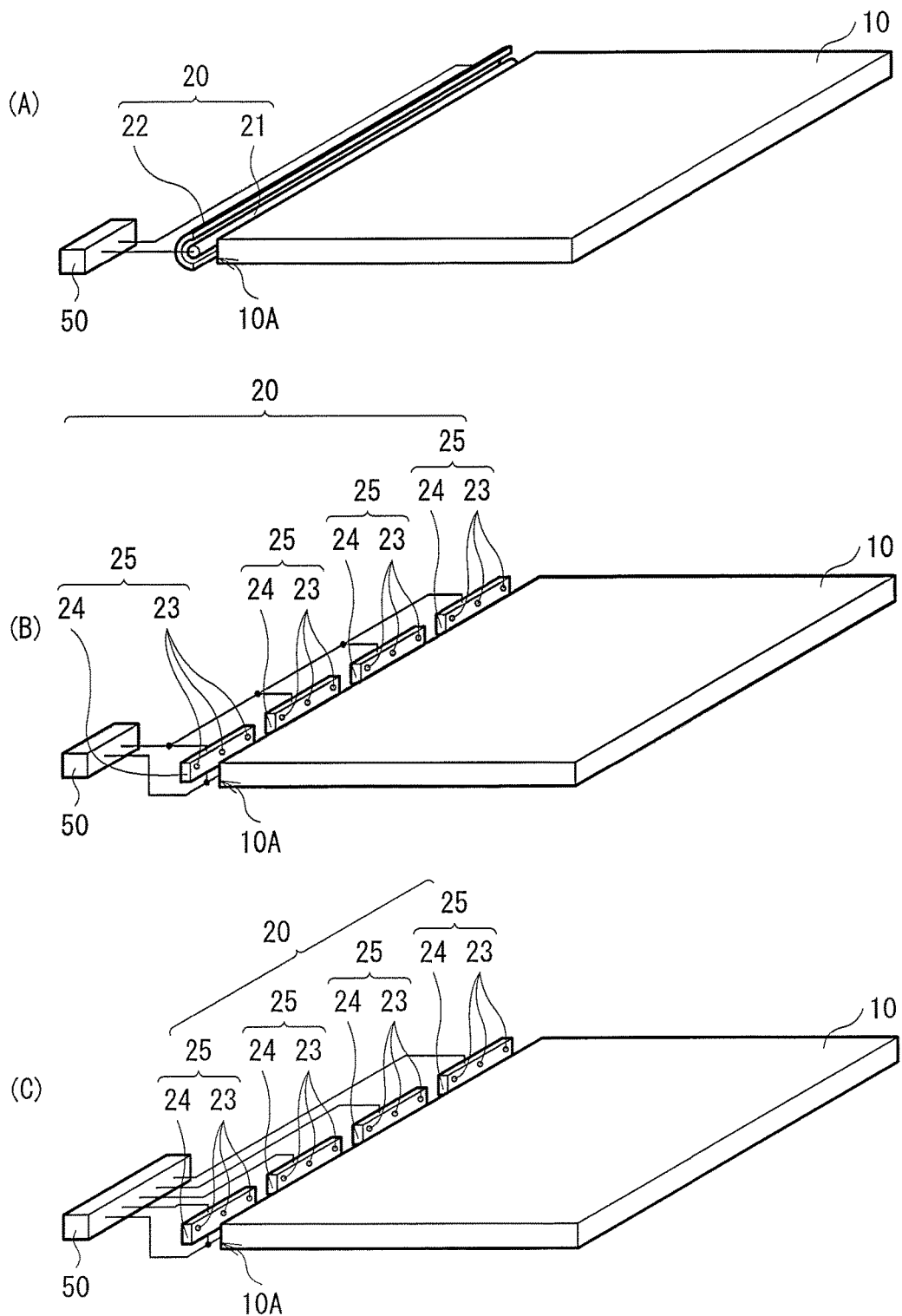
FIGS. 89A through 89C is a perspective view illustrating an example of a configuration of the light source according to any of the embodiments.

In the above-described respective embodiments and the modifications thereof, for example, as illustrated in (A) of FIG. 89, the light source 20 may be configured of a linear light source 21 and a reflective mirror 22. For example, the linear light source 21 may be configured of HCFL or CCFL. The reflective mirror 22 reflects, toward the light incidence surface 10A, light traveling toward the direction not directly entering the light incidence surface 10A, of the light emitted from the linear light source 21. For example, as illustrated in (B) or (C) of FIG. 89, the light source 20 may be configured by arranging a plurality of point light sources 23 in line. Each of the point light sources 23 emits light toward the light incident surface 10A, and may be configured of, for example, a light emitting device having an emission spot on a surface facing the light incident surface 10A. Examples of such a light emitting device may include an LED and a laser diode (LD). In terms of efficiency, thickness reduction, and uniformity, each of the point light sources 23 may be preferably a white LED. Note that the plurality of point light sources 23 included in the light source 20 may include, for example, red LEDs, green LEDs, and blue LEDs.

For example, as illustrated in (B) and (C) of FIG. 89, the plurality of point light sources 23 may be provided two by two or more on respective common substrates 24. In this case, a light source block 25 is configured of one substrate 24 and the plurality of point light sources 23 provided on the substrate 24. For example, the substrate 24 may be a circuit board provided with a wiring that electrically connects the point light sources 23 to the drive circuit 50, and each of the point light sources 23 is mounted on the circuit board. The respective point light sources 23 provided on the common substrate 24 (the respective point light sources 23 in the light source block 25) are collectively (non-independently) driven by the drive circuit 50, and for example, although not illustrated, may be connected to one another in parallel or in series. In addition, the point light sources 23 provided on different substrates 24 (the point light sources 23 in the respective light source blocks 25) may be independently driven by the drive circuit 50. At this time, for example, as illustrated in (C) of FIG. 89, the point light sources 23 provided on the different substrates 24 (the point light sources 23 in the respective light source blocks 25) may be connected to different current paths.

As illustrated in (A) to (C) of FIG. 89, the light source 20 may be provided on one side surface of the light guide plate 10, or although not illustrated, may be provided on two side surfaces, three side surfaces, or all side surfaces of the light guide plate 10. In addition, in the case where the light source 20 is provided on three side surfaces or all side surfaces, the light sources 20 provided on two side surfaces opposing to each other may be turned on only when partial lighting is performed, and all of the light sources 20 may be turned on when the entire surface lighting is performed.

(Modification 20)

Figure 90:
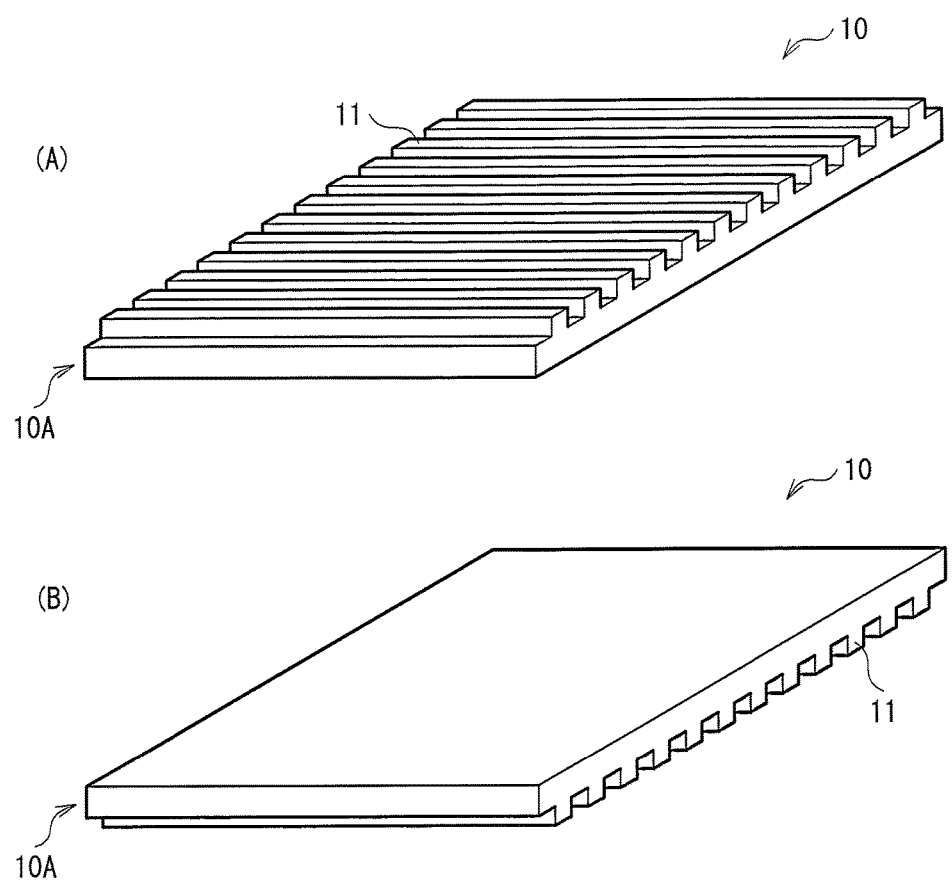
FIGS. 90A and 90B is a perspective view illustrating an example of a configuration of a light guide plate according to any of the embodiments.

In the above-described respective embodiments and the modifications thereof, for example, as illustrated in (A) of FIG. 90, the light guide plate 10 may include a plurality of strip-shaped projections 11 on the top surface thereof. Incidentally, for example, as illustrated in (B) of FIG. 90, the light guide plate 10 may include the plurality of strip-shaped projections 11 on the bottom surface thereof. In addition, although not illustrated, for example, the light guide plate 10 may include the plurality of strip-shaped projections 11 in the light guide plate 10. Moreover, the inside of the light guide plate may be hollow or may be densely packed.

The projections 11 each extend in the direction parallel to the normal of the light incidence surface 10A, and for example, as illustrated in (A) and (B) of FIG. 90, the projections 11 may be formed successively from one side surface of the light guide plate 10 to the other side surface facing that side surface. A cross-sectional surface in an arrangement direction of each of the projections 11 may have, for example, a rectangular shape, a trapezoidal shape, or a triangular shape. When the cross-sectional surface in the arrangement direction of each of the projections 11 has a rectangular shape, a rectilinear propagation property of light is extremely high, and the light guide plate 10 having such projections 11 is suitable for a large-scale backlight. When the cross-sectional surface in the arrangement direction of each of the projections 11 has a trapezoidal shape, processing of a die used to form each of the projections 11 by injection molding, extrusion molding, heat-press molding, or the like is easy, and mold releasability in molding is high, and yields and molding speed are allowed to be improved due to a reduction in errors.

Figure 91:
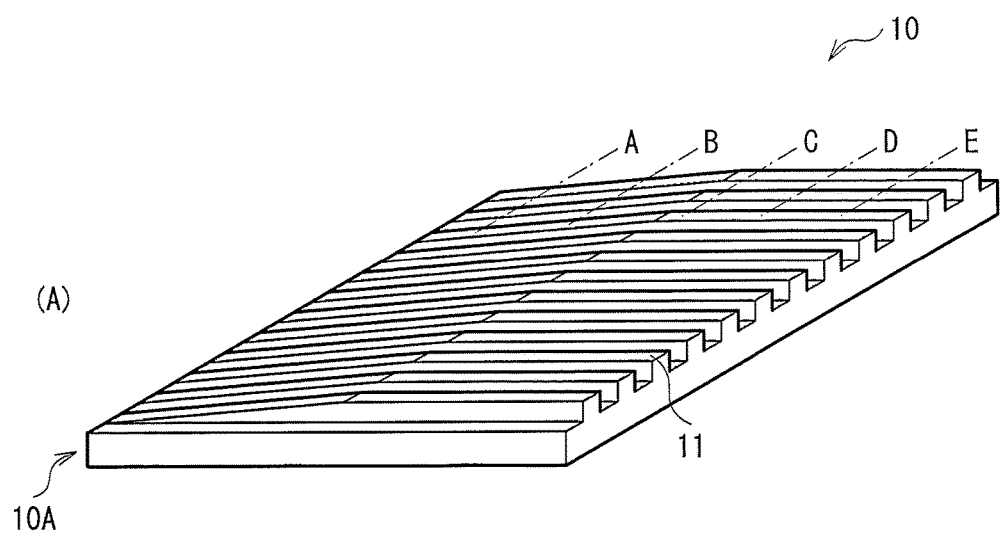
FIGS. 91A and 91B is a perspective view and a sectional diagram each illustrating another example of the configuration of the light guide plate according to any of the embodiments.
Figure 91:
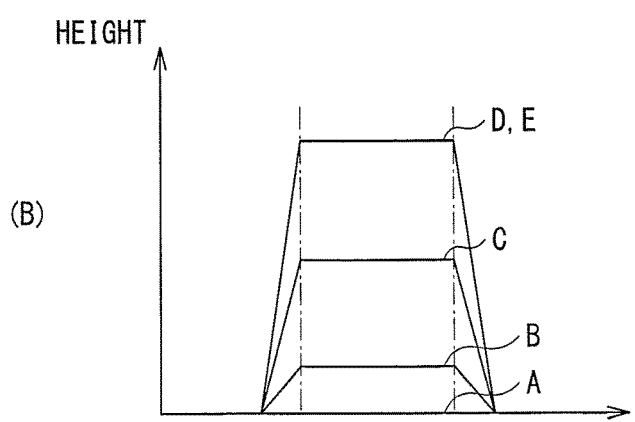

A flat surface may or may not be disposed between adjacent projections 11. The height of each of the projections 11 may be uniform or nonuniform in a plane. For example, as illustrated in (A) and (B) of FIG. 91, when one side surface of the light guide plate 10 is the light incidence surface 10A, the height of each of the projections 11 may be relatively smaller on the light incidence surface 10A side, and relatively higher on a side surface side facing the light incident surface 10A. Moreover, for example, when a pair of facing side surfaces among the side surfaces of the light guide plate 10 are light incident surfaces 10A, the height of each of the projections 11 may be relatively lower at and in proximity to both of the light incident surfaces 10A, and is relatively higher in other regions. The height at and in proximity to the light incident surface 10A of each of the projections 11 may be zero or substantially zero. For example, as illustrated in (A) and (B) of FIG. 91, the height of each of the projections 11 may be increased from the light incident surface 10A side with increasing distance from the light incident surface 10A. At this time, the height of each of the projections 11 may be uniform in a midway from the light incident surface 10A to the side surface side facing the light incident surface 10A. Incidentally, a plurality of projections 11 with nonuniform height as illustrated in (A) of FIG. 91 may be disposed in a region other than the top surface of the light guide plate 10, and, for example, may be disposed on the bottom surface of the light guide plate 10 or in the light guide plate 10.

Figure 92:
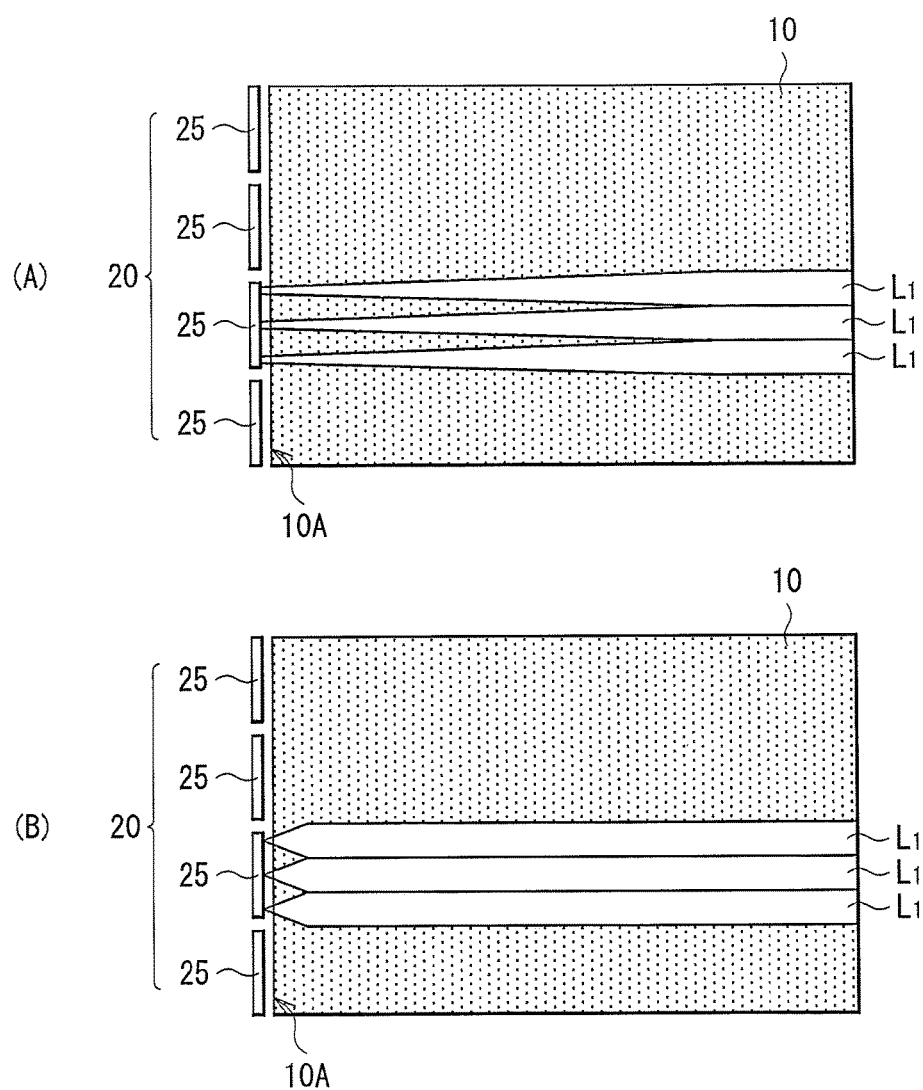
FIGS. 92A and 92B is a schematic diagram illustrating an example of a function of the light guide plate in FIG. 90 or FIG. 91.

As described above, varying the height of each of the projections 11 (in other words, varying the depth of a groove formed between the projections 11) enables varying the rectilinear propagation property of light. For example, as illustrated in (A) and (B) of FIG. 90, in the case where the projections 11 are disposed on and in proximity to the light incident surface 10A, when one light source block 25 is turned on, for example, as illustrated in (A) of FIG. 92, light L1 emitted from the light source block 25 propagates through the light guide plate 10 while not spreading too much in a lateral direction (a width direction). In this case, a dark region may be generated between the point light sources 23 in proximity to the light incident surface 10A, and in this case, image quality may be degraded. Therefore, in such a case, for example, as illustrated in (A) and (B) of FIG. 91, the height of each of the projections 11 may be preferably set to be relatively low or zero at and in proximity to the light incident surface 10A. In doing this way, for example, as illustrated in (B) of FIG. 92, the light L1 emitted from the light source block 23 is allowed to be spread in the lateral direction (the width direction) at a divergent angle of the point light source 23 at and in proximity to the light incident surface 10A, and therefore, the light L1 is allowed to propagate with a substantially uniform width in a region distant from the light incident surface 10A.

(Modification 21)

Figure 93:
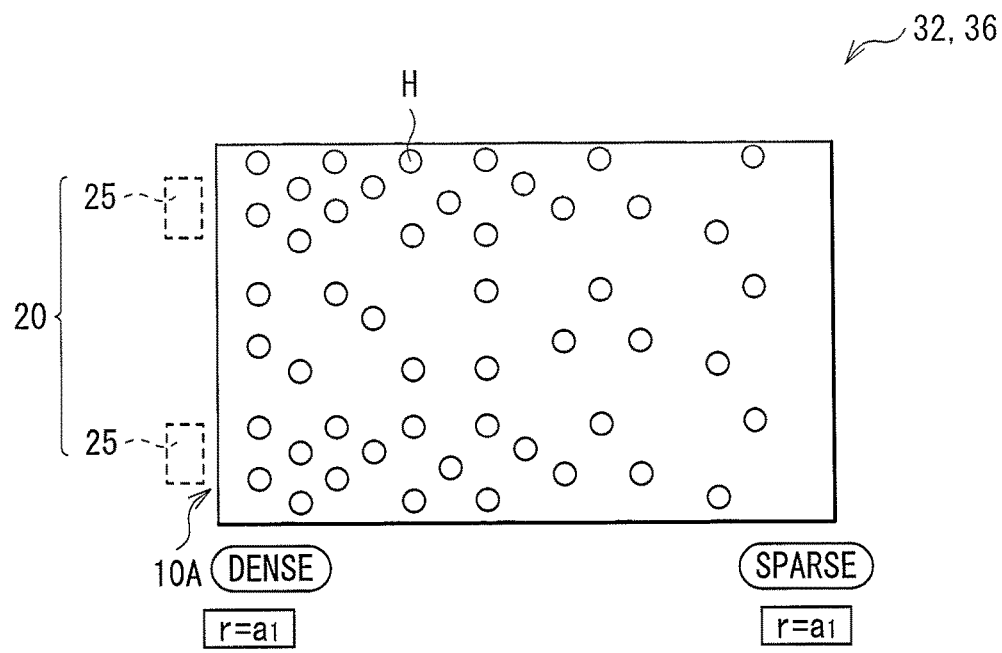
FIG. 93 is a plan view illustrating a twenty-seventh modification of the electrode structure in FIG. 4.
Figure 94:
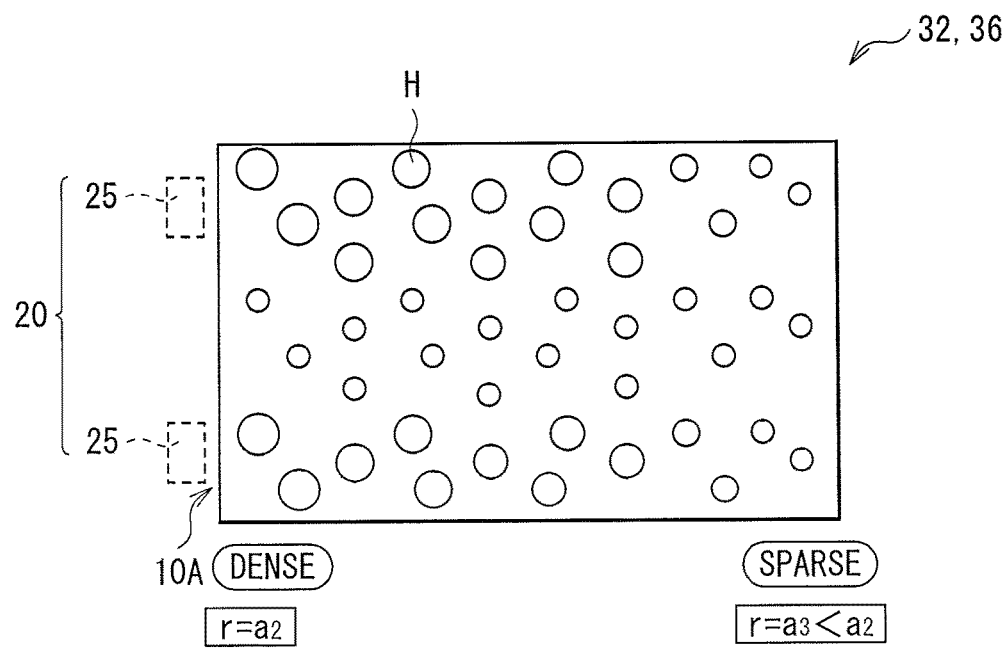
FIG. 94 is a plan view illustrating a twenty-eighth modification of the electrode structure in FIG. 4.
Figure 95:
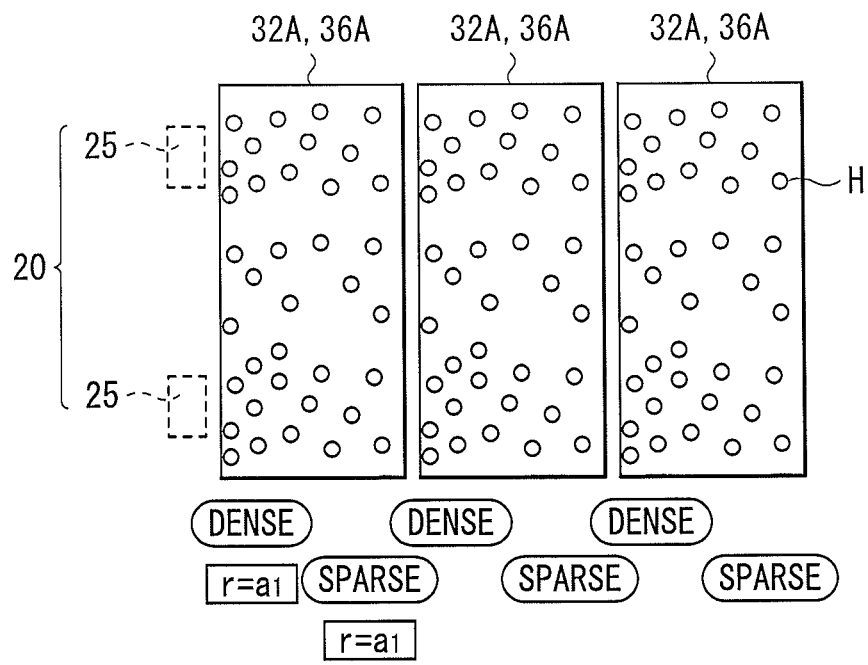
FIG. 95 is a plan view illustrating a twenty-ninth modification of the electrode structure in FIG. 4.
Figure 96:
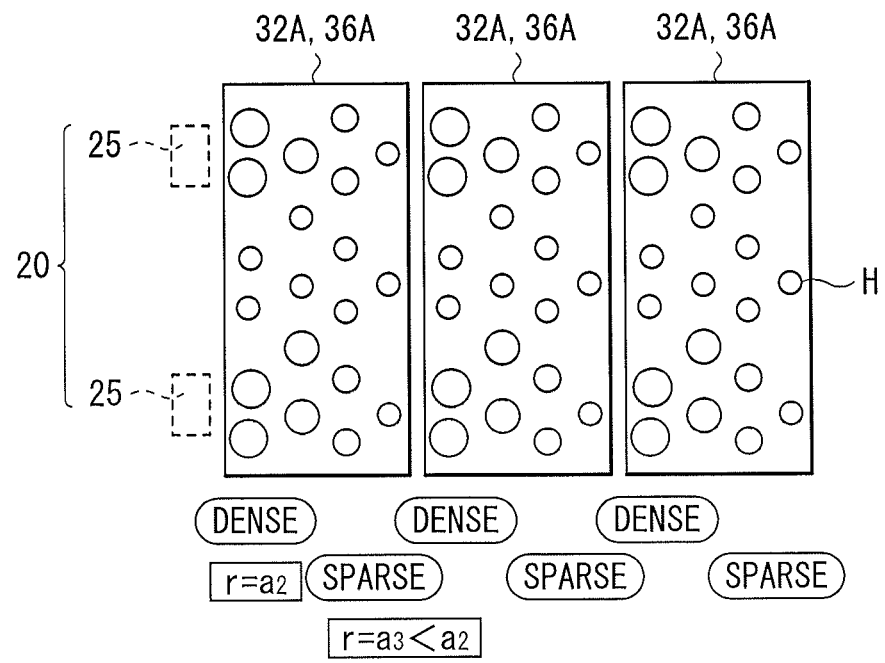
FIG. 96 is a plan view illustrating a thirtieth modification of the electrode structure in FIG. 4.
Figure 97:
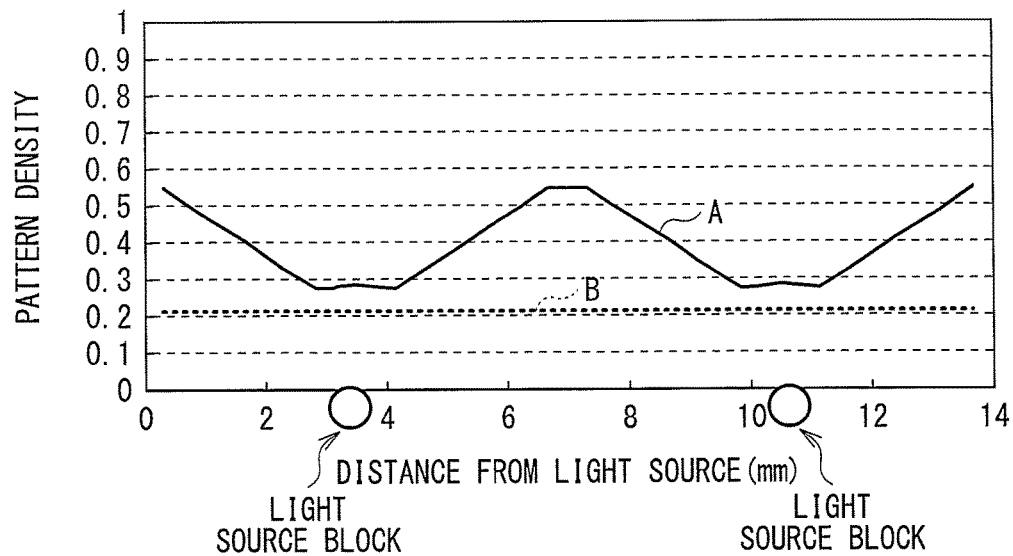
FIG. 97 is a diagram illustrating an example of pattern density distribution of the electrode structure in any of FIG. 80 to FIG. 83 and FIG. 93 to FIG. 96.
Figure 98:
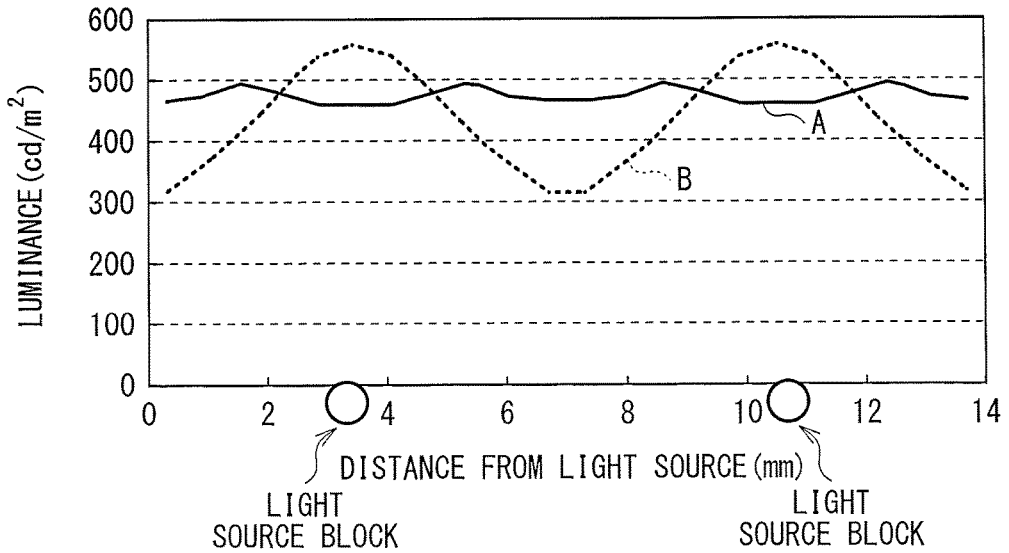
FIG. 98 is a diagram illustrating an example of luminance distribution when an electrode having the pattern density in FIG. 97 is used.

In Modification 7 described above, the light source 20 may be configured of the plurality of light source blocks 25 arranged in line, for example, as illustrated in (B) of FIG. 89 or (C) of FIG. 90. In this case, when the clearance between the two adjacent light source blocks 25 is wide, the density of the openings H per unit area may be relatively large in a region closer to the light source block 25, and may be relatively small in a region farther from the light source block 25, in the direction parallel to the light incidence surface 10A. For example, as illustrated in FIG. 93 and FIG. 94, the number of openings H (the radius thereof is fixed) per unit area may be relatively large in a region closer to the light source block 25, and may be relatively small in a region farther from the light source block 25, in the direction parallel to the light incidence surface 10A. Moreover, for example, as illustrated in FIG. 95 and FIG. 96, the radius of the opening H may be relatively large in a region closer to the light source block 25, and may be relatively small in a region farther from the light source block 25, in the direction parallel to the light incidence surface 10A. In such a case, in the direction parallel to the light incidence surface 10A, the luminance in a region closer to the light source block 25 is allowed to be suppressed as compared with the case where the openings H are not provided, and the luminance in a region farther from the light source block 21 is allowed to be enhanced as compared with the case where the openings H are not provided. As a result, for example, when the entire light emission region of the backlight 1 or 2 is put in a bright state, the in-plane luminance is allowed to be uniformized. For example, in the case where the patterning density in a region away from the light incidence surface 10A by 2 mm has a distribution represented by A in FIG. 97, the in-plane luminance is allowed to be uniformized in the direction parallel to the light incidence surface 10A as represented by A in FIG. 98. On the other hand, for example, in the case where the patterning density in a region farther from the light incidence surface 10A by 2 mm has a flat distribution represented by B in FIG. 97, the in-plane luminance is largely varied in the direction parallel to the light incidence surface 10A as represented by B in FIG. 98. Note that, in the present modification, when the point light sources 23 are used instead of the light source blocks 25, the density of the openings H per unit area may be relatively large in a region closer to the point light sources 23, and may be relatively small in a region farther from the point light sources 23, in the direction parallel to the light incidence surface 10A. Also in such a case, the in-plane luminance is allowed to be uniformized in the direction parallel to the light incidence surface 10A.

(Modification 22)

Figure 99:
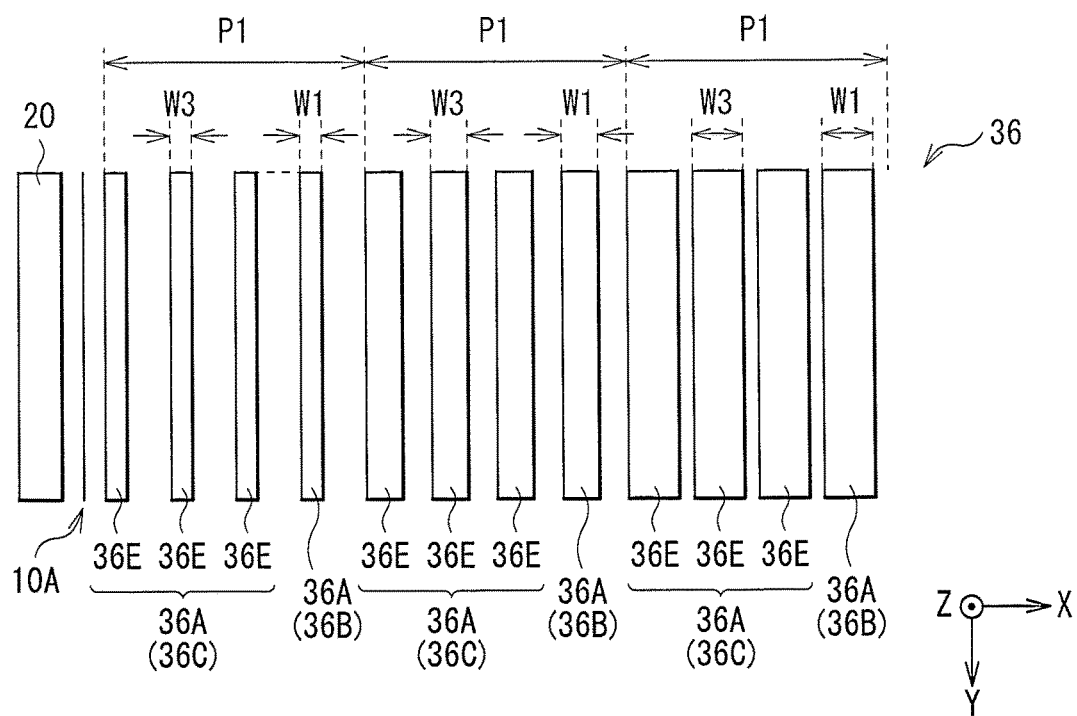
FIG. 99 is a plan view illustrating a thirty-first modification of the electrode structure in FIG. 4.

In the above-described respective embodiments and the modifications thereof, when each of the partial electrodes 36C is configured of the plurality of strip-shaped partial electrodes 36E extending in one direction in the plane (in the direction parallel to the light incidence surface 10A), the width W1 of the partial electrode 36B and a width W3 of the partial electrode 36E may be varied depending on the distance from the light source 20. For example, as illustrated in FIG. 99, the width W1 of the partial electrode 36B and the width W3 of the partial electrode 36E may be relatively small in a region closer to the light source 20, and may be relatively large in a region farther from the light source 20. In such a case, for example, when the entire light emission region of the backlight 1 or 2 is put in a bright state, the in-plane luminance is allowed to be uniformized. Moreover, for example, in the direction orthogonal to the light incidence surface 10A, when white display is performed in a region closer to the light source 20 and in a region farther from the light source 20, white luminance is allowed to be equivalent in both regions.

(Modification 23)

Figure 100:
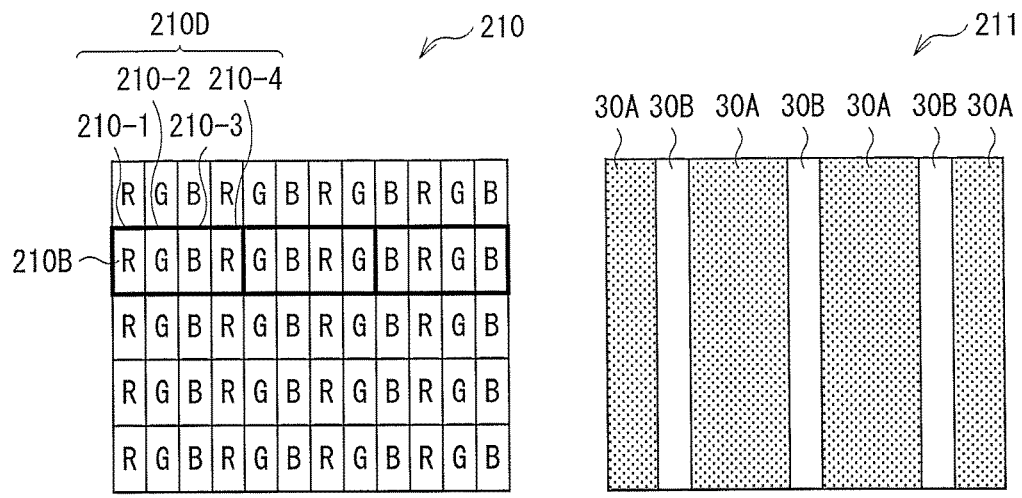
FIGS. 100A, 100B, 100C and 100D are schematic diagrams illustrating an example of relationship between pixels of a display panel and backlight light.
Figure 100:
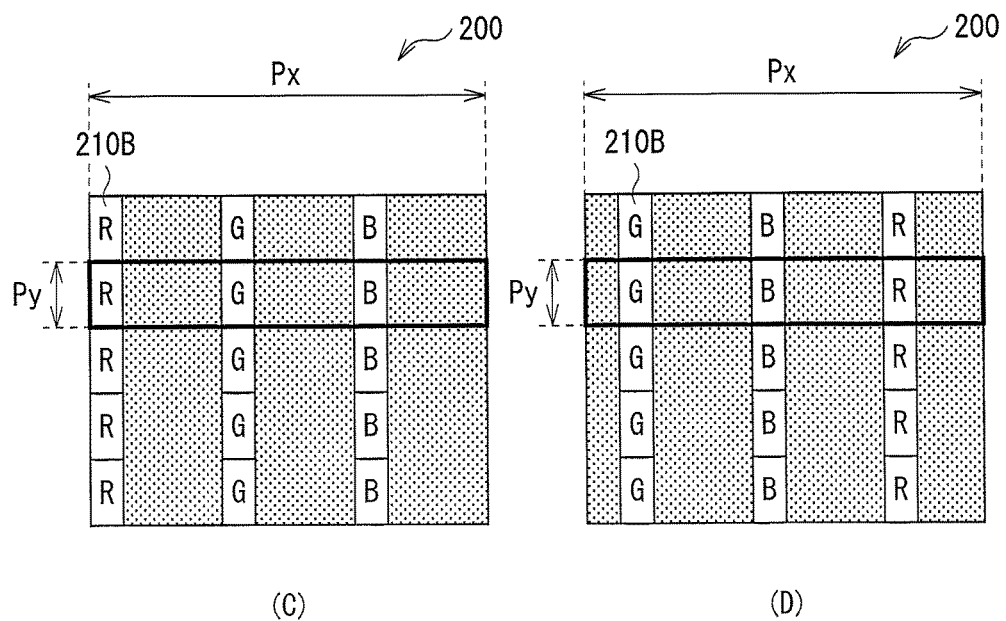

In the above-described respective embodiments and the modifications thereof, in three-dimensional display, for example as illustrated by a thick frame in (A) of FIG. 100, four pixels 210-1 to 210-4 of the display panel 210 are driven as one three-dimensional pixel 210D. At this time, for example, as illustrated in (B) of FIG. 100, the backlight 211 forms the scattering region 30B for each three-dimensional pixel 210D, and allows the backlight light to enter the each of the pixels 210-1 to 210-4 at different incident angles. Accordingly, the strip-shaped illumination light beam enters the respective pixels located at a position common in the three-dimensional pixels 210D (for example, the pixel 210-1, 210-2, 210-3, or 210-4 in FIG. 100) at the substantially same angle. As a result, picture light modulated by the pixels is output from the respective pixels located at a position common in the three-dimensional pixels 210D at a predetermined angle. At this time, for example, the viewer may view picture light from the pixel 210a illustrated in (C) of FIG. 100 with his right eye, as well as may view picture light from the pixel 210a illustrated in (D) of FIG. 100 with his left eye. In other words, the viewer views different pictures with parallax therebetween with his right and left eyes. As a result, the viewer perceives display of three-dimensional picture (stereoscopic picture) on the display panel 210.

In this case, when a pixel pitch Px in a lateral direction and a pixel pitch Py in a vertical direction are compared, the pixel pitch Py in the vertical direction is several times as large as the pixel pitch Px in the lateral direction. Therefore, the viewer views pictures whose pixel pitches are largely different in the vertical direction and the lateral direction. At this time, the viewer may feel the picture quality being deteriorated.

Figure 101:
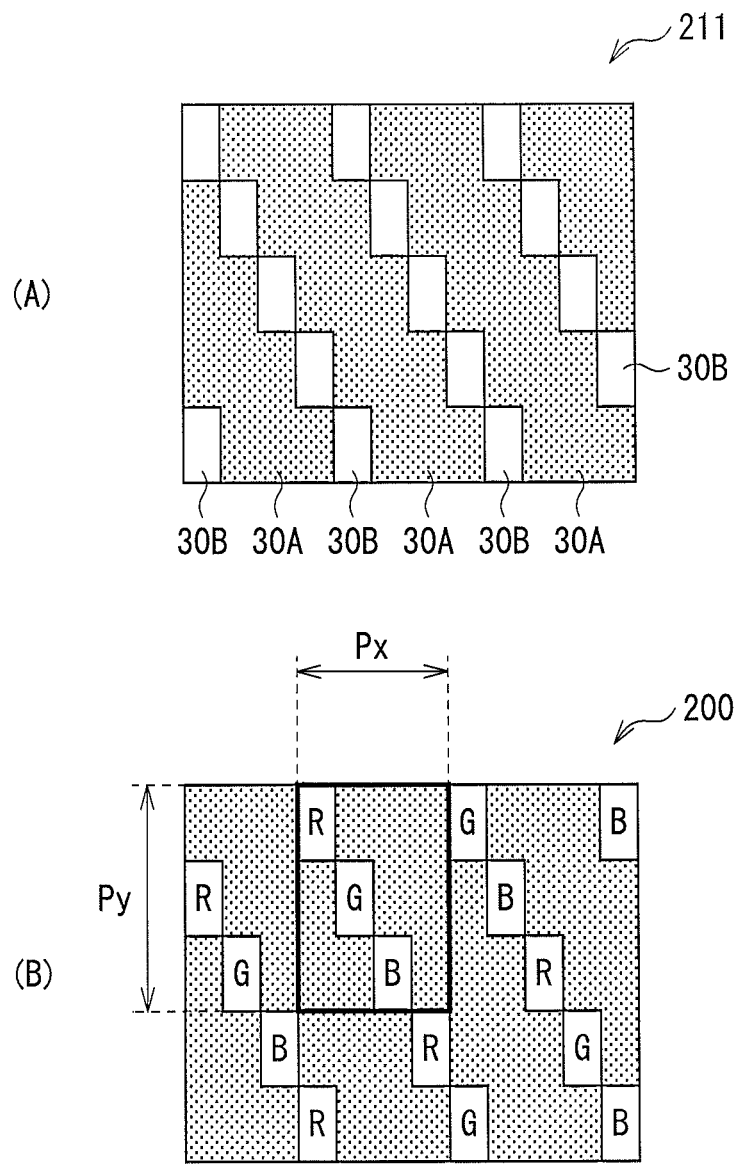
FIGS. 101A and 101B is a schematic diagram illustrating a first modification of the relationship between the pixels of the display panel and the backlight light.

Therefore, for example, as illustrated in (A) of FIG. 101, the respective scattering regions 30B are arranged by shifting in the lateral direction (the Y-axis direction) by the amount of the width of the pixel 210a, in relation to the adjacent scattering regions 30B. In such a case, as illustrated in (B) of FIG. 101, the pixel pitch Px in the lateral direction and the pixel pitch Py in the vertical direction are allowed to be approached to each other as compared with the pixel pitches illustrated in (C) and (D) of FIG. 101. As a result, it is possible to suppress deterioration in picture quality.

Figure 102:
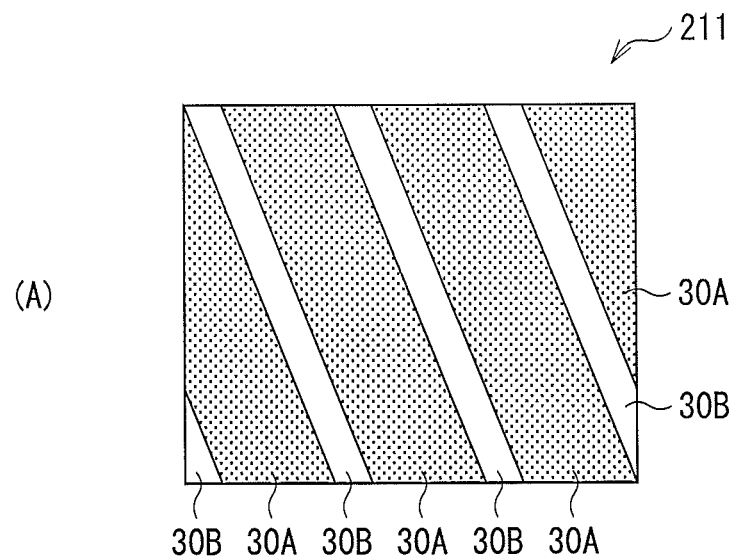
FIGS. 102A and 102B is a schematic diagram illustrating a second modification of the relationship between the pixels of the display panel and the backlight light.
Figure 102:
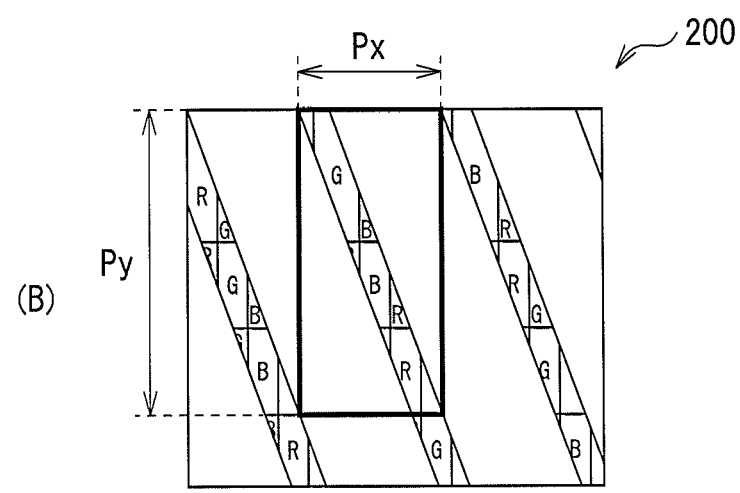

Incidentally, as illustrated in (A) of FIG. 102, the scattering regions 30B may be arranged in an oblique stripe shape. Even in such a case, as illustrated in (B) of FIG. 102, the pixel pitch Px in the lateral direction and the pixel pitch Py in the vertical direction are allowed to be approached to each other as compared with the pixel pitches illustrated in (C) and (D) of FIG. 100. As a result, it is possible to suppress deterioration in picture quality. Note that, in the case of the display panel having the panel size of 3.5 inches and vertical 800×lateral 480×three (RGB) number of pixels, the inclined angle of the scattering regions 30B is 71.57 degrees at four parallaxes.

(Modification 24)

Figure 103:
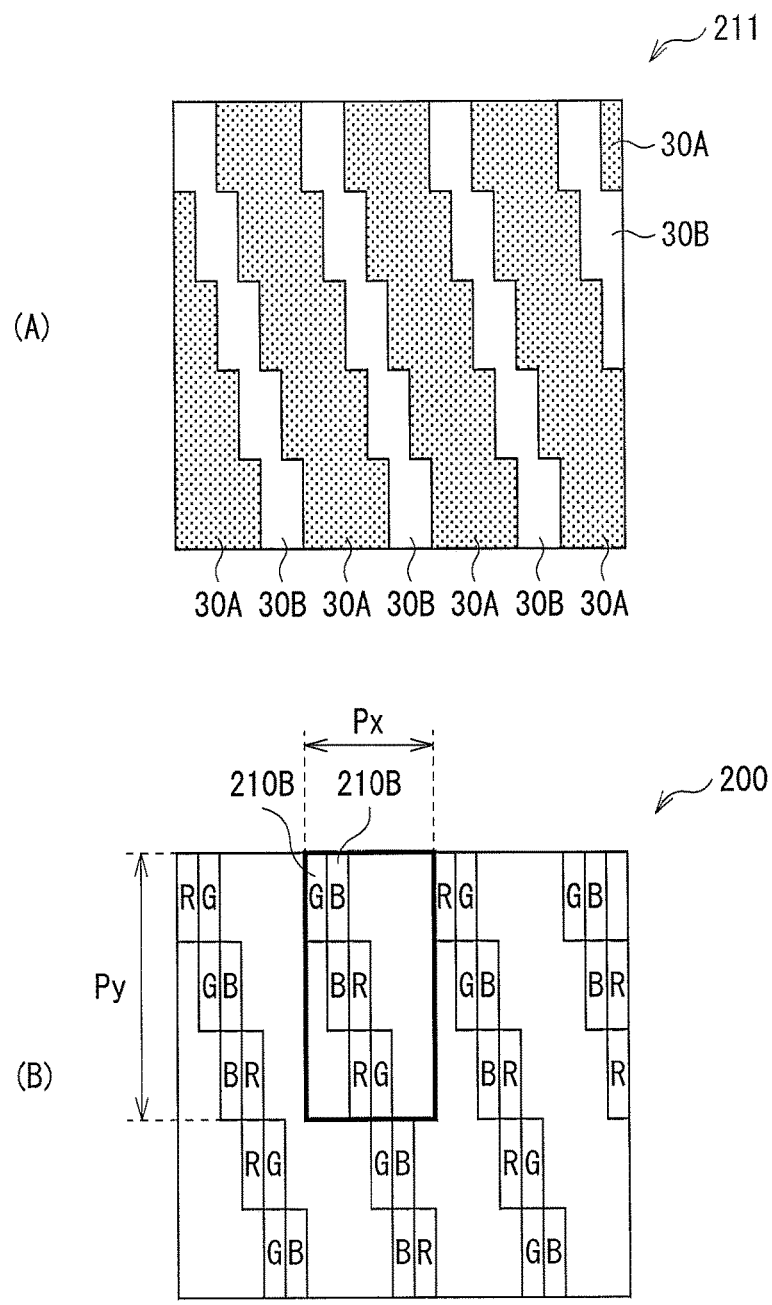
FIGS. 103A and 103B is a schematic diagram illustrating a third modification of the relationship between the pixels of the display panel and the backlight light.
Figure 104:
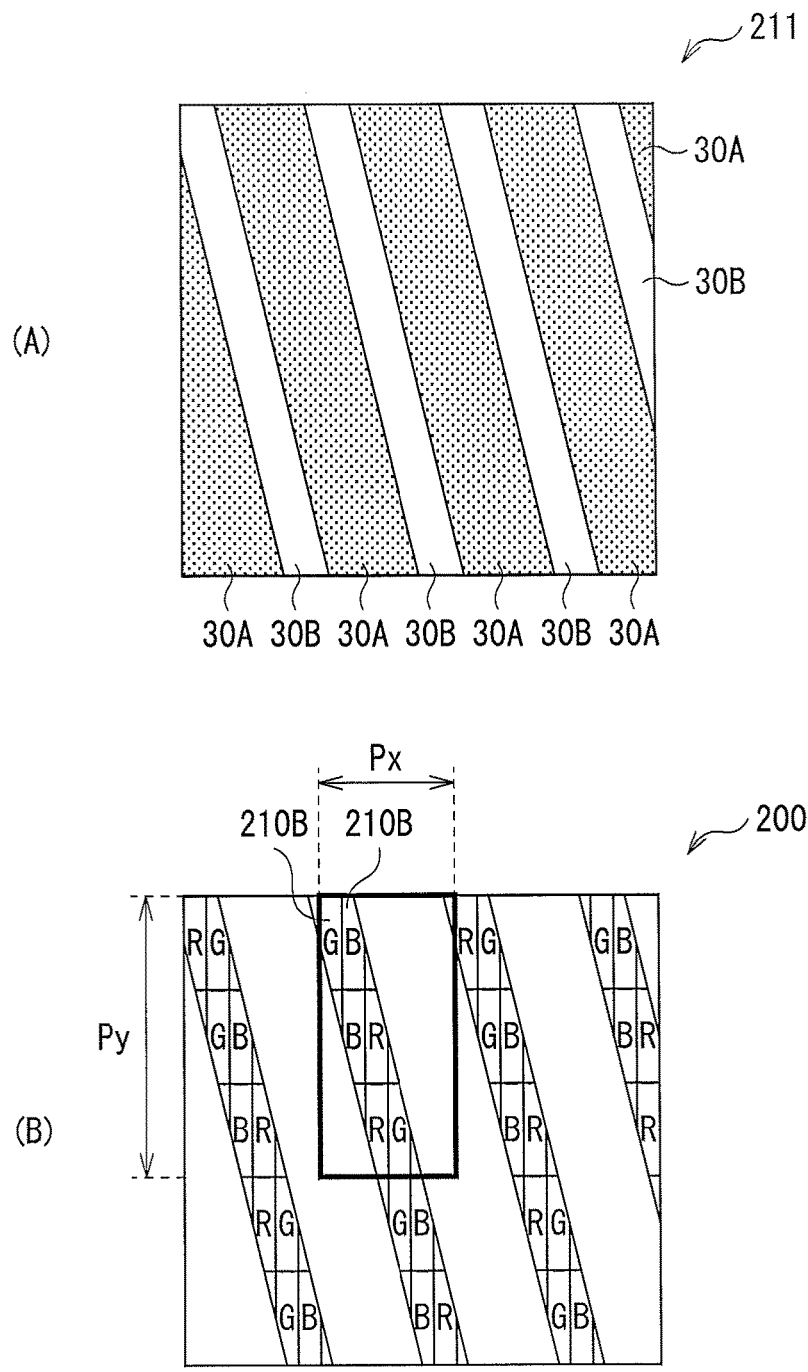
FIGS. 104A and 104B is a schematic diagram illustrating a fourth modification of the relationship between the pixels of the display panel and the backlight light.
Figure 105:
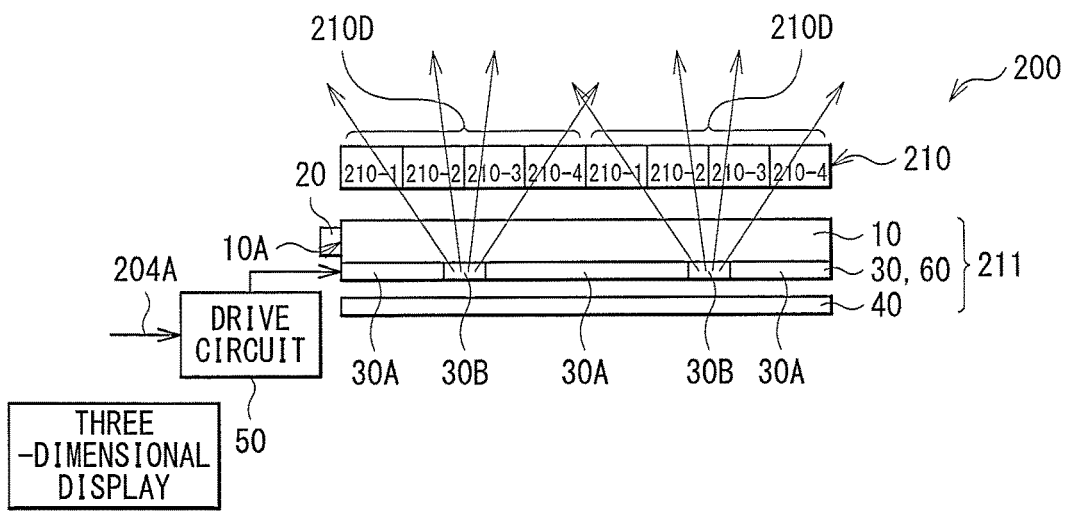
FIG. 105 is a schematic diagram illustrating an example of time-divisional driving in three-dimensional display.
Figure 106:
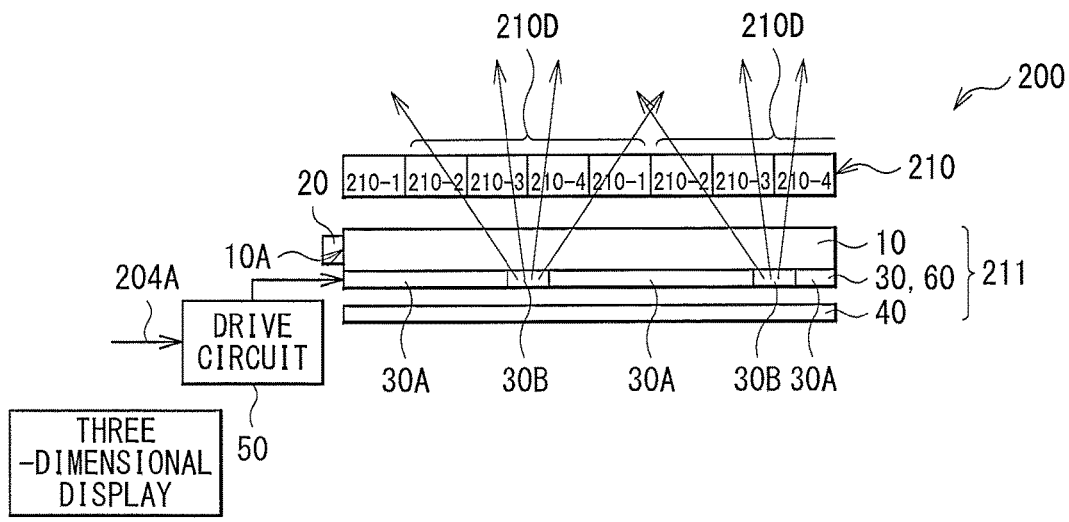
FIG. 106 is a schematic diagram illustrating an example of the time-divisional driving following FIG. 105.
Figure 107:
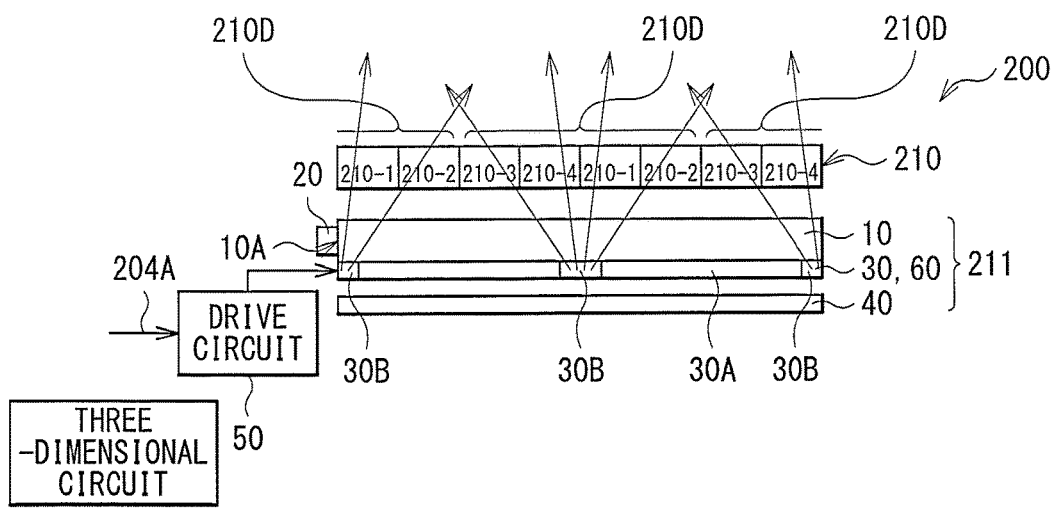
FIG. 107 is a schematic diagram illustrating an example of the time-divisional driving following FIG. 106.
Figure 108:
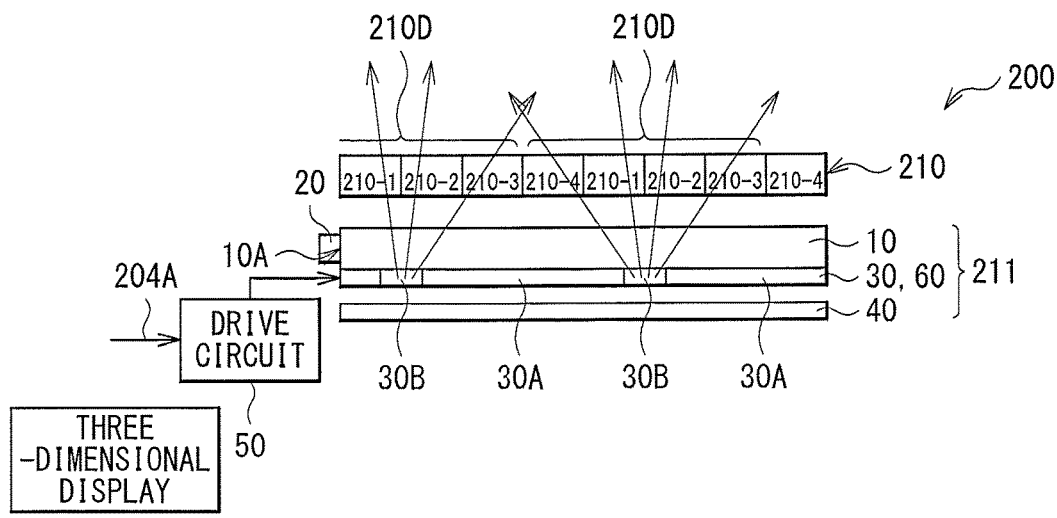
FIG. 108 is a schematic diagram illustrating an example of the time-divisional driving following FIG. 107.

In Modification 20 described above, for example, as illustrated in FIG. 101 and FIG. 102, the backlight 211 forms one scattering region 30B for each pixel 210B. For example, as illustrated in FIG. 103 and FIG. 104, alternatively, the backlight 211 may form one scattering region 30B for every two pixels 210B. Incidentally, the above-described two pixels 210B may be two pixels 210B with different colors, adjacent to each other in RGB arrangement direction. In such a case, even if the display panel 210 is progressed in high definition, and each pixel 210B is downsized, alignment between the pixels 210B and the scattering regions 30B is easily achievable.

(Modification 25)

Moreover, in the above-described respective embodiments and the modifications thereof, a drive circuit (not illustrated) driving the display panel 210 may drive the display panel 210 in a time-divisional manner. In this case, the drive circuit 50 switches over the emission region of the linear illumination light beams from the backlight 211, in synchronization with sequential switching over of the display of the display panel 210 one pixel row by one pixel row in the pixel rows the number of which is equal to the number of parallaxes. For example, as illustrated in FIG. 105, FIG. 106, FIG. 107, and FIG. 108, the drive circuit 50 switches over the emission region of the linear illumination light beams from the backlight 211, in synchronization with sequential switching over of the display of the display panel 210 one pixel row by one pixel row in four pixel rows within one frame period (1/60 second). At this time, the drive circuit (not illustrated) driving the display panel 210 applies a voltage corresponding to a picture signal to each pixel so that the display of the display panel 210 is sequentially switched over one pixel row by one pixel row in pixel rows the number of which is equal to the number of parallaxes, within one frame period (1/60 second). In this way, performing switching over at high speed makes it possible for the viewer to perceive pixels four times the number of pixels emitting light at that instant, thereby increasing substantial resolution.

Incidentally, in the present modification, for example as illustrated in FIG. 7 and FIG. 11, the partial electrode 36C may be configured of the plurality of partial electrodes 36E. At this time, in three-dimensional display, the drive circuit 50 may drive each of the partial electrodes 32B, whereas in two-dimensional display, the plurality of partial electrodes 36A may be grouped by the number equal to the number of parallaxes in three-dimensional display, and the drive circuit 50 may sequentially drive the groups one by one within one frame period (1/60 second) to switch over the emission region of the linear illumination light beams. In such a case, even if the emission area of the linear illumination light beams in three-dimensional display is different from the emission area of the linear illumination light beams in two-dimensional display, the display luminance in three-dimensional display and the display luminance in two-dimensional display are allowed to be equal to each other. As a result, when the drive circuit 50 switches over the driving pattern from the driving pattern for three-dimensional display to the driving pattern for two-dimensional display, or from the driving pattern for two-dimensional display to the driving pattern for three-dimensional display, it is possible to eliminate change in in-plane distribution of the display luminance.

(Modification 26)

Moreover, in the above-described respective embodiments and the modifications thereof, one or both of the transparent substrate 31 and the transparent substrate 37 may be integrally provided with the light guide plate 10. For example, in the above-described respective embodiments and the modifications thereof, when the transparent substrate 37 is in contact with the light guide plate 10, the transparent substrate 37 may be integrally provided with the light guide plate 10. At this time, the transparent substrate 37 corresponds to a specific example of "first transparent substrate" or "second transparent substrate" in CLAIMS. Moreover, for example, in the above-described respective embodiments and the modifications thereof, when the transparent substrate 31 is in contact with the light guide plate 10, the transparent substrate 31 may be integrally provided with the light guide plate 10. At this time, the transparent substrate 31 corresponds to a specific example of "first transparent substrate" or "second transparent substrate" in CLAIMS. In addition, for example, in the above-described respective embodiments and the modifications thereof, when both the transparent substrates 31 and 37 are in contact with the light guide plate 10, the transparent substrates 31 and 37 may be integrally provided with the light guide plate 10. At this time, the transparent substrate 31 or the transparent substrate 37 corresponds to a specific example of "first transparent substrate" or "second transparent substrate" in CLAIMS.

(Modification 27)

Figure 109:
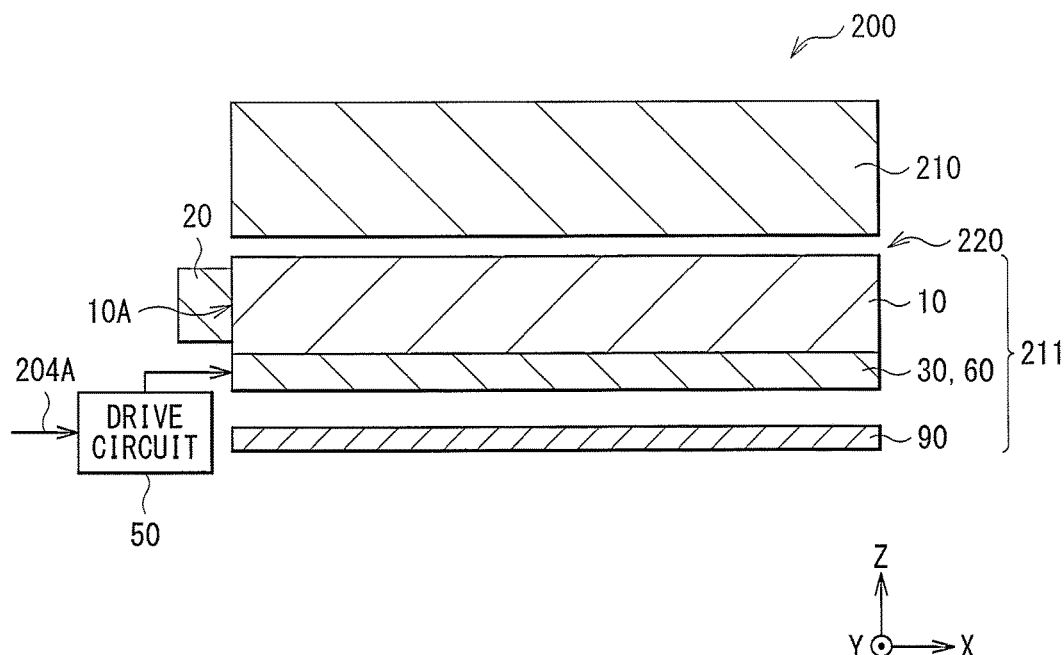
FIG. 109 is a sectional diagram illustrating a seventh modification of the structure of the display unit according to any of the embodiments.

Moreover, in the above-described respective embodiments and the modifications thereof, a reflection suppressing layer may be provided in place of the reflector 40. For example, the reflection suppressing layer may be formed by applying a low reflectance material on a surface of a base material, or by applying a light absorption material on the surface of the base material. For example, as illustrated in FIG. 109, a reflection suppressing layer 90 may be provided in place of the reflector 40. For example, the reflection suppressing layer 90 is formed by applying a low reflectance material on a surface of a base material, or by applying a light absorption material on the surface of the base material. In this way, by providing the reflection suppressing layer 90, it is possible to suppress to be low the ratio of the light that is reflected by the reflector 40 to enter the display panel 210 through the transmissive region 30A. As a result in the case where the reflector 40 is provided, it is possible to enhance contrast.

4. Examples

Next, Examples of the backlight 211 according to the above-described respective embodiments and the modifications thereof will be described. Note that the following Examples are mere example, and the present technology is not limited to the Examples in any way.

Figure 110:
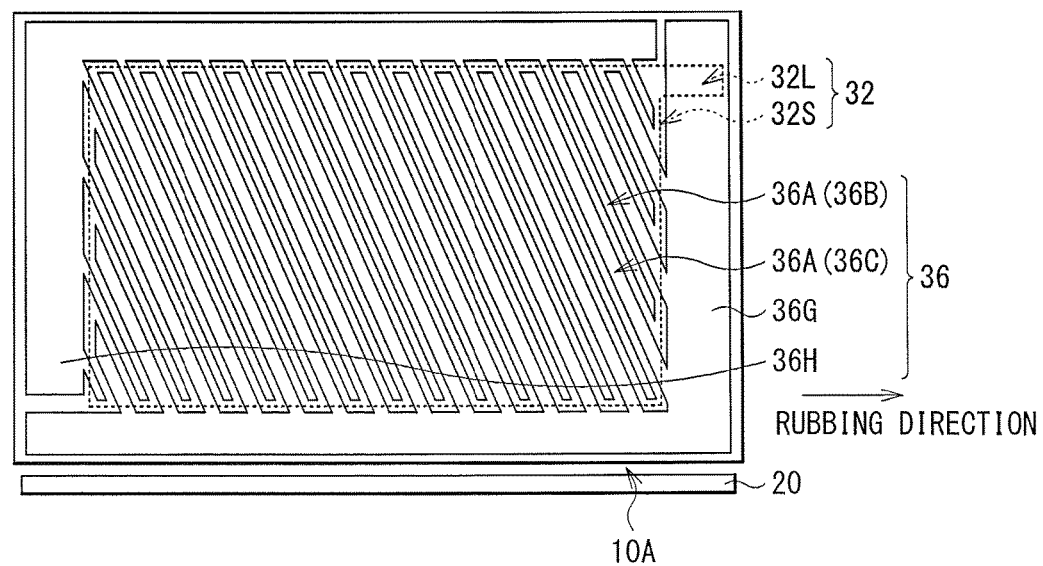
FIG. 110 is a diagram illustrating electrode layout according to an embodiment.
Figure 111:
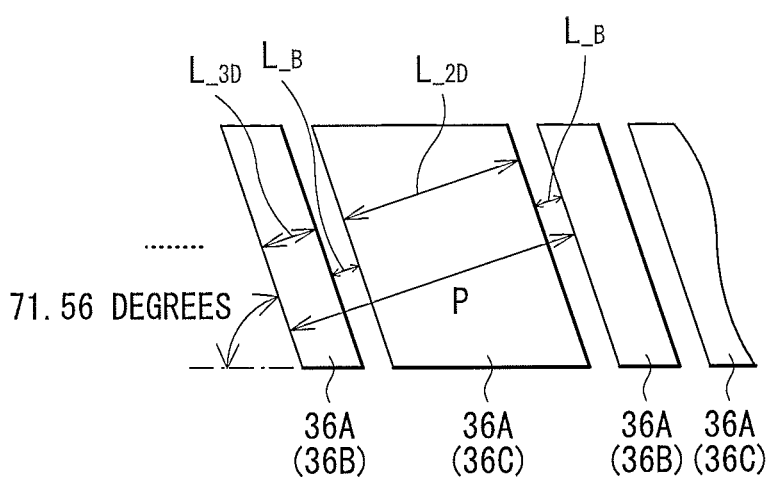
FIG. 111 is a diagram illustrating the electrode layout in FIG. 110 on an enlarged scale.

FIG. 110 illustrates an example of a layout of the lower electrode 32 and the upper electrode 36 of the backlight 211 according to Examples and Comparative Examples. FIG. 111 illustrates a part of the upper electrode 36 in Examples 1 to 10 and Comparative Examples 1 and 2 in an enlarged manner. In each Example and each Comparative Example, one partial electrode 36B and one partial electrode 36C were regarded as one set, and the upper electrode 36 was configured by arranging a plurality of the sets. Further, in each Example and each Comparative Example, as for the upper electrode 36, the wiring 36H connected to each of the partial electrodes 36B and the wiring 36G connected to each of the partial electrodes 36C were provided outside the display region. In each Example and each Comparative Example, the lower electrode 32 was configured of a solid film.

In each Example and each Comparative Example, after a polyimide alignment film was applied on a surface of each of the lower electrode 32 and the upper electrode 36, the alignment films were subjected to rubbing in a predetermined direction (see FIG. 110), spacers were spread on a surface of the alignment film on the lower electrode 32, and a ring-like sealing agent was drawn on a surface of the alignment film on the upper electrode 36. After that, a planar electrode 32S was disposed in a region facing the partial electrodes 36B and 36H, and the lower electrode 32 and the upper electrode 36 were bonded so that the planar electrode 32S is located in a region that faces the wiring 36G or the wiring 36H and is away from the light source 20 as much as possible. Then, a mixture (a liquid crystal, a liquid crystalline monomer, and polymerization initiator) previously formed was injected in vacuum to a clearance between the lower electrode 32 and the upper electrode 36, and then ultraviolet irradiation was performed to complete a light modulation device. To form a desired gap determined by a pixel size, a light guide plate was bonded on a top surface of the light modulation device. Note that a glass substrate itself may be used as a light guide plate without bonding a light guide plate. A reflector having characteristics illustrated in Table 1 described later was disposed on a back surface of the light modulation device. Then, LED light sources were disposed with a predetermined distance on an end surface (a light incidence surface) to complete a backlight.

(Evaluation Method)

(1) Display Power

Three-dimensional display performance was evaluated in the following manner. An AC pulse voltage of 100V and 60 Hz was applied between the lower electrode 32 and the upper electrode 36 of the fabricated backlight to perform stripe display. After that, TFT liquid crystal display panel and stripe pattern were aligned and fixed so as to provide most excellent three dimensional display, while a three-dimensional display signal was input to the TFT liquid crystal display panel. Three-dimensional display performance was evaluated by visual observation in that state.

On the other hand, two-dimensional display performance was evaluated by visual observation by applying a voltage between the lower electrode 32 and the upper electrode 36 so that light was emitted from the entire surface of the fabricated backlight, and inputting two-dimensional display signal to the TFT liquid crystal display panel. Six-parallax display was performed as 3D display method.

(2) Contrast Ratio

The luminance of light amount of light emission section and non-light emission section of the backlight in three-dimensional display were measured by a microspectroscope. Luminance ratio of the light emission section and the non-light emission section was regarded as a contrast ratio.

(3) Brightness

A polarization film was mounted on the fabricated backlight, and the luminance in the front direction was measured as brightness.

Table 1 illustrates configuration and evaluation results in Examples 1 to 8 and Comparative Example 1.

TABLE 1

| | Width of Partial Electrode 36C (μm) | Width of Partial Electrode 36B (μm) | Cell Gap (μm) | Reflector | Relationship between Light Incident Surface and Rubbing Direction | Three-Dimensional Display | Brightness (cd/m$^2$) | Contrast Ratio | Two-Dimensional Display |
|---|---|---|---|---|---|---|---|---|---|
| Example 1 | 299.6 | 83 | 7 | Black | Parallel | ○ | — | 20.4 | ○ |
| Example 2 | 299.6 | 63 | 7 | Black | Parallel | ○○ | — | 24.6 | ○ |
| Example 3 | 299.6 | 63 | 4 | Black | Parallel | ○○ | — | 42.6 | ○ |
| Example 4 | 299.6 | 83 | 7 | Mirror | Parallel | x | — | 6.0 | ○○ |
| Example 5 | 299.6 | 63 | 4 | Black | Parallel | — | 1102 | — | — |
| Example 6 | 299.6 | 63 | 4 | Black | Parallel | — | 660 | — | — |
| Example 7 | 299.6 | 63 | 4 | Black | Parallel | — | 114 | — | — |
| Example 8 | 299.6 | 63 | 4 | Black | Orthogonal | — | 280 | — | — |
| Comparative Example 1 | 299.6 | — | — | Diffusion Reflection | — | ○○ | — | 62 | x |

Example 1

An ITO film was patterned in a layout described below on a glass substrate (thickness: 0.7 mm) of a size of 160 mm*125 mm, to form the upper electrode 36.
Width of Partial Electrode 36C (L_2D): 299.6 μm
Width of Partial Electrode 36B (L_3D): 83 μm
Space Width (L_B): 60 μm
Pitch (P): 502.6 μm
Angle formed by Partial Electrode 36B or 36C and Substrate Side Section: 71.56 degrees Further, an ITO film was formed in a planar shape on another glass substrate to form the lower electrode 32. The two glass substrates were bonded so that a cell gap was 7 μm and the rubbing direction was parallel to the light incident surface, to form a light modulation device. Further, an acryl light guide plate having a thickness of 2.0 mm was bonded to the glass substrate on the upper electrode 36 side of the light modulation device, and a black reflective sheet was disposed as a reflector on the glass substrate on the lower electrode 32 side of the light modulation device. A liquid crystal panel for display having a size of 10.4 inches and 800*600*RGB was used.

Example 2

The configuration same as that in Example 1 was used except that the width of the partial electrode 36B (L_3D) was set to 63 μm and the space width (L_B) was set to 70 μm.

Example 3

The configuration same as that in Example 2 was used except that the cell gap was set to 4 μm.

Example 4

The configuration same as that in Example 1 was used except that ESR mirror manufactured by 3M company was used as a reflector.

Example 5

The configuration same as that in Example 3 was used except that a polarization film was disposed on a top of the fabricated backlight so that the rubbing direction was parallel to a transmission axis direction of the polarization film.

Example 6

The configuration same as that in Example 3 was used except that a polarization film was disposed on a top of the fabricated backlight so that the rubbing direction intersected a transmission axis direction of the polarization film at 45 degrees.

Example 7

The configuration same as that in Example 3 was used except that a polarization film was disposed on a top of the fabricated backlight so that the rubbing direction was orthogonal to a transmission axis direction of the polarization film.

Example 8

The configuration same as that in Example 5 was used except that a rubbing direction was perpendicular to a light incident surface and a polarization film was disposed on a top of the fabricated backlight so that the rubbing direction was parallel to a transmission axis direction of the polarization film.

Comparative Example 1

A reflection sheet, an injection-molded light guide plate, a diffuser sheet, a prism sheet, a DBEF sheet, and a fixed barrier (formed by patterning chromium on a glass substrate so that a width of a transmissive region was 83 μm and a pitch was 502.6 μm) were stacked in this order to obtain a stripe emission pattern.

(Discussion)

In Comparative Example 1, three-dimensional display was obtainable, however two-dimensional display was not obtainable because display was dark and a fixed barrier was used. On the other hand, in Examples 1 to 3, both two-dimensional display and three-dimensional display were obtainable, and brightness was at workable level. In addition, in Example 2 in which the width of the partial electrode 36B in Example 1 was narrowed from 83 μm to 63 μm, double image in three-dimensional display was reduced. In Example 1, when emission pattern width of the backlight was observed by a microscope, the emission pattern width was larger than the electrode width, and further the emission pattern width was larger than the stripe display width for three-dimensional display determined by the display panel. On the other hand, in Example 2, when the emission pattern width of the backlight was observed by a microscope, although the emission pattern width was larger than the electrode width, the emission pattern width was smaller than the stripe display width for three-dimensional display determined by the display panel. Therefore, it is conceivable that adjusting the width of the partial electrode 36B so that the emission pattern width of the backlight was smaller than the stripe display width for three-dimensional display determined by the display panel makes it possible to reduce double image in three-dimensional display.

In Example 3 in which the cell gap was set to 4 μm that is small, three-dimensional display property and the contrast ratio were improved as compared with Example 1. It is conceivable that this is because the spread in width of the above-described emission pattern was caused by fringe field of the electrode edge, and the influence was decreased by decrease in cell thickness. Further, it is conceivable that the transparent state in the light modulation layer was not complete and had slight scattering property, and thus cell thickness is decreased virtually to suppress light leakage by scattering in the transparent state.

When Examples 5 to 7 were compared, it was found that brightness was varied depending on the transmission axis direction of the polarization film mounted on the backlight. Therefore, it is conceivable that the light emitted from the light modulation device was polarized in the rubbing direction. It was found from the result that when the brightness was given importance, the rubbing direction and the transmission axis of the polarization plate on the backlight side of the display liquid crystal panel were preferably parallel to each other. In addition, when Example 5 and Example 7 were compared, display in Example 5 was brighter than display in Example 7. Therefore, it was found that when brightness was given importance, the rubbing direction was preferably parallel to the light incidence surface as much as possible. In addition, luminance in Example 5 was higher than that in Example 8. Therefore, it was found that the rubbing direction (that is, alignment direction of the bulk and the microparticles during no-voltage application) was preferably parallel to the light incidence surface. This reason is described in the section of Anisotropic Diffusion.

Table 2 illustrates configurations and evaluation results in Examples 9 and 10 and Comparative Example 2.

Angle formed by Partial Electrode 36B or 36C and Substrate Side Section: 71.56 degrees Further, an ITO film was formed in a planar shape on another glass substrate to form the lower electrode 32. The two glass substrates were bonded so that a cell gap was 7 μm and the rubbing direction was parallel to the light incident surface. Further, one of the glass substrates was polished in a state of empty cell before liquid crystal injection and decreased in thickness to 0.2 mm, and then liquid crystal injection was performed to form a light modulation device. Further, a black reflective sheet was disposed as a reflector on the glass substrate on the lower electrode 32 side of the light modulation device. A liquid crystal panel for display having a size of 3.7 inches and 800*360*RGB was used. Four-parallax display was performed as 3D display method.

Example 10

The configuration same as that in Example 9 was used except that the width of the partial electrode 36B (L_3D) was set to 42.2 μm, and the space width (L_B) was set to 11.2 μm.

Example 11

The configuration same as that in Example 10 was used except that the width of the partial electrode 36C (L_2D) was divided into three, the divided width was set to 42.2 μm that was equal to the width of the partial electrode 36B (L_3D), and a space width between respective electrodes was set to 24.3 μm.

Example 12

Patterning was performed on the lower electrode 32, the electrode widths (L_2D) and (L_3D) were set to 50.2 μm, the space width (L_B) between respective electrodes was set to 14.3 μm, and alignment was performed so that a center line of the electrode was overlapped with a center line of the partial electrode 36C, to form a light modulation device. Except for the points, the configuration was the same as that in Example 11.

TABLE 2

| | Width of Partial Electrode 36C (μm) | Width of Partial Electrode 36B (μm) | Cell Gap (μm) | Reflector | Relationship between Light Incident Surface and Rubbing Direction | Three-Dimensional Display | Brightness (cd/m$^2$) | Contrast Ratio | Two-Dimensional Display |
|---|---|---|---|---|---|---|---|---|---|
| Example 9 | 209.4 | 50.2 | 7 | Black | Parallel | ○ | — | — | ○ |
| Example 10 | 209.4 | 42.2 | 4 | Black | Parallel | ○○ | — | — | ○ |
| Comparative Example 2 | 209.4 | — | — | Diffusion Reflection | — | ○○ | — | — | x |

Example 9

An ITO films was patterned in a layout described below on a glass substrate (thickness: 0.7 mm) of a size of 60 mm*85 mm, to form the upper electrode 36.
Width of Partial Electrode 36C (L_2D): 209.4 μm
Width of Partial Electrode 36B (L_3D): 50.2 μm
Space Width (L_B): 3.2 μm
Pitch (P): 266.0 μm Example 13

The width of the partial electrode 36C (L_2D) was divided into three, and the divided width was set to 18.0 μm. In two-dimensional display, an AC pulse voltage of 100 V, 60 Hz, and Duty 100% was applied to three of the divided width (L_2D), and an AC pulse voltage of 100 V, 60 Hz, and Duty 25% was applied to one of the widths (L_3D) to drive the electrodes. Except for the points, the configuration was the same as that in Example 10.

Comparative Example 2

A reflection sheet, an injection-molded light guide plate, a diffuser sheet, a prism sheet, a DBEF sheet, and a fixed barrier (formed by patterning chromium on a glass substrate so that a width of a transmissive region was 50.2 µm and a pitch was 266.0 µm) were stacked in this order to obtain a stripe emission pattern.

(Discussion)

In Comparative Example 2, three-dimensional display was obtainable, however two-dimensional display was not obtainable because display was dark and a fixed barrier was used. On the other hand, in Example 9 and Example 10, both two-dimensional display and three-dimensional display were obtainable, and brightness was at workable level. In addition, in Example 10 in which the width of the partial electrode 36B in Example 9 was narrowed from 50.2 µm to 42.2 µm, double image in three-dimensional display was reduced. This is for the same reasons as those in Example 3.

In Example 11, it was possible to reduce the ITO area of the electrode width (L_2D) by 33%. Therefore, brightness in two-dimensional display was improved by about 4%.

In Example 12, a part of the ITO area uninvolved to a light modulation region that switched over the transparency and scattering property was reduced, and thus luminance enhancement of 2% was obtained as compared with Example 11. This is presumably because unnecessary absorption was reduced. In addition, since the line width of the lower electrode 32 was designed to be larger by 4 µm than the line width of the upper electrode 36, although alignment error of about 2 µm occurred, it did not affect the results.

In Example 13, deviation of the in-plane luminance distribution in two-dimensional display from the average was suppressed by 49% as compared with Example 11. This is because the line width of electrode width (L_2D) was decreased and non-voltage state was temporally inserted to the electrode width (L_3D) by 75% to decrease scattering intensity in two-dimensional display.

Moreover, for example, the technology may be configured as follows.

(1)

A display unit including:

a display panel having a plurality of pixels two-dimensionally arranged;

a first polarization plate and a second polarization plate that face each other with the display panel in between; and an illumination device configured to illuminate the display panel through the first polarization plate, the illumination device including a first transparent substrate and a second transparent substrate that are arranged to face each other with a distance, a light source configured to apply light to an end surface of the first transparent substrate or an end surface of the second transparent substrate, and a light modulation layer provided in a clearance between the first transparent substrate and the second transparent substrate, the light modulation layer being configured to exhibit scattering property or transparency to the light from the light source depending on a magnitude of an electric field, wherein the light modulation layer includes a first region and a second region, the first region having optical anisotropy, and relatively high responsiveness to the electric field, and the second region having optical anisotropy, and relatively low responsiveness to the electric field, and the light modulation layer generates polarized light when the light modulation layer exhibits the scattering property, the polarized light having a polarization component mainly in a direction parallel to a transmission axis of the first polarization plate.

(2)

The display unit according to (1), wherein when the light modulation layer exhibits the scattering property, the second region has a component of an optical axis mainly in a first direction, and the first region has an optical axis in a direction intersecting or orthogonal to the optical axis of the second region, and when the light modulation layer exhibits the scattering property, the optical axis of the second region faces in the direction parallel to the transmission axis of the first polarization plate.

(3)

The display unit according to (1) or (2), wherein the first region mainly contains a liquid crystal material, the second region mainly contains a polymer material, and has a streaky structure, a porous structure, or a rod-like structure, and a longitudinal direction of the streaky structure, the porous structure, or the rod-like structure is coincident with or substantially coincident with a polarization direction of the polarized light.

(4)

The display unit according to any one of (1) to (3), wherein when the light modulation layer exhibits the scattering property, an optical axis of the second region faces in a direction parallel to the end surface.

(5)

The display unit according to any one of (1) to (4), wherein the illumination device further includes a first electrode provided on a surface of the first transparent substrate, and a second electrode provided on a surface of the second transparent substrate.

(6)

The display unit according to (5), further including a drive section outputting a plurality of linear illumination light beams, wherein the second electrode includes a plurality of first partial electrodes each extending in the first direction and each having a stripe shape or a step shape, and the drive section, in performing three-dimensional display, applies a voltage allowing the light modulation layer to relatively exhibit the scattering property, to a specific plurality of second partial electrodes of the plurality of first partial electrodes, and applies a voltage allowing the light modulation layer to relatively exhibit the transparency, to a plurality of third partial electrodes, excluding the plurality of second partial electrodes, of the plurality of first partial electrodes, thereby outputting the plurality of linear illumination light beams.

(7)

The display unit according to (6), wherein the plurality of second partial electrodes are arranged with a pitch corresponding to a pixel pitch for the three-dimensional display on the display panel.

(8)

The display unit according to (7), wherein the first direction is a direction obliquely intersecting the end surface.

(9)

The display unit according to (7) or (8), wherein the drive section drives each of the second partial electrodes in a state where positions of the respective second partial electrodes are fixed, in performing the three-dimensional display.

(10)

The display unit according to (7) or (8), wherein, when the plurality of first partial electrodes are grouped for each pitch, the drive section sequentially assigns within one frame period, in performing the three-dimensional display, the plurality of first partial electrodes included in each group to the second partial electrodes, the pitch corresponding to the pixel pitch for the three-dimensional display on the display panel.

(11)

The display unit according to any one of (7) to (10), wherein, when the plurality of first partial electrodes are grouped for each pitch, the drive section sequentially drives within one frame period, in performing the two-dimensional display, the plurality of first partial electrodes included in each group, the pitch corresponding to the pixel pitch for the three-dimensional display on the display panel.

(12)

The display unit according to any one of (7) to (10), wherein the first electrode includes a plurality of fourth partial electrodes each extending in a direction parallel to the end surface.

(13)

The display unit according to (12), wherein the plurality of fourth electrodes are arranged with a pitch corresponding to a pixel pitch in a direction intersecting the end surface on the display panel.

(14)

The display unit according to (12) or (13), wherein the drive section applies a same voltage to all the fourth partial electrodes in performing the three-dimensional display.

(15)

The display unit according to (12) or (13), wherein the drive section sequentially drives the plurality of fourth partial electrodes by every predetermined unit within one frame in performing two-dimensional display.

(16)

The display unit according to (12) or (13), wherein the drive section applies a voltage to the plurality of fourth partial electrodes in two-dimensional display, the voltage having a frequency, a voltage value, or a duty ratio corresponding to a distance from the light source.

(17)

The display unit according to any one of (6) to (10), wherein the second electrode includes a plurality of fifth partial electrodes each extending in the first direction and each having a strip shape or a step shape, and the plurality of fifth partial electrodes and the plurality of first partial electrodes are overlapped with each other.

(18)

The display unit according to any one of (6) to (9), wherein an electrode width of the third partial electrodes is smaller than an electrode width of the second partial electrodes.

(19)

The display unit according to (19), wherein, in performing two-dimensional display, the drive section applies, to the second partial electrodes, a voltage having a voltage value smaller than a voltage value of a voltage applied to the third partial electrodes, a voltage having a duty ratio smaller than a duty ratio of the voltage applied to the third partial electrodes, or a voltage having a frequency smaller than a frequency of the voltage applied to the third partial electrodes.

(20)

An illumination device including:

a first transparent substrate and a second transparent substrate that are arranged to face each other with a distance;

a light source configured to apply light to an end surface of the first transparent substrate or an end surface of the second transparent substrate; and a light modulation layer provided in a clearance between the first transparent substrate and the second transparent substrate, the light modulation layer being configured to exhibit scattering property or transparency to the light from the light source depending on a magnitude of an electric field, wherein the light modulation layer includes a first region and a second region, the first region having optical anisotropy, and relatively high responsiveness to the electric field, and the second region having optical anisotropy, and relatively low responsiveness to the electric field, and the light modulation layer generates polarized light when the light modulation layer exhibits the scattering property, the polarized light having a polarization component mainly in a first direction.

This application is based upon and claims the benefit of priority of the Japanese Patent Application No. 2011-105559, filed on May 10, 2011, and the Japanese Patent Application No. 2011-173349, filed on Aug. 8, 2011, both filed with the Japan Patent Office, the contents of which are incorporated herein by reference.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display unit comprising:

a display panel having a plurality of pixels two-dimensionally arranged;

a first polarization plate and a second polarization plate that face each other with the display panel in between; and an illumination device configured to illuminate the display panel through the first polarization plate, the illumination device including a first transparent substrate and a second transparent substrate that are arranged to face each other with a distance therebetween, a light source configured to apply light to an end surface of the illumination device, and a light modulation layer provided in a clearance between the first transparent substrate and the second transparent substrate, the light modulation layer being configured to exhibit scattering property or transparency of the light from the light source depending on a magnitude of an electric field, wherein the light modulation layer includes a first portion and a second portion, the first portion having optical anisotropy, and relatively high responsiveness to the electric field, and the second portion having optical anisotropy, and relatively low responsiveness to the electric field, and wherein the light modulation layer generates polarized light when the light modulation layer exhibits the scattering property, the polarized light having a polarization component mainly in a first direction that is parallel to a transmission axis of the first polarization plate.

2. The display unit according to claim 1, wherein
when the light modulation layer exhibits the scattering property, the second portion has a component of an optical axis mainly in the first direction, and the first portion has an optical axis in a second direction intersecting or orthogonal to the optical axis of the second portion, and
when the light modulation layer exhibits the scattering property, the optical axis of the second portion is in the same first direction as the transmission axis of the first polarization plate.

3. The display unit according to claim 1, wherein
the first portion mainly contains a liquid crystal material,
the second portion mainly contains a polymer material, and has a streaky structure, a porous structure, or a rod-like structure, and
a longitudinal direction of the streaky structure, the porous structure, or the rod-like structure is coincident with or substantially coincident in the first direction that is a polarization direction of the polarized light.

4. The display unit according to claim 1, wherein when the light modulation layer exhibits the scattering property, an optical axis of the second portion is in the first direction.

5. The display unit according to claim 1, wherein the illumination device further includes a first electrode provided on a surface of the first transparent substrate, and a second electrode provided on a surface of the second transparent substrate.

6. The display unit according to claim 5, further comprising a drive section,
wherein the second electrode includes a plurality of first partial electrodes each extending in the first direction and each having a shape selected from the group consisting of a stripe shape, a zigzag shape, a waveform shape, a ramp shape, and a trapezoidal shape, and
wherein the first partial electrodes include a plurality of second partial electrodes, and a plurality of third partial electrodes,
wherein the drive section, in performing three-dimensional display, applies a voltage allowing the light modulation layer to relatively exhibit the scattering property, to the second partial electrodes, and applies a voltage allowing the light modulation layer to relatively exhibit the transparency, to the plurality of third partial electrodes, thereby outputting the plurality of linear illumination light beams.

7. The display unit according to claim 6, wherein the plurality of second partial electrodes are arranged with a pitch corresponding to a pixel pitch for the three-dimensional display on the display panel.

8. The display unit according to claim 7, wherein the first direction is a direction obliquely intersecting the end surface.

9. The display unit according to claim 7, wherein, when the plurality of first partial electrodes are grouped for each pitch, the drive section sequentially assigns within one frame period, in performing the three-dimensional display, the plurality of first partial electrodes included in each group to the second partial electrodes, the pitch corresponding to the pixel pitch for the three-dimensional display on the display panel.

10. The display unit according to claim 7, wherein, when the plurality of first partial electrodes are grouped for each pitch, the drive section sequentially drives within one frame period, in performing the two-dimensional display, the plurality of first partial electrodes included in each group, the pitch corresponding to the pixel pitch for the three-dimensional display on the display panel.

11. The display unit according to claim 7, wherein the first electrode includes a plurality of fourth partial electrodes each extending in a direction parallel to the end surface.

12. The display unit according to claim 11, wherein the plurality of fourth electrodes are arranged with a pitch corresponding to a pixel pitch in a direction intersecting the end surface on the display panel.

13. The display unit according to claim 11, wherein the drive section applies a same voltage to all the fourth partial electrodes in performing the three-dimensional display.

14. The display unit according to claim 11, wherein the drive section sequentially drives the plurality of fourth partial electrodes by every predetermined unit within one frame in performing two-dimensional display.

15. The display unit according to claim 11, wherein the drive section applies a voltage to the plurality of fourth partial electrodes in two-dimensional display, the voltage having a frequency, a voltage value, or a duty ratio corresponding to a distance from the light source.

16. The display unit according to claim 6, wherein
the second electrode includes a plurality of fifth partial electrodes each extending in the first direction and each having a strip shape or a step shape, and
the plurality of fifth partial electrodes and the plurality of first partial electrodes are overlapped with each other.

17. The display unit according to claim 7, wherein an electrode width of the third partial electrodes is smaller than an electrode width of the second partial electrodes.

18. The display unit according to claim 17, wherein, in performing two-dimensional display, the drive section applies, to the second partial electrodes, a voltage having a voltage value smaller than a voltage value of a voltage applied to the third partial electrodes, a voltage having a duty ratio smaller than a duty ratio of the voltage applied to the third partial electrodes, or a voltage having a frequency smaller than a frequency of the voltage applied to the third partial electrodes.

19. An illumination device comprising:
a first transparent substrate and a second transparent substrate that are arranged to face each other with a distance therebetween;
a light source configured to apply light to an end surface of the illumination device; and
a light modulation layer provided in a clearance between the first transparent substrate and the second transparent substrate, the light modulation layer being configured to exhibit scattering property or transparency to the light from the light source depending on a magnitude of an electric field,
wherein the light modulation layer includes a first portion and a second portion, the first portion having optical anisotropy, and relatively high responsiveness to the electric field, and the second portion having optical anisotropy, and relatively low responsiveness to the electric field, and
wherein the light modulation layer generates polarized light when the light modulation layer exhibits the scattering property, the polarized light having a polarization component mainly in a first direction.

* * * * *